United States Patent

Bloomfield et al.

Patent Number: 6,157,464
Date of Patent: Dec. 5, 2000

[54] FACSIMILE STORE AND FORWARD SYSTEM WITH LOCAL INTERFACE

[75] Inventors: Mark C. Bloomfield, Marietta; Edward F. Castro, Acworth; Joseph T. Dyer, Marietta; Deborah J. Jackson, Smyrna; Charles E. Lemons, Alpharetta; Bruce A. McCown, Marietta, all of Ga.

[73] Assignee: PTEK Holdings, Inc., Atlanta, Ga.

[21] Appl. No.: 08/669,065

[22] Filed: Jun. 24, 1996

Related U.S. Application Data

[63] Continuation of application No. 08/567,410, Dec. 5, 1995, Pat. No. 5,559,611, which is a continuation of application No. 08/132,997, Oct. 7, 1993, Pat. No. 5,555,100.

[51] Int. Cl.$^7$ .............................. H04N 1/32; H04N 1/327
[52] U.S. Cl. .......................... 358/407; 358/442; 358/468
[58] Field of Search ..................................... 358/407, 434, 358/468, 442, 438; 379/100.09

[56] References Cited

U.S. PATENT DOCUMENTS

| | | | |
|---|---|---|---|
| 3,594,495 | 7/1971 | Bond | 178/5 |
| 3,641,432 | 2/1972 | Bond | 324/4 |
| 4,058,672 | 11/1977 | Crager et al. | 358/257 |
| 4,058,838 | 11/1977 | Crager et al. | 358/257 |
| 4,106,060 | 8/1978 | Chapman, Jr. | 358/256 |
| 4,571,699 | 2/1986 | Herzog et al. | 364/900 |
| 4,584,434 | 4/1986 | Hashimoto | 179/2 A |
| 4,602,129 | 7/1986 | Matthews et al. | 379/88 |
| 4,613,907 | 9/1986 | Yoshimoto et al. | 358/257 |
| 4,614,978 | 9/1986 | Doster et al. | 356/263 |
| 4,642,697 | 2/1987 | Wada | 358/439 |
| 4,646,160 | 2/1987 | Lizuka et al. | 358/402 |
| 4,654,718 | 3/1987 | Sucyoshi | 358/257 |
| 4,660,218 | 4/1987 | Hashimoto | 379/93 |
| 4,713,837 | 12/1987 | Gordon | 379/93 |
| 4,748,656 | 5/1988 | Gibbs et al. | 379/95 |

(List continued on next page.)

FOREIGN PATENT DOCUMENTS

| | | | |
|---|---|---|---|
| 3230609 | 2/1984 | Germany | H04N 1/00 |
| 57-184362 | 11/1982 | Japan | H04N 1/00 |

(List continued on next page.)

OTHER PUBLICATIONS

"A Message Handling System for Public Networks" Nakayama et al. ACM Eighth Data Communications Symposium, vol. 13 No. 4 pp. 103.111 1983.

(List continued on next page.)

*Primary Examiner*—Scott Rogers
*Attorney, Agent, or Firm*—Nora M. Tocups, Esq.; James L. Ewing, IV, Esq.; Kilpatrick Stockton, LLP

[57] ABSTRACT

A local router interface couples a conventional facsimile device to the public switched telephone network (PSTN) to communicate with a remotely located facsimile store and forward facility (F-SAFF) to perform a host of improved facsimile service methods, including a never no answer or busy send (NNABS) method, a never no answer receive (NNAR) method, a private facsimile method, a will call facsimile method, a pager facsimile method, a facsimile mail method, a facsimile information retrieve method, a facsimile information send method, a facsimile cover method, a facsimile speed cover method, a facsimile broadcast method, a facsimile flexible broadcast method, a facsimile access restriction method, a facsimile conversion method, an urgent facsimile method, and a facsimile addition method. Innocuous call progress monitoring with fast busy detection, post-fax line holding, F-SAFF-to-remote and remote-to-F-SAFF bridging are provided. The router includes detectors for loop-current, ring signals, call progress signals, precise busy signals, dual tone multi-frequency (DTMF) signals, and modulated data signals, as well as generators for going off-hook, generating and transmitting DTMF signals and modulated data signals over a wall phone line as well as ring and dial tone signals through an adjustable amplifier circuit and a subscriber line interface circuit to a fax telephone line. A switching connection circuit is also included for selectively connecting the wall phone line to the fax phone line and for selectively connecting other components of the telephony interface thereto.

16 Claims, 89 Drawing Sheets

U.S. PATENT DOCUMENTS

| | | |
|---|---|---|
| 4,837,798 | 6/1989 | Cohen et al. .............................. 379/88 |
| 4,870,678 | 9/1989 | Adachi ..................................... 358/434 |
| 4,893,333 | 1/1990 | Baran et al. ............................. 379/100 |
| 4,905,273 | 2/1990 | Gordon et al. ............................. 379/93 |
| 4,918,722 | 4/1990 | Duehrene et al. ...................... 379/100 |
| 4,922,518 | 5/1990 | Gordon et al. ............................. 379/57 |
| 4,935,955 | 6/1990 | Neudorfer ................................ 379/100 |
| 4,941,170 | 7/1990 | Herbst ..................................... 379/100 |
| 4,942,599 | 7/1990 | Gordon et al. ............................. 379/93 |
| 4,967,288 | 10/1990 | Mizutori et al. ........................ 358/425 |
| 4,969,184 | 11/1990 | Gordon et al. .......................... 379/100 |
| 4,974,254 | 11/1990 | Perin et al. .............................. 379/100 |
| 4,994,926 | 2/1991 | Gordon et al. .......................... 358/400 |
| 5,008,926 | 4/1991 | Misholi ..................................... 379/89 |
| 5,033,079 | 7/1991 | Carton et al. ...................... 379/100.09 |
| 5,065,254 | 11/1991 | Hishida .................................. 358/400 |
| 5,136,634 | 8/1992 | Rae et al. ................................ 379/100 |
| 5,193,110 | 3/1993 | Jones et al. ................................. 94/51 |

FOREIGN PATENT DOCUMENTS

| | | | |
|---|---|---|---|
| 58-165452 | 9/1983 | Japan ............................... H04N 1/00 |
| 58-186253 | 10/1983 | Japan ..................................... 358/403 |
| 59-015387 | 1/1984 | Japan ............................... H04N 7/16 |
| 59-214365 | 12/1984 | Japan ............................... H04N 3/42 |
| 59-231964 | 12/1984 | Japan ............................... H04N 1/00 |
| 60-119164 | 6/1985 | Japan ................................... 379/100 |
| 6253545 | 3/1987 | Japan ............................... H04L 1/00 |
| 1258526 | 10/1989 | Japan ............................. H04L 11/20 |
| 2211698 | 7/1989 | United Kingdom ..................... 379/98 |

OTHER PUBLICATIONS

Advanced Facsimile Communication Network, Ejiri 11B830700, pp. 178–18198.

"An Answering Machine That Really Gives Answers", Deidre A: Depke, Oct. 9, 1989.

Audiofax, Inc. Proposal for Bellsouth Advanced Networks Facsimile Automated and On–Demand Distribution Methods Oct. 6, 1988 p. 26.

CCITT "Telematic Services: Operations and Quality of Service" Recommendations F. 162 vol. II, Sections 1–10, 1984.

Trilogue Message Management Systems, Comverse Technology, Inc.

Control Methods for Facsimile Store and Forward Communication Serivces, IEEE/IEICE, Conference Record.

Design for Facsimile Storage and Conversion Processing in STOC–201, Shimamura etal. vol. 33 No. 1, 1985.

Development of a Multi–Media MHS Based on CCITTX. 400 Recommendations Computer Message Systems—BSE/ Server Science Publ. 1986.

Development of a Public Facsimile Comm. System Using Storage and Conversion Techniques—pp. 19–4, 1–5, 1980.

Development of Fax Comm. System for Packet Switched Data Network International Conf. vol. 2 of 4, 1981.

Enhanced Fax Comm. Network, Japan Telecommunications Review pp. 30–35, Jan. 1986.

Fax Controller—Smart 1—SPC Fax Dialer—MITEL Enterprises Nov. 1991.

Audiofax, Inc. Fax Management System Description, Jul., 1991, Release 1.5 pp. 1–Index–4.

Fax/PAK Facsimile Transmission Service, Universal Compatability Between Fax Machines, The Next Breakthrough, Service Features.

FaxMaster 21 Remote Operation, What is Remote Operations? How to Set Up Fax Master for Remote Operations— p. 1–61—FaxMaster 21 Handbook.

Faxmaster Made Easy to: Distribution From: Mike Domefield, Jun. 9, 1985—Internal Memo.

Feigenbaum "Information Disclosure Statement" for 192, 839, Apr. 1990 Pat #4,918722 File History.

The Fax Network—Intelligent Comm. Module (ICM) Product Specifications—May 11, 1992.

Interfax's Unique Fax Service—May 1990—p. 58–9—Teleconnect MCI—Safe(R)Store–and–Forward Message Switching System.

User's Guide Standard Asynchronous Access (in part), Public Fax Comm. Network IEEE Comm. Mag. 8203 pp. 47 et. seq. 1982.

"Smart Fax" Mailbox Manager From Electron.

System Spec. for Bell South Adv. Networks, Nov. 28, 1988, Fax Automated and On–Demand Distribution Methods.

A TR300–Telephone Line Powered Call Controller for Routing Calls Transparently to Alternative Long Distance Carriers.

Trilogue Hardware Architecture—Comverse Technology, Inc. 1987.

The 3M Fax Xchange Fax. Network Switch Turns Your Fax. Network Into a Highly Efficient, High–Volume Control— Publ. Date Unknown—p. 1–2.

US Fax—Publication Date Unknown—pp. 1–8.

Fax Fever Slams Business Hard—Insight Magazine Aug. 22, 1988.

Facsimile Communication in Digital Network—Masayoshi etal.—Jan. 1984—pp. 19–27.

AT&T Fax Products & Services Speed The Written Message—1989 pp. 12–17—Licwinko et al.

CCITT—Red Book—vol. VIII—Data Comm. Networks Message Handling Systems—1985—pp. 1–38.

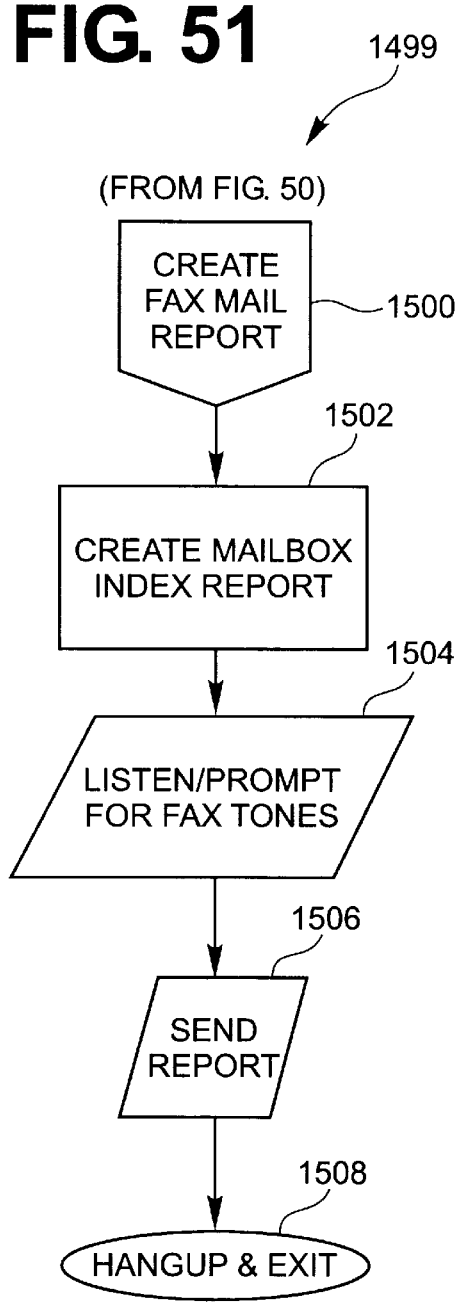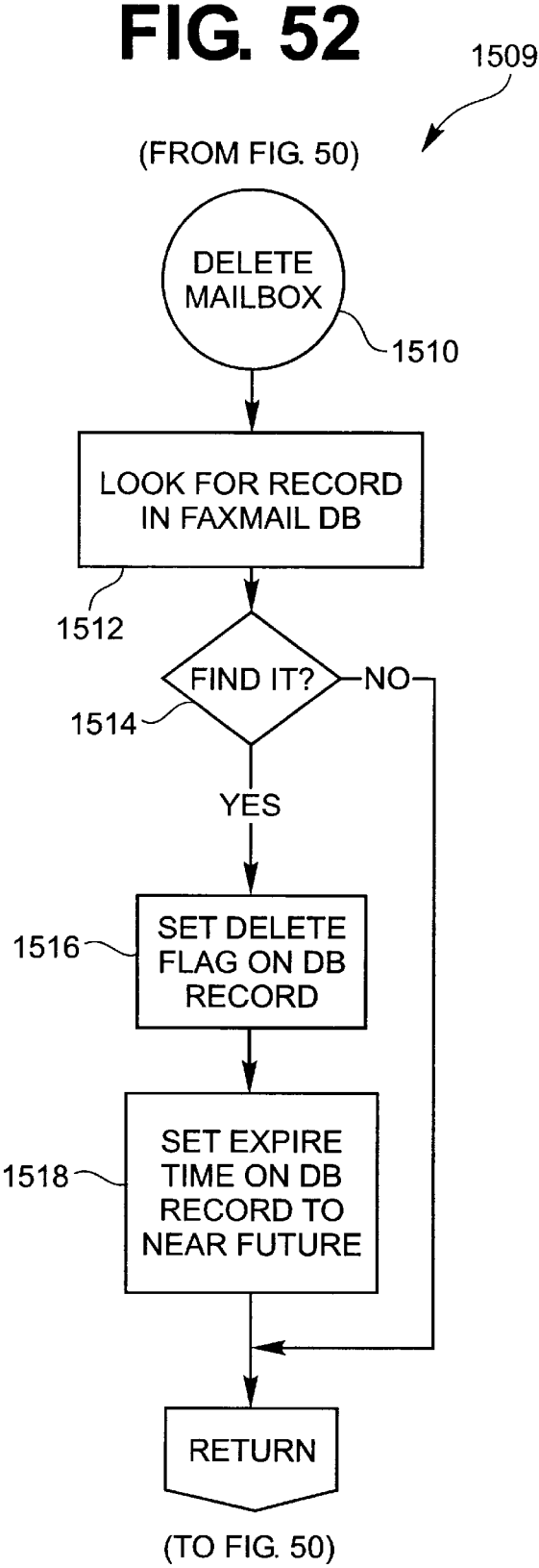

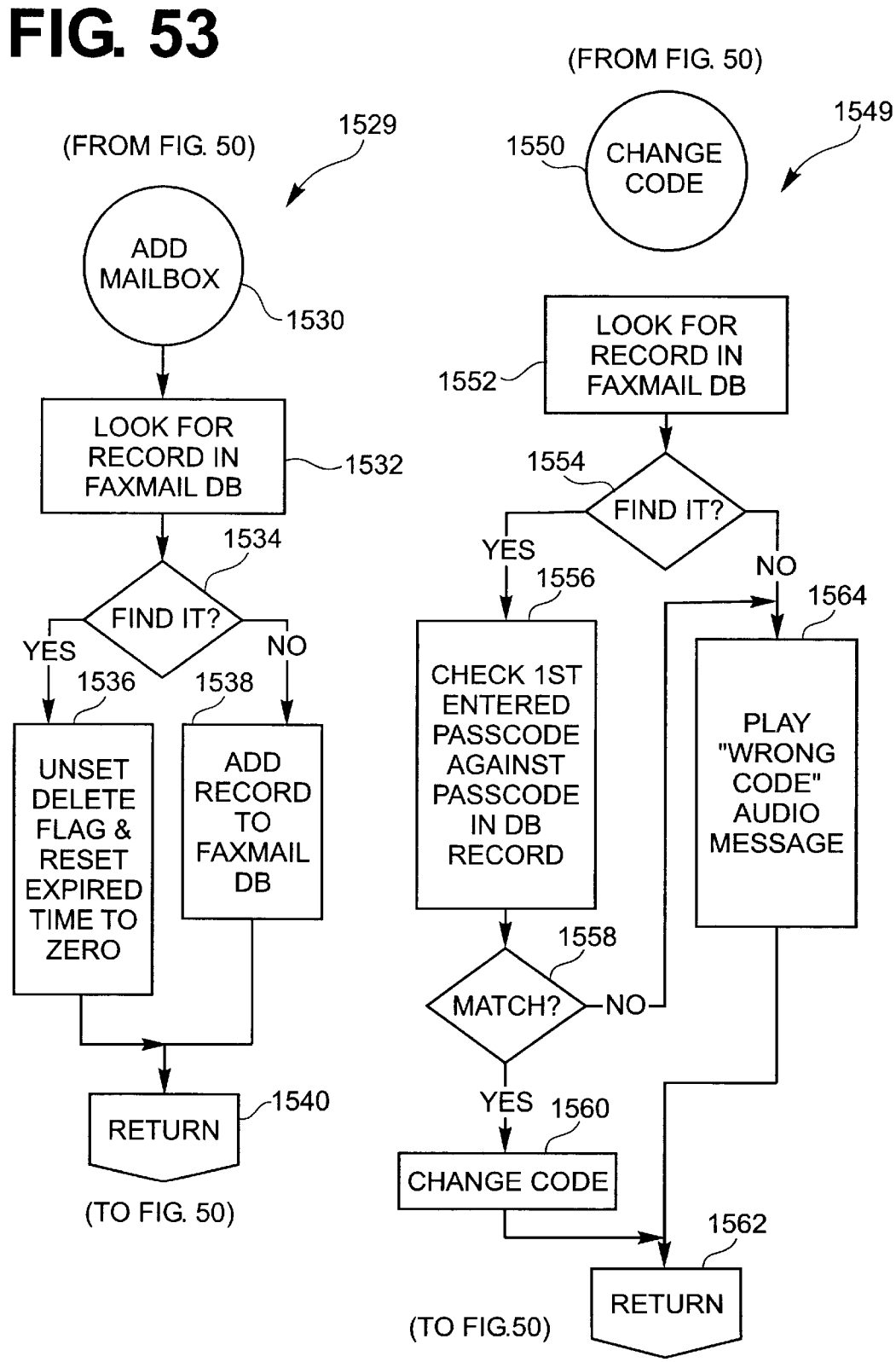

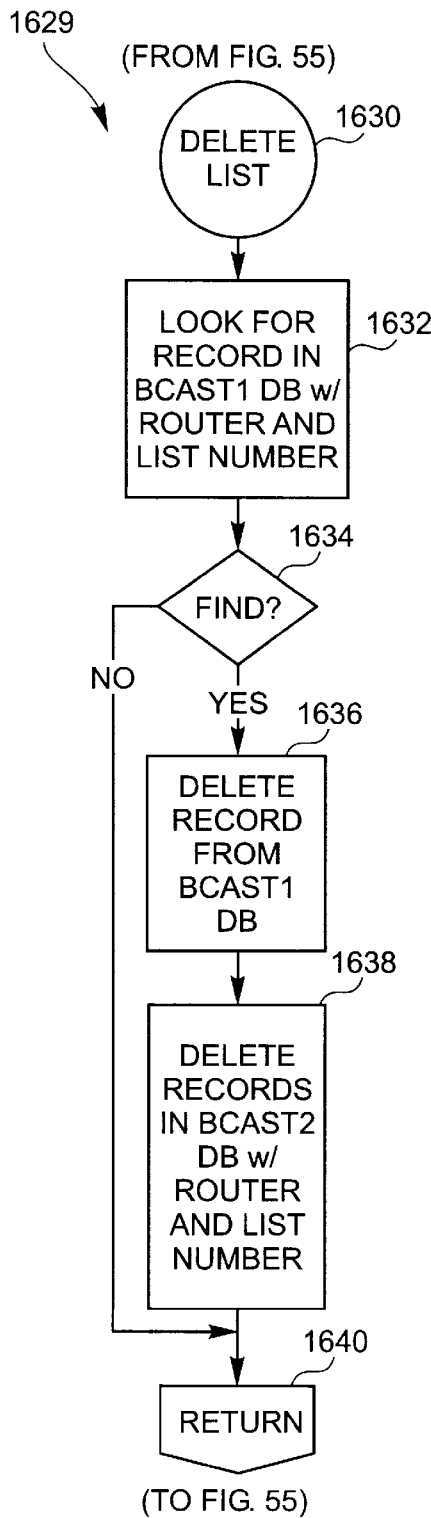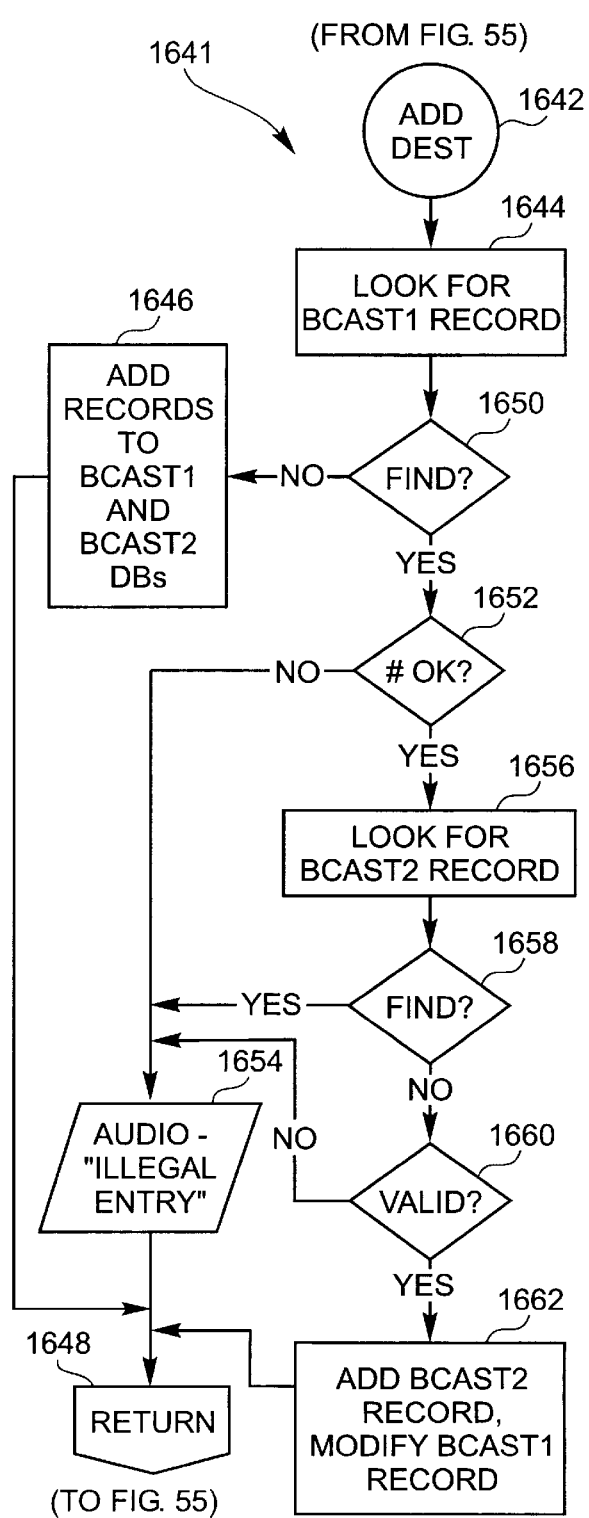

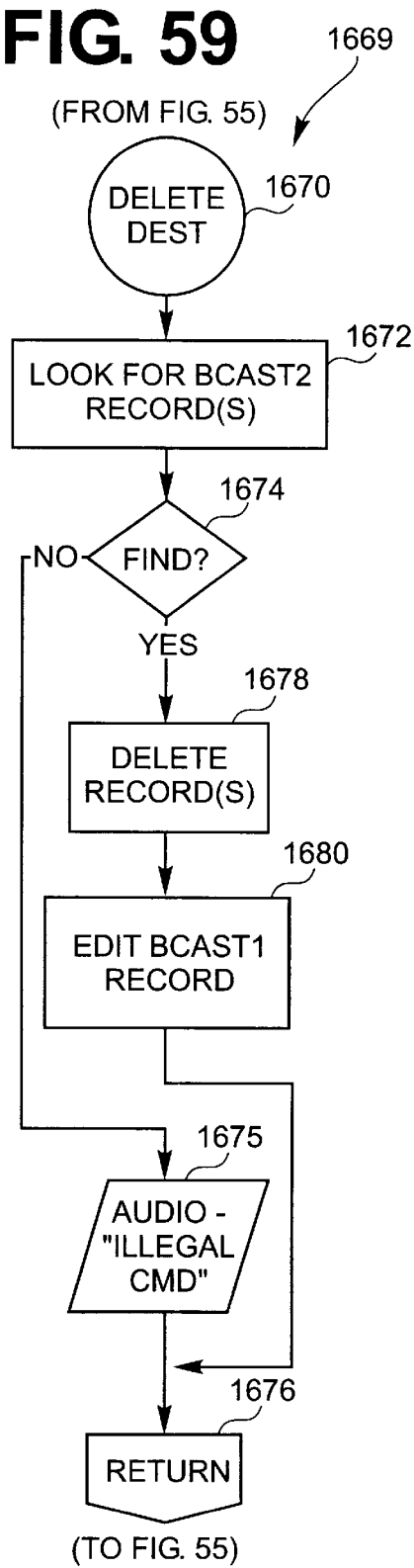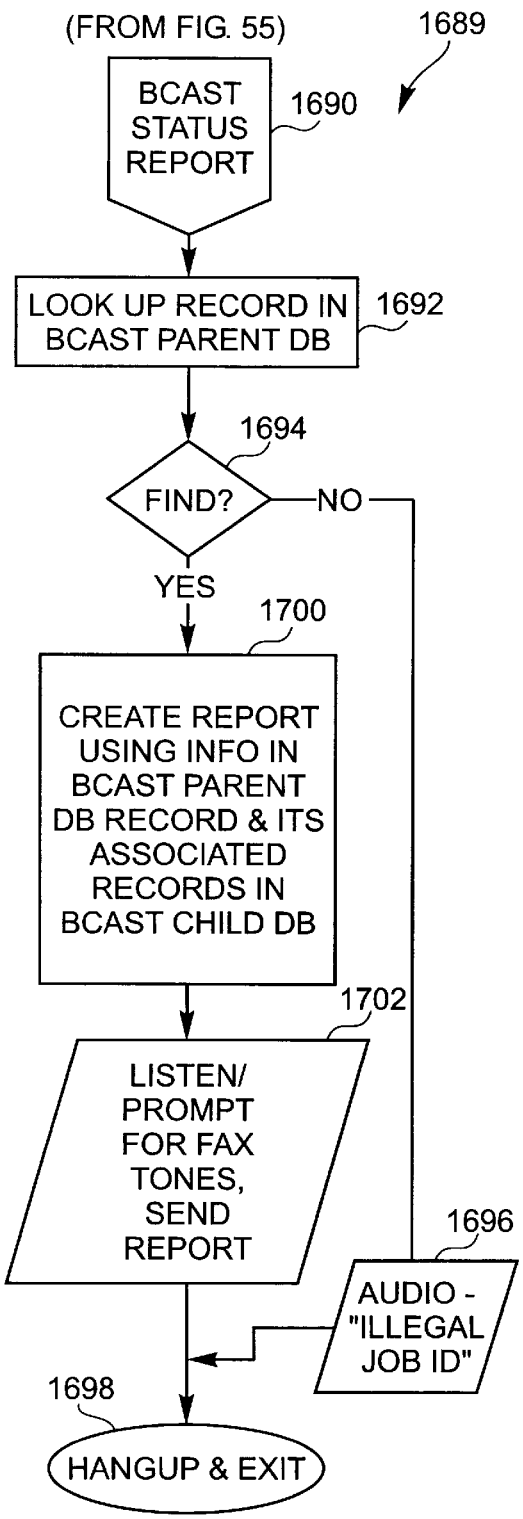

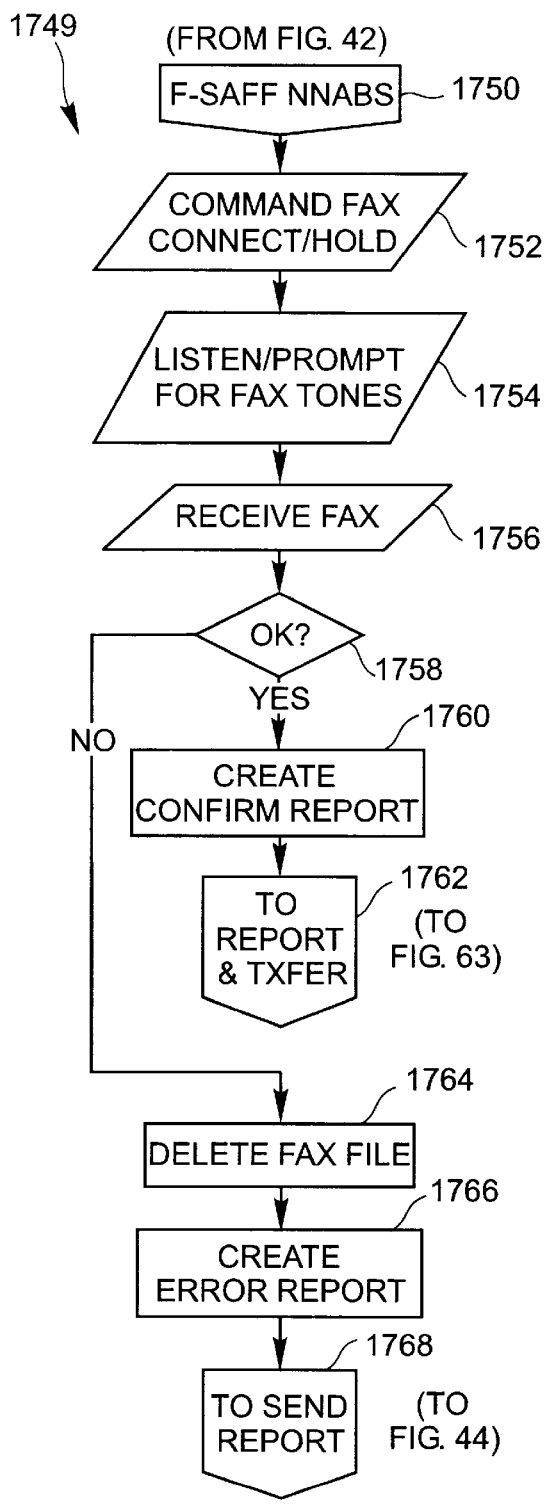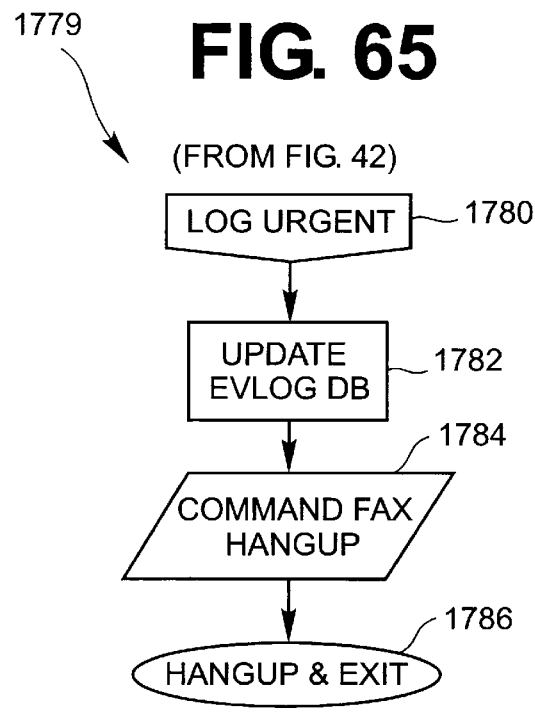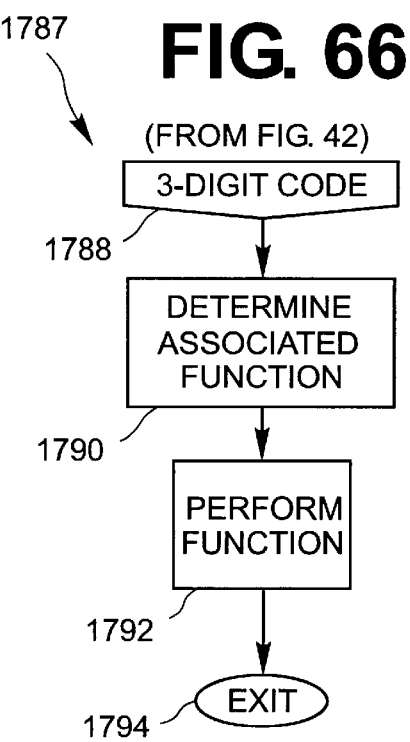

FIG. 67

(FROM FIGS. 42, 68)

FLEX B'CAST — 1880

↓

CALL GET/HOLD FAX — 1882
(TO FIG. 48)

↓

GENERATE UNIQUE JOB ID, JOB START TIME, EST. FINISH TIME — 1884

↓

ADD RECORD TO BC PARENT DB AND ADD RECORDS TO BC CHILD DB; CREATE JOB CONFIRM REPORT — 1886

↓

TO REPORT & TXFER — 1888
(TO FIG. 63)

FIG. 68

(FROM FIG. 42)

B'CAST FAX — 1892

↓

LOOK FOR RECORDS IN BROADCAST DB w/ ROUTER AND LIST NUMBER, COMBINE DESITINATIONS — 1894

↓

TO FLEX B'CAST — 1896
(TO FIG. 67)

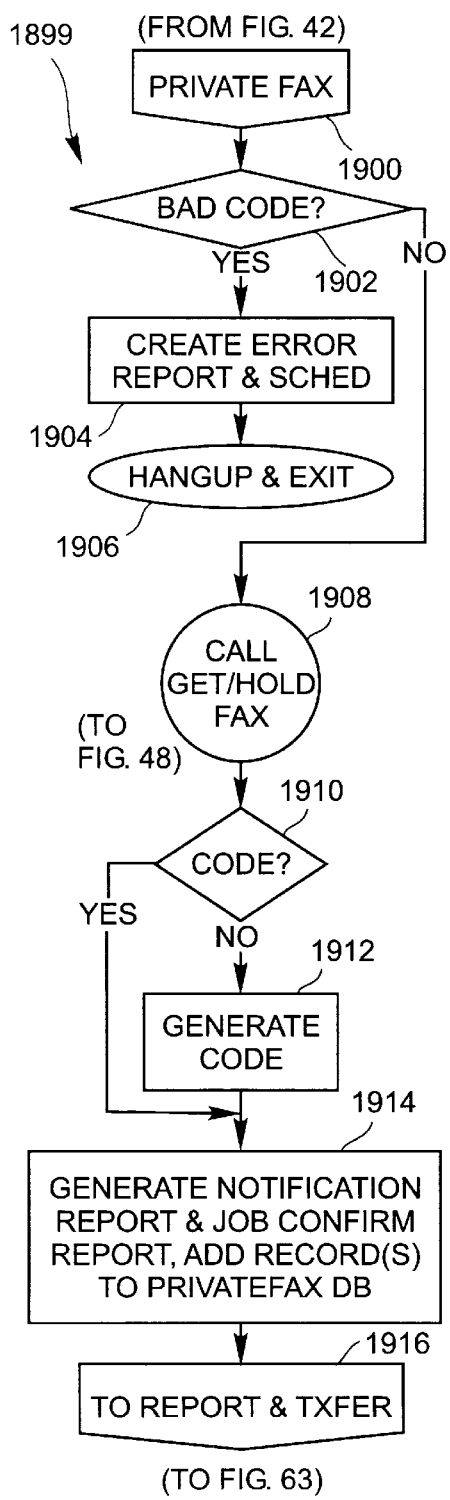
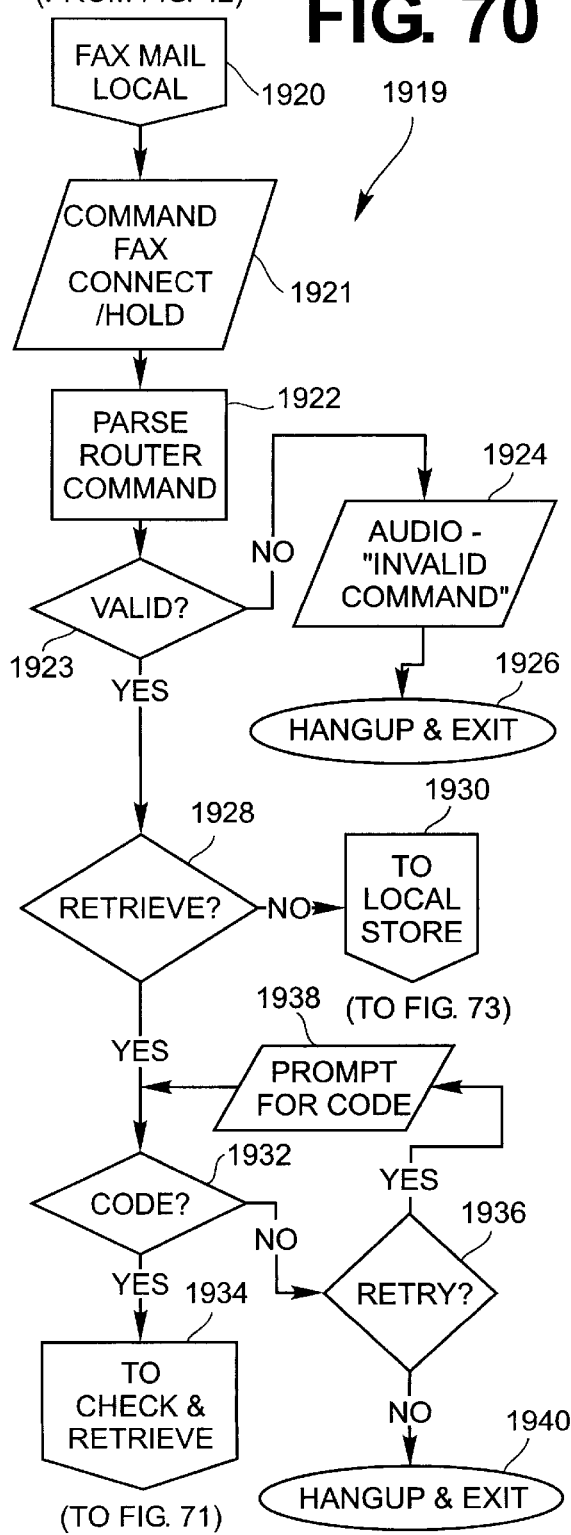

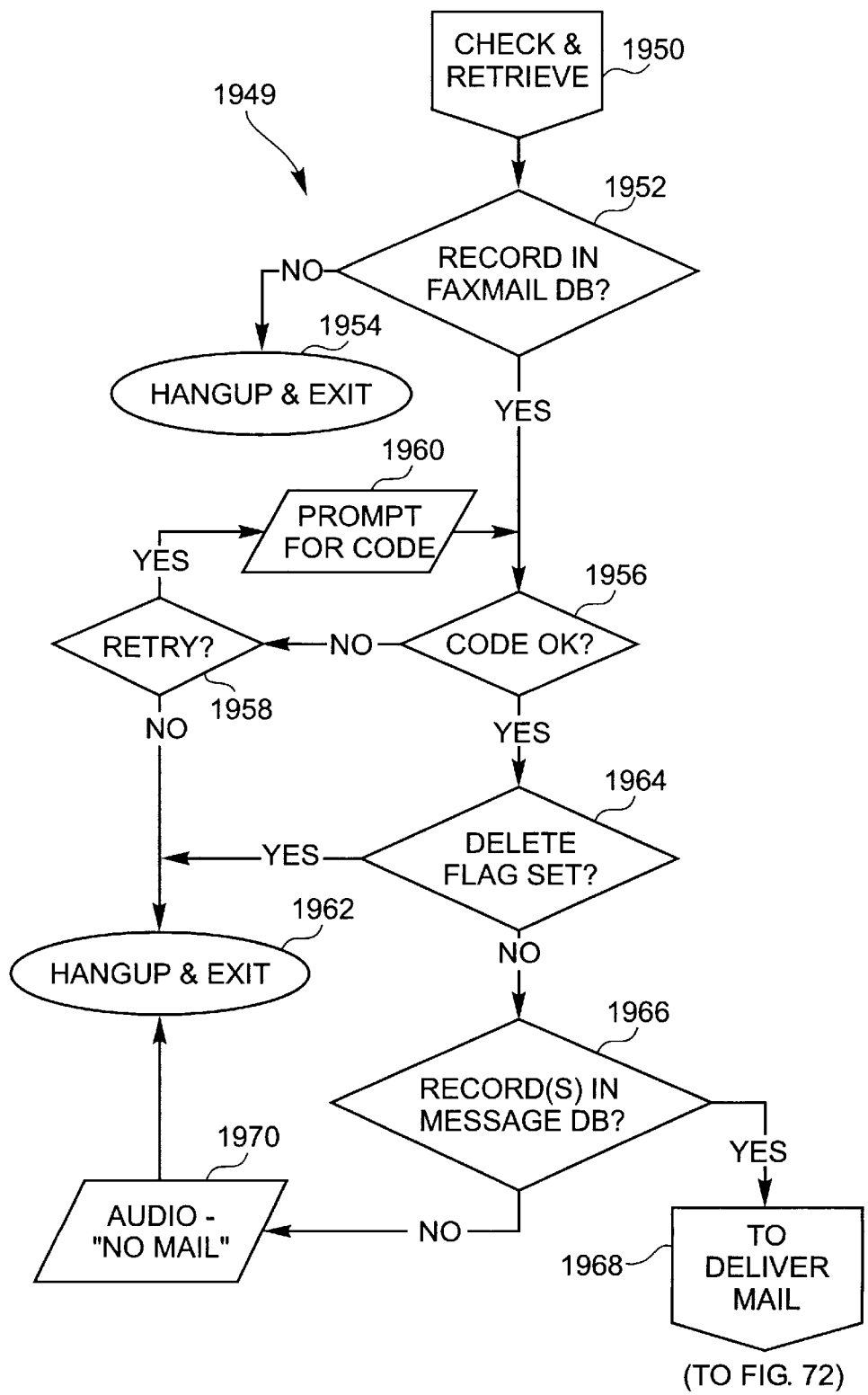

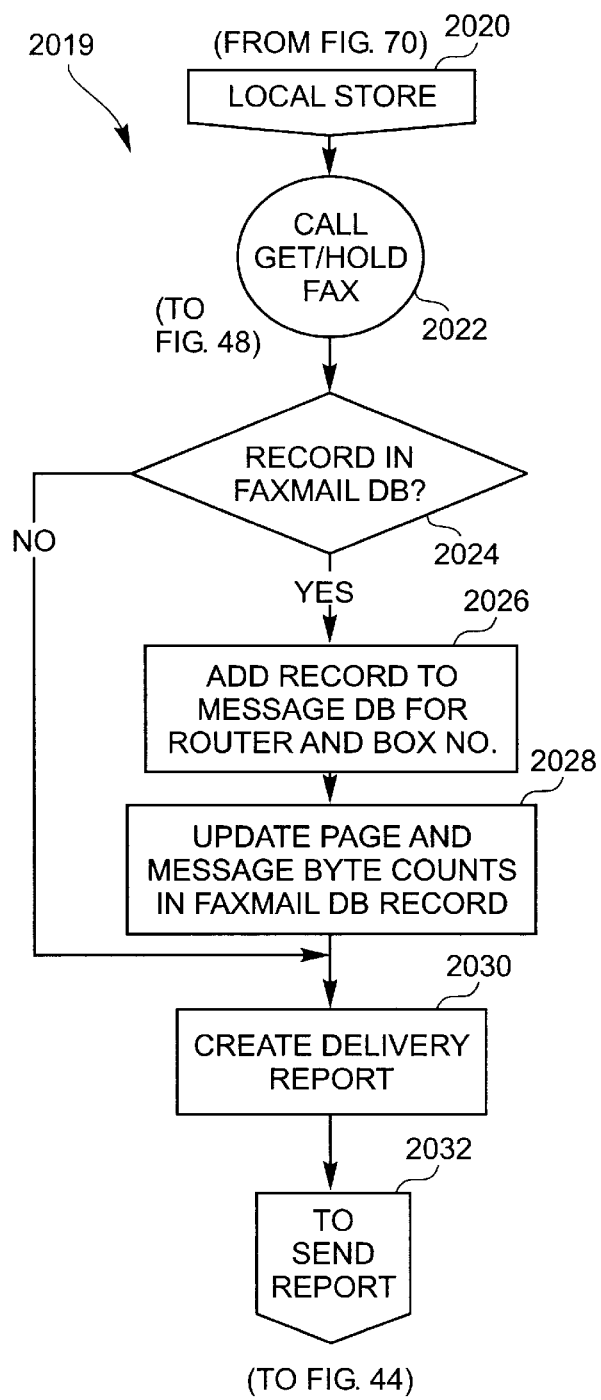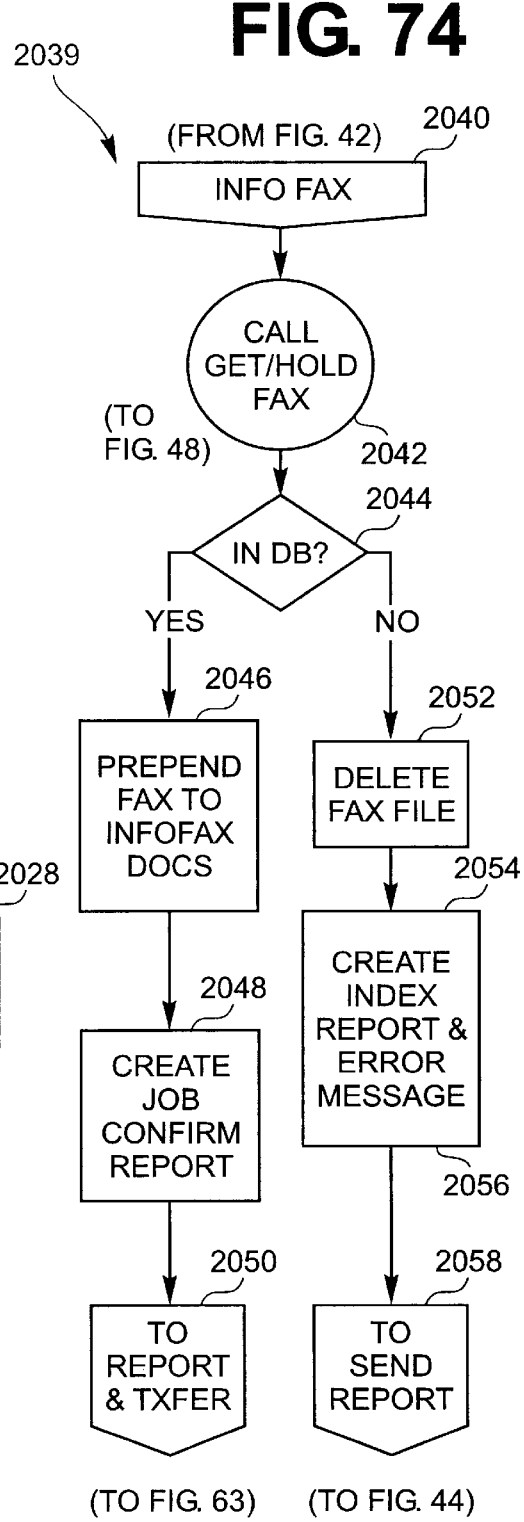

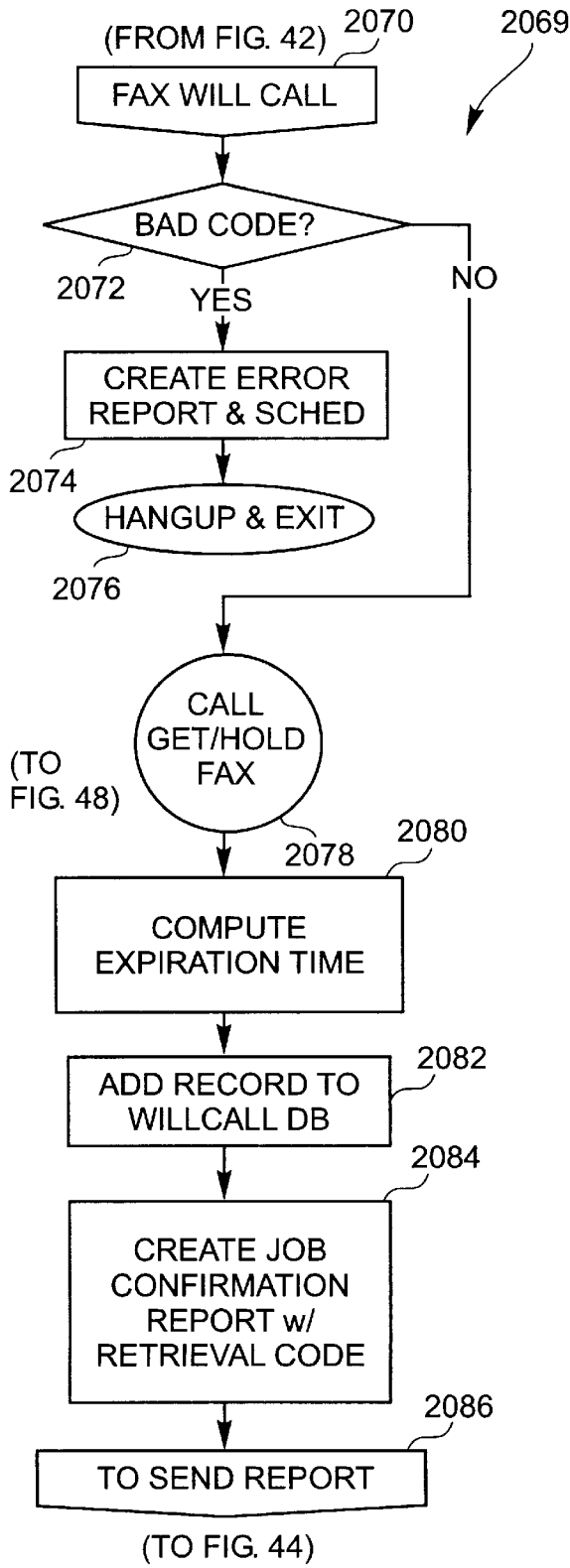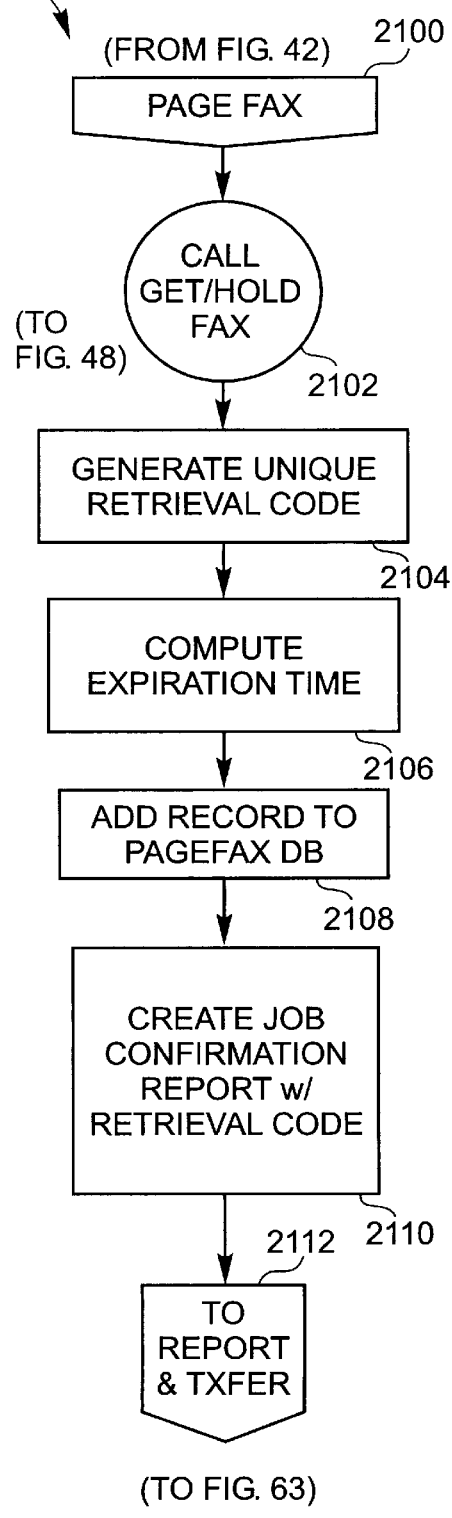

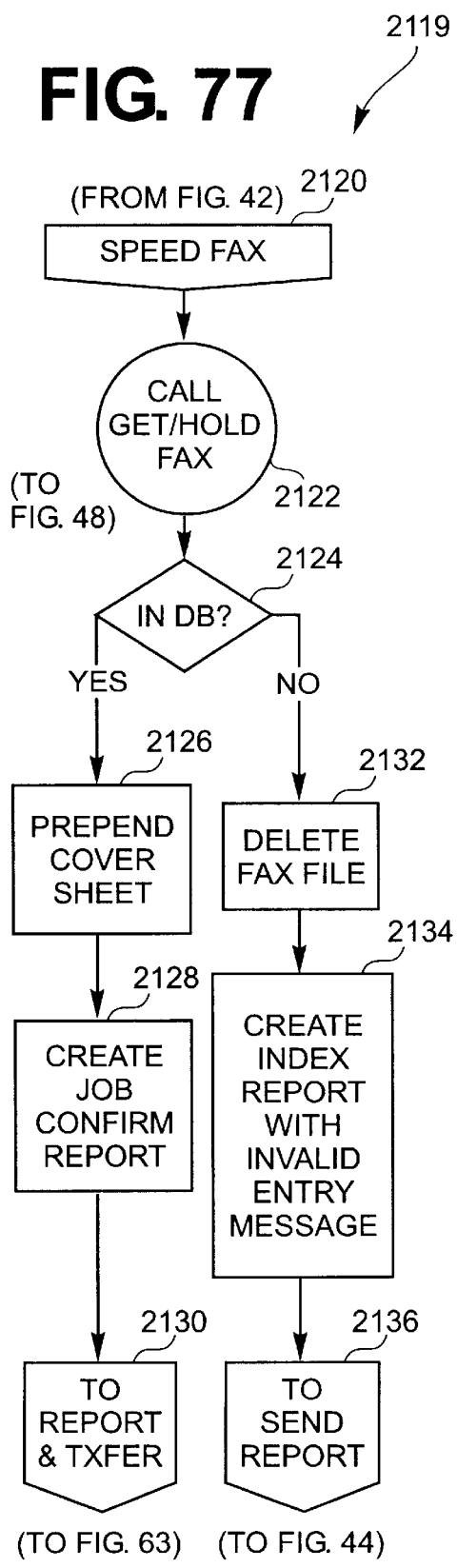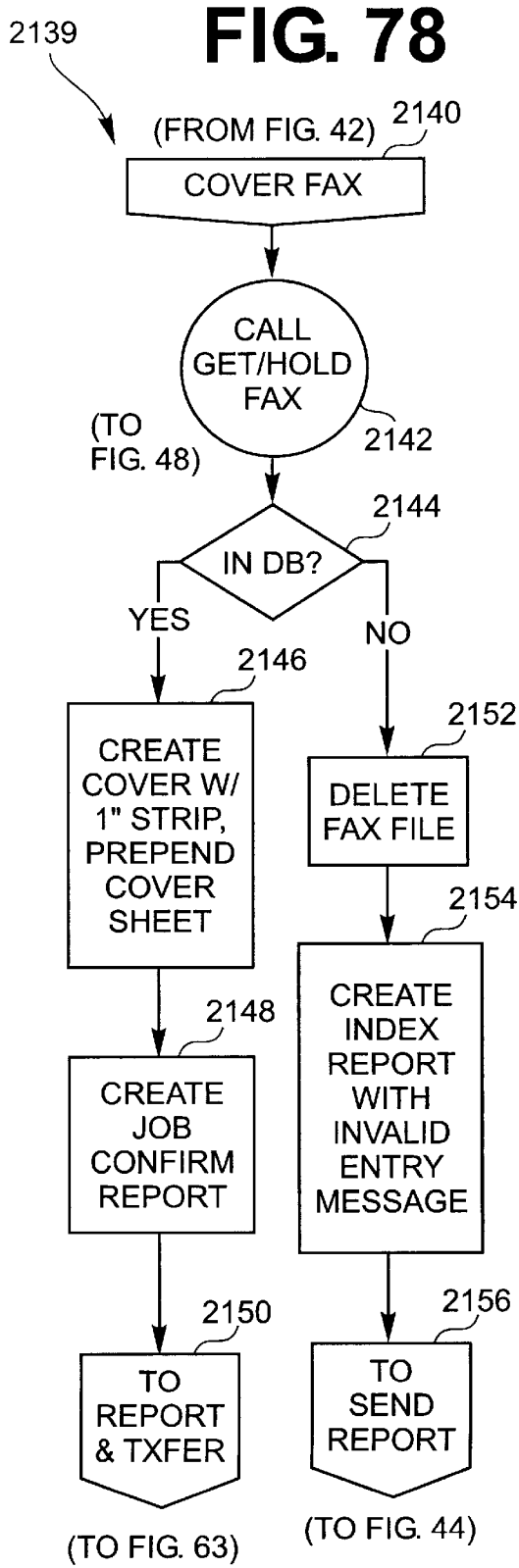

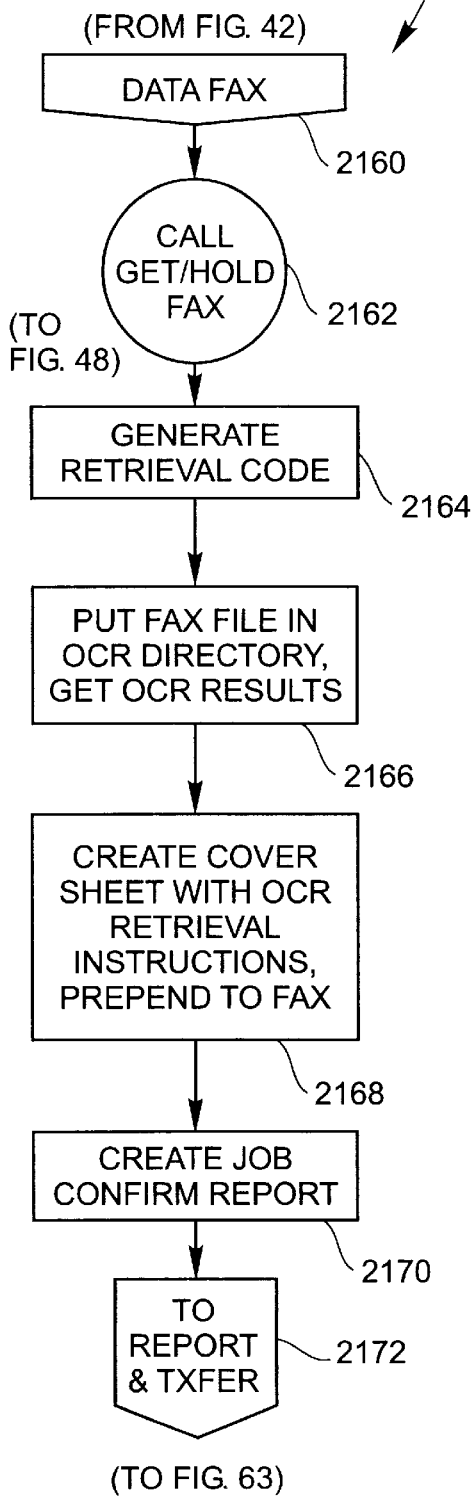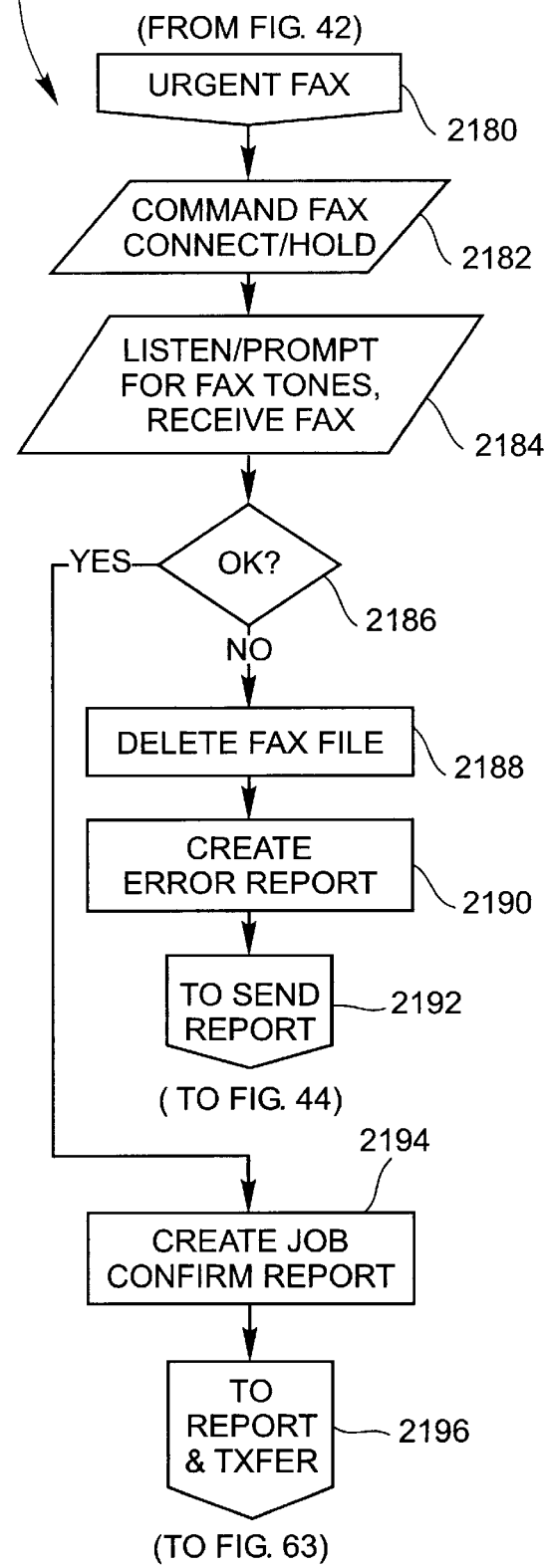

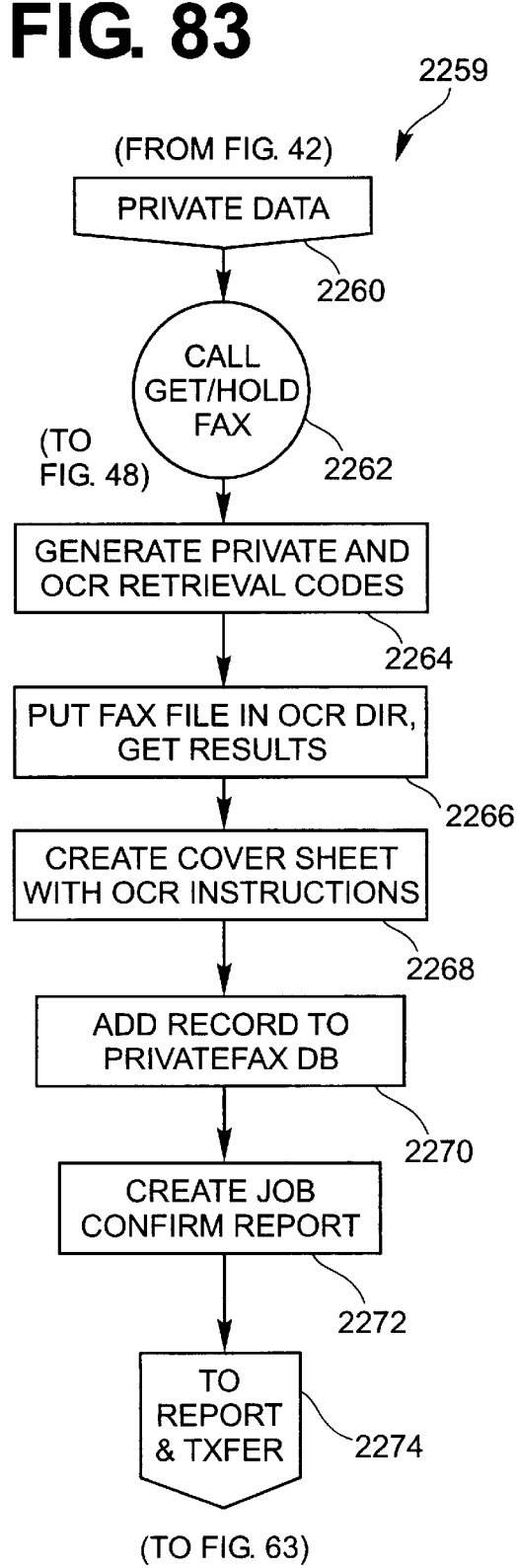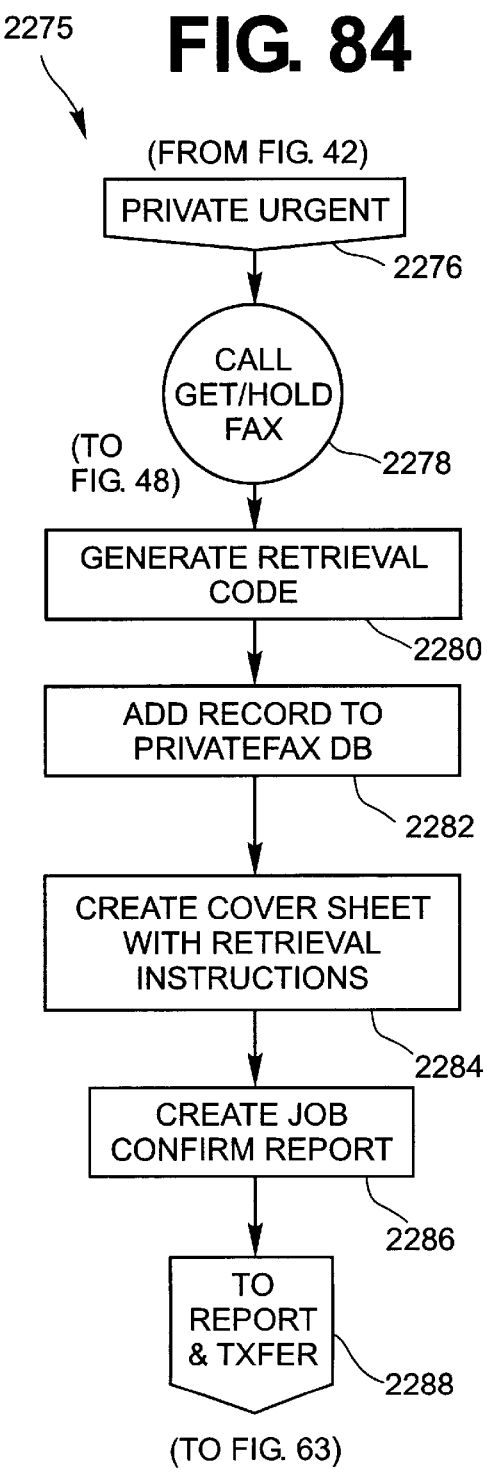

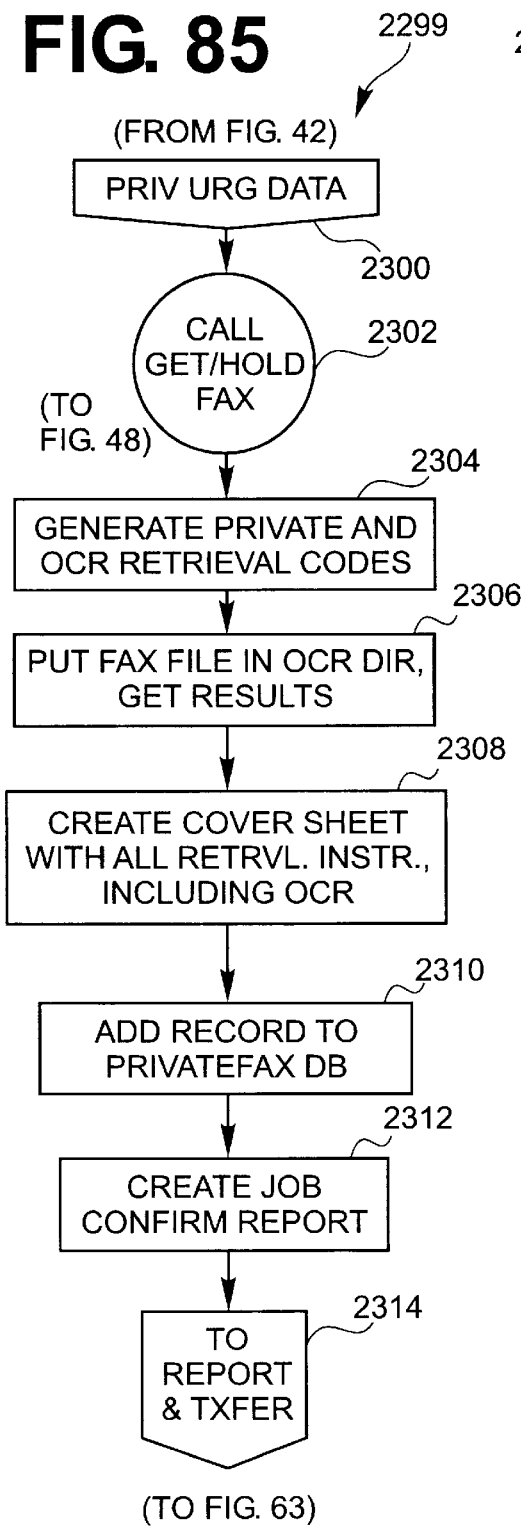
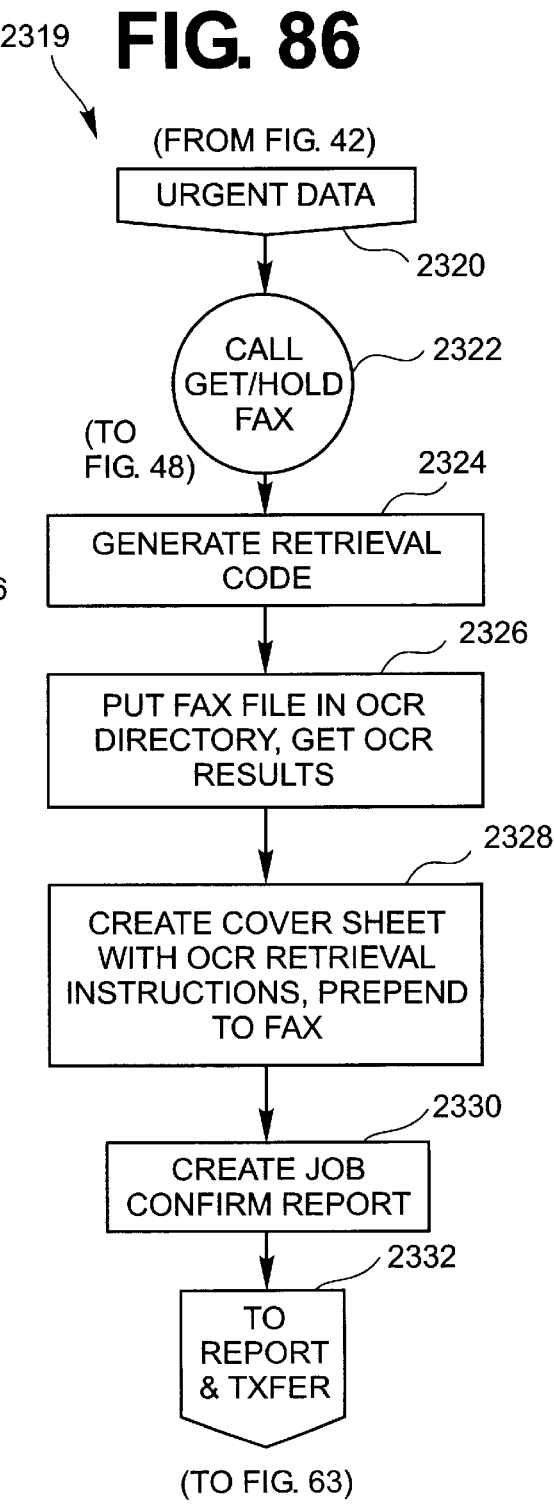

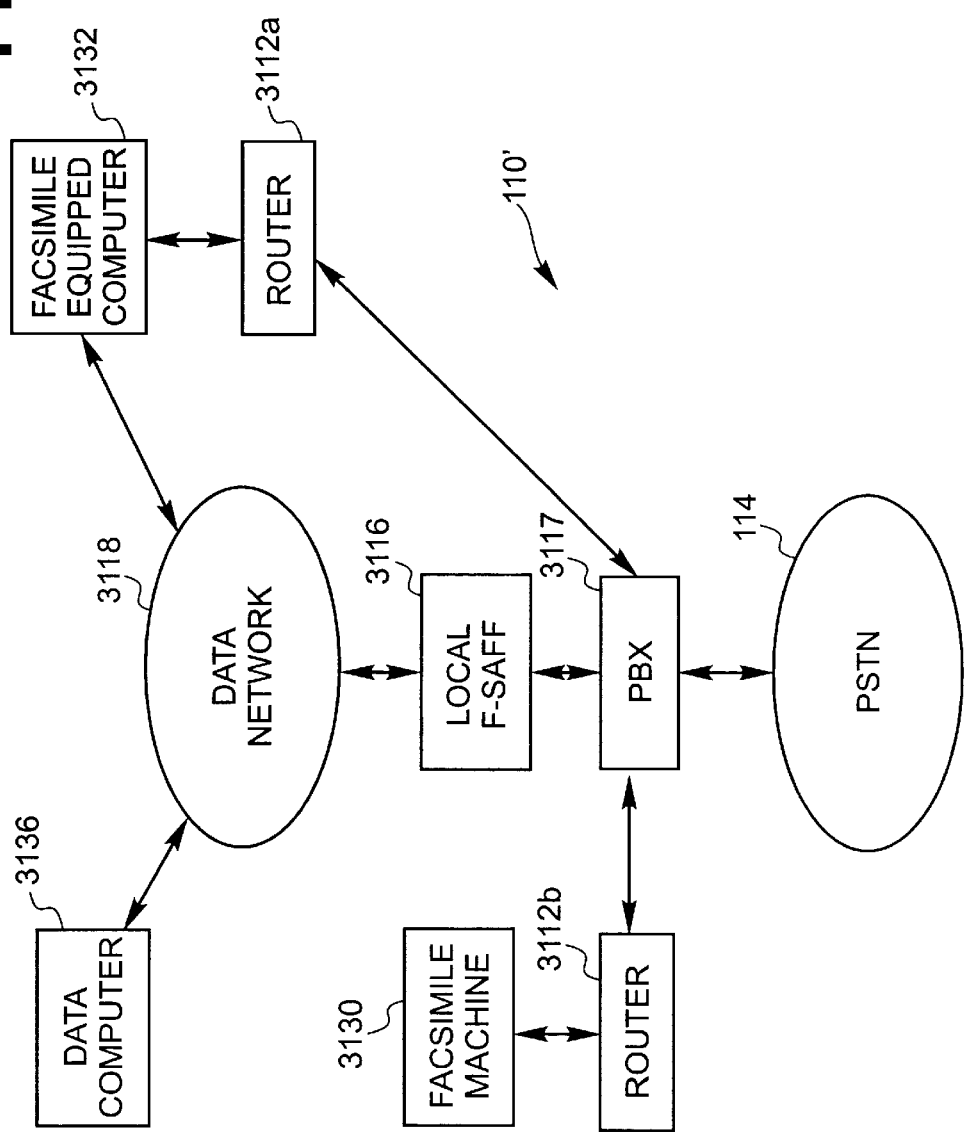

FACSIMILE STORE AND FORWARD SYSTEM WITH LOCAL INTERFACE

CROSS-REFERENCE TO RELATED APPLICATIONS

This application is a continuation of application Ser. No. 08/567,410, filed on Dec. 5, 1995, now U.S. Pat. No. 5,559,611, which is a continuation of application Ser. No. 08/132,997, filed on Oct. 7, 1993, now U.S. Pat. No. 5,555,100.

BACKGROUND OF THE INVENTION

The present invention relates generally to the field of facsimile telecommunications, and more specifically, to the field of services provided by, and methods of gaining access to, facsimile store and forward facilities (F-SAFF's).

The field of facsimile telecommunications is now a relatively old field of technology and currently includes an immense number of active facsimile communication devices. Nonetheless, the number of facsimile machines in use throughout the world continues to increase very rapidly. Many business people view the ability to transfer information through facsimile communication as an integral part of their businesses. While there are undoubtedly many reasons for the widespread acceptance of facsimile technology, one apparent reason for this success is the striking simplicity of the basic operation of a facsimile machine. Many people find it very easy to use and learn to use the basic operation of a conventional facsimile machine since such operation usually only encompasses inserting a document into the facsimile machine, dialing a telephone number, and pressing a start key. Without a doubt, such a procedure is much less complicated than the operating procedures of many electronic devices in use today.

While conventional basic facsimile technology has existed for many years now, the conventional facsimile method has always had several rather serious drawbacks. While often faster, less expensive, and more convenient than other forms of information transfer, such as the postal service or courier document delivery services, the conventional facsimile communication method suffers from many old and new problems which may delay, prevent or complicate facsimile transfer of information. Of all these problems, the unavailability of facsimile machines and intended recipients are perhaps the most serious. In an ideal sense, if every person carried a personal facsimile machine which was always able to simultaneously send and receive facsimile information, which answered to a telephone number known by everyone else, and which was continuously monitored by the owner, the problems of facsimile machine unavailability and intended recipient unavailability would not be such serious problems. Unfortunately, since such is not the case, facsimile machine users often experience many frustrating difficulties with basic facsimile communication.

For instance, it is often very frustrating for a person to dial a destination telephone number and receive either a busy signal or no response at all. The sender often wastes considerable amounts of time continuing to initiate telephone calls in an all to common "hit or miss" process. Such a situation can likewise be very frustrating for an intended recipient who is expecting to receive facsimile information or is unaware of a problem with the destination facsimile machine, such as a paper-out situation. In addition, facsimile machines are often effectively unavailable because of problems arising during the actual electronic transfer of facsimile information. In other words, it is not uncommon for senders of facsimile information to make mistakes in dialing destination facsimile telephone numbers, for switching equipment in public and private networks to fail or misdirect a call, or even for facsimile information to be overwritten in facsimile machines with limited amounts of storage memory.

Furthermore, intended recipients are often effectively unavailable because of difficulties encountered during the physical phase of transferring a facsimile hard copy output from a destination facsimile machine to the intended recipient. Unfortunately, it is often the case that (i) the hard copy is ignored for a long period of time in a facsimile tray, in an employee mail slot, on an intermediate employee's desk, or in a variety of other places, (ii) the hard copy is mistakenly directed to, or obtained by, an employee other than the intended recipient, or (iii) the hard copy is mistakenly thrown away. These are only a few of the reasons the physical phase of transferring a facsimile hard copy to an intended recipient often renders the recipient at least temporarily effectively unavailable to basic facsimile communication. Furthermore, to magnify the problem, senders often incorrectly assume that successful facsimile communication has taken place by relying on so-called "confirmation" printouts from the sending facsimile machines even though such indications do not confirm communication with the intended recipient person but merely suggest that information has been transferred to some machine somewhere. Moreover, many of the previously-identified problems are intensified and create additional frustration when information to be communicated is especially important, urgent, or confidential.

In addition, intended recipients are often physically separated from their normal facsimile machines when they desire to receive facsimile information or when a sender desires to send such information. Achieving such a delivery of information can often be very frustrating, requiring several telephone calls and the immediate assistance of several additional people. A sender may also desire to make facsimile information available to an unlimited number of unknown (effectively unavailable) potential recipients. It could obviously be very frustrating and expensive to provide a staff of people to receive and service telephone calls from desirous recipients.

Besides experiencing problems related to recipient and facsimile machine unavailability, users of basic facsimile methods often send the same facsimile information to more than one destination. Successive attempts to send the same information to multiple destinations can occupy a facsimile telephone line for long periods of time. This practice of manually broadcasting information to multiple destinations only compounds the facsimile machine unavailability problem. In addition, users of basic facsimile methods often create additional unavailable times sending multiple facsimile transmissions which include standard portions, such as cover sheets or other standard information. Another problem with conventional facsimile communication is unauthorized outbound transmissions. In many cases, long distance bills can become especially high with uncontrolled usage. Yet another area in which conventional facsimile communication could be improved is the frequently manual stage of retyping information received through facsimile communication.

Systems and methods have been offered in the past for addressing a few of the issues and problems identified above. Some advanced, more expensive, facsimile machines have been designed to, among other functions, provide a limited amount of memory for storing a limited amount of incoming facsimile information in a paper-out situation or storing outgoing facsimile information for retrying unavailable destinations or broadcasting the information to more than one destination. Unfortunately, in addition to obvious memory constraints, these advanced facsimile machines are often much more expensive than basic facsimile machines. Also, and more importantly, the additional functionality often creates more time in which the facsimile machine is unavailable for receiving or sending other facsimile information. Moreover, many additional functions, are simply too complicated for many people to use or learn to use. For instance, some facsimile machines are capable of providing output to personal computers which can be programmed to perform optical character recognition (OCR) on the facsimile information, thereby decreasing time spent manually retyping the information. In addition to such procedures being complicated, difficult to learn and time consuming in and of themselves, the cost of acquiring these more expensive facsimile machines and sophisticated OCR software is often very prohibitive despite characteristically poor output quality.

Another proposed solution includes the use of remotely located facsimile store and forward facilities (F-SAFF's). Various types of enhanced facsimile services have been offered by these facilities to combat many of the above problems. Enhanced facsimile services have included, among others, a facsimile overflow service for receiving calls directed to or from unavailable facsimile machines, a facsimile mailbox service similar to the more common voice mail service but for facsimile information, a facsimile broadcast service for distributing facsimile information to multiple destinations, and a fax on demand service for allowing public access to facsimile information. While these enhanced facsimile services have addressed some of the above problems of conventional basic facsimile methods, problems still remain, including new problems created by the services themselves. Consequently, F-SAFF's have not yet received widespread acceptance.

With many of the enhanced facsimile services, a user is required to dial into a facility and traverse a set of voice menus, often requiring a personal identification number (PIN), before being allowed to transmit the facsimile information. Thus, users often spend large amounts of time using and learning to use complicated procedures. In addition, the initializing stages of activating the services are often just as complicated and time consuming. Another major reason F-SAFF's are not as popular as many had hoped is that a user is often required to change or add one or more new telephone numbers to utilize the services. In other words, to use many of the services, a user would often be forced to acquire and distribute new stationary, business cards, etc., in addition to learning new telephone numbers. In addition, depending on whether the service provider is a Regional Bell Operating Company, a long distance provider, or other class of provider, the ability to deliver and bill for delivering facsimile information across long distance lines and provide other specialized services frequently presents additional complications for the service provider and the user.

There is, therefore, a need in the industry for a system which addresses these and other related, and unrelated, problems.

SUMMARY OF THE INVENTION

Briefly described, the present invention includes, in its most preferred method and apparatus embodiments, a facsimile store and forward system including, among other elements, a local interface and a remotely located facsimile store and forward facility (F-SAFF) which cooperate to perform a host of improved facsimile service methods. In its most preferred embodiment, the local interface is a router device which is coupled between a conventional facsimile machine and the public switched telephone network (PSTN). The router includes a wall telephone line coupler for coupling a wall telephone line (including private branch exchange (PBX) lines) to the router, a fax telephone line coupler for coupling a telephone line connected to a local facsimile machine to the router, telephony interface circuitry coupled between the wall telephone line coupler and the fax telephone line coupler, and central processing unit (CPU) circuitry for directing operation of the telephony interface to, at least, generate command data and communicate command data and facsimile information with the F-SAFF. Also included in the router is a telephone line surge protector coupled between the telephony interface and the wall telephone line coupler. Furthermore, the router includes a male AC coupler for coupling the router to an AC power outlet, a female AC coupler for receiving a local facsimile machine power cord, a fused AC surge protector, including a visual integrity indicator, for protecting the router and the local facsimile machine from AC surges, and an isolated power supply, including a visual power-on indicator, for converting the AC power into DC power at various voltages. A speaker is also included for audible indications of various types of errors and reception of urgent facsimile information, as is discussed below in greater detail.

The telephony interface of the router, in its most preferred embodiment, includes a detector for detecting loop current on the fax telephone line, detectors for detecting ring signals, call progress signals, and precise busy signals on the wall telephone line, and a detector for detecting dual tone multi-frequency (DTMF) signals and modulated data signals on either or both telephone lines. The telephony interface further includes an outbound generator for loading the wall telephone line and generating and transmitting DTMF signals and modulated data signals over the wall telephone line and an inbound generator for providing battery to the fax telephone line and generating and transmitting ring and dial tone signals through an adjustable amplifier circuit and a subscriber line interface circuit to the fax telephone line. A switching connection circuit is also included for selectively connecting the wall telephone line to the fax telephone line and for selectively connecting other components of the telephony interface to the wall telephone line and/or the fax telephone line.

The CPU circuitry of the router includes, in its most preferred embodiment, a memory system with stored program control data and a processor device connected to the memory system for interpreting the stored program control data to direct operation of the router. The memory system includes read only memory (ROM) and random access memory (RAM). The ROM is non-volatile memory and controls power-on initialization of the router. When initially powered, the router performs several tests to determine whether the current RAM contains good data and how to gain access to outside lines. If the RAM does not contain good data, the router uses any digits necessary to obtain an outside line and dials a telephone number stored in the ROM to obtain the telephone number of an F-SAFF from which new RAM can be downloaded.

According to the preferred embodiment of the present invention, the facsimile store and forward system includes a plurality of locationally diverse F-SAFF's servicing a plurality of routers. In addition, the facsimile store and forward system includes a universal platform and an operator station platform connected to the PSTN. Before the router can be initialized, the user must communicate certain configuration information, such as the telephone number of the local facsimile machine and the serial number of the router, to the operator station platform through voice communication or by faxing a completed initialization form to the operator station platform. The operator station platform communicates such configuration information to the universal platform which determines which of the plurality of F-SAFF's will be assigned to service the router based upon the telephone number of the local facsimile machine. The universal platform then calls the designated F-SAFF with the router configuration information, and the F-SAFF calls the router with an instruction to call the universal platform. When the router calls the universal platform, regardless of whether the call is in response to a command from an F-SAFF or in response to an instruction in the router's ROM, the universal platform will provide the router with the telephone number of the designated F-SAFF, along with the telephone numbers of backup F-SAFF's to be used when the primary F-SAFF is unavailable for any reason. According to instructions in the ROM, the router will then call the F-SAFF and receive a download of new RAM data. Operation of the router then proceeds with instructions found in the new RAM data.

The improved facsimile service methods of the preferred embodiment of the present invention include, among others, the following: a never no answer or busy send (NNABS) method, a never no answer receive (NNAR) method, a private facsimile method, a will call facsimile method, a pager facsimile method, a facsimile mail method, a facsimile information retrieve method, a facsimile information send method, a facsimile cover method, a facsimile speed cover method, a facsimile broadcast method, a facsimile flexible broadcast method, a facsimile access restriction method, a facsimile conversion method, an urgent facsimile method, and a facsimile addition method. The NNABS method directly addresses the problem of, among others, destination facsimile machine unavailability. When a local user at the local facsimile machine dials the telephone number of a remote destination facsimile machine (not the number of an F-SAFF), the router will automatically dial the stored telephone number of the F-SAFF and transfer the call to the F-SAFF upon detecting a no answer or busy condition from the remote facsimile machine. The F-SAFF will receive and store the facsimile information and then repeatedly attempt to deliver the information to the destination. By having the F-SAFF make the repeated attempts to deliver the facsimile information, the local facsimile machine is available to send or receive other facsimile transmissions. After the F-SAFF first receives the information, the F-SAFF will generate and transmit to the local facsimile machine a job confirmation report including a reduced image of the first page of the facsimile information, the reason (busy or no answer) for the initial transfer to the F-SAFF, and a job identification number. Immediately after the job confirmation report is transmitted to the local facsimile machine, the F-SAFF will make a first attempt to deliver the facsimile information to the remote facsimile machine by instructing the router to transfer the call to the destination telephone number using a call transfer or three-way calling service provided by the local exchange carrier. After delivering the information to the remote facsimile machine, (or after trying for a predetermined amount of time) the F-SAFF will also generate and transmit to the local facsimile machine a delivery report which includes the reduced image of the first page of the facsimile information, the job identification number, the number of delivery attempts, and the time of delivery (or last attempt if unsuccessful).

During the NNABS method, as well as other methods of the preferred embodiment of the present invention, the router and F-SAFF perform certain special functions which improve the speed, convenience, and efficiency of the method. Among other special functions, many of which are not explicitly identified as special or unique with respect to the NNABS method or other methods of the preferred embodiment of the present invention, but are nonetheless regarded as equally inventive, a first special function is referred to herein as innocuous call progress monitoring. When the local facsimile machine goes off-hook, the router supplies generated battery and dial tone to the local facsimile machine and collects the DTMF digits of the remote facsimile telephone number dialed by the local user. The router then provides an active load to the wall telephone line and dials the remote facsimile telephone number, adding any digits necessary to obtain an outside line when operating behind a PBX. The router then removes battery to the facsimile telephone line, connects the wall telephone line to the facsimile telephone line, removes the active load from the wall telephone line, and begins innocuously monitoring the connected telephone lines. At this point, the local user has the option of either listening through the handset to hear call progress signals, operator messages, etc., or pressing the start button on the local facsimile machine if not already pressed. If the remote facsimile machine is busy, a precise busy detector in the router will detect the signal to cause the router to grab the line by disconnecting the wall telephone line from the facsimile telephone line and again supplying battery to the facsimile line, all before the local facsimile machine has an opportunity to detect the busy signal and automatically drop the line, as some conventional facsimile machines are inclined. This innocuous call progress monitoring ability, made possible in part by the precise busy detector, a high impedance barrier to monitoring devices, and the switching design of the router, allows the local user to actually hear call progress signals, special information tone recordings, etc., on the wall telephone line while preventing the local facsimile machine from automatically dropping the line if the start button is instead pushed.

A second special function is referred to herein as a post-fax line holding ability. As stated above, after the facsimile information is transferred to the F-SAFF from the local facsimile machine, the F-SAFF generates and transmits to the local facsimile machine a job confirmation report during the same telephone call. In addition, after the job confirmation report is transmitted to the local facsimile machine from the F-SAFF, the F-SAFF instructs the router to assist in making a first delivery attempt to the remote facsimile machine during the same call. Thus, after each of these transmissions of facsimile information, (the transmission of facsimile information to the F-SAFF from the local facsimile machine, as well as the transmission of the confirmation report facsimile information from the F-SAFF to the local facsimile machine) the router and F-SAFF communicate further during the same telephone call. This post-fax communication is made possible because of the router's ability to hold the wall telephone line open after any facsimile transmission (inbound or outbound). In many cases, conventional facsimile machines automatically drop telephone connections after the end of a facsimile transmission. To prevent such a line drop, the router is able to monitor a facsimile transmission, without affecting the quality of the transmission, and then supply an additional load to the line after detecting certain modulated concluding handshaking signals near the end of the transmission. In this way, when the local facsimile machine automatically goes on-hook, the line is kept open by the router so that additional communication can take place between the F-SAFF and the router. As a result, the F-SAFF does not need to make additional calls to the router to perform functions which should logically be performed during the same telephone call.

A third special function is referred to herein as F-SAFF-to-remote bridging. An example of this function is described above relative to the F-SAFF instructing the router to transfer the call to a destination telephone number. According to this process, the router first signals a central office of the local exchange carrier to suspend the current call. One example of such signaling includes simply flashing the wall telephone line by removing all load from the wall telephone line for a short amount of time. As instructed by the F-SAFF, the router then dials the telephone number of the remote facsimile machine. After dialing the telephone number, the router signals the central office again (through flashing the line, for example) to connect the suspended call to the present call. The router then hangs up the line to leave the F-SAFF connected to the call to the remote facsimile machine and to become available to send and receive other facsimile information. One of the most significant benefits of this F-SAFF-to-remote bridging function becomes evident when a destination telephone number is a long distance telephone number. By using the router to initiate the telephone call, rather than having the F-SAFF initiate the call directly, the long distance charges will automatically appear on the user's telephone bill. Thus, the difficulties of establishing authorizations to bill particular long distance companies, etc., are avoided. Furthermore, this F-SAFF-to-remote bridging function enables Regional Bell Operating Companies (RBOCs) to provide many of the services of the preferred embodiment of the present invention while better addressing equal access and other long distance concerns.

The never no answer receive (NNAR) method directly addresses, among others, the problem of local facsimile machine unavailability and the inconvenience of changing local telephone numbers as required by some other proposed solutions. According to the NNAR method, when the paper in a local facsimile machine runs out or when the local facsimile machine is disabled for some other reason, the router automatically directs incoming calls to the F-SAFF for storage until the local facsimile machine is able to receive the facsimile information. Thus, the user is not required to obtain and inform others of a new telephone number to utilize this F-SAFF service. When an incoming call for the local facsimile machine is answered by the router, the router first rings the local facsimile machine. If the local facsimile machine does not answer, the router performs another special function, referred to herein as remote-to-F-SAFF bridging, by suspending the call from remote facsimile machine, calling the F-SAFF, communicating with the F-SAFF, and then connecting the F-SAFF to the call from the remote facsimile machine. According to this NNAR method of the preferred embodiment of the present invention, the local facsimile machine is then monitored to detect when it is again able to receive facsimile information. Such monitoring is accomplished through having the router schedule periodic polling of the local facsimile machine to check its availability, having the F-SAFF periodically call the router and instruct the router to check the availability of the local facsimile machine, and having the router recognize, through monitoring modulated facsimile signals, when the local facsimile machine sends or receives facsimile information. In addition, the router recognizes a quick off-hook/on-hook flash at the local facsimile machine as a signal from the user to immediately poll the local facsimile machine for availability. Once the router detects local facsimile machine availability, the router automatically initiates a telephone call to the F-SAFF and asks to receive any stored facsimile information which is then transmitted to the local facsimile machine. The F-SAFF then deletes the stored facsimile information.

The private facsimile method addresses the problems of, among others, remote facsimile machine and recipient unavailability, confidentiality and delivery assurance, while remaining very convenient and easy to use. According to the private facsimile method of the preferred embodiment of the present invention, to request the service, a user simply: (1) dials a prefix to the destination telephone number, such as a "2", and ending the dialing with a "#" (ending dialing with a "#" is, throughout this disclosure, a faster method of ending the dialing string since the router would otherwise assume such a conclusion after sensing a lapse of a predetermined amount of time during which the user does not supply input); or (2) dials the same prefix to the destination telephone number, and ending the dialing with a user-generated retrieval code preceded by a "*" and ending with a "#". In operation, the router receives the DTMF digits from the local facsimile machine, translates the digits into a command for the F-SAFF, dials the F-SAFF, and transmits the command to the F-SAFF. If a user-defined retrieval code is supplied which matches a code already in use for the router, the F-SAFF generates an error report, schedules the report for delivery to the local facsimile machine, and ends the method. By not accepting delivery of any information from the local facsimile machine so that the documents remain in the local facsimile machine unscanned, the user is provided an indication that the service has not been invoked. If the user-defined retrieval code is not already in use, the F-SAFF then, invoking the post-fax line holding ability, commands the router to connect the facsimile telephone line to the wall telephone line and hold the line open for more commands, prompts the user to press the start button if not already pressed, receives and stores the facsimile information, generates both a job confirmation report and a notification report, sends the job confirmation report to the local facsimile machine, and invoking the F-SAFF-to-remote bridging ability, sends the notification report to the remote destination facsimile machine. The notification report includes a reduced image of the first page of the facsimile information and instructions on how to retrieve the remainder of the facsimile information. The instructions include, in addition to other information, the telephone number of the local facsimile machine as the number to call, thus again addressing the inconvenience of changing telephone numbers. If the user supplied a retrieval code with the original request, the notification report does not show such a code, leaving it up to the user to inform the intended recipient of the appropriate code. Otherwise, if the user did not specify a retrieval code, the F-SAFF generates a retrieval code and includes the code on the notification report. When the intended recipient dials the telephone number of the local facsimile machine from a remote facsimile machine as indicated on the notification report, the router answers the call and receives DTMF tones representing the retrieval code. The router then translates the digits into a command for the F-SAFF and invokes the router-to-F-SAFF bridging ability to transfer the call to the F-SAFF which retrieves the stored facsimile information and transmits it to the remote facsimile machine. The F-SAFF then generates a delivery report, dials the local facsimile machine telephone number, transmits the delivery report, and deletes the stored facsimile information.

Even easier to use and more confidential than the private facsimile method is the will call facsimile method which, in a different way, addresses similar problems, among others, such as when the user does not know the telephone number of the intended recipient. The will call facsimile method is invoked by a user dialing a pre-defined code, such as "*5", followed by a user-defined retrieval code and a "#". The router translates the digits into a command for the F-SAFF, dials the F-SAFF, and transmits the command to the F-SAFF. In response, the F-SAFF verifies that the user-defined retrieval code has not already been used and invokes the post-fax line holding ability of the router to receive the facsimile information and then send a generated job confirmation report, including the user-defined retrieval code, back to the local facsimile machine. If the user-defined retrieval code is already in use, an error report is generated and scheduled for subsequent delivery, while any documents in the local facsimile machine are allowed to remain un-scanned. The user must notify the intended recipient of the pending information and instructions on how to retrieve the information. Such instructions should include dialing the telephone number of the local facsimile machine and providing the unique retrieval code to the router which then invokes the remote-to-F-SAFF ability to transfer the call to the F-SAFF for delivery of the facsimile information. After the facsimile information is delivered, the F-SAFF generates and transmits to the local facsimile machine a delivery report and then deletes the stored facsimile information from storage within the F-SAFF.

The pager facsimile method also addresses many of the above-referenced problems with conventional facsimile methods, placing special emphasis on the recipient who is truly unavailable. A user begins the method by dialing a prefix, such as "*7", before the telephone number of a pager service, including any additional digits needed to access pagers requiring additional digits, and followed by a "#". As before, the router translates and transmits the pager facsimile method information to the F-SAFF which then receives and stores the facsimile information. The F-SAFF generates and transmits to the local facsimile machine a job confirmation report which includes a generated retrieval code. The F-SAFF also uses the F-SAFF-to-remote bridging ability of the router to call the pager service telephone number and outpulse DTMF digits identifying the telephone number of the local facsimile machine and the retrieval code. The pager service then transmits the telephone number and retrieval code to the pager. When the paged recipient calls the router, the call is transferred (remote-to-F-SAFF bridging) to the F-SAFF which gives the caller the option through audio prompting of receiving the facsimile information during that call (line turn-around) or designating another delivery telephone number to which the F-SAFF will subsequently attempt delivery. Again, after the information is delivered, the F-SAFF generates a delivery report, transmits the report to the local facsimile machine, and deletes the stored facsimile information.

The facsimile mail method included in the preferred embodiment of the present invention includes a facsimile mail usage procedure and a facsimile mail administration procedure functioning as a pre-requisite to the facsimile mail usage procedure. The facsimile mail administration procedure is initiated by dialing a pre-defined code from the local facsimile machine, such as "**3", followed by: a box number, a "*", a passcode, and a "#" to add a mailbox; or a box number, a "*" the box number again, and a "#" to delete a mailbox. The router translates the digits, dials the F-SAFF, and transfers the command to the F-SAFF. The F-SAFF creates or deletes the corresponding mailbox for that particular router, and then generates and transmits back to the local facsimile machine a facsimile mail index report identifying the current facsimile mail configuration. After the facsimile mailboxes are created, a user is able to, from both the local facsimile machine and from a remote facsimile machine (through remote-to-F-SAFF bridging), send facsimile information to the F-SAFF to be stored in respective mailboxes and receive delivery of the stored facsimile information through line turn-around or to an alternate delivery destination. Subsequently, the stored facsimile information is deleted from the F-SAFF.

The facsimile information retrieve method of the preferred embodiment of the present invention is similar, in some ways, to a fax on demand service in that it addresses the desire to provide facsimile information to an unlimited number of unknown recipients. However, unlike many fax on demand services, the facsimile information retrieve method suffers less from common problems related to such services, such as difficulty of administration and the inconvenience of using alternate telephone numbers. The facsimile information retrieve method, like the facsimile mail method, also includes an information retrieve usage procedure and an information retrieve administration procedure functioning as a pre-requisite to the information retrieve usage procedure. The information retrieve administration procedure is initiated by dialing a pre-defined code from the local facsimile machine, such as "4", followed by: a user-defined document number and a "#" to add a document; or a user-defined document number, a "", the user-defined document number again, and a "#", to delete facsimile information corresponding to the document number. The router translates the digits, dials the F-SAFF, and transfers the command to the F-SAFF which, depending on the command, then receives and stores facsimile information from the local facsimile machine or deletes referenced facsimile information. In any event, a facsimile information retrieve method index report is subsequently created and transmitted to the local facsimile machine. To initiate the information retrieve usage procedure and obtain a copy of the stored information from a remote destination, a recipient dials the telephone number of the local facsimile machine and inputs the document number. The router translates the digits into an F-SAFF command and invokes the remote-to-F-SAFF ability to transfer the call to the F-SAFF which delivers the stored document information to the recipient through line turn around or to an alternate delivery destination as determined by the recipient. After delivery of the stored information, the stored facsimile information is not deleted from the F-SAFF until deleted through the information retrieve administration procedure.

The facsimile information send method, the facsimile cover method and facsimile speed cover method of the present invention all address, among other concerns, the inefficient use of local facsimile machine availability and human resources in sending multiple facsimile transmissions which include standard information portions repeated throughout the multiple facsimile transmissions. These methods enable a user to store standard facsimile information in the F-SAFF through an administration procedure which is combined with new information during a usage procedure. With the facsimile information send method, the users send information to the F-SAFF for storage in much the same way they would in using the information retrieve administrative procedure of the facsimile information retrieve method discussed above. Once stored, the information send usage procedure is initiated by the user placing into the local facsimile machine a document to be prepended (attached preceeding) to the stored information by the F-SAFF and by the user dialing a pre-defined code, such as "*4", followed by a destination telephone number, a "*", a document number of the stored standard facsimile information, and a "#". The router dials the F-SAFF, transmits a translated command to the F-SAFF, and responds to commands from the F-SAFF so that the current facsimile information is transmitted from the local facsimile machine to the F-SAFF. If the document number is invalid, an error report is generated and transmitted back to the local facsimile machine as the method ends. Otherwise, after receiving current facsimile information corresponding to the document placed in the local facsimile machine, the F-SAFF retrieves the stored standard facsimile information and prepends the current facsimile information thereto. Subsequently, the F-SAFF generates and transmits to the local facsimile machine a job confirmation report and attempts to deliver the newly formed combination facsimile information by commanding the router to dial the destination telephone number and transfer the call. If not able to make the delivery at first, another delivery attempt will be scheduled.

The facsimile cover method and facsimile speed cover method enable a user to, among others, avoid having to generate new cover sheets for every transmission and continually using local facsimile machine availability time to transmit standard cover sheet information. The facsimile cover method includes a cover administration procedure and a cover usage procedure. A user initiates the cover administration procedure by placing into the local facsimile machine a document to become a standard cover sheet and by dialing a pre-defined code, such as "6", followed by: a user-defined cover number and a "#" to store new cover sheet facsimile information; or a user-defined cover number, a "", the cover number again, and a "#" to delete previously stored cover sheet facsimile information. After receiving a command translated by the router, the F-SAFF analyzes the command, receives the cover facsimile information from the local facsimile machine, stores the cover facsimile information, and determines if the cover number is valid and not in use. If the cover number is bad, the F-SAFF generates an error report which is then transmitted to the local facsimile machine, and the method ends. Otherwise, the F-SAFF associates the stored cover facsimile information with the cover number, generates a cover sheet index report, and transmits the index report back to the local facsimile machine. To initiate the cover usage procedure, a user places into the local facsimile machine a document to which a stored cover sheet is to be prepended. The name of the intended recipient should appear within a one (1) inch strip along the top of the first page of the document. The user then dials a pre-defined code, such as "*6", followed by a user-defined cover number, a "*", a destination telephone number, and a "#". The router dials the F-SAFF, transmits a translated command to the F-SAFF, and responds to commands from the F-SAFF so that the current facsimile information is transmitted from the local facsimile machine to the F-SAFF. If the cover number is invalid, an error report is generated and transmitted back to the local facsimile machine, and the method ends. Otherwise, after receiving current facsimile information corresponding to the document placed in the local facsimile machine, the F-SAFF retrieves the stored cover sheet facsimile information and creates a new cover sheet which includes the stored cover sheet information and the information, such as the name of the recipient, found along the top one (1) inch strip of the first page of the current facsimile information. This new cover sheet is prepended to the current facsimile information to form combination facsimile information. Subsequently, the F-SAFF generates and transmits to the local facsimile machine a job confirmation report and attempts to deliver the newly formed combination facsimile information by commanding the router to dial the destination telephone number and transfer the call. If not able to make the delivery at first, a delivery attempt will be scheduled. Regardless of when the information is delivered, the F-SAFF inserts information such as the time and date of the delivery and the number of pages onto the new cover sheet.

The facsimile speed cover method is very similar to the facsimile cover method in that cover sheet information is stored at the F-SAFF for later retrieval and prepending to current facsimile information. The facsimile speed cover method includes a speed administration procedure and a speed usage procedure. The speed administration procedure is similar to the cover administration procedure with one exception being that a destination number is stored along with the (speed) cover facsimile information which can already include the name of the recipient since the speed cover is linked to only one destination. A destination number is, therefore, included after the speed cover number following the predefined code entered by the user to initiate the speed administration procedure. To initiate the speed usage procedure, the user dials a pre-defined code, such as "*6", followed by a speed cover number and a "#", without a destination number. The router dials the F-SAFF, transmits a translated command to the F-SAFF, and responds to commands from the F-SAFF so that the current facsimile information is transmitted from the local facsimile machine to the F-SAFF. If the speed cover number is invalid, an error report is generated and transmitted back to the local facsimile machine, and the method ends. Otherwise, after receiving current facsimile information corresponding to the document placed in the local facsimile machine, the F-SAFF prepends the stored speed cover information to the current facsimile information to form combination facsimile information for delivery to the stored destination number associated with the stored speed cover information. As with the cover facsimile method, a job confirmation report is generated and transmitted to the local facsimile machine after which the F-SAFF attempts to deliver the newly formed combination facsimile information by commanding the router to dial the destination telephone number and transfer the call. If not able to make the delivery at first, a delivery attempt will be scheduled. Regardless of when the information is delivered, the F-SAFF inserts the time and date of the delivery onto the new speed cover sheet.

The facsimile broadcast method and the facsimile flexible broadcast method of the preferred embodiment of the present invention both address, among others, the issue of being able to, with a small amount of effort, broadcast current facsimile information to multiple destinations without creating much local facsimile machine unavailability time. According to the facsimile broadcast method, the user defines broadcast lists at the F-SAFF through a broadcast administration procedure and accesses the broadcast lists through a broadcast usage procedure. To define the broadcast lists according to the facsimile broadcast method of the preferred embodiment of the present invention, the user dials a pre-defined code, such as "**1", followed by: a broadcast list number, a "*", one or more destination telephone numbers separated by a "*", and a "#" to create a broadcast list or add destinations to a broadcast list; or a broadcast list number, a "", one or more destination telephone numbers separated by a "", and a ∩ to delete one or more destination telephone numbers from a particular broadcast list; or a broadcast list number, a "***", the list number again, and a "#" to delete an entire broadcast list. To use a broadcast list according to the broadcast usage procedure, a user simply dials a pre-defined code, such as "*1", followed by a broadcast list number and a "#". The router then dials the F-SAFF, transmits a translated command to the F-SAFF, and responds to commands from the F-SAFF so that the current facsimile information is transmitted from the local facsimile machine to the F-SAFF. The F-SAFF determines the destination telephone numbers corresponding to the broadcast list number. A job confirmation report is generated and transmitted back to the local facsimile machine. The F-SAFF then uses the F-SAFF-to-remote bridging ability of the router to place a call transfer to the first, preferably long distance, destination telephone number in the broadcast list. With any other long distance telephone numbers in the broadcast list, the F-SAFF will likewise call the router and use its F-SAFF-to-remote bridging ability. The F-SAFF will attempt to deliver, repeatedly if necessary, the facsimile information to any remaining local destinations through dialing the destination telephone numbers directly.

The facsimile flexible broadcast method of the preferred embodiment of the present invention is very similar to the facsimile broadcast method. One major difference between the two methods is the absence of an administration procedure per se. With the facsimile flexible broadcast method, a user simply dials multiple destination telephone numbers separated by a "*" and terminating with a "#". The router translates the destination telephone numbers into a facsimile flexible broadcast command including the destination telephone numbers, dials the F-SAFF, and communicates the command to the F-SAFF. The F-SAFF analyzes the command to discover the multiple destination telephone numbers, commands the router to connect the local facsimile machine to the line and receives facsimile information from the local facsimile machine. A job confirmation report is then sent back to the local facsimile machine, and the method continues like the facsimile broadcast method discussed above.

The facsimile access restriction method of the preferred embodiment of the present invention addresses controlling unauthorized outbound transmissions from the local facsimile machine. Through the facsimile access restriction method, the user is able to restrict access to the local facsimile machine by requiring that all users dial an access code before being able to use the services of the preferred embodiment of the present invention. The facsimile access restriction method is initiated by the user dialing a pre-defined code, such as "**02", followed by: a "*", a user-defined access code, and a "#" to activate the service; or a "***", the userdefined access code, and a "#" to deactivate the service. While storing the access code locally inside the router, the router also dials the F-SAFF and notifies the F-SAFF of the access code. Thus, the restriction cannot be overcome by temporarily unplugging the router since the access code will be downloaded to the router during a subsequent RAM download if any memory was lost during the unplugged time.

The facsimile conversion method of the preferred embodiment of the present invention addresses the common practice of retyping information received by facsimile without the difficulty of many other proposed solutions to the problem. According to the facsimile conversion method, a user is able to send a facsimile transmission to a recipient who is then able to obtain a character-based electronic version of the facsimile information from an optical character recognition (OCR)/bulletin board service (BBS) platform also included in the facsimile store and forward system of the present invention. A user initiates the facsimile conversion method by placing a document in the local facsimile machine and dialing a pre-defined code, such as "*8", followed by a destination telephone number and a "#". In a manner similar to other methods discussed above, the F-SAFF stores facsimile information received from the local facsimile machine, and sends a job confirmation report to the local facsimile machine. The F-SAFF also forms combination facsimile information by prepending to the facsimile information a generated cover sheet including instructions on how to retrieve the character-based version of the facsimile information. Using the F-SAFF-to-remote bridging ability of the router during the call from the router, the F-SAFF transmits the combination facsimile information to a remote facsimile machine at the destination telephone number. Meanwhile, the F-SAFF has also transferred the facsimile information to the OCR/BBS platform for conversion and accessibility. When the recipient, as instructed, dials into the OCR/BBS platform through a remote modem, the user is allowed to download a character-based version of the facsimile information.

The urgent facsimile method of the preferred embodiment of the present invention addresses the need to elevate recipient awareness of the arrival of certain urgent information. A user initiates the urgent facsimile method by placing a document in the local facsimile machine and dialing a pre-defined code, such as "*9", followed by a destination telephone number and a "#". Although the router initially attempts to complete the call without involving the F-SAFF for the transfer of facsimile information, the router will call the F-SAFF and transfer the information to the F-SAFF for subsequent delivery attempts if the call cannot be completed immediately. If a remote router answers the telephone line after the destination telephone number is dialed, the local router commands the remote router to connect the remote facsimile machine and transfers the facsimile information to the remote facsimile machine. In addition, if the transmission of facsimile information is successful, which is detected by monitoring the modulated signals between facsimile machines, the local router commands the remote router to begin emitting an audible tone through the internal speaker to draw attention to the recently received facsimile information. Subsequently, for billing purposes, the local router calls the F-SAFF and notifies it of the successful completion of the urgent facsimile service.

The facsimile addition method of the present invention provides a user the ability to conveniently transmit ad hoc combinations of facsimile information by temporarily storing a first portion of facsimile information at the F-SAFF until a second portion of information is received and matched with the first portion, at which time the combination facsimile information is transmitted to the destination identified during the first transmission. This method is especially useful when a user desires to send information stored in a computer along with information embodied in a physical document, thus this method will be described in terms of sending combination transmissions consisting of information from a facsimile equipped computer and information from a conventional facsimile machine. According to the preferred embodiment of the present invention, a facsimile equipped computer is connected to a router like a conventional facsimile machine so that the facsimile equipped computer communicates with the router in much the same way as a conventional facsimile machine even though the user interacts with the facsimile equipped computer through software menus, commands, etc, corresponding to the methods of the preferred embodiment of the present invention. The facsimile addition method includes a facsimile addition usage method and a facsimile addition administration method serving as a pre-requisite to the facsimile addition usage method. In addition, according to the preferred embodiment of the present invention, a user must also create a facsimile mailbox through the facsimile mail method of the present invention before using the facsimile addition method of the present invention.

A user initiates the facsimile addition administration method of the present invention by, according to the preferred embodiment of the present invention, selecting the facsimile addition service on the facsimile equipped computer. The user also identifies the facsimile information on the facsimile equipped computer to be transmitted as the first portion of a combination transmission, identifies the user's facsimile mailbox number, provides a facsimile addition document number to identify this particular facsimile addition job, and supplies the destination telephone number. The facsimile equipped computer software assembles the information and transmits DTMF signals to the router requesting the facsimile addition administration method, just as if a person were standing at a conventional facsimile machine dialing the appropriate digits. The router translates the digits, dials the F-SAFF, and transfers the command to the F-SAFF which then communicates with the facsimile equipped computer to receive and store the facsimile information in a manner related to the facsimile mailbox number, the facsimile addition document number, and the destination telephone number. Subsequently, an index report is created and transmitted to the facsimile equipped computer. To initiate the facsimile addition usage procedure the user places a physical document embodying the second portion of information in a conventional facsimile machine connected to a second router, dials digits identifying the facsimile addition usage procedure, the facsimile mailbox number, and the facsimile addition document number. Subsequently, the second router dials and communicates with the F-SAFF so that facsimile information is transmitted from the conventional facsimile machine to the F-SAFF and temporarily stored at the F-SAFF. The F-SAFF then appends (attaches subsequent) the second portion of facsimile information to the first, previously stored, portion of facsimile information to produce combination facsimile information. Next, the F-SAFF dials the destination telephone number and delivers the combination facsimile information. After delivery, the stored facsimile information is deleted from the F-SAFF.

As discussed above, this facsimile addition method entails the transmission of information through a first router and through a second router, the storage of information relative to the mailbox of the first router, and the referencing of the stored information through the second router. Thus, in one preferred embodiment of the present invention, the routers are user addressable in that the user of one router is able to access service databases of another router. In addition, the feature of user addressability of routers also has broader implications extending to the other methods of the present invention whereby a user is not required to program features for each commonly owned router and whereby a large number of users have access to similar databases. In another embodiment of the present invention, the information stored during the facsimile addition administration method is not stored in a manner related to a particular router's mailbox but is stored with reference to a truly distinct (router independent) retrieval code whereby there would be no user addressability or mailbox allocation concerns. Also, in another alternate embodiment of the present invention, user computers are connected to the F-SAFF through a data network, such as a local area network, so that the first portion of information for this facsimile addition method is communicated to the F-SAFF through a data connection independent of a router. Thus, regardless of how the information reaches the F-SAFF from the user, the F-SAFF merges the information and completes the transmission of the combination facsimile information.

In addition, various combinations of the improved facsimile service methods are supported by the facsimile store and forward system of the preferred embodiment of the present invention. One type of combination includes combining the facsimile flexible broadcast method with any of several other methods by simply substituting for a single destination telephone number multiple destination telephone numbers separated by a delineation digit, such as a "*". Other service combinations supported by the facsimile store and forward system of the preferred embodiment of the present invention include, without limitation, a private/conversion method, a private/urgent method, a private/urgent/conversion method, and an urgent/conversion method.

The present invention also includes a variety of alternate embodiments. Although the router of the preferred embodiment exists as a separate device connected to a telephone line leading to a local facsimile machine and connected to a separate telephone line connected to the PSTN, the scope of the present invention includes embodiments where at least a portion of the functionality of the preferred router is provided by, without limitation, (1) an improved facsimile device, (2) an improved PBX attached to a conventional facsimile machine, or (3) a personal computer operating under specialized software control in conjunction with an internal facsimile adapter. In addition, another alternate embodiment of the present invention includes an F-SAFF network uniquely designed to handle a large number of telephone calls. In yet another alternate embodiment of the present invention, many of the improved facsimile service methods disclosed as being initiated from the local facsimile machine are also capable of being initiated remotely through dialing an initial passcode recognized by the router. In still other alternate embodiments, the routers can be programmed to direct all long distance calls through the F-SAFF to access discounted rates. In another alternate embodiment of the present invention, a router is programmed to recognize select ring cadences as directed toward the local facsimile machine where a single telephone line is used for both voice and facsimile communication. In other alternate embodiments, calls are directed to particular facsimile mailboxes or destination based on automatic number identification (ANI) information detected by the router.

In still other alternate embodiments of the present invention, the router attempts to notify the user that facsimile information is stored at the F-SAFF in a facsimile mailbox or as NNAR information which has not been delivered because the local facsimile machine has not been available because of a paper-out situation, etc., or in situations where the user does not operate a local facsimile machine from the router at all. One embodiment includes using the router's internal speaker to provide such notification. Other embodiments include providing an additional light indicator on the router or changing the use of an existing indicator. Still another embodiment includes attaching a separate indication device between the router and the local facsimile machine which is responsive to certain signals transmitted from the router. In another alternate embodiment of the present invention, the F-SAFF is co-located with one or more routers and communicates with one or more user computers through a local area data network.

It is therefore an object of the present invention to provide an improved facsimile store and forward system.

Another object of the present invention is to provide a facsimile store and forward system which is easy and convenient to use and learn to use.

Another object of the present invention is to provide a facsimile store and forward system which provides enhanced facsimile services while preserving facsimile machine availability.

Another object of the present invention is to provide a facsimile store and forward system which provides incoming and outgoing enhanced facsimile services accessible from a pre-existing telephone number.

Another object of the present invention is to provide a facsimile store and forward system which provides services to accommodate recipient unavailability.

Another object of the present invention is to provide a facsimile store and forward system which includes an F-SAFF connected to the PSTN and an interface router device connected between a facsimile machine and the PSTN.

Yet another object of the present invention is to provide an interface device for coupling a local facsimile machine to the PSTN and communicating command information and facsimile information with an F-SAFF.

Still another object of the present invention is to provide a facsimile store and forward system which is co-located with one or more routers and communicates with one or more user computers through a local area data network.

Still another object of the present invention is to provide an interface device for coupling a local facsimile machine to the PSTN which includes means for holding a line open after communication of facsimile information by the local facsimile machine.

Still another object of the present invention is to provide an interface device for coupling a local facsimile machine to the PSTN which includes means for transferring calls from an F-SAFF to a remote destination.

Still another object of the present invention is to provide a method of utilizing a user's toll telephone transmission arrangement to place toll telephone calls.

Still another object of the present invention is to provide an interface device for coupling a local facsimile machine to the PSTN which includes means for transferring calls from a remote destination to an F-SAFF.

Still another object of the present invention is to provide an interface device for coupling a local facsimile machine to the PSTN which includes means for innocuously monitoring call progress signals and precisely detecting a busy signal.

Still another object of the present invention is to provide an interface device for coupling a local facsimile machine to the PSTN which includes means for automatic firmware acquisition during power-up initialization.

Still another object of the present invention is to provide an interface device for coupling a local facsimile machine to the PSTN which includes means for automatic firmware upgrading.

Still another object of the present invention is to provide an interface device for coupling a local facsimile machine to the PSTN which includes means for determining proper dial-out sequences.

Still another object of the present invention is to provide a facsimile store and forward system which detects when a local facsimile machine is unavailable, directs incoming calls for storage on an F-SAFF, and continues to monitor the local facsimile machine for availability after which any stored information is delivered to the local facsimile machine.

Still another object of the present invention is to provide a facsimile store and forward system which detects when a remote facsimile machine is unavailable, stores the facsimile information, and subsequently delivers the information.

Still another object of the present invention is to provide a facsimile store and forward system which supports flexible broadcasting to multiple destinations identified in a dialing string.

Still another object of the present invention is to provide a facsimile store and forward system which stores facsimile information, transmits a notification report to an intended recipient, and transfers the information to the recipient upon receiving a user-generated or system-generated retrieval code from the intended recipient.

Still another object of the present invention is to provide a facsimile store and forward system which provides a user the ability to conveniently transmit ad hoc combinations of facsimile information by temporarily storing a first portion of facsimile information at the F-SAFF until a second portion of information is received and matched with the first portion, at which time the combination facsimile information is transmitted to the destination identified during the first transmission.

Still another object of the present invention is to provide a facsimile store and forward system which provides stored facsimile information to callers transferred through an interface device and providing a retrieval code.

Still another object of the present invention is to provide a facsimile store and forward system which pages an intended recipient and subsequently delivers stored facsimile information.

Still another object of the present invention is to provide a facsimile store and forward system which converts facsimile information into character-based information which is made accessible to the intended recipient through a bulletin board system.

Still another object of the present invention is to provide a facsimile store and forward system which provides notification to an intended recipient of the receipt of facsimile information deemed urgent.

Still another object of the present invention is to provide a facsimile store and forward system which is sensitive to distinctive ring cadences designating a facsimile transmission.

Other objects, features and advantages of the present invention will become apparent upon reading and understanding the present specification, when taken in conjunction with the accompanying drawings.

BRIEF DESCRIPTION OF THE DRAWINGS

FIG. 51 is a flow chart representation of the create fax mail report routine referenced by FIG. 51.

FIG. 52 is a flow chart representation of the delete mailbox routine referenced by FIG. 51.

FIG. 53 is a flow chart representation of the add mailbox routine referenced by FIG. 51.

FIG. 54 is a flow chart representation of the change code routine referenced by FIG. 51.

FIG. 57 is a flow chart representation of the delete list routine referenced by FIG. 55.

FIG. 58 is a flow chart representation of the add destination routine referenced by FIG. 55.

FIG. 59 is a flow chart representation of the delete destination routine referenced by FIG. 55.

FIG. 60 is a flow chart representation of the broadcast status report routine referenced by FIG. 55.

FIG. 62 is a flow chart representation of the F-SAFF NNABS routine referenced by FIG. 42.

FIG. 65 is a flow chart representation of the log urgent routine referenced by FIG. 42.

FIG. 66 is a flow chart representation of the 3-digit code routine referenced by FIG. 42.

FIG. 67 is a flow chart representation of the flex broadcast routine referenced by FIG. 42.

FIG. 68 is a flow chart representation of the broadcast fax routine referenced by FIG. 42.

FIG. 69 is a flow chart representation of the private fax routine referenced by FIG. 42.

FIG. 70 is a flow chart representation of the fax mail local routine referenced by FIG. 42.

FIG. 71 is a flow chart representation of the check & retrieve routine referenced by FIG. 70.

FIG. 73 is a flow chart representation of the local store routine referenced by FIG. 70.

FIG. 74 is a flow chart representation of the info fax routine referenced by FIG. 42.

FIG. 75 is a flow chart representation of the fax will call routine referenced by FIG. 42.

FIG. 76 is a flow chart representation of the page fax routine referenced by FIG. 42.

FIG. 77 is a flow chart representation of the speed fax routine referenced by FIG. 42.

FIG. 78 is a flow chart representation of the cover fax routine referenced by FIG. 42.

FIG. 79 is a flow chart representation of the data fax routine referenced by FIG. 42.

FIG. 82 is a flow chart representation of the urgent fax routine referenced by FIG. 42.

FIG. 83 is a flow chart representation of the private data routine referenced by FIG. 42.

FIG. 84 is a flow chart representation of the private urgent routine referenced by FIG. 42.

FIG. 85 is a flow chart representation of the private urgent data routine referenced by FIG. 42.

FIG. 86 is a flow chart representation of the urgent data routine referenced by FIG. 42.

FIG. 107 is a block diagram representation of a facsimile store and forward system in accordance with an alternate embodiment of the present invention shown connected locally to a variety of different access devices.

DETAILED DESCRIPTION OF THE PREFERRED EMBODIMENTS

Figure 1:
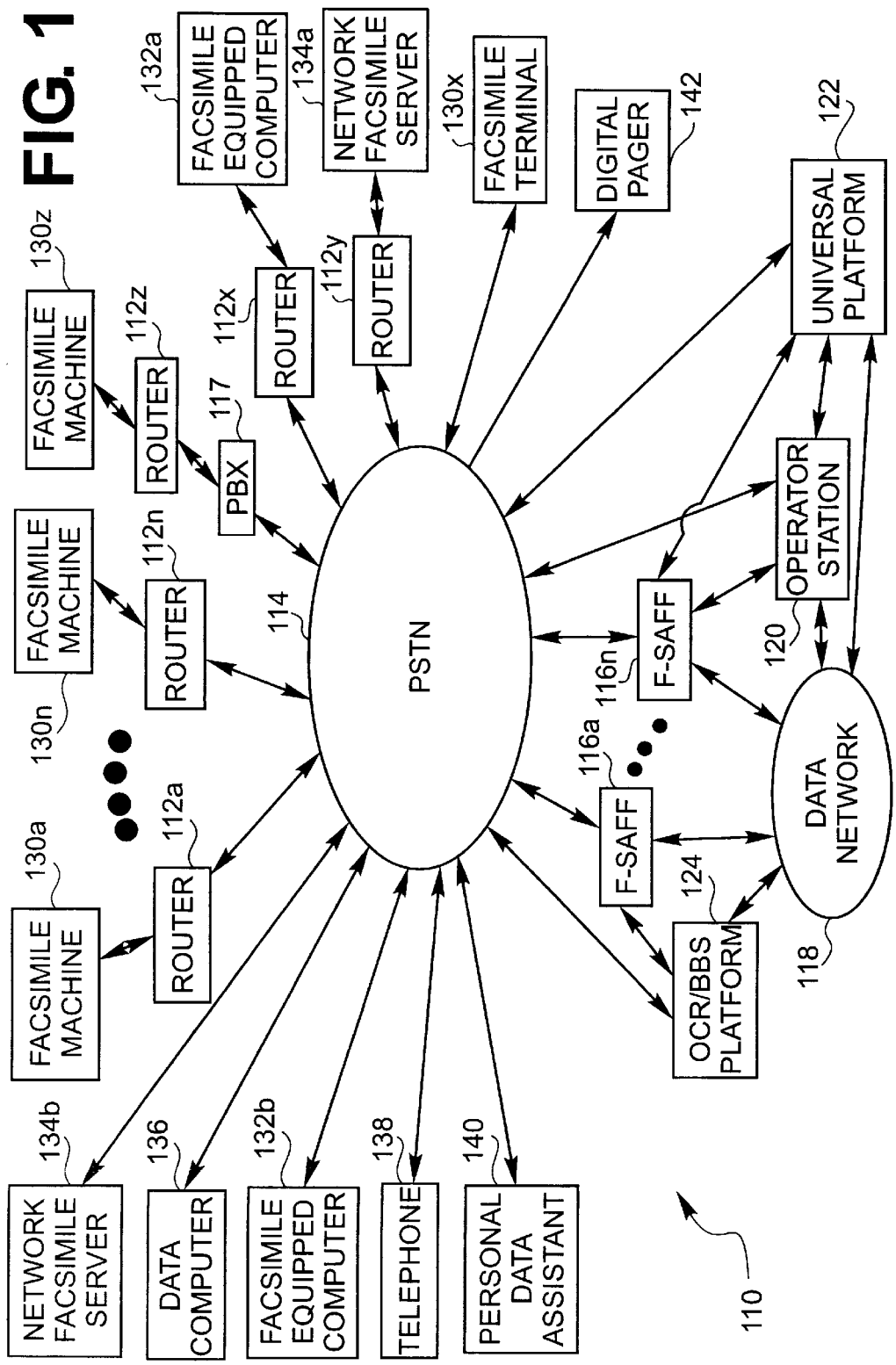
FIG. 1 is a block diagram representation of a facsimile store and forward system in accordance with the preferred embodiment of the present invention shown connected through the PSTN to a variety of different access devices.

Refer now in greater detail to the drawings in which like numerals represent like components throughout the several views and in which lower letter reference numeral suffixes differentiate similar components referred to collectively without such suffixes. FIG. 1 shows a facsimile store and forward system 110 servicing a variety of different access devices 130–142, each of which represents a plurality of similarly situated devices. A plurality of routers 112a–z are shown connected through a public switched telephone network (PSTN) 114 in a many-to-one relationship with a plurality of facsimile store and forward facilities (F-SAFFs) 116a–116n. Each F-SAFF 116a–116n is connected through a direct connection, the PSTN 114 and/or a data network 118 to an operator station platform 120, a universal platform 122, and an optical character recognition/bulletin board service (OCR/BBS) platform 124, each of which is discussed in greater detail below. It should be understood that the connecting lines shown in FIG. 1 represent many various types of communication links, including standard telephone lines, wireless communication networks, or other networks. Furthermore, the PSTN 114 is a common designation considered to be generally understood by those skilled in the telecommunications industry as including any number of local exchange carrier central offices, access tandems, long distance toll offices, and other telecommunication switching systems.

According to alternate embodiments of the present invention, the PSTN 114 and data network 118 are replaced by any of a variety of different interconnecting networks, including any combination of public, private, switched, non-switched, wireline, non-wireline, digital, analog, in-band signaling, out-of-band signaling, voice, data, local or wide area networks. In addition, although DTMF signaling and transfer of information through DTMF and Bell 202 formats are disclosed in the preferred embodiment of the present invention, as is discussed in greater detail below, other alternate embodiments of the present invention include methods and apparatus to accommodate signaling and information transfer through alternate signaling networks and formats, including integrated services digital network (ISDN) and other out-of-band and in-band signaling methods whereby signals and information, such as message waiting indications and destination telephone numbers, are communicated (in either direction) between an F-SAFF 116 and a router 112.

The routers 112a–112n are shown interfacing between a plurality of conventional facsimile machines 130a–130n and the F-SAFFs 116a–116n through the PSTN 114. Another router 112z is shown connecting another conventional facsimile machine 130z to a private branch exchange (PBX) 117 which is connected through the PSTN 114 to the F-SAFFs 116a–116n. In addition to the connections shown in FIG. 1, it should be understood that the present invention also includes connecting PBXs 117 between the PSTN 114 and the other devices of FIG. 1. Another facsimile machine 130x is shown connected directly to the PSTN 114 in a stand-alone configuration. The facsimile machine 130 is discussed in greater detail below in reference to FIG. 103. A facsimile equipped computer 132a is shown connected to the PSTN 114 through another router 112x, and another facsimile equipped computer 132b is shown connected directly to the PSTN 114 in a stand-alone configuration. Such facsimile equipped computers 132 are considered well known as including all sorts of stationary and portable computer devices which include hardware facsimile adapters and software programs providing facsimile communication capabilities. A network facsimile server 134a is shown connected through another router 112y to the PSTN 114, and another network facsimile server 134b is shown connected directly to the PSTN 114 in a stand-alone condition. The network facsimile server 134 represents one server device in a network (local or wide area) providing facsimile communication services to user terminals in the network. Since facsimile machines 130, facsimile equipped computers 132, and network facsimile servers 134 are also facsimile devices which function and communicate with the PSTN 114 through methods similar to those of facsimile machines 130, further references to facsimile machines 130 should be understood to also apply, as far as practical and would be understood by one reasonably skilled in the art after review of this specification, to any fax-capable device, including conventional facsimile machines, facsimile equipped computers 132, network facsimile servers 134, and personal data assistants 140. In addition, it is understood that these computer facsimile devices 132, 134, 140 can include software programs and methods which enable the computer facsimile devices 132, 134, 140 to output signals to routers 112 which substantially emulate users standing at facsimile machines 130. In other words, as will become clearer after review of the present specification, the computer facsimile devices 132, 134, 140 of one preferred embodiment of the present invention include software programs which enable the devices to receive user input through menus and graphical icons whereby users select, configure, and operate services of the present invention. Thus, the manual functions of dialing on a facsimile machine keypad, pressing start buttons, inserting documents, manipulating facsimile machine handsets, etc., should be understood to have computer facsimile device equivalents. In addition, references to a local facsimile machine 130 are intended to represent any type of facsimile device connected to router 112 initiating use of the facsimile store and forward system of the present invention, and references to a remote facsimile machine 130n are intended to represent any type of facsimile device located away from the local facsimile device 130, regardless of the whether the device is connected directed to another router 112.

Other access devices are also shown connected directly to the PSTN 114 for communication with the facsimile store and forward system 110, including a data computer 136, a telephone 138, a personal data assistant 140, and a digital pager 142. Data computer 136 represents all types of data computers having any of a variety of communication capabilities, including conventional personal computers having standard modems. The telephone 138 includes all types of hardwired and wireless telephone and radio devices. The personal data assistant 140, commonly referred to as a PDA, is a small, portable device, often pen-based, having processing and facsimile or modem communication capabilities. The digital pager 142 is representative of conventional digital pager devices. It should be understood that all of the accessing devices 130–142 are discussed in further detail below and are representative of a large plurality of such devices connected to the PSTN 114.

Figure 2:
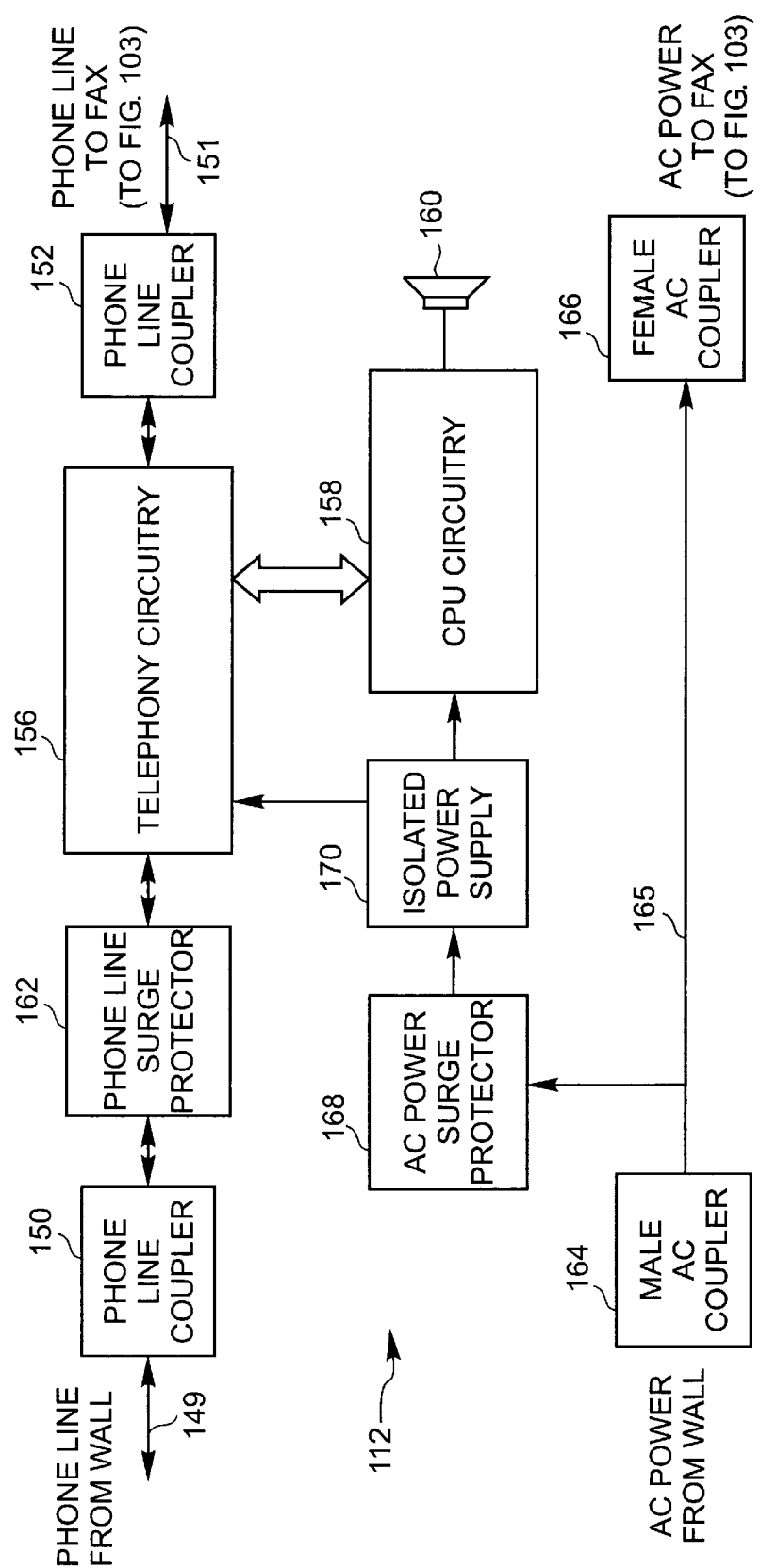
FIG. 2 is a block diagram representation of the router of FIG. 1.

FIG. 2 shows a block diagram representation of the router 112 in accordance with the preferred embodiment of the present invention. A wall phone line coupler 150 is shown for providing connection to a wall phone line 149 coupled directly, or through a PBX or other transmission medium, to the PSTN 114 (FIG. 1). A fax phone line coupler 152 is also shown for connection to a fax phone line 151 connected to the facsimile machine 130, which is shown in greater detail in FIG. 103. Coupled between the wall phone line coupler 150 and the fax phone line coupler 152 is telephony circuitry 156 which is controlled by central processing unit (CPU) circuitry 158 which is shown including a speaker 160. A phone line surge protector 162 is also shown connected between the wall phone line coupler 150 and the telephony circuitry 156. The router 112 receives AC power through a male wall AC coupler 164 which is connected through AC interconnect 165 to female fax AC coupler 166 for connection through a facsimile power cord to provide power to the facsimile machine 130. The router 112 is also shown including an AC surge protector 168 for protecting the router 112 and the facsimile machine 130 from harmful power surges. In addition, the AC surge protector 168 is connected to an isolated power supply 170 which provides power to the telephony circuitry 156 and the CPU circuitry 158.

Figure 3:
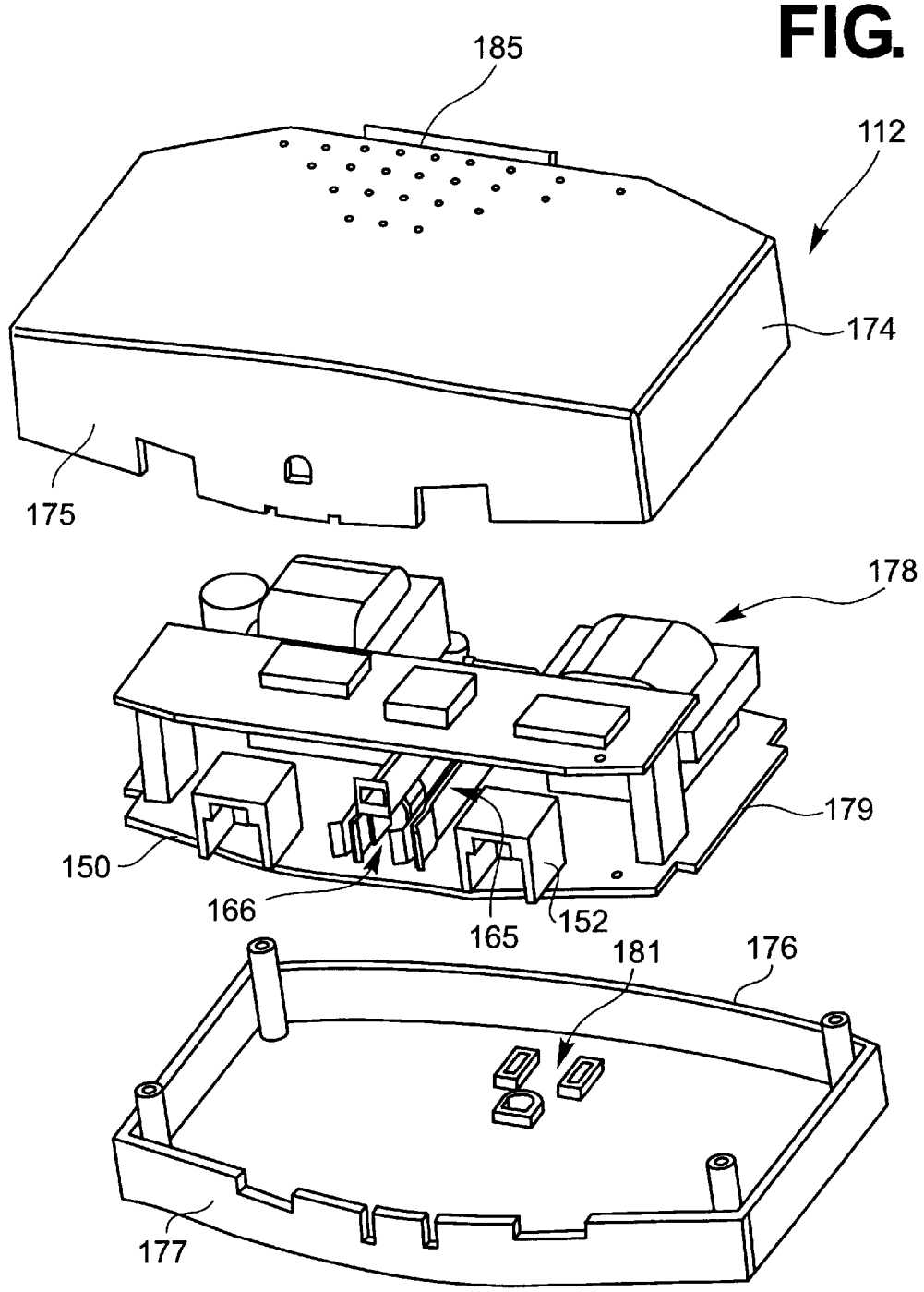
FIG. 3 is a bottom exploded perspective physical view of the router of FIG. 1.
Figure 4:
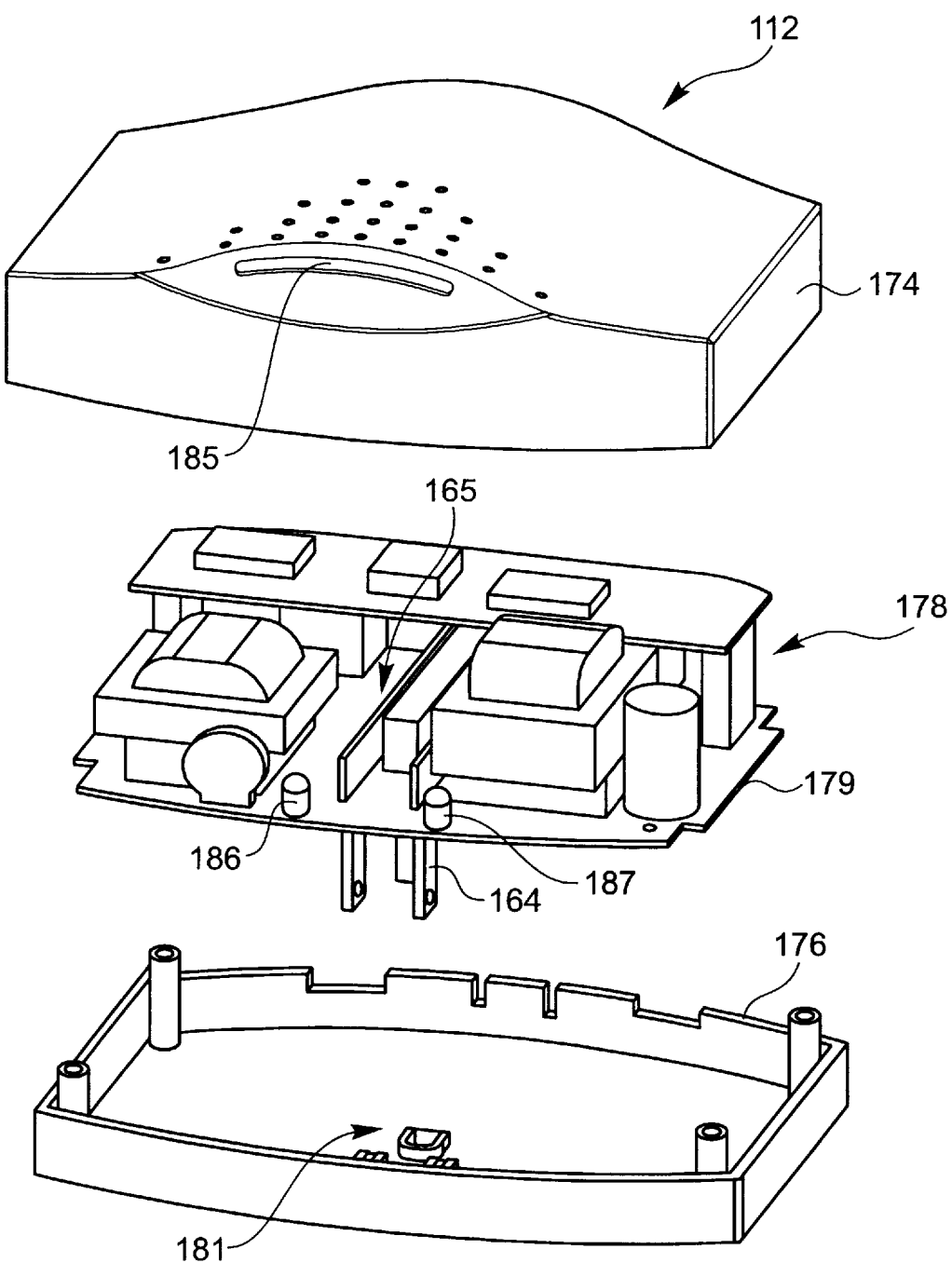
FIG. 4 is a top exploded perspective physical view of the router of FIG. 1.

Referring now to FIG. 3, which shows a bottom exploded perspective physical view of the router 112, and FIG. 4, which shows a top exploded perspective physical view of the router 112, a router front panel 174 connects to a router back panel 176 to enclose a router circuit assembly 178 including a router circuit board 178. The wall phone line coupler 150 and the fax phone line coupler 152 are shown attached to the router circuit board 179, along with the female fax AC coupler 166 and the male wall AC coupler 164 which are connected to each other through the AC interconnect 165. In its assembled configuration, the router 112 defines access portals through a front panel bottom wall 175 of the router front panel 174 and a back panel bottom wall 177 of the router back panel 176 to the wall phone line coupler 150, the fax phone line coupler 152, and the female fax AC coupler 166. A male prong portal 181 is also shown defined in the router back panel 176 for receiving the male wall AC coupler 164 when assembled. An indicator bar 185 is mounted to the router front panel 174 for receiving light signals from a power indicator 186 and a surge indicator 187 through light directing filaments (not shown).

Figure 5:
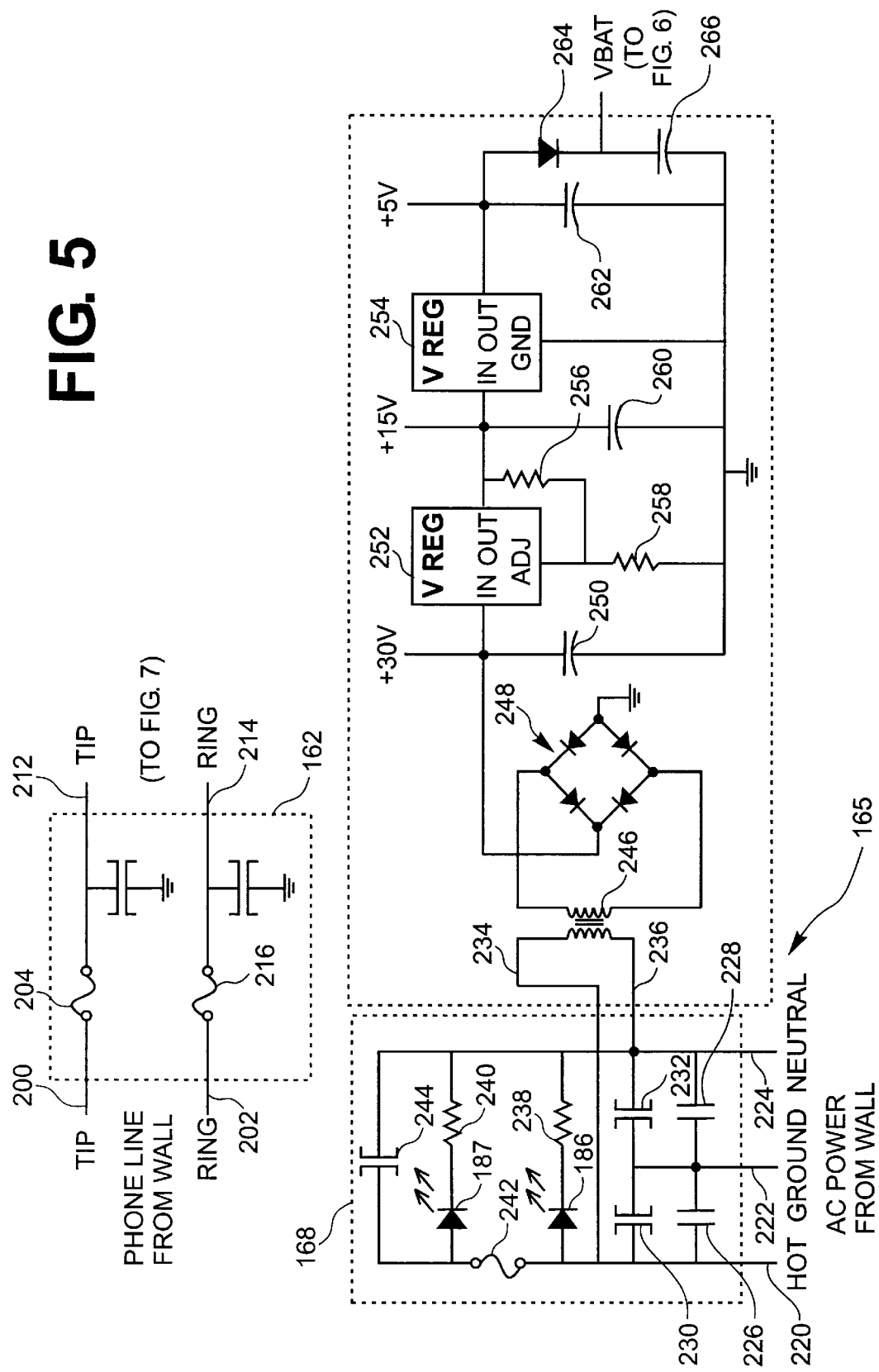
FIG. 5 is a schematic representation of the phone line surge protector, AC surge protector, and isolated power supply of FIG. 2.

Referring back to FIG. 2, the phone line surge protector 162 is shown connected between the wall phone line coupler 150 and the telephony circuitry 156, and the AC surge protector 168 and isolated power supply 170 are shown connected between the AC interconnected 165 and the telephony circuitry 156 and CPU circuitry 158. FIG. 5 shows a schematic representation of the phone line surge protector 162, AC surge protector 168, and isolated power supply 170. As input to the phone line surge protector 162 from a telephone line connected to the PSTN 114 (FIG. 1), a wall tip line 200 and a wall ring line 202 are shown for connection to the phone line coupler 150 (FIG. 2). A tip line fuse 204 and a ring line fuse 206 are connected to the wall tip line 200 and wall ring line 202, respectively. When too much current attempts to flow through the lines 200, 202, the fuses 204, 206 will open the circuit to prevent damage to other components. For a similar purpose, a tip line metal oxide varistor (MOV) 208 and a ring line MOV 210 are also included as shown. When high voltage appears on the lines 200, 202, the MOVs 208, 210 will short very quickly to eliminate the high voltage. Thus, the phone line surge protector 162 produces signals on a protected tip line 212 and a protected ring line 214 which are connected to the telephony circuit 156 which is shown in greater detail in FIG. 7.

The AC surge protector 168 is shown receiving signals through the AC interconnect 165 which is shown including an AC hot lead 220, an AC ground lead 222, and an AC neutral lead 224. Noise reducing capacitors 226 and 228 are shown connecting the AC hot lead 220 and the AC neutral lead 224 to the AC ground lead 222. MOVs 230 and 232 are connected in a similar configuration and, along with MOV 244, attempt to provide protection against high voltage surges. The power indicator 186 and surge indicator 187 are shown connected in series with resistors 238 and 240, respectively, to provide visual indications of power and surge protection capabilities. When too much current flows through a surge fuse 242, the surge indicator 187 will no longer generate light, indicating a decreased surge protection capability. The isolated power supply 170 is shown connected to the AC surge protector 168 through a protected hot lead 234 which is connected to the AC hot lead 220 and a protected neutral lead 236 which is connected to the AC neutral lead 224. An AC isolation transformer 246 is shown for stepping the AC voltage down to a lower level of 24 VAC (rms). An example of an acceptable transformer 246 is the PSS3-20 transformer from Prem of McHenry, Ill. An AC bridge rectifier 248 is shown for rectifying the stepped down voltage which is then smoothed by a capacitor 250 to produce a DC voltage of 30 V. Subsequently, two voltage regulators 252 and 254 provide the lower voltages of +15 V and +5 V. The resistors 256 and 258 determine the voltage supplied by the voltage regulator 252, and capacitors 260 and 262 help filter out noise. Examples of acceptable voltage regulators 252 and 254 are, respectively, an LM317T adjustable voltage regulator and an LM78L05ACZ +5VDC voltage regulator available from National Semiconductor of Santa Clara, Calif. While these DC voltages produced by the isolated power supply 170 are provided to other elements of the present invention, the connections are, as a matter of convenience and in an effort not to further complicate the drawings, not explicitly shown in later schematics. Furthermore, de-coupling capacitors are also included near every power connection to reduce noise. A diode 264 and a capacitor 266 are also shown connected to the +5 V output of the voltage regulator 254. The capacitor 266 builds up charge when power is supplied through the diode 264 from the voltage regulator 254. When all external power is disabled, the capacitor 266 will, for a limited amount of time, provide power only on a VBAT line 268 by virtue of the diode 264.

Figure 6:
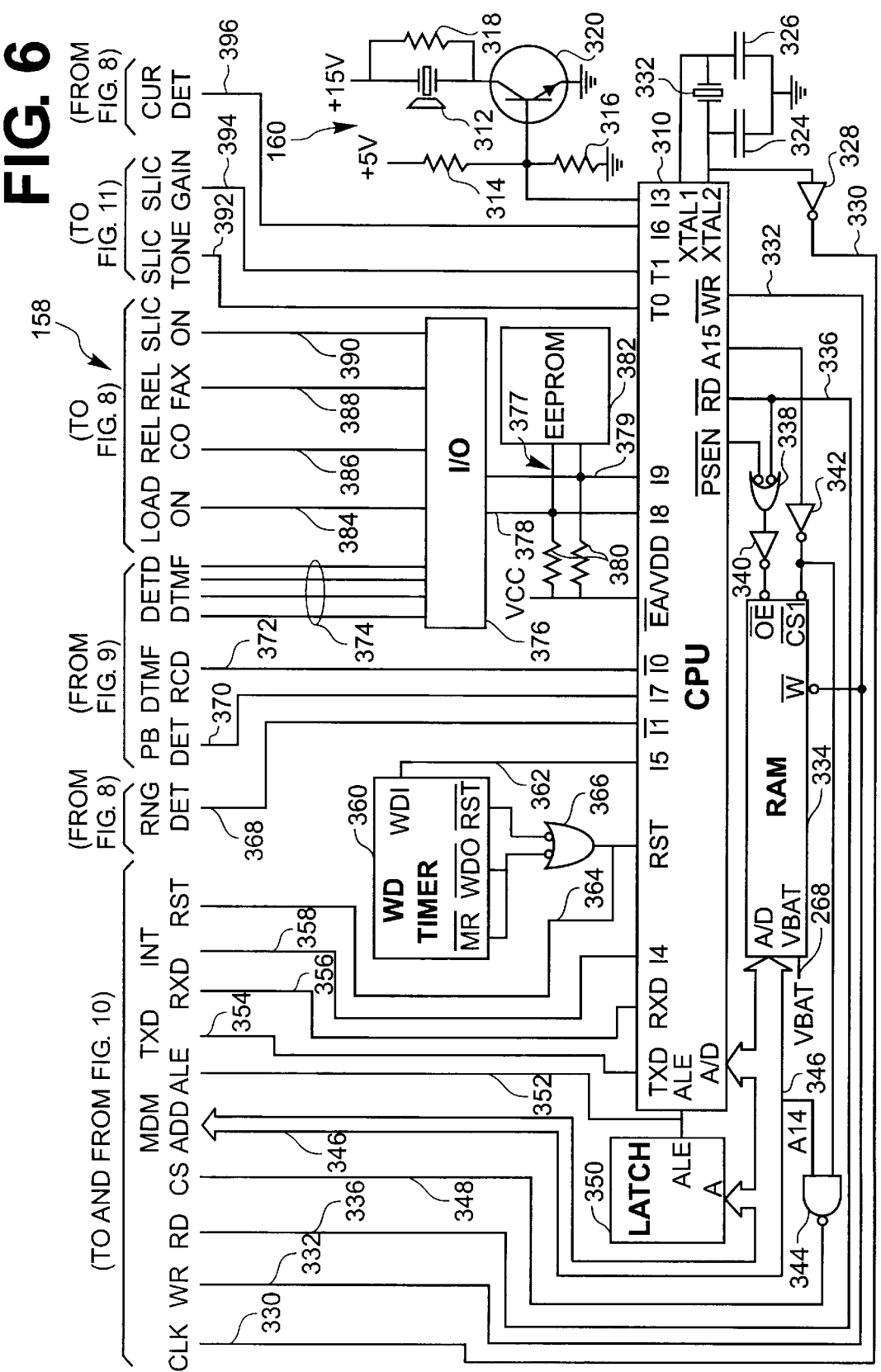
FIG. 6 is a schematic representation of the CPU circuitry of FIG. 2.

FIG. 6 shows a schematic representation of the CPU circuitry 158. A CPU integrated circuit (IC or chip) 310 is shown connected through pin I3 to the speaker circuit 160. The CPU chip 310 is a microprocessor having real time clock capabilities and internal non-volatile ROM and volatile RAM for interpreting stored program instructions, an example of an acceptable CPU chip 310 being the 8051 microprocessor from Phillips of Mineral Wells, Tex. Within the speaker circuit 160, a resistor 314 is shown connected to +5 V, and a resistor 316 is shown connected to ground, both of which are connected to the base of a speaker transistor 320 whose emitter is grounded and whose collector is connected to a piezo speaker 312 and a resistor 318 which are connected in parallel to +15 V. An example of an acceptable piezo speaker 312 is the PKM17EPT-4001 from Murata-Erie of Smyrna, Ga. Signals emitted from the 13 pin of the CPU chip 310 affect the amount of current allowed to flow through the speaker transistor 320, thus affecting the pitch and duration of tones emitted from the piezo speaker 312. A CPU crystal 322 is shown connected between the XTAL1 and XTAL2 pins of the CPU chip 310 which are connected to ground through capacitors 326 and 324, respectively. An example of an acceptable CPU crystal 322 is the HC495-11.0592 MHz crystal from Crystek of Fort Myers, Fla. The XTAL2 pin is also connected through an inverter 328 to a clock (CLK) line 330 which is shown directed toward FIG. 10. An example of an acceptable inverter 328, as well as other inverters shown throughout the router 112, is the 74HC04 inverter from Texas Instruments of Austin, Tes. A write (WR) pin on the CPU chip 310 is shown connected through a write line 332 to a write (W) pin on a random access memory (RAM) chip 334 and directed toward FIG. 10. An example of an acceptable RAM chip 334 is the 60256P static ram from National Semiconductor of Santa Clara, Calif. Refer to the drawings for inversion indicators on pin names. An address pin A15 of the CPU chip 310 is shown connected through an inverter to a CS1 pin on the RAM chip 334 and along with an A14 address signal to a NAND gate 344 to which a chip select (CS) line 348 is connected and directed toward FIG. 10. One example of an acceptable NAND gate 344, as well as other NAND gates shown in the router 112, is the 746COO from Texas Instruments of Austin, Tex. A read (RD) pin on the CPU chip 310 is connected to a read line 336 which is directed toward FIG. 10 and also along with signals from a PSEN pin on the CPU chip 310 to another NAND gate 338 whose output is inverted by an inverter 340 before being supplied to an output enable (OE) pin on the RAM chip 334. The VBAT signal line 268 is shown connected to the RAM chip 334 for temporarily maintaining memory contents after external power is lost.

Figure 10:
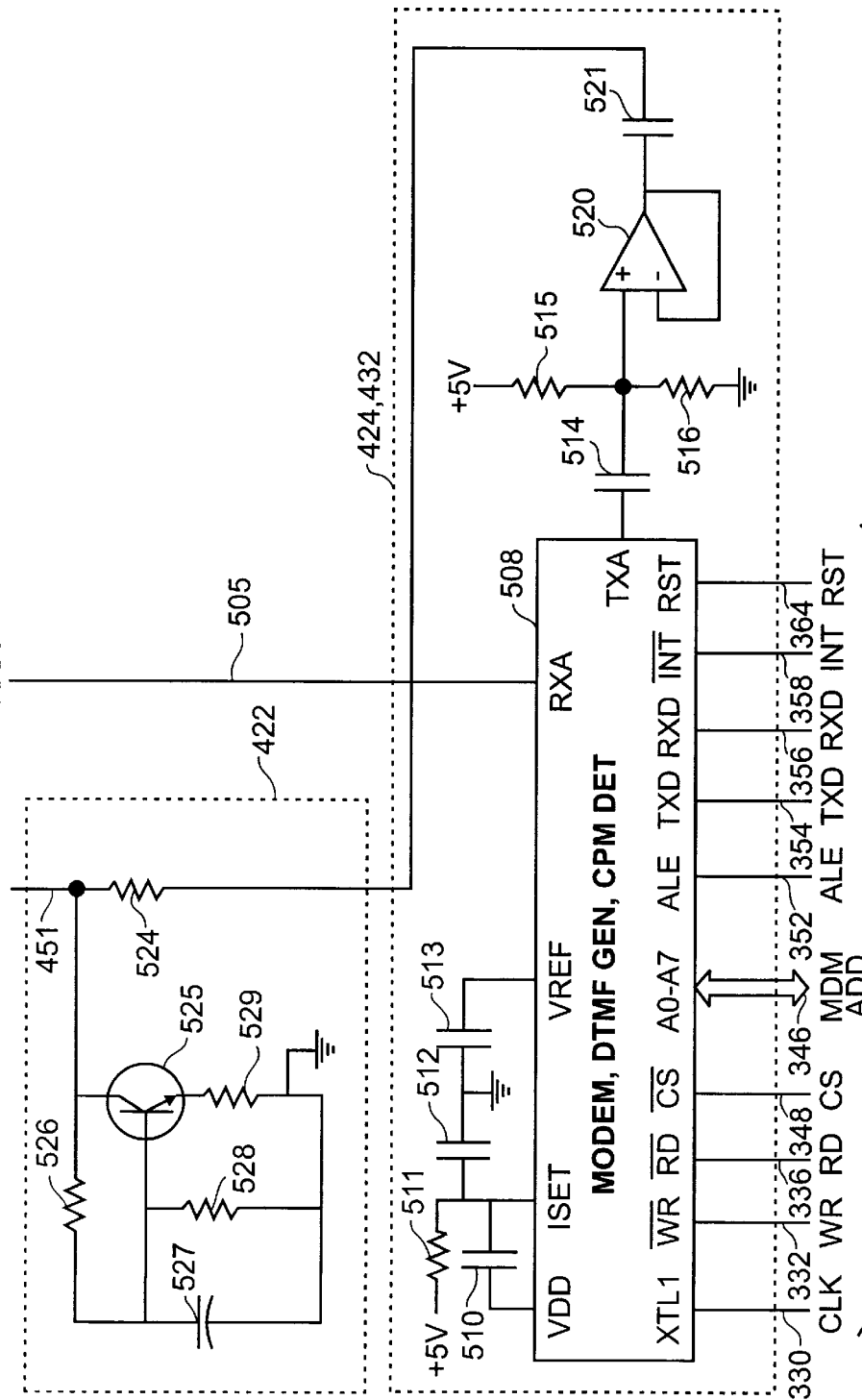
FIG. 10 is a schematic representation of the active line load, modem, DTMF generator, and call progress monitoring detector circuits of FIG. 7.

A data/address bus 346 is shown connected between address/data (A/D) pins on the CPU chip 310, A/D pins on the RAM chip 334, address (A) pins on a latch chip 350, and directed toward FIG. 10 through modem address (MDM ADD) bus 346. An example of an acceptable latch chip 350 is the 74HC573 latch from Texas Instruments of Austin, Tex.

Address line enable (ALE) pins on both the CPU chip 310 and the latch chip 350 are connected through an ALE line 352 which is also directed toward FIG. 10. As is discussed in greater detail below, the data/address bus 346 is implemented as a multiplexed bus with some lines serving both address and data functions in conjunction with the latch chip 350 as controlled by the ALE line 352. A transmit data (TXD) line 354, a received data (RXD) line 356, and an interrupt (INT) line 358 are shown connected to the CPU chip 310 at pins TXD, RXD, and 14, respectively, and directed toward FIG. 10. A watch dog (WD) timer 360 is shown connected through WD input line 362 leading from pin I5 on the CPU chip 310. An example of an acceptable watch dog timer 360 is the MAX705CSA from Maxim of Sunnyvale, Calif. A NAND gate 366 receives output from the WD timer 360 to produce a reset signal on a reset line 364 which is connected to a reset (RST) pin on the CPU chip 310 and is shown directed toward FIG. 10. The reset line 364 goes low to reset elements connected to the reset line 364, including the CPU chip 310, when the WD timer 360 does not receive anticipated signals through the WD input line 362 and also remains low after a power-up to allow proper initialization of elements.

Figure 8:
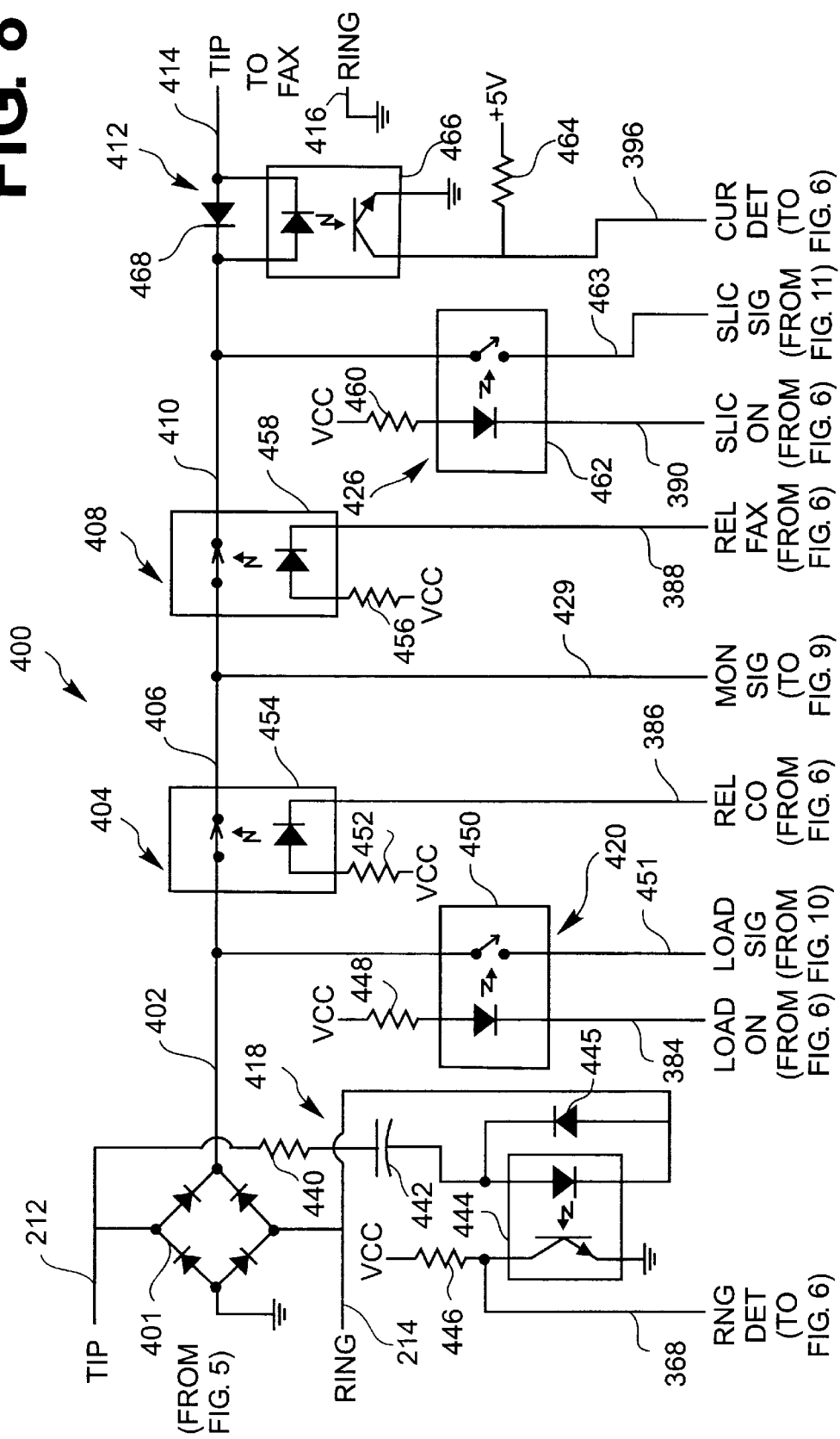
FIG. 8 is a schematic representation of the switching/detecting circuit of FIG. 7.

A ring detect (RNG DET) line 368 is shown connected to pin I5 on the CPU chip 310 and directed toward FIG. 8. A precise busy detect (PB DET) line 370 and a dual tone multi-frequency received (DTMF RCD) line 372 are shown connected to pin I7 and pin I0 on the CPU chip 310 and directed toward FIG. 9. Detected (DETD) DTMF lines 374 are also shown directed toward FIG. 9 and connected to an input/output (I/O) expander chip 376 which is connected to pins I8 and I9 on the CPU chip 310 through an inter-integrated circuits (I2C) bus 377 comprising a first I2C bus line 378 and a second I2C bus line 379. An example of an acceptable I/O expander chip 376 is the 8574 I2C I/O expander from Signetics of Sunnyvale, Calif. A load on line 384, release central office (REL CO) line 386, release facsimile machine (REL FAX) line 388, and a subscriber line interface (SLIC) on line 390 are also shown connected to the I/O expander chip 376 and directed toward FIG. 8. The I²C bus lines 378, 379 are also shown connected to a serial electrically erasable programmable read only memory (EEPROM) chip 382 and being pulled up by pull-up resistors 380 to VCC (+5V) which is also shown connected to the CPU chip 310 at pin EA/VDD. An example of an acceptable EEPROM chip 382 is the 24C01 NOVRAM chip from Microchip of Carrolton, Tex. The EEPROM chip 382 contains a unique serial number for each router 112, allowing identical programming and production of other elements of the router 112. A SLIC tone line 392 and a SLIC gain line 394 are shown connected to pins T0 and T1 of the CPU chip 310 and directed toward FIG. 11. Finally, a current detector (CUR DET) line 396 is shown connected to pin I6 of the CPU chip 310 and directed toward FIG. 8. Operation of the CPU circuitry 158 is discussed in greater detail below.

Figure 7:
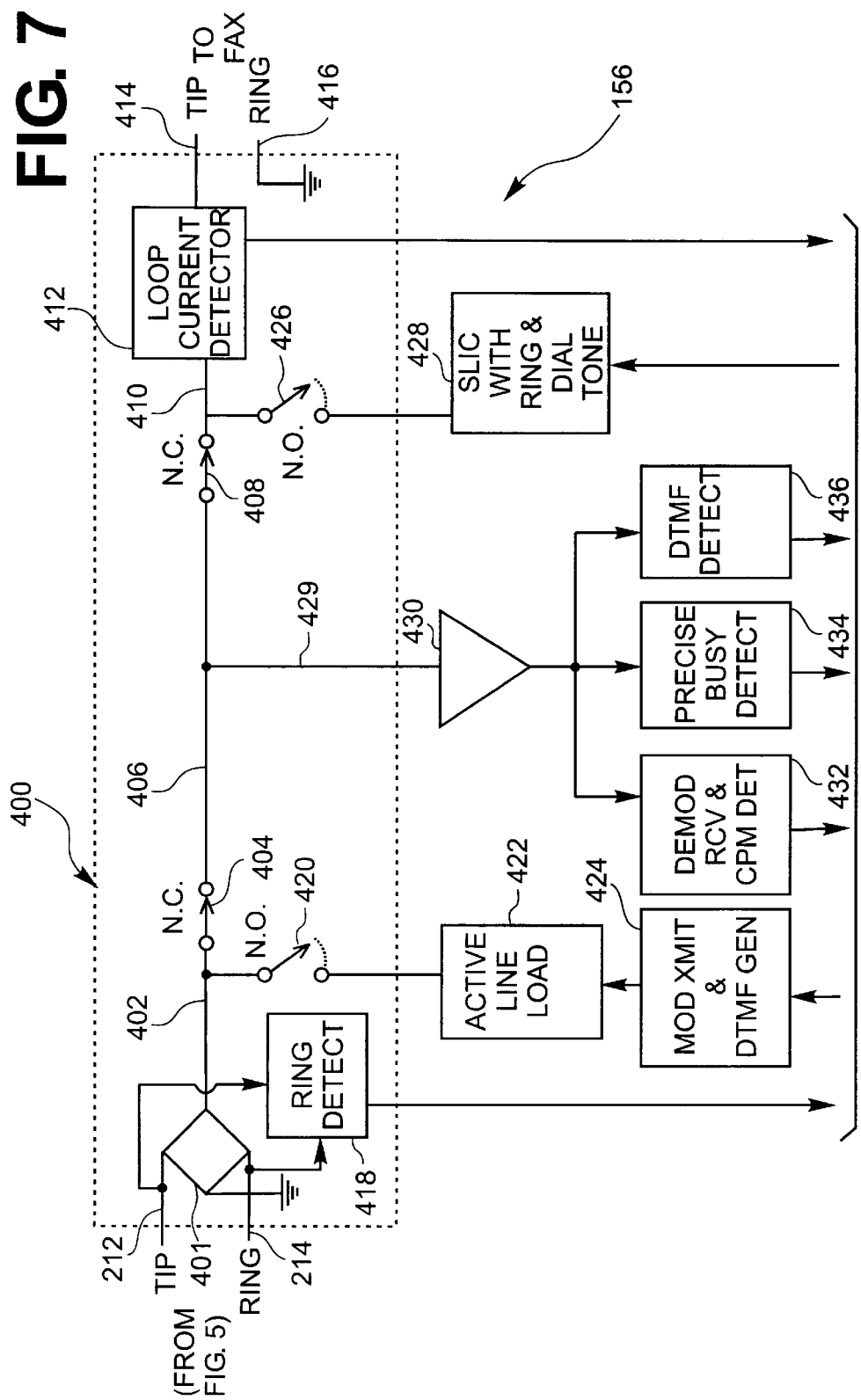
FIG. 7 is a block diagram representation of the telephony circuitry of FIG. 2.

Referring now to FIG. 7, which shows a block diagram representation of the telephony circuitry 156 of FIG. 2, the protected tip line 212 and protected ring line 214 from FIG. 5 are shown connected to a switching/detecting circuit 400 outlined in dotted lines. The switching/detecting circuit 400 is shown including a telephone tip detector 401 connected to the protected lines 212, 214 and a first direct conductor 402. A central office (CO) release switch 404 is shown connected between the first direct conductor 402 and a second direct conductor 406. A fax release switch 408 is shown connecting the second direct conductor 406 to a third director conductor 410 which is also connected to a loop current detector circuit 412. A fax tip line 414 is also connected to the loop current detector circuit 412, and a fax ring line 416 is connected to router ground. Both fax lines 414, 416 continue on to the fax phone line coupler 152 shown in FIG. 2. The switching/detecting circuit 400 further includes a ring detector circuit 418 connected to the protected tip line 212 and ring line 214 and a load switch 420 connected to the first direct conductor 402. The switching/detecting circuit 400 also includes a SLIC switch 426 connected to the third direct conductor and a monitored signal line 429 connected to the second direct conductor 406. The telephony circuitry 156 further includes an active line load circuit 422 connected to the load switch 420 of the switching/detecting circuit 400. A modulator transmit and DTMF generator circuit 424 is also connected to the active line load circuit 422. An integrated SLIC with ring and dial tone generator circuit 428 is shown connected to the SLIC switch 426. A detector amplifier circuit 430 is connected to the monitored signal line 429 and provides signals to a demodulator receive and call progress monitoring (CPM) detector circuit 432, a precise busy detector circuit 434, and a DTMF detector circuit 436. All of the detector circuits 412, 418, 432, 434, and 436 are shown supplying signals to FIG. 6, and the generator circuits 424 and 428 are shown receiving signal from FIG. 6. Each of the elements of FIG. 7 are shown in greater detail in the following FIGS.

The switching/detecting circuit 400 is shown in greater schematic detail in FIG. 8. The protected tip line 212 and protected ring line 214 are shown connected to the telephone tip detector 401 for ensuring that signals passing to the first direct conductor 402 are indeed tip signals, thereby accommodating any inadvertent wiring reversal by the user. The ring detector circuit 418 is shown including a resistor 440 connected to the protected tip line 212 and a capacitor 442 which is connected to the resistor 440, an input of a transistor output optoisolator 444, and a diode 445 preventing excessive reverse bias voltage across the transistor optoisolator 444. An input of the transistor optoisolator 444 is also connected to the protected ring line 214, and the output of the transistor optoisolator is pulled-up by resistor 446 which is connected to VCC. When a ring signal appears across the protected tip and ring lines 212, 214, the transistor optoisolator 444 will detect the signal and cause its output, and thus the ring detect line 368, to drop to ground. The load switch 420 is shown including an opto-isolated relay switch 450 connected to the first direct conductor 402 and a pull-up resistor 448 connected to VCC and to the opto-isolated relay switch 450. Also connected to the opto-isolated relay switch 450 is the load switch control line 384 from FIG. 6, and a load signal line 451 coming from FIG. 10. The opto-isolated relay switch 450 is normally open so that only when the load switch control line 384 goes low, signals are allowed to flow from the load signal line 451 to the first direct conductor 402. The CO release switch 404 is shown including a pull-up resistor 452 and an opto-isolated relay switch 454 selectively connecting the first direct conductor 402 to the second direct conductor 406. The opto-isolated relay switch 454 is normally closed so that the first direct conductor 402 is disconnected from the second direct conductor 406 only when the release CO control line 386 coming from FIG. 6 goes low. The monitored signal line 429 is also show connected to the second conductor 406. In a manner similar to the CO release switch, the fax release switch 408 is shown including a resistor 456 and an opto-isolated relay switch 458 which is normally closed to connect the second direct conductor 406 to the third direct conductor 410 and which opens the connection in response to receiving a low signal through the release fax control line 388 coming from FIG. 6. The SLIC switch 426 is similar to the load switch 420 in that a normally open opto-isolated relay switch 462 and a pull-up resistor 460 cooperate to connect the third direct conductor 410 to a SLIC signal line 463 when a low signal is provided through the SLIC switch control line 390 from FIG. 6. The loop current detector circuit 412 is relatively similar to the ring detector circuit 418 in including a pull-up resistor 464 and a transistor output optoisolator 466. However, in conjunction with a diode 468, current flowing between the third direct conductor 410 and the fax tip line 414 also flows through the loop current detector circuit 412 to produce a low voltage situation on the loop current detector line 396 directed toward FIG. 6. An example of an acceptable transistor output optoisolator 444, 466 is the PS2701-1 MCT2 from NEC Electronics of Mountainview, Calif. An example of an acceptable opto-isolated relay switch 450, 462 is the LAA110 from CP Clare of Wakefield, Mass. An example of an acceptable opto-isolated relay switch 454, 458 is the LBB110 from CP Clare of Wakefield, Mass.

Figure 9:
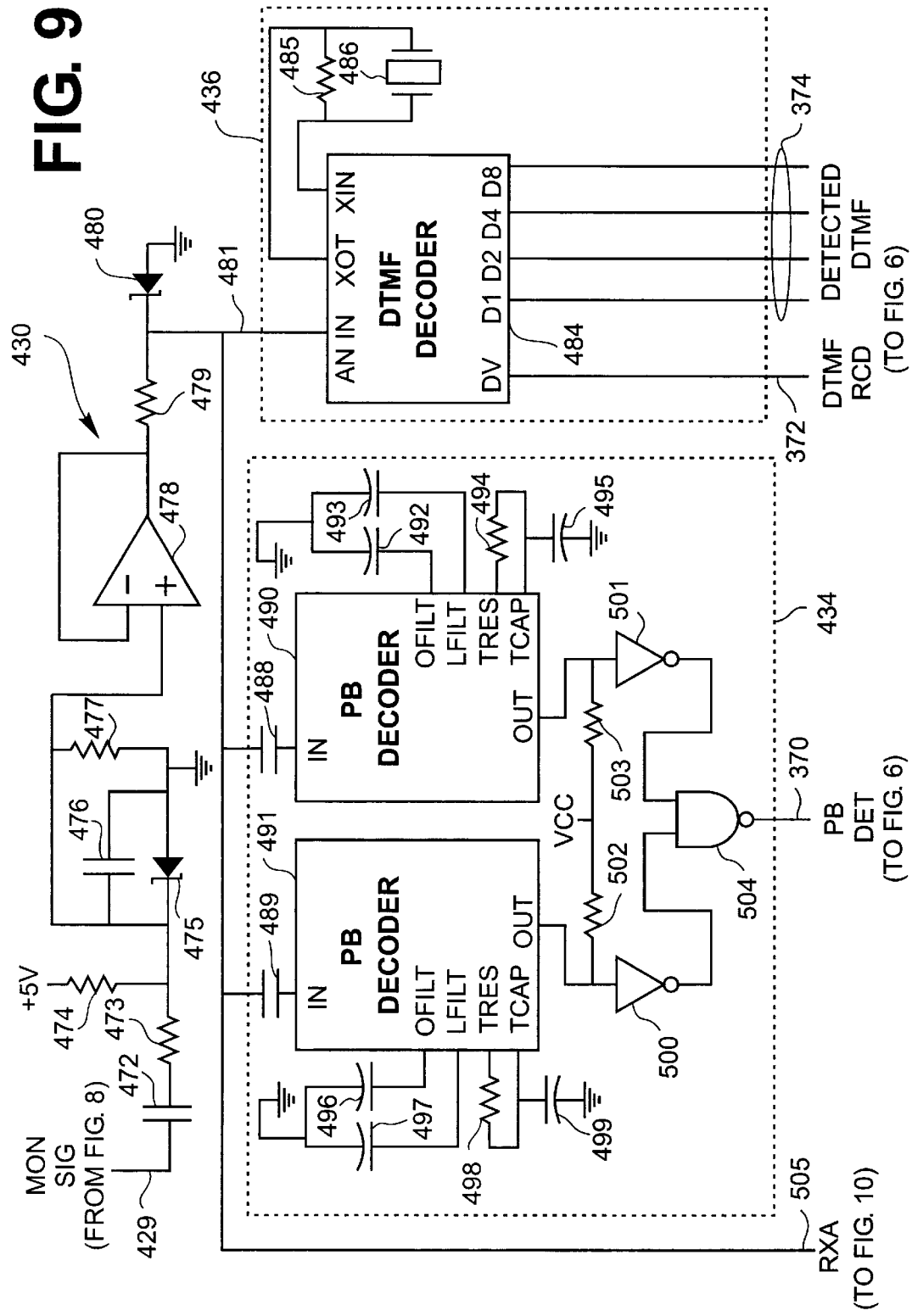
FIG. 9 is a schematic representation of the detector amplifier, precise busy, and DTMF detector circuits of FIG. 7.

FIG. 9 shows a schematic representation of the detector amplifier circuit 430, the precise busy detector circuit 434, and the DTMF detector circuit 436 of the telephony circuitry 156 of FIG. 7. The monitored signal line 429 is shown connected to an AC-coupling capacitor 472 and a resistor 473 of the detector amplifier circuit 430. Zener diode 475 and capacitor 476 provide further protection against high voltages, and resistors 474 and 477 set the DC offset of the signal presented to a detector amplifier 478. Continuing, the detector amplifier 478 with very high input impedance between the "−" and "+" inputs is shown connected to a resistor 479 and a zener diode 480 which further protect components against transients. An example of an acceptable detector amplifier 478, as well as other operation amplifiers shown in the router and not otherwise distinguished, is the LM2902 from National Semiconductor of Santa Clara, Calif. An isolated signal line 481 is shown connecting the detector amplifier circuit 430 to the precise busy detector circuit 434, the DTMF detector circuit 436, and elements in FIG. 10 through a demodulate & CPM detect line 505. The DTMF detector circuit is shown including a DTMF decoder chip 484 receiving input through an ANI IN pin connected to the isolated signal line 481. An example of an acceptable DTMF decoder chip 484 is the 75T204-IL from Silicon Systems Inc. of Tustin, Calif. A resistor 485 and a crystal 486 are connected across XOT and XIN pins for proper configuration of the DTMF decoder chip 484. An example of an acceptable crystal 486 is the HC495-3.579545 MHz crystal from Crystek of Fort Myers, Fla. The DTMF received line 372 is connected to a data valid (DV) pin on the DTMF decoder chip 484, and the detected DTMF lines 374 are connected to pins D1, D2, D4, and D8 on the DTMF decoder chip 484. When a DTMF digit is detected on the isolated signal line 481, the DTMF decoder chip 484 identifies the digit through the detected DTMF lines 374 and flags the occurrence on the DTMF received line 372. Signals entering the precise busy detector circuit 434 from the isolated signal line 481 are AC-coupled through capacitors 488 and 489 to a first tone decoder chip 490 and a second tone decoder chip 491, respectively. An example of an acceptable tone decoder chip 490, 491 is the XR-567A from Exar of San Jose, Calif. The first tone decoder chip 490 looks for signals of a first frequency as determined by capacitor 492, capacitor 493, resistor 494, and capacitor 495, and the second tone decoder chip 491 looks for signals of a second frequency as determined by capacitor 496, capacitor 497, resistor 498, and capacitor 499. Each decoder chip 490, 491 will output a signal through its OUT pin upon detecting such a frequency. Signals from the decoder chips 491, 490 are pulled-up by resistors 502 and 503, directed through inverters 500 and 501 and NAND gate 504 to produce the precise busy detect line 370 directed toward FIG. 6. Since the conventional U.S. busy signal consists of two frequencies, the precise busy detector circuit 434 outputs a signal on the precise busy detect line 370 when sensing the occurrence of a signal on the isolated signal line 481 having both frequencies.

Following the demodulate and CPM receive line 505 to FIG. 10, which shows a schematic representation of the active line load circuit 422, the modulator transmit and DTMF generator circuit 424, and the demodulator receive and CPM detect circuit 432, the functions of the modulator transmit and DTMF generator circuit 424 and the demodulator receive and CPM detect circuit 432 are all provided, according to the preferred embodiment of the present invention, by a circuit centered around an integrated modem chip 508. An example of an acceptable integrated modem chip 508 is the 73K312L modem from Silicon Systems, Inc. of Tustin, Calif. The demodulate and CPM receive line 505, clock line 330, write line 332, read line 336, chip select line 348, data/address bus 346, address latch enable line 352, transmit data line 354, receive data line 356, interrupt line 358, and reset line 364 are shown connected to RXA, XTL1, WR, RD, CS, A0–A7, ALE, TXD, RXD, INT, and RST pins, respectively, on the integrated modem chip 508. A capacitor 510, resistor 511, capacitor 512, and capacitor 513 are connected as shown to pins VDD, ISET, and VREF for proper configuration. A TXA pin is also shown connected to a capacitor 514, resistors 515 and 516, an amplifier 520 and a capacitor 521 for additional buffering isolation. The capacitor 521 is also connected to a resistor 524 in the active line load circuit 422 which is shown further including an amplifier 525 biased by a resistor 526, capacitor 527, and resistors 528 and 529. The active line load circuit 422 provides an active load to a central office resembling that of a transformer of an off-hook facsimile machine. An example of an acceptable amplifier 525 is the D40C4 darlington pair from Harris of Melbourne, Fla.

The address latch enable line 352 connected to the ALE pin of the integrated modem chip 508 indicates when the data/address bus 347 contains an address; the chip select line 348 indicates when the integrated modem chip 508 is being addressed; and the read line 356 and write line 332 control reads and writes to and from the modem chip 508. When appropriately commanded through register writes from the data/address bus 346, the integrated modem chip 508 demodulates modulated data received through the demodulate and CPM receive line 505 and outputs the resulting demodulated data on the receive data line 356. Conversely, appropriately commanded through the data/address bus 346, the integrated modem chip 508 modulates data supplied to it through the transmit data line 354 and outputs the modulated data through the TXA pin. According to the preferred embodiment of the present invention, both the Bell 202 communication format, which is a standard AT&T frequency shift keyed communication scheme, and the V.21 communication format, which is a standard CCITT Group 3 fax negotiation and control procedure, can be modulated and demodulated by the integrated modem chip 508. In addition, when appropriately configured, the integrated modem chip 508 will set one or more bits, which can be read through the data/address bus 346, indicating when signals with call progress monitoring frequencies, including ringback, dial tone, and voice signals, are detected on the demodulate and CPM receive line 505. Furthermore, DTMF tones, as well as other tones at lower levels, to be generated and transmitted through pin TXA are written to the integrated modem chip 508 through the data/address bus 346. The interrupt line 358 is not utilized in the preferred embodiment, but, in alternate embodiments of the present invention, is used to designate certain functions as background activities.

Figure 11:
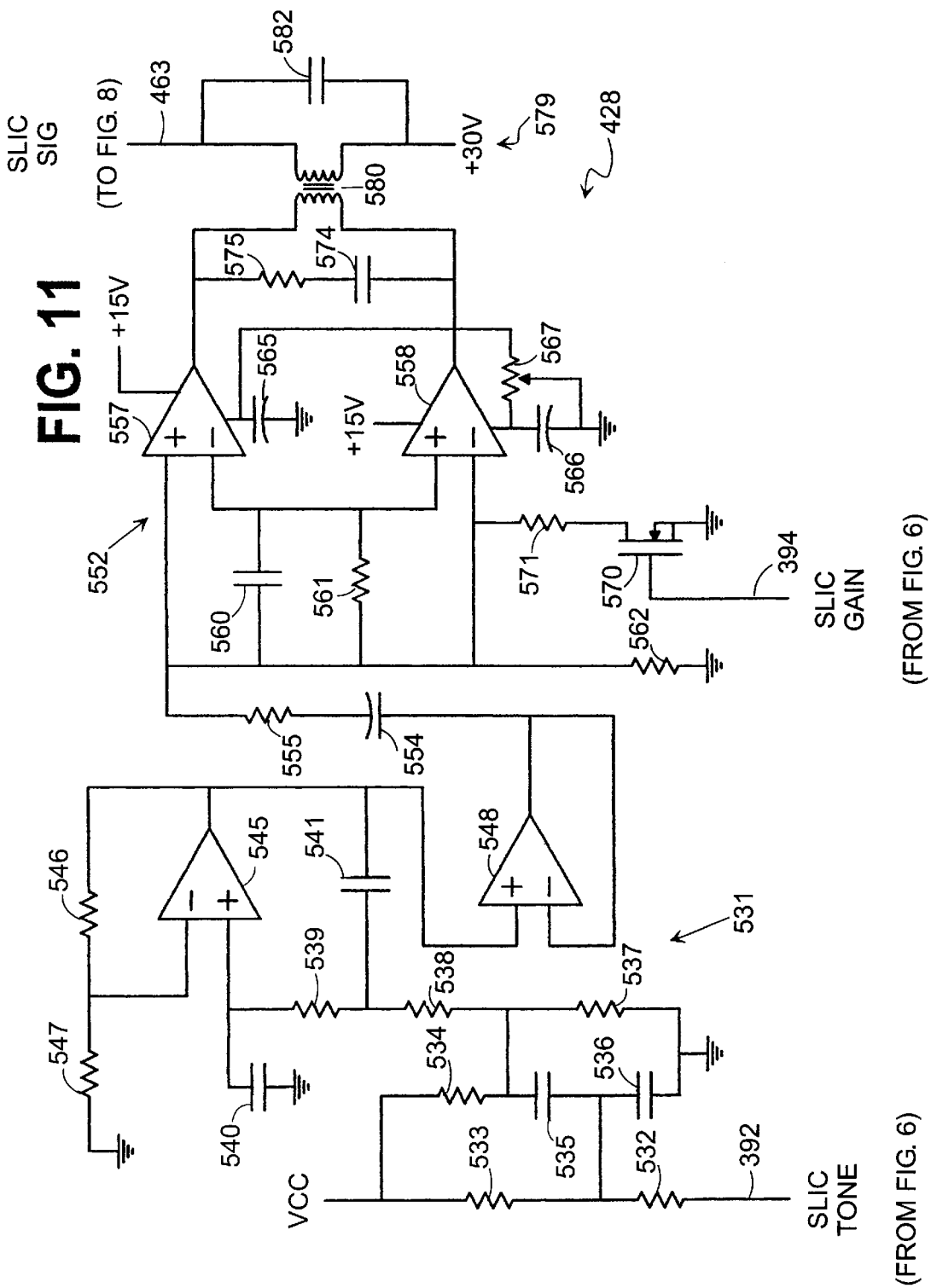
FIG. 11 is a schematic representation of the integrated SLIC with ring and dial tone generator circuit of FIG. 7.

Referring now to FIG. 11, which shows a schematic representation of the integrated SLIC with ring and dial tone generator circuit 428 of FIG. 7, a pulse width modulator circuit 531 is shown connected between the SLIC tone line 392 and a push-pull amplifier circuit 552 which is connected to the SLIC gain control line 394 and the SLIC signal line 463. As digital signals are supplied to the SLIC tone line 392, the pulse width modulator 531 modulates the digital signals into analog signals through the operation of resistors 532, 533, 534, 537, 538, 539, 546, and 547, capacitors 535, 536, 540, and 541, and operational amplifier 545. In an alternate embodiment of the present invention, a conventional digital-to-analog converter is used in place of the pulse width modulator 531. Connected to the operational amplifier 545 is another operational amplifier 548 configured as a buffer to which is connected an AC-coupling capacitor 554 and a resistor 555. The push-pull amplifier circuit 552 is shown including an operational amplifier 557 and an operational amplifier 558 which cooperate to amplify the signal supplied from the pulse width modulator 531 through resistor 555. An example of an acceptable operational amplifier 558, 559 is the LM380N-8 audio amplifier from National Semiconductor of Santa Clara, Calif. The resistors 562, 561, 575, and 567 and capacitors 560, 565, 566, and 574 are used to operate the amplifiers 557, 558. The gain applied by the push-pull amplifier circuit 552 is determined by the voltage on the SLIC gain control line 394 which is connected to a mosfet 570 which is connected to the operation amplifier 558 through a resistor 571. An example of an acceptable mosfet 570 is the VN2222LL FET from Motorola of Phoenix, Ariz. Since ring signals, which are very high voltage signals, and dial tone and other tone signals, which are much lower voltage signals, are all modulated by the pulse width modulator circuit 531 and amplified by the push-pull amplifier 552, the amplification of signals from the pulse width modulator circuit 531 needs to be adjustable, which is accomplished through varying the voltage on the SLIC gain control line 394. By using one amplifier, the push-pull amplifier 552, to amplify ring signals and other tone signals, cost and size benefits are realized which are specially relevant to one-device environments such as that of the preferred embodiment of the present invention. Output from the push-pull amplifier circuit 552 is supplied to a SLIC 579 which includes a SLIC transformer 580 connected in parallel with a capacitor 582. The SLIC 579 superimposes the amplified analog signals onto +30 VDC to appear like a central office on the SLIC signal line 463. An example of an acceptable SLIC transformer 580 is the SPW-351-S transformer by Prem of McHenry, Ill.

Figure 12:
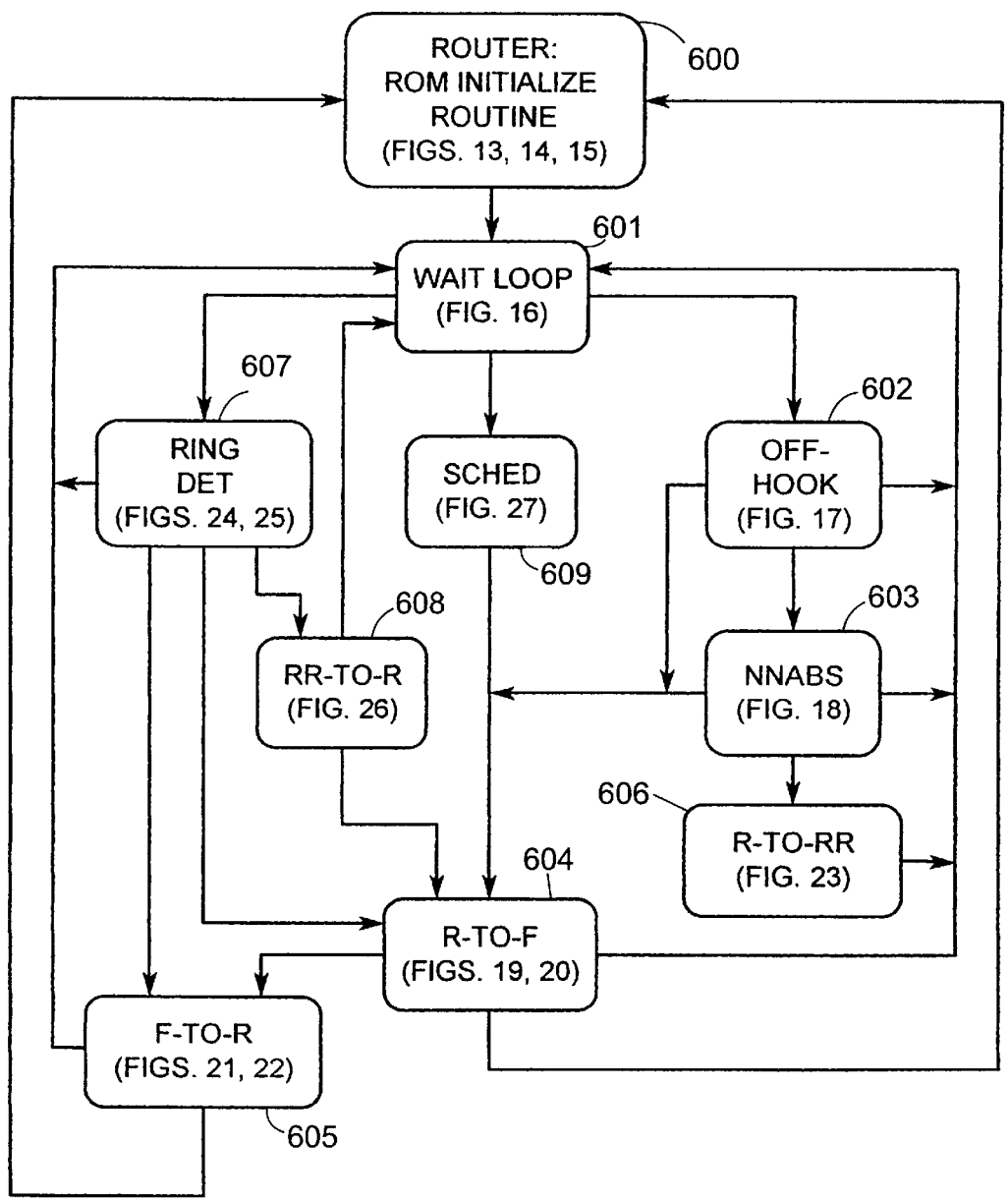
FIG. 12 is a flow chart representation of an overview of the operation of the router of FIG. 1.

FIG. 12 shows a flow chart representation of an overview of the operation of the router 112, in accordance with the preferred embodiment of the present invention (refer to FIGS. 1, 2, or 5–11 for elements referenced by the following discussion). Each of the blocks in FIG. 12 represent processes which are further defined in the referenced FIGS. Operation begins in the ROM initialize routine 600 and shown in more detail in FIGS. 13, 14, 15. A wait loop 601 is then entered which is shown in more detail in FIG. 16. Then, depending on what happens next, the operation of the router 112 continues in the ring detect routine 607 and shown in more detail in FIGS. 24, 25 if a ring from the PSTN 114 is detected by the router 112, the scheduler routine 609 and shown in more detail in FIG. 27 if a scheduled event is to be performed, or the off-hook routine 602 and shown in more detail in FIG. 17 if the local user takes the local facsimile machine 130 off-hook. After the off-hook routine 602, operation returns to the wait loop 601 or continues in a router-to-F-SAFF (R-to-F) routine 604, shown in more detail in FIGS. 19, 20 and not to be confused with the F-SAFF-to-remote or remote-to-F-SAFF special functions of the present invention, or a never-no-answer-or-busy service (NNABS) routine 603 shown in more detail in FIG. 18. The reasons alternate branching from the off-hook routine 602 and others shown in FIG. 12 are explained in detail below. Operation continues after the NNABS routine 603 in a router-to-remote-router (R-to-RR) routine 606, shown in more detail in FIG. 23, or the wait loop 601. After the R-to-F routine 604, operation returns to the wait loop 601 or the ROM initialize routine 600 or continues in an F-SAFF-to-router (F-to-R) routine 605 shown in greater detail in FIGS. 21, 22. After the F-to-R routine operation continues in the wait loop 601 or the ROM initialize routine 600. If the scheduler routine 609 was performed after the wait loop 601, operation continues in the R-to-F routine 604 which is discussed above. If the ring detect routine 607 is performed, operation returns to the wait loop 601 or continues in the F-to-R routine 605, the R-to-F routine 604, or in a remote-router-to-router (RR-to-R) routine 608, after which operation continues in the R-to-F routine 604.

Figure 13:
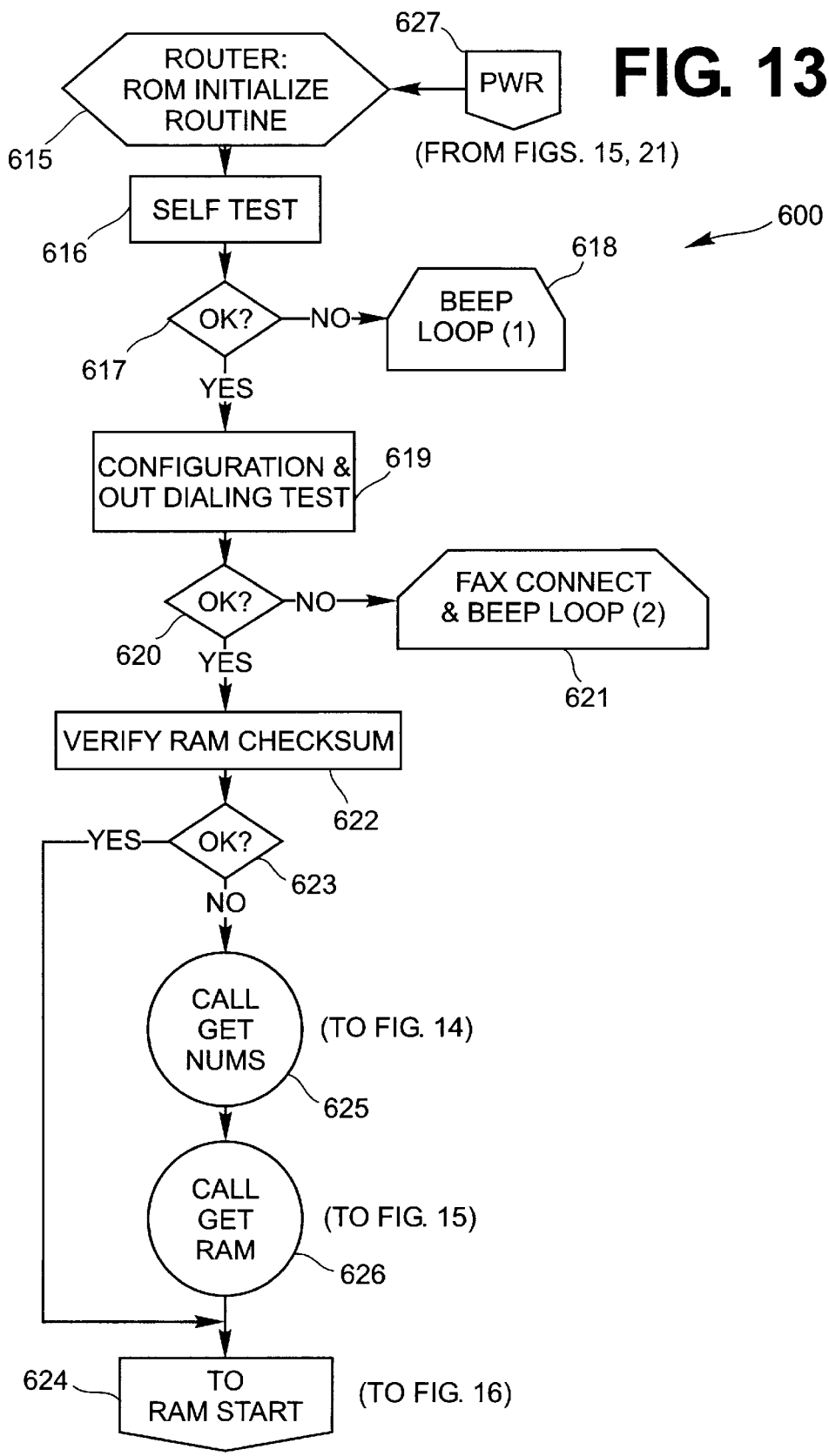
FIG. 13 is a flow chart representation of the initialize routine of FIG. 12.

Referring now to FIG. 13, the ROM initialize routine 600 is shown in greater detail. The ROM initialize routine 600 is performed in response to instructions stored in the internal ROM within the CPU chip 310, while the other routines referenced by FIG. 12 are performed according to RAM downloaded into the RAM chip 334. After the ROM initialize routine begins in step 615, a self test is performed in step 616 whereby the CPU chip 310 verifies operability of itself and other elements of the router 112. If a problem is detected, the NO branch of decision 617 indicates operation is suspended in a first beeping loop 618 to indicate the occurrence of a hardware malfunction requiring the router 112 to be serviced. To actually emit a beep, the CPU chip 310 places a signal on the I3 pin to operate the speaker transistor 320 whereby the piezo speaker 312 is caused to produce a beep according to a first format. In addition, the switches 404, 408, 420, and 426 remain in their normal configuration as shown in FIGS. 7 and 8, i.e., the CO release switch 402 and the fax release switch 408 are closed so that the wall phone line 149 is connected to the fax phone line 151, and the load switch 420 and the SLIC switch 426 are open. If the self test in step 616 is successful, the YES branch of the decision 617 is taken to a configuration & out dialing test 619. During the configuration portion of step 619, the CPU chip 310 initializes variables, establishes tables, etc.

During the out dialing test, the CPU chip 310 first causes the load switch 420 to close, the CO release switch 404 to remain closed, the fax release switch 408 to open, and the SLIC switch 426 to close. The CPU chip 310 accomplishes the switching changes by outputting appropriate serial data through the I8 and I9 pins onto the I2C bus 377 to the parallel I/O chip 376. The parallel I/O chip 376 interprets the serial data to output a low signal on the load switch control 384 to close the opto-isolated relay switch 450 of the load switch 420, a high signal on the release CO control line 386 to keep the opto-isolated relay switch 454 of the CO release switch 404 closed, a low signal on the release fax control line 388 to open the opto-isolated relay switch 458 of the fax release switch 408, and a low signal on the SLIC switch control line 390 to close the opto-isolated relay switch 462 of the SLIC switch 426. Thus, by selectively grounding the control lines 384, 386, 388, and 390, the switches 420, 404, 408, and 426 are changed from their normal configurations which are, conversely, maintained with high signals. When the load switch 420 closes, the active line load circuit 422 is connected to the first direct conductor 402 so that the router 112 is itself off-hook. In addition, since the SLIC switch 426 is closed, the integrated SLIC with ring and dial tone generator circuit 428 is connected to the third direct conductor 410 to be able to supply battery and dial tone to the local facsimile machine 130. If the user takes the local facsimile machine 130 off-hook during the out dial test of step 619, or during other times when the router 112 is unavailable to the local facsimile machine 130, no dial tone is supplied to the local facsimile machine 130. The router 112 handles such a situation differently according to alternate embodiments of the present invention, including transmitting error tones to the local facsimile machine 130, providing battery and dial tone to receive and store the dialed digits for subsequent performance of the desired operation, or simply abandoning the router's former operation and attending exclusively to the user's request. Regarding the router 112 of the preferred embodiment, to prevent the SLIC 579 from being connected to the PSTN 114, the router always makes sure that at least one of the fax release switch 408 or the CO release switch 404 is open when the SLIC switch 426 is closed.

After the switches 420, 404, 408, and 426 are set, in environments without a PBX, a dial tone will immediately be detected from a CO (not shown) within the PSTN 114. The dial tone is detected through the CPM detecting ability of the integrated modem chip 508. Since the CO release switch 404 is closed, the dial tone signal is supplied to the second direct conductor 406 and then flows through the monitored signal line 429, the detector amplifier circuit 430, and demodulate and CPM detect receive line 505 to the RXA pin on the integrated modem chip 508. The CPU chip 310 periodically polls a register within the integrated modem chip 508 through the data/address bus 346 to realize the supply of dial tone signals from the CO. The out dialing test continues with the router 112 dialing several pulse and DTMF digits and combinations of pulse and DTMF digits to determine which outdialing sequences, if any, are needed to receive a secondary dial tone. The CPU chip 310 writes data representative of the digits to the integrated modem chip 508 through the data/address bus 346. The integrated modem chip 508 then outputs the DTMF tone signals through the TXA pin so that the signal eventually pass through the active line load circuit 422, the closed load switch 420, the first direct conductor 402, the telephone tip detector 401, the phone line surge protector circuit 162, the wall phone line coupler 150, and onto the wall phone line 149 coupled to the PSTN 114. After determining which outdialing sequences are successful, the CPU chip 310 fills an outdialing table with the successful outdialing sequences.

As indicated in decision 620, if the router 112 was unable to receive a dial tone, the outdialing test was not successful, and the router 112 will enter another loop 621 where a beep with a second sound is emitted and where switches 404, 408, 420, and 426 are returned to their normal states where the wall phone line 149 is connected to the fax phone line 151, the SLIC switch 426 being opened before the fax release switch 408 is closed. Otherwise, the contents of the RAM chip 334 are checked by computing a checksum of the contents and comparing the computed checksum to a location in the RAM chip 334 where a valid checksum would be stored, as indicated by step 622. If the contents of the RAM chip 334 are valid, such as when external power has been briefly removed from the router 112 or when a complete re-initialization is directed by a subsequent routine, the YES branch of decision block 623 is taken to jump connector 624 which indicates that operation continues at a RAM START connector in FIG. 16, which corresponds to the wait loop 601. Otherwise, the NO branch of decision block 623 is taken to call connector 625 which indicates that operation continues at a GET NUMS connector in FIG. 14.

Figure 14:
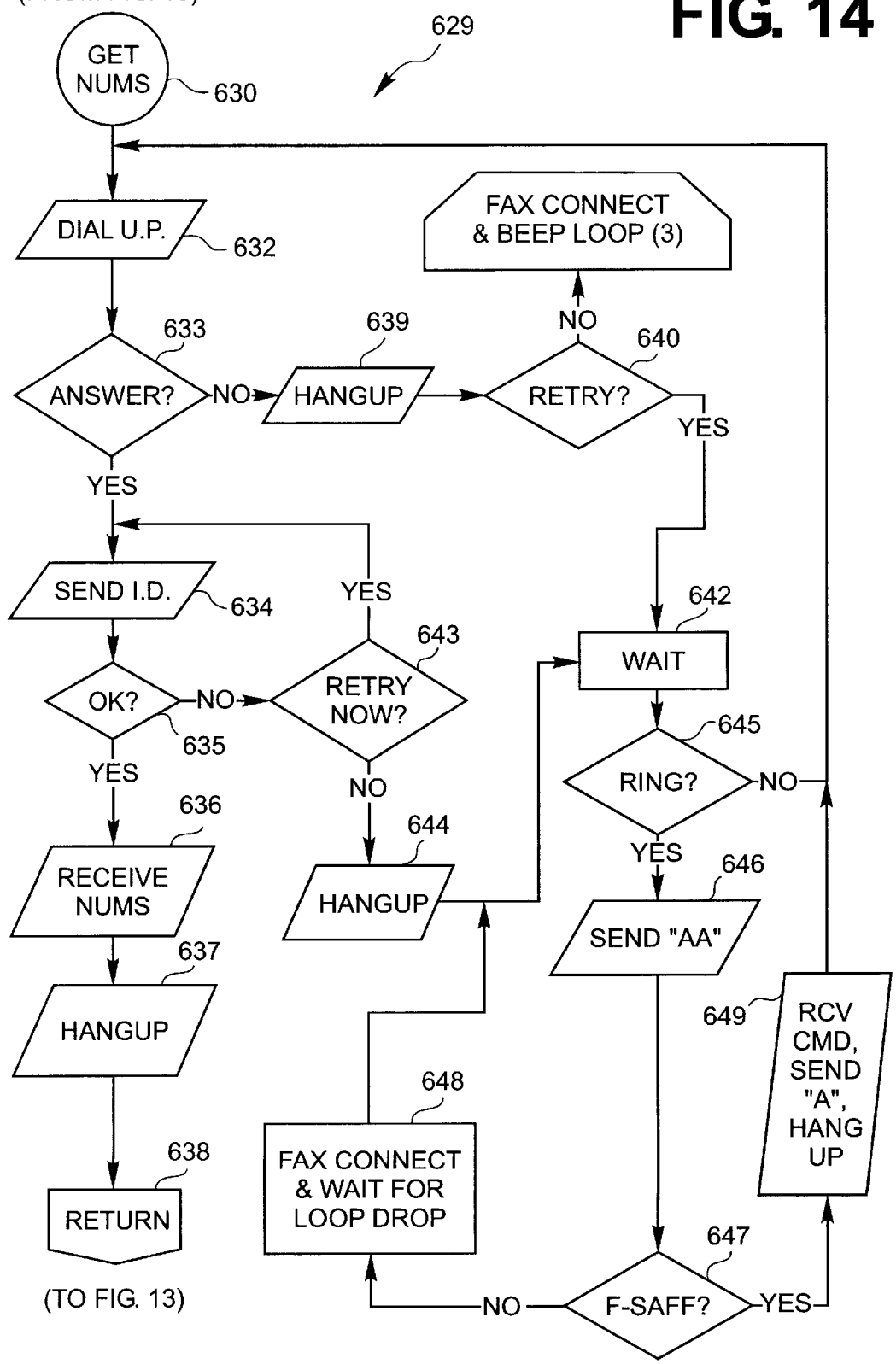
FIG. 14 is a flow chart representation of the get numbers routine of FIG. 13.

Referring now to FIG. 14, a GET NUMS subroutine 629 begins with a GET NUMS connector 630. Step 632 indicates that the router 112 dials a telephone number of the universal platform 122 (U.P. or UP). The UP telephone number is stored in the internal ROM of the CPU chip 310 and in the EEPROM chip 382 which tie CPU chip 310 reads through the I2C bus 377. If the telephone numbers are different, the number stored in the EEPROM chip 382 is preferred so that only the contents of the EEPROM chip 382 would need to be changed if the telephone number of the UP 122 ever changed. To dial the UP telephone number, the CPU chip 310 adds any necessary outdialing sequence to the UP telephone number and directs the integrated modem chip 508 to dial the telephone number after directing the load switch 420 to take the router 112 off-hook. The CPU chip 310 then repeatedly reads a register within the integrated modem chip 508 through the data/address bus 346 to check for call progress signals. If the UP 122 answers the call, as detected by the router 112 receiving a signal from the F-SAFF 116, such as a DTMF "A", the YES branch of the decision block 633 indicates that the router 112 then transmits to the UP 122 the unique identification number (serial number) of the router 112 as stored in the EEPROM 382. The identification number transmission function is a DTMF transmission similar to the previous dialing function. If the transmission to the UP 122 is good, i.e., no CRC errors, the router 112 will receive an acknowledgment signal, such as an "A", from the F-SAFF 116 before receiving DTMF digits corresponding to telephone numbers belonging to a preferred F-SAFF 116 and backup F-SAFFs, as indicated by the YES branch of decision block 635 and step 363. The method by which the UP 122 determines the appropriate F-SAFF telephone numbers is discussed in detail below. The DTMF digits from the UP 122 are detected and supplied to the CPU chip 310 by the DTMF detector circuit 436. The DTMF received line 372 provides a signal to the CPU chip 310 indicating that data on the detected DTMF lines 374 is valid, causing the CPU chip 310 to read the parallel I/O chip 376 for such data. The CPU chip 310 subsequently stores the F-SAFF telephone numbers in the RAM chip 334. Then, according to step 637, the router 112 hangs up the wall phone line 149. The hang-up is accomplished by opening the load switch 420, thereby removing any load to the wall phone line 149. Finally, jump connector 638 indicates that the process continues back in FIG. 13 where the process left off before coming to FIG. 14.

Referring back to decision block 633, if the UP 122 does not answer the call from the router 112, the NO branch is taken to step 639 which indicates that the router 112 hangs up the wall phone line 149 and then, at decision block 640, determines whether a predetermined limit on a number of retries has been reached. If another retry is not possible, the NO branch is taken to step 641 which indicates that a beep with a third sound format is emitted and that switches 404, 408, 420, and 426 are returned to their normal states where the wall phone line 149 is connected to the fax phone line 151. Otherwise, the router 112 enters a wait period 642 where the process is suspended for a predetermined amount or until a ring signal is detected on the wall telephone line 149 through the ring detector circuit 418 which indicates the detection through the ring detect line 368. Referring back to decision block 635, if the UP 122 detects a transmission error, which would become known to the router 112 after receiving an appropriate error code from the UP 122, or if the UP 122 fails to respond within a predetermined amount of time, the NO branch of decision block 635 and the YES branch of decision block 643 would be taken to loop operation back to step 634 for a predetermined number of retries. On the other hand, after a predetermined number of retries, or if the ID of tile router 112 is not known to the UP 122, which would become known to the router 112 after receiving a hang-up error code from the UP 122, the NO branches of decision blocks 635 and 643 are taken to step 644 where the router 112 hangs up the wall phone line 149. The hang-up error code from the UP 122 is a DTMF string of digits decoded by the DTMF decoder chip 484 of the DTMF detector circuit 436 and translated by the CPU chip 310. The hang-up is accomplished by opening the load switch 420.

If a ring signal is not detected during a predetermined amount of time, the NO branch of decision block 645 is taken back to the dial UP step 632 where the GET NUMS subroutine 629 begins again. If, on the other hand, a ring signal is detected on the wall phone line 149, the YES branch of decision block 645 is taken to step 646 which indicates that the router 112 answers the call and transmits a signal consisting of DTMF digits "AA". In performing step 646, the load switch 420 is closed to answer the call, and the integrated modem chip 508 is commanded by the CPU chip 310, as with all DTMF generation and transmission by the router 112, to output the "AA" DTMF digits. Subsequently, as indicated by the YES branch of decision block 647, if an F-SAFF 116 is calling to notify the F-SAFF that the UP is ready to download appropriate telephone numbers, a DTMF command is received at step 649. Such a command will be a "call UP" command, to which the router 112 will respond by transmitting a DTMF "A" and going on-hook. Operation then continues back at step 632 where the GET NUMS subroutine 629 begins again. Otherwise, if the ring was not generated by an F-SAFF 116, the router 112 will connect the wall phone line 149 to the fax phone line 151 to receive any incoming facsimile information until sensing a drop of loop current indicating the end of the facsimile transmission, as indicated by step 648, after which operation will return to the wait loop 642. The loss of loop current is sensed by the loop current detector circuit 412 which communicates such an occurrence to the CPU chip 310 through the loop current detector line 396. If a user attempts to initiate a facsimile transmission during the wait period of step 642, the router 112 will connect the phone lines 149, 151 together until the next loss of loop current. Thus, a user is allowed to send and receive facsimile information, though not utilize other services of the present invention, while the router 112 is waiting for the completion of UP 122 and F-SAFF 116 configuration which can be determined either through periodic retries by the router 112 or as prompted by an F-SAFF 116, as is discussed in greater detail below.

Figure 15:
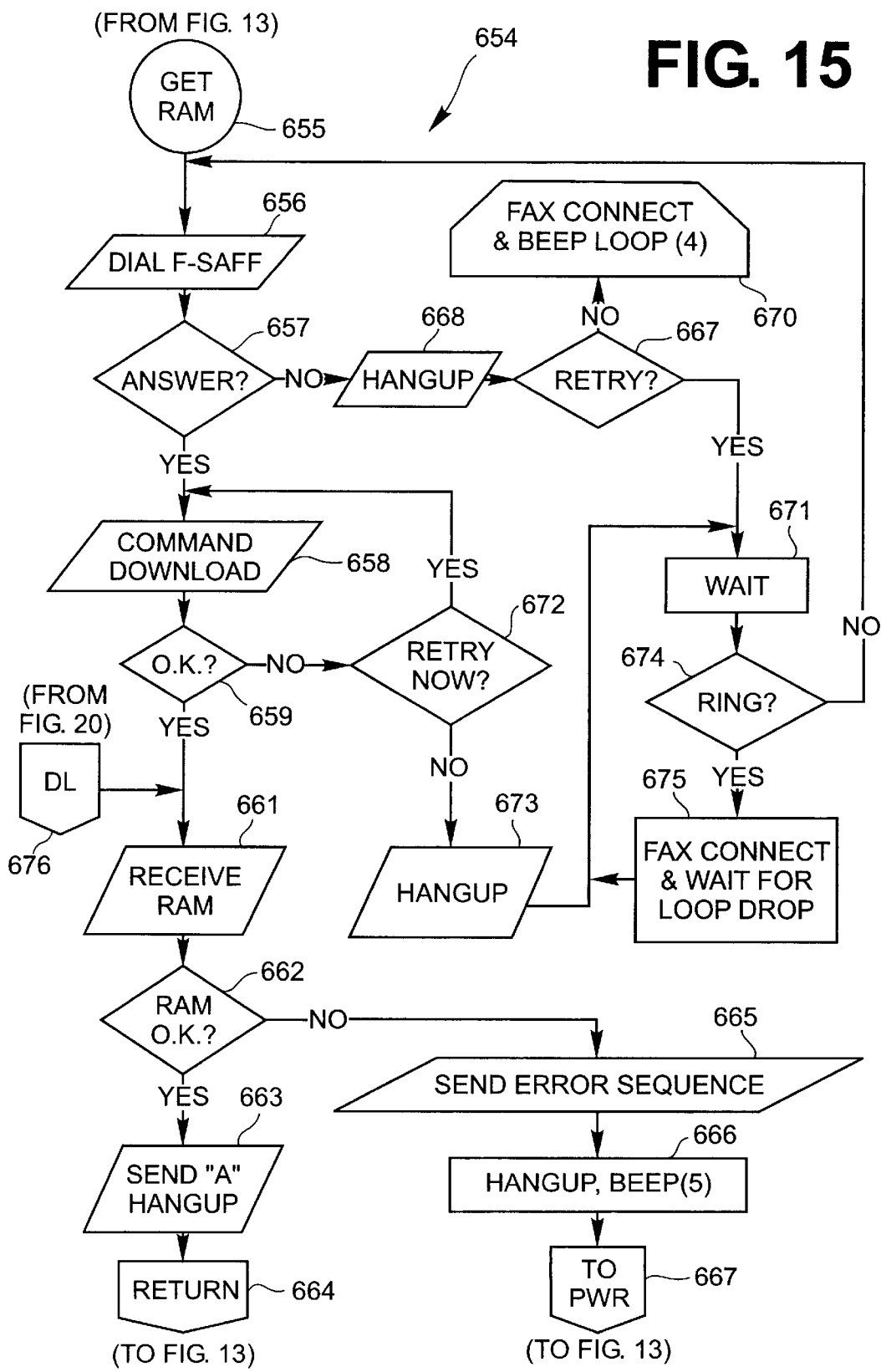
FIG. 15 is a flow chart representation of the get RAM routine of FIG. 13.

When operation finally returns to FIG. 13 through the jump connector 638, a call connector 626 directs operation to a GET RAM subroutine 654 shown in FIG. 15. After beginning the GET RAM subroutine 654 at connector 655, the router 112 goes off-hook and dials the recently stored telephone number of the preferred F-SAFF 116, step 656. If the F-SAFF 116 answers the call, as detected by the router 112 receiving a signal from the F-SAFF 116, such as a DTMF "A", according to step 658, the router 112 transmits a DTMF string corresponding to a download command to the F-SAFF 116. If the router 112 receives an indication from the F-SAFF 116 that the command was understood and allowed, the YES branch of the decision block 659 is taken to step 661 which indicates that Bell 202 modulated RAM data, according to the XMODEM communication format, for example, is received and downloaded into the RAM chip 334. The download is achieved by the CPU chip 310 commanding the integrated modem chip 508 to demodulate the information arriving on the demodulate and CPM detect receive line 505 and supply the resulting data through the receive data line 356 to the CPU chip 310. If the RAM data is received properly, the router 112 receives an appropriate signal from the F-SAFF 116, the YES branch on decision block 662 is taken to step 663 where another DTMF "A" is sent to the F-SAFF 116 and the router goes on-hook by opening the load switch 420, and the process is returned back to FIG. 13 by jump connector 664. If the RAM data is not received properly, the NO branch of the decision block 662 is taken to step 665 which indicates that a DTMF error sequence is sent to the F-SAFF 116, after which the router 112, according to step 666, disconnects from the wall phone line 149 and beeps the piezo speaker 312 according to a fifth pattern. According to the jump connector 667, operation then continues in FIG. 13 at the PWR connector 627.

Back at decision block 657, if the F-SAFF 116 does not answer after a predetermined amount of time (or after receiving a predetermined number of ringback signals), or if the line is busy, the NO branch is taken to step 668 where the router 112 hangs up the wall phone line 149. Then, if a maximum retry limit has been reached, according to step 670 a loop is entered in which the wall phone line 149 is connected to the fax phone line 151, and a beep according to a fourth format is emitted from the router 112. Otherwise, a wait period is entered as indicated by step 671. Another method of reaching the wait period 671 begins with decision block 659. If the router 112 does not receive an acknowledgment from the F-SAFF 116 that the download command of step 658 was received as a valid and acceptable command, the NO branch of decision block 659 is taken to decision block 672 which determines if another retry is appropriate, based on the number of prior retries and any error codes received from the F-SAFF 116. If so, the YES branch of decision block 672 is taken so that the process continues back at step 658. Otherwise, the NO branch is taken to step 673 where the router 112 goes on-hook, after which step 671 is reached. As with the wait period of step 642 in FIG. 14, the user is allowed to send and receive facsimile information during the wait period. Thus, since the router 112 does not yet expect to receive a call from an F-SAFF 116, if a ring is detected during the wait period, the wall phone line 149 is connected to the fax phone line 151 until loop current is dropped, after which time the wait period is again entered for the remaining wait period. As will be discussed below with respect to FIG. 20, a download (DL) connector is shown connected before step 660.

Figure 16:
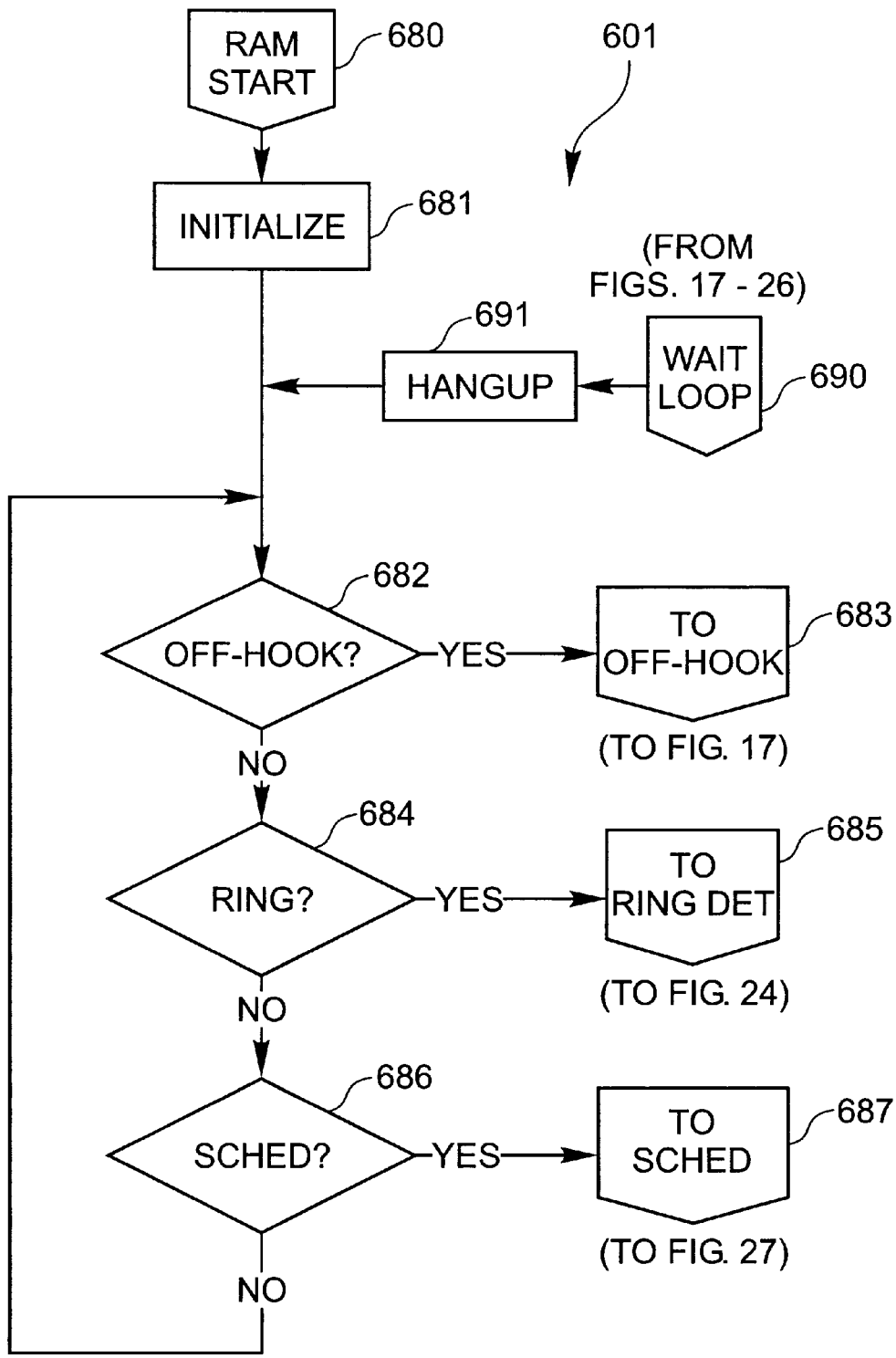
FIG. 16 is a flow chart representation of the wait loop of FIG. 12.

Operation eventually returns to FIG. 13 through the jump connector 664 where the jump connector 624 indicates that operation continues in FIG. 16 at a RAM START connector shown as connector 680 in FIG. 16. Before this point, the CPU chip 310 has executed instructions stored in ROM internal to the CPU chip 310. After this point, downloaded instructions stored in the RAM chip 334 are executed. However, certain ROM kernel functions are provided to the RAM procedures. Available to the RAM procedures are the functions used to perform all of the operations discussed above during the ROM initialize routine 600 shown throughout FIGS. 13–15, including functions to decode DTMF digits received in an interrupt mode, setting control switches, etc. In addition, other ROM functions made available to the RAM procedures include counter functions, table functions, clock functions, etc. After the connector 680, in the wait loop 601, an initialize step 681 is performed to initialize variables, ensure proper switch settings, etc., before the procedure enters a loop defined by decision blocks 682, 684, and 686. During the loop, the switches 404, 420, 408, 426 remain in a wait loop mode where only the SLIC switch 426 is closed. At decision block 682, the router 112 determines if a local user has gone off-hook at the local facsimile machine 130 by checking the loop current detector line 396. If the local user has gone off-hook, the YES branch of decision block 682 is taken so that the process continues in FIG. 17 as indicated by jump connector 683. If, on the other hand, no loop current is detected, the NO branch of decision block 682 is taken to decision block 684 where the ring detect line 368 is checked for an indication that a call is being placed to the local facsimile machine 130. If the router 112 is indeed receiving a ring signal, the YES branch of decision block 684 is taken to jump connector 685 which indicates that operation continues in FIG. 24. On the other hand, if no ring signal is being detected, the NO branch of the decision block 684 is taken to decision block 686 which determines if the time for the CPU chip 310 to execute a scheduled event has arrived. If so, the YES branch of decision block 686 is taken to a jump connector 687 which directs further operation to FIG. 27. If it is not time to perform a scheduled event, the NO branch is taken back up to the decision block 682 so that the wait loop 601 functions as a loop. As will be shown below in many instances, procedures often return to the wait loop 601 through the wait loop connector 690 after which the router 112 goes on-hook to the wall phone line 149, if not already there, the switches 404, 420, 408, and 426 assume the wait mode where only the SLIC switch 426 is closed, and the router 112 delays entering the wait loop 601 until loop current is lost, if not already lost.

Figure 17:
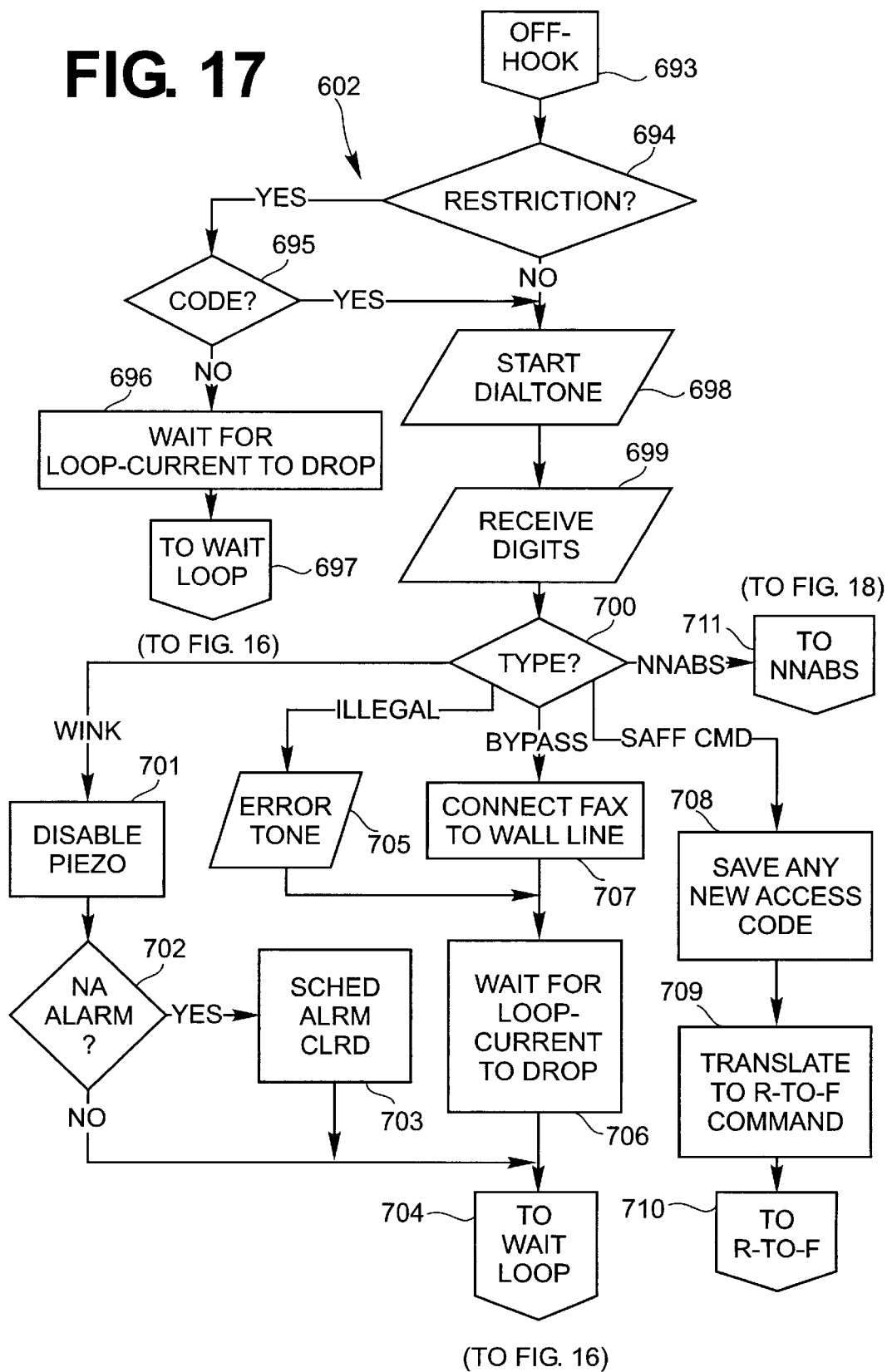
FIG. 17 is a flow chart representation of the off-hook routine of FIG. 12.

Referring now to FIG. 17, the off-hook routine 602 is shown in greater detail beginning with the connector 693. Although not explicitly shown, one of the first steps of the off-hook routine is to close the fax release switch 408 so that DTMF digits entered at the local facsimile machine 130 can be decoded by the DTMF detector circuit 436. According to the facsimile access restriction method, explained in greater detail below, a user can restrict access to a local facsimile machine 130 by requiring that an access code be entered before the router 112 will outdial any telephone numbers. Decision block 694 determines if such a restriction has been previously invoked, as is discussed in greater detail below. If so, the local user must enter the code when initially going off-hook at the local facsimile machine 130, or the router 112 will simply wait for a loss of loop current before entering the wait loop again without performing any action requested by the user, as is indicated by steps 695–697. If the correct code is entered, or if the access restriction feature has not been invoked, the router 112 provides dialtone to the local facsimile machine 130 at step 698. The router 112 provides dialtone to the local facsimile machine 130 when the CPU 310 outputs the digital equivalent of a dialtone on the SLIC tone line 392 and places a signal on the SLIC gain control line 394 causing the push-pull amplifier circuit 552 to minimally amplify the resulting signal from the pulse width modulator circuit 531. The SLIC 579 then superimposes the amplified AC signal onto +30 VDC for transmission through the closed SLIC switch 426, the third direct conductor 410, the loop current detector circuit 412, the fax tip line 414, the fax phone line coupler 152, and onto the fax phone line 151. As the local user continues dialing, the digits are received by the router 112 in step 699 and stored in the RAM chip 334.

After receiving the digits, the CPU chip 310 analyzes the digits in step 700 to determine the next appropriate action. If no digits were entered and the local facsimile machine 130 was placed back on-hook, the router 112 interprets the wink to be a request to disable any alarm beeps or tones being emitted from the piezo speaker 312, according to step 701. Then, according to decision block 702 and step 703, if the previous alarm was a No Answer (NA) alarm, as is discussed in greater detail below, the CPU chip 310 schedules an alarm cleared notification to the F-SAFF 116 whereby the router 112 will call the F-SAFF 116 to notify the F-SAFF that the NA alarm was cleared. In any event, operation then jumps back to the wait loop 601 in FIG. 16 according to the jump connector 704. If the local user entered an invalid sequence of digits, the ILLEGAL branch of the decision block 700 is taken to step 705 which indicates that an error tone will be supplied back to the local facsimile machine 130, the error tone being generated in digital form by the CPU chip 310, converted to analog form by the pulse width modulator circuit 531, amplified by the push-pull amplifier circuit 552, and superimposed onto +30 VDC by the SLIC 579. Then, in step 706, the process waits until the user goes on-hook at the local facsimile machine 130 to cause a drop in loop-current before jumping back to FIG. 16. If a predefined by passcode, such as a "#", is entered at the local facsimile machine 130 by the local user, the router 112 simply connects the wall telephone line 149 to the fax telephone line 151, as indicated by the BYPASS branch of decision block 700 and step 707, and waits until a drop in loop-current at step 706 before returning to the wait loop 601 in FIG. 16. If the local user enters digits corresponding to a request for an enhanced facsimile service directly involving the F-SAFF 116, the SAFF CMI branch of the decision block 700 is taken to step 708 where, if the command involved a new access code, the code is first saved in the RAM chip 334. Then, in step 709, the digits are translated into a Router-to-F-SAFF (R-to-F) command, and operation jumps to FIG. 19 by virtue of the R-to-F jump connector 710, discussed in greater detail below. Finally, if the local user entered a destination telephone number as though the router 112 was not connected to the local facsimile machine 130 or if the local user dialed a prefix to a destination number, such as a "*9", to invoke the urgent facsimile service, the NNABS (Never No Answer or Busy Send) branch of the decision block 700 is taken to the NNABS jump connector 711 which indicates that operation continues in FIG. 18.

Figure 18:
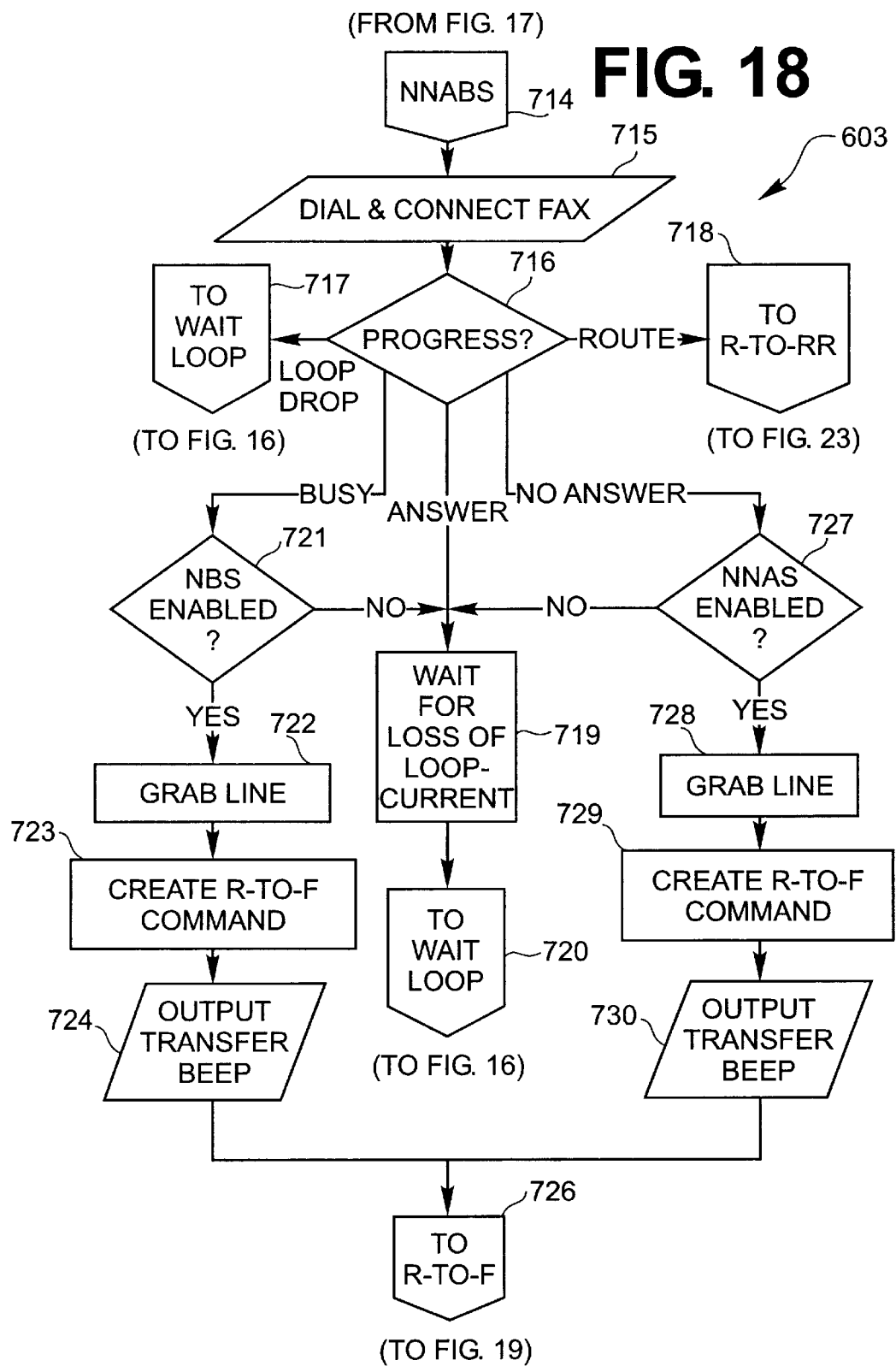
FIG. 18 is a flow chart representation of the NNABS routine of FIG. 12.

Referring now to FIG. 18, NNABS routine 603 begins with the connector 714. At this point, only the SLIC switch 426 and the fax release switch 408 are closed. Then, as indicated by step 715, the router 112 first dials the destination telephone number entered by the local user and then connects the wall phone line 149 to the fax phone line 151. To dial the destination telephone number, the CPU chip 310 first closes the load switch 420, causing the router 112 to go off-hook, and then instructs the integrated modem chip 508 to output DTMF digits corresponding to the destination telephone number. Then, to connect the wall telephone line 149 to the fax telephone line 151, the CPU chip 310 causes the SLIC switch 426 to open, followed quickly by causing the CO release switch 404 to close, and then causing the load switch 420 to open. In this way, the local user is allowed to hear the progress of the phone call because of the direct connection between the wall phone line 149 and the fax phone line 151, and the router 112 is innocuously monitoring the call progress through the monitored signal line 429 connected to the high impedance detector amplifier circuit 430, as indicated by step 716.

If a drop in loop-current is first sensed, by the router 112, the LOOP DROP branch of decision block 716 is taken to the wait loop jump connector 717 which directs operation back to the wait loop 601 in FIG. 16. If another router 112n answers the call, as would be detected by an initial signal emitted from the router 112n, discussed in greater detail below, the ROUTER branch of the decision block 716 is taken to the R-to-RR (Router-to-Remote Router) jump connector 718 which directs operation to FIG. 23. If any other device answers the call within a predetermined amount of time, the ANSWER branch is taken to step 719 which indicates that the router 112 simply waits to detect a loss of loop-current, during which time facsimile information and/or voice communication may be transmitted through the router 112. Then, wait loop jump connector 720 directs operation back to FIG. 16. If a busy signal is detected, the BUSY branch of decision block 716 is taken. Detecting busy signals very quickly is the sole purpose of the precise busy detector circuit 434 which looks for the two frequencies of the standard busy signal, rather than waiting to analyze a cadence of energy like many facsimile machines, to quickly provide an indication to the CPU chip 310 through the precise busy detect line 370. If the Never Busy Send (NBS) option is not enabled on the router 112 as part of the RAM downloaded to the router 112 from the F-SAFF 116, the process continues along the NO branch of decision block 721 as though a non-router answer was detected, as indicated by step 719. On the other hand, if the NBS option is enabled, the YES branch of decision block 721 is taken to step 722 where the router 112 grabs the fax phone line 151 before the local facsimile machine 130 has a chance to detect the busy signal and automatically hang-up if the start button has already been pressed. The router 112 grabs the line by opening the fax release switch 408, thereby hanging up the wall phone line 149, and immediately closing the SLIC switch 426 to keep the local facsimile machine 130 in the same mode as though it were waiting for an answer from a destination facsimile machine 130n. Subsequently, a NNABS R-to-F command is created in step 723 which includes the destination telephone number. A transfer beep is then generated and transmitted to the local facsimile machine 130 indicating that a transfer to the F-SAFF 116 is about to take place, according to step 724. In an alternate embodiment of the present invention, a means for generating and transmitting a standard voice prompt to the local facsimile machine 130 notifying of the transfer is included in router 112, as well as for generating and transmitting other standard voice prompts to the local facsimile machine 130 or to remote callers. Referring again to the preferred embodiment of the present invention, operation is subsequently directed to FIG. 19 through jump connector 726. Referring back to decision block 716, if no answer is detected within a predetermined amount of time, the NO ANSWER branch is taken to decision block 727 which determines whether the Never No Answer Send (NNAS) option is enabled in the router 112. Like the NBS option, if the NNAS option is not enabled, the process continues to step 719, otherwise the fax phone line 151 is grabbed, a NNABS R-to-F command is created, a transfer beep is output to the local facsimile machine 130, and operation continues in FIG. 19, as indicated by steps 728, 729, 730, and 726.

Figure 19:
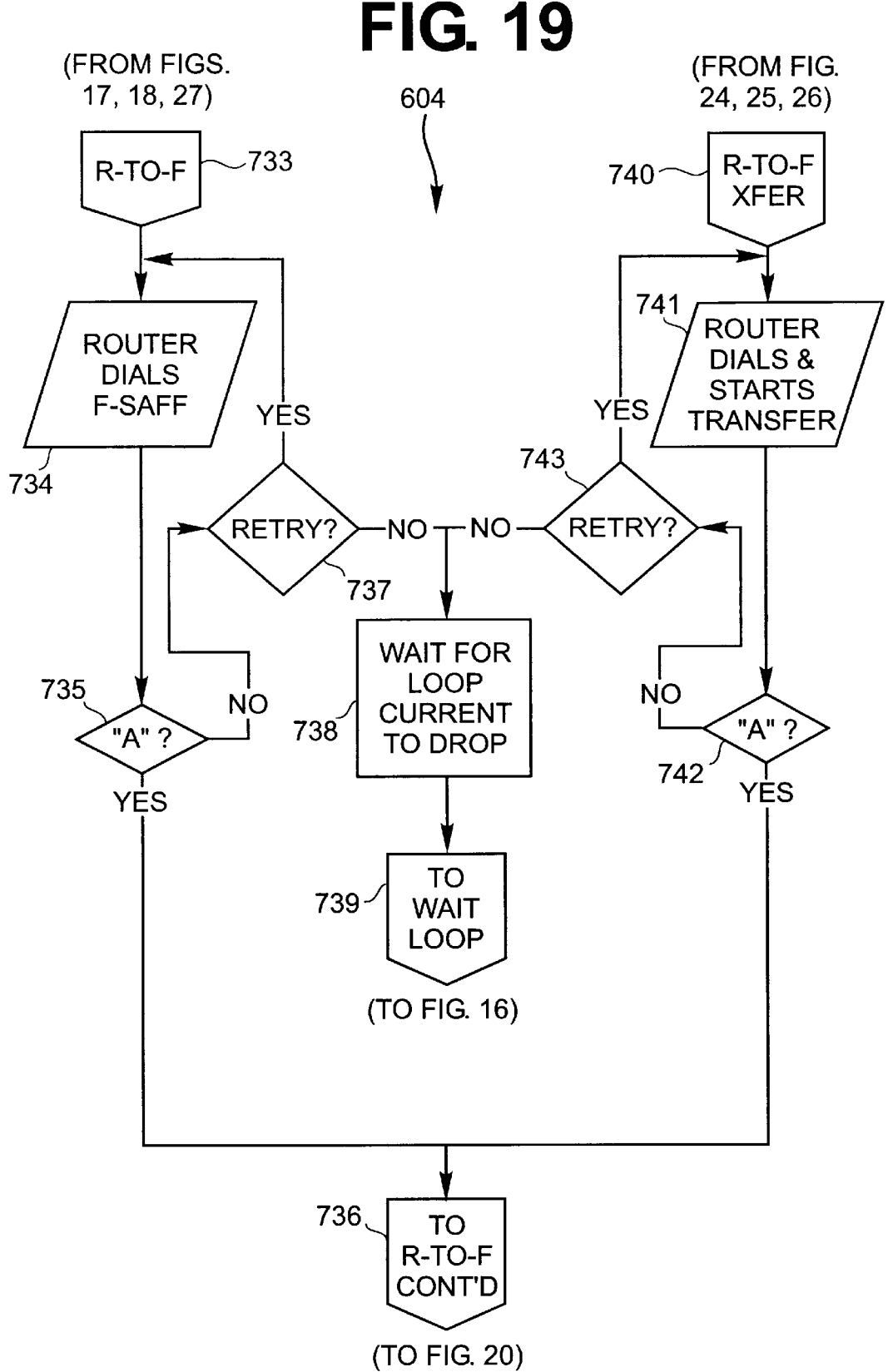
FIG. 19 is a flow chart representation of the R-to-F routine of FIG. 12.
Figure 24:
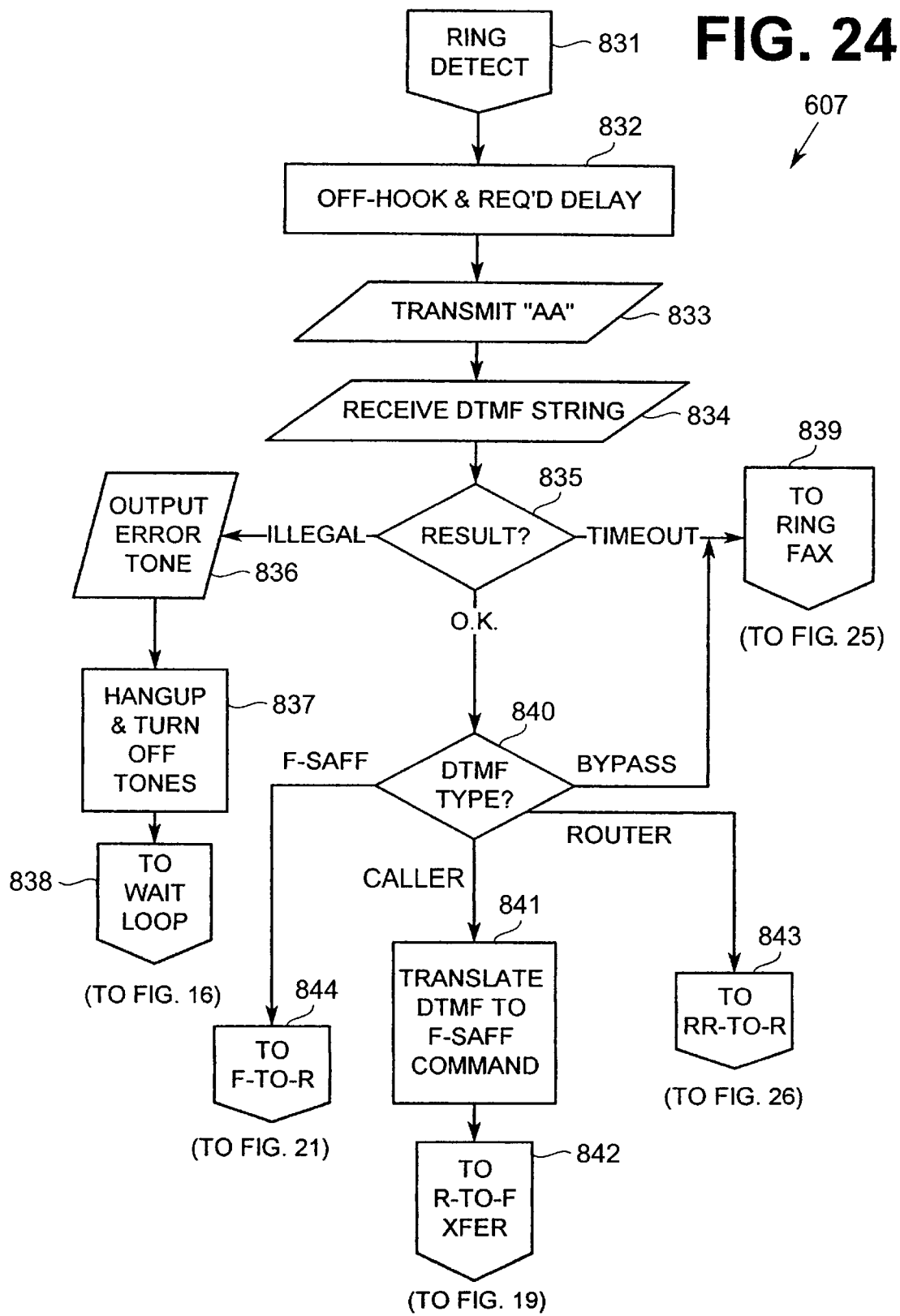
FIG. 24 is a flow chart representation of the ring detect routine of FIG. 12.
Figure 25:
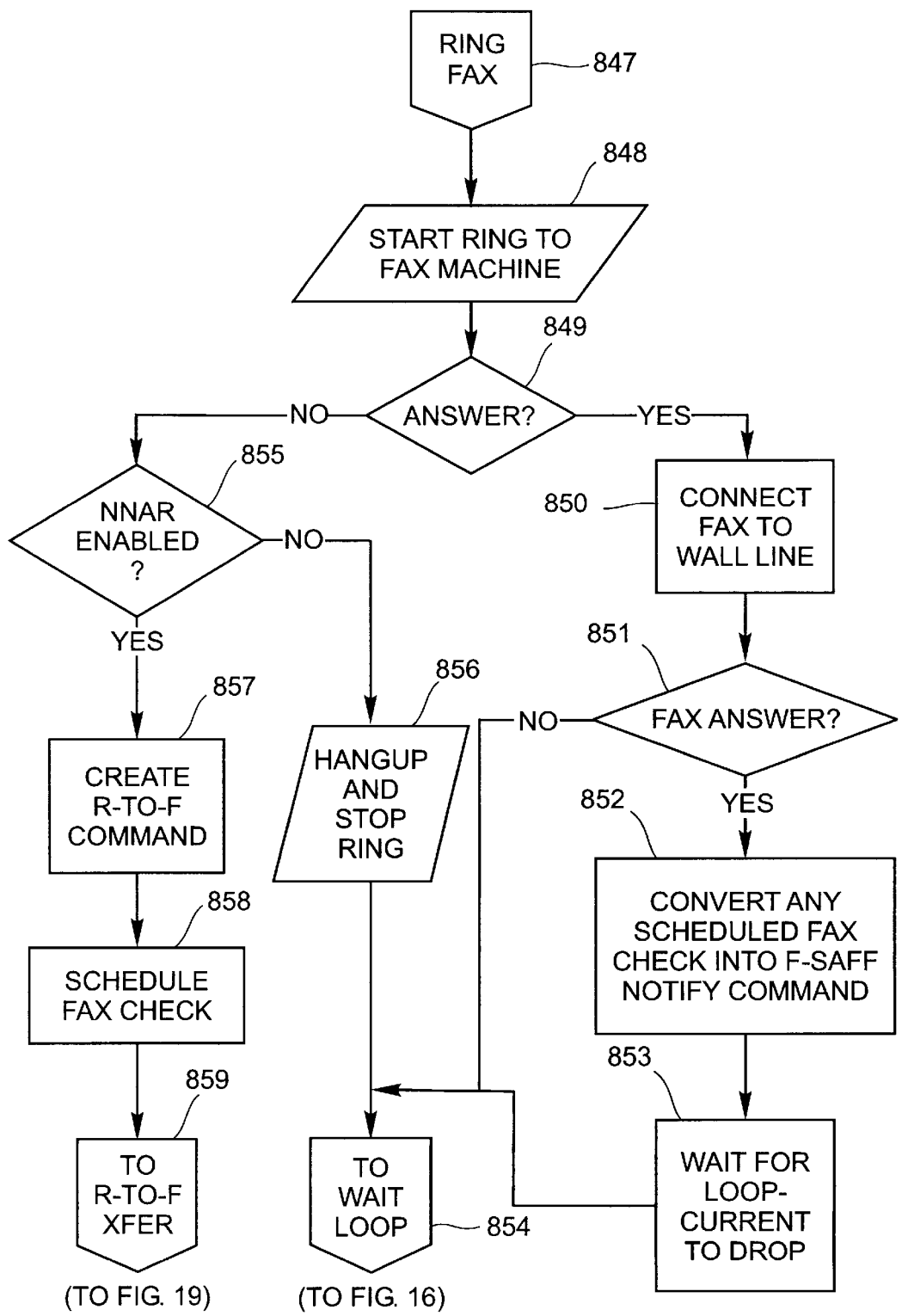
FIG. 25 is a flow chart representation of the ring fax routine of FIG. 12.
Figure 26:
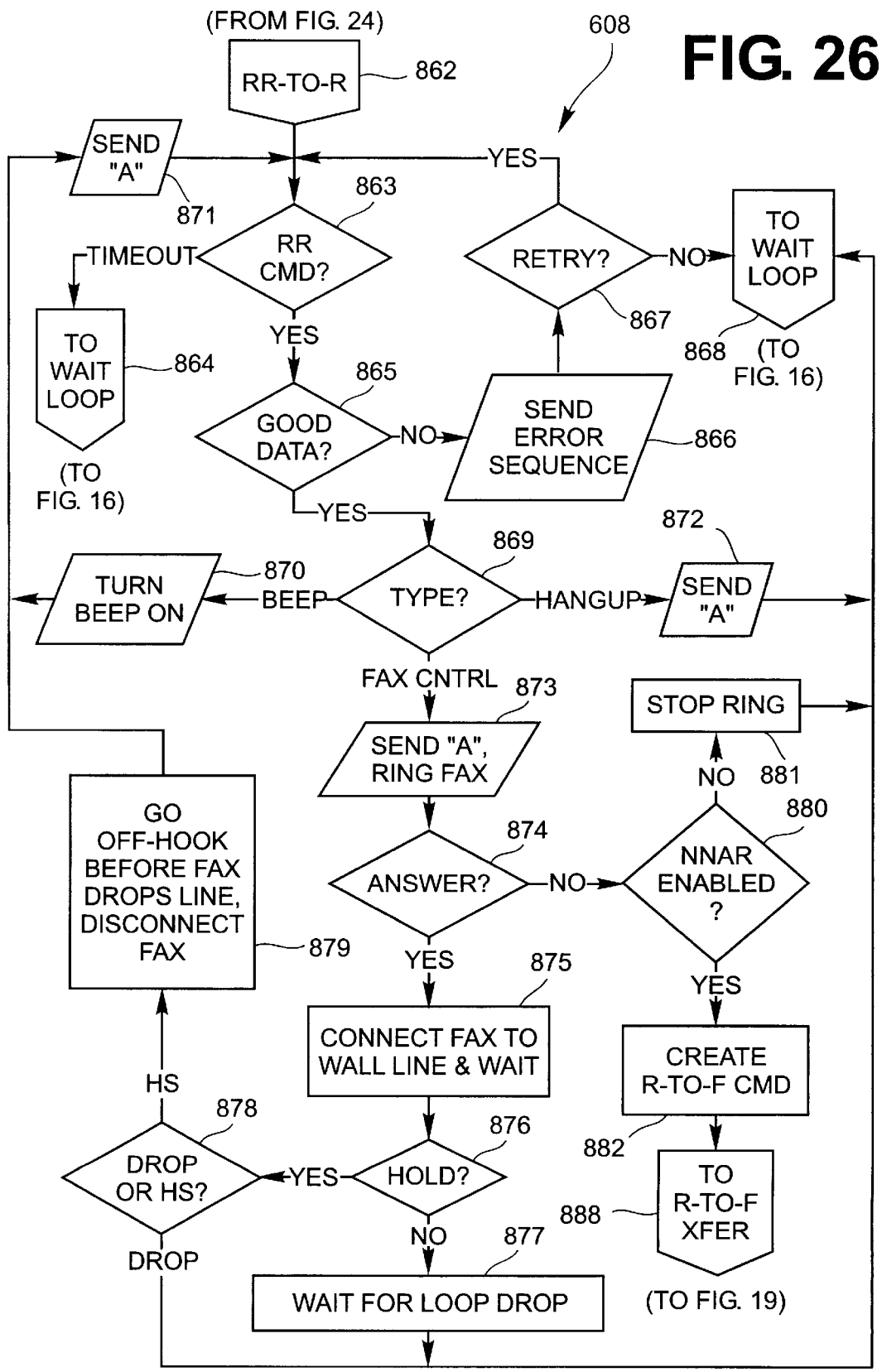
FIG. 26 is a flow chart representation of the RR-to-R routine of FIG. 12.
Figure 27:
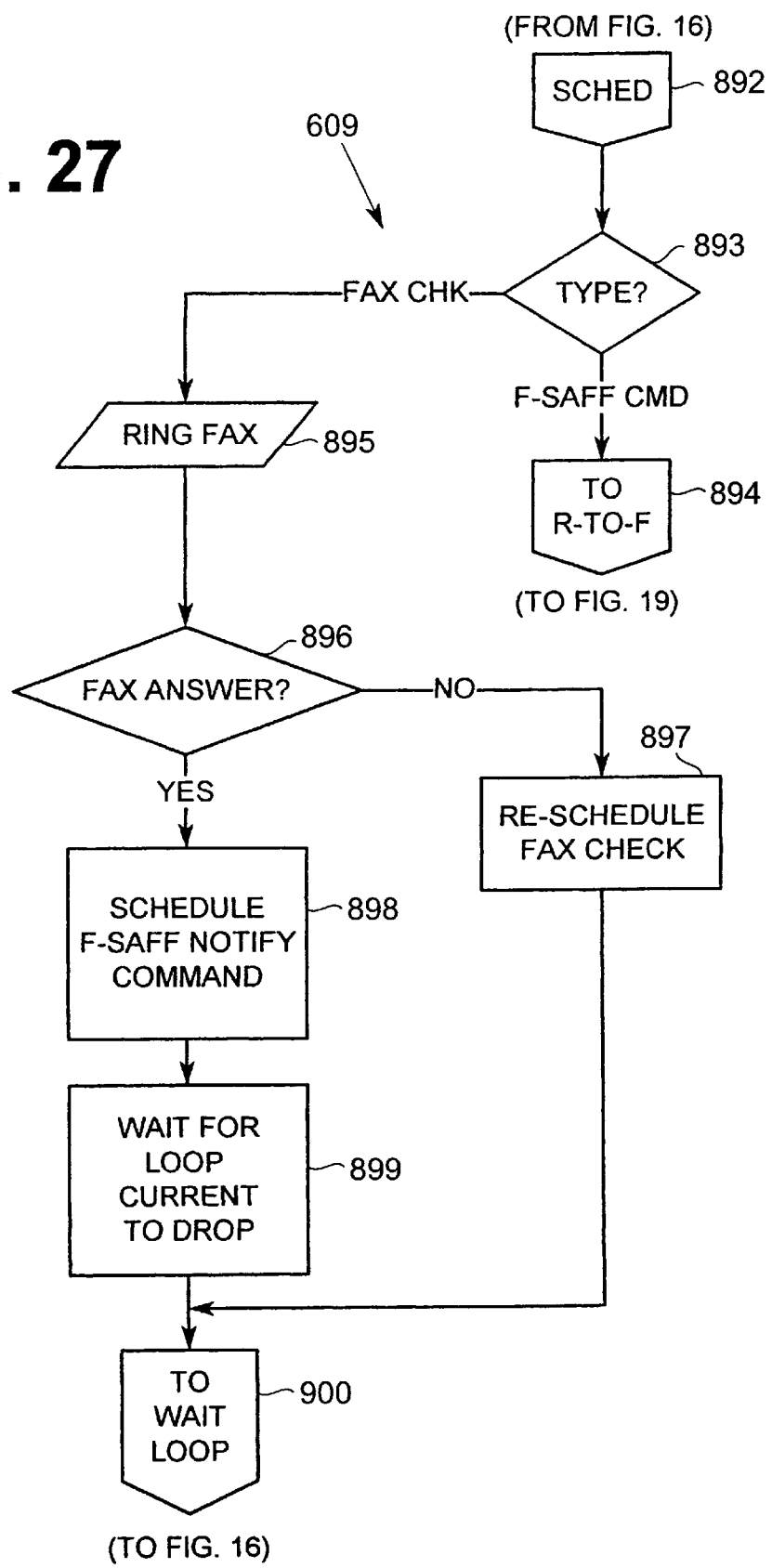
FIG. 27 is a flow chart representation of the scheduler routine of FIG. 12.

Referring now to FIG. 19, the R-to-F routine is accessible through an R-to-F connector 733 from FIGS. 17, 18, and 27, and is accessible through an R-to-F XFER (transfer) connector 740 from FIGS. 24, 25, and 26. After the R-to-F connector 733, the CPU chip 310 ensures that the release fax switch 408 is open, the SLIC switch 426 is closed, the CO release switch 404 is closed, and the load switch 420 is closed, and then dials the F-SAFF 116 in step 734. The telephone number of the F-SAFF 116 is stored in the RAM chip 334, and any outside line access digits are prepended to the telephone number as necessary to reach the PSTN 114. If the F-SAFF 116 answers, it will output a handshaking signal, such as a DTMF "A", which is detected by the router 116 through the DTMF detector circuit 436 since the release CO switch 404 is closed. If the "A" is not received, the NO branch of decision block 735 is taken to decision block 737 which determines if a a retry is possible because a predetermined number of attempts has not been reached and directs operation through its YES branch back to step 734 to hang-up the wall phone line 149 and try to access the F-SAFF 116 again, eventually dialing a back-up F-SAFF 116n. Otherwise, the NO branch of decision block 737 is taken to step 738 which waits for the loop-current to the local facsimile machine 130 to drop before returning the wait loop 601 in FIG. 16 by virtue of the jump connector 739. If an "A" is detected, operation continues through YES branch of decision block 735 to FIG. 20 through an R-to-F CONT'D jump connector 736. If the R-to-F routine 604 is entered through the R-to-F XFER connector 740, the router 112 dials the F-SAFF 116 after starting a call transfer, step 741. As discussed below, when the R-to-F connector 740 is reached, an outside telephone call through the wall phone line 149 has been answered by the router 112. Thus, to dial the F-SAFF 116, the router 112 must first suspend the outside call through a call transfer or third party calling service offered by the local line carrier. Although use of such a service varies from carrier to carrier, such a suspension is often accomplished by simply flashing the wall telephone line 149, i.e., temporarily opening the load switch 420 and either the CO release switch 404 or the fax release switch 408. Once the first call is suspended by a central office within the PSTN 114, the router is provided another dialtone and dials the telephone number of the F-SAFF 116. Again, if an "A" is not received, a retry routine is entered as defined by decision block 742 and 743. Otherwise, the YES branch of decision block 742 is taken to jump connector 736 where operation is again directed to FIG. 20.

Figure 20:
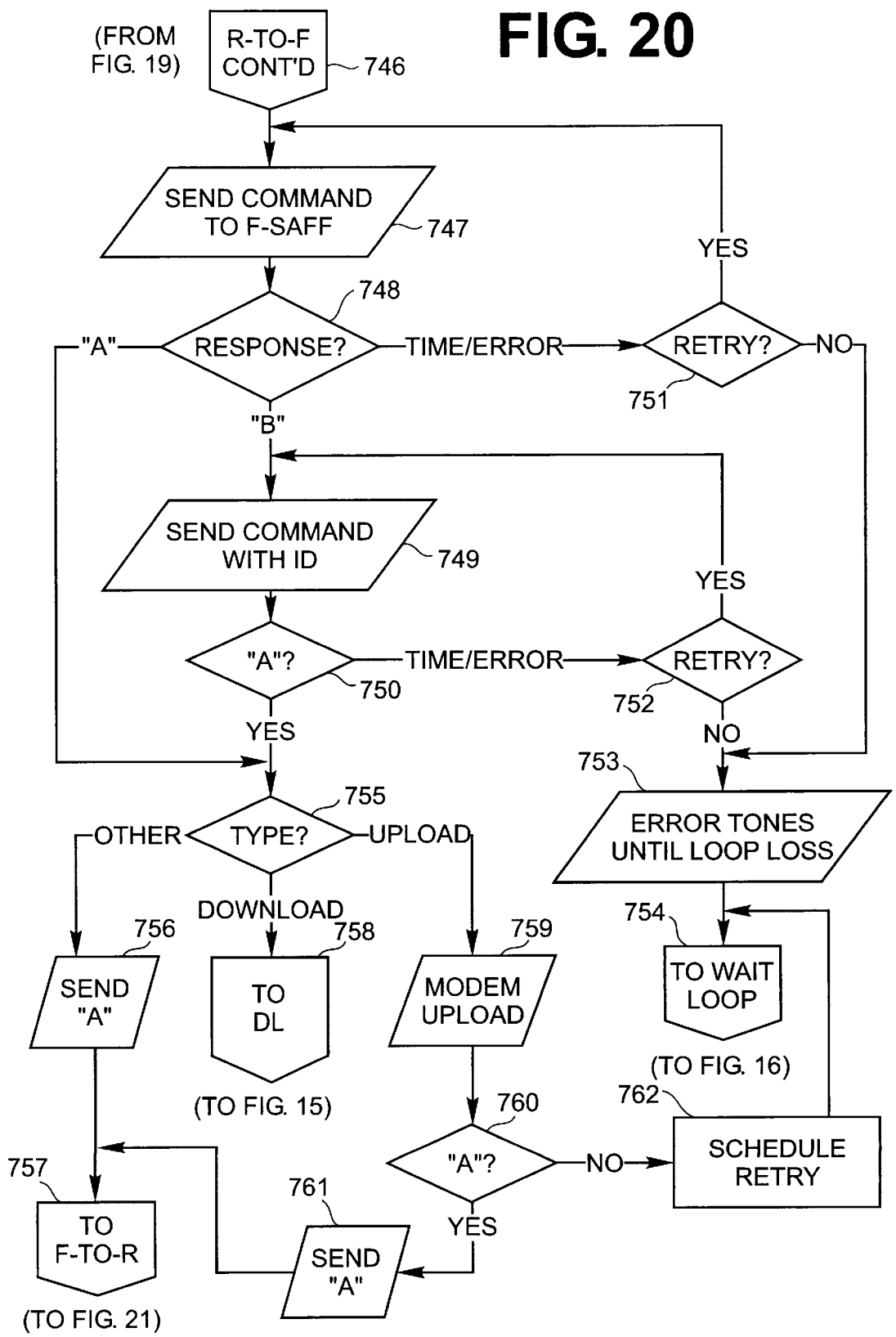
FIG. 20 is a flow chart representation of the R-to-F-cont'd routine of FIG. 19.

FIG. 20 begins with the R-to-F CONT'D connector 746. At this point, the F-SAFF 116 has answered the telephone call, the switches 404, 408, 420, and 426 are closed, open, closed, and closed, respectively, and an outside call may be suspended at the central office, the local facsimile machine 130 is attempting to invoke an enhanced facsimile service, or the router 112 is calling in response to a schedule event, etc., as shown in FIG. 12. According to step 747, the router 112 transmits a command to the F-SAFF 116. Such a command is a DTMF sequence generated by the integrated modem chip 508 as directed by the CPU chip 310. The router 112 then waits for a response from the F-SAFF 116 which may be an O.K. code, such as a DTMF "A", a "send more information" code, such as a DTMF "B", an error code, or no response at all. If a "B" is detected, the router 112 responds by sending more information about the router 112, such as its telephone number and/or the types of services available to it. This function is especially useful when the router 112 has dialed or been busy-forwarded to another F-SAFF 116n which has no information on this particular router 112 but will nevertheless attempt to provide the requested service and subsequently communicate relevant information with the preferred F-SAFF 116. If an "A" is subsequently received, operation will continue through the YES branch of decision block 750 to the decision block 755, just as if an "A" were received back at step 748. If an error tone is received or if a predetermined amount of time passes during decision block 748 or 750, the TIME/ERROR branches are taken to decision blocks 751 and 752, respectively. If a retry is in order at decision block 751, the process continues through the YES branch to repeat back to step 747, and otherwise, the process continues through the NO branch to step 753 where error tones are provided back to the local facsimile machine 130 if it is off-hook or to any suspended caller until a hang-up is detected, at which time the process continues back at the wait loop in FIG. 16 through jump connector 754. Similarly, if a retry is in order at decision block 752, the YES branch is taken back to step 749, but otherwise the process continues at step 753.

If decision block 755 is reached, an O.K. code, such as an "A", has been received from the F-SAFF 116. The next course of action is determined by the type of command that was previously sent to the F-SAFF 116 in step 747. If the command was a request for a download of new RAM, as will occur from time to time when the F-SAFF 116 determines that an upgrade is in order and instructs the router 112 to schedule such a call to the F-SAFF 116, the DOWNLOAD branch is taken to jump connector 758 which directs operation back to the DL connector 676 in the ROM code in FIG. 15. If the command sent to the F-SAFF 116 in step 747 was an upload command, as will be periodically scheduled for call log information which the router 112 tracks, the UPLOAD branch of decision block 755 is taken to step 759 which indicates that modulated data is uploaded to the F-SAFF 116. The router 112 sends modulated data when the CPU chip 310 instructs the integrated modem chip 508 to modulate and transmit data communicated thereto through the transmit data line 354. Subsequently at decision block 760, the router 112 looks for an acknowledgment signal from the F-SAFF 116 and then sends an acknowledgment "A" of its own in step 761 before continuing to the F-SAFF-to-Router (F-to-R) routine 605 in FIG. 21 by way of jump connector 757. If acknowledgment is not received from the F-SAFF 116, the NO branch of decision block 760 is taken to step 762 where the upload attempt is rescheduled, after which operation again returns to the wait loop 601 in FIG. 16. If the command sent to the F-SAFF 116 in step 747 was anything other than an upload or download command, the OTHER branch of decision block 755 is taken to step 756 which indicates that an acknowledgment "A" is sent to the F-SAFF 116, followed by the jump connector 757 directing operation to FIG. 21.

Figure 21:
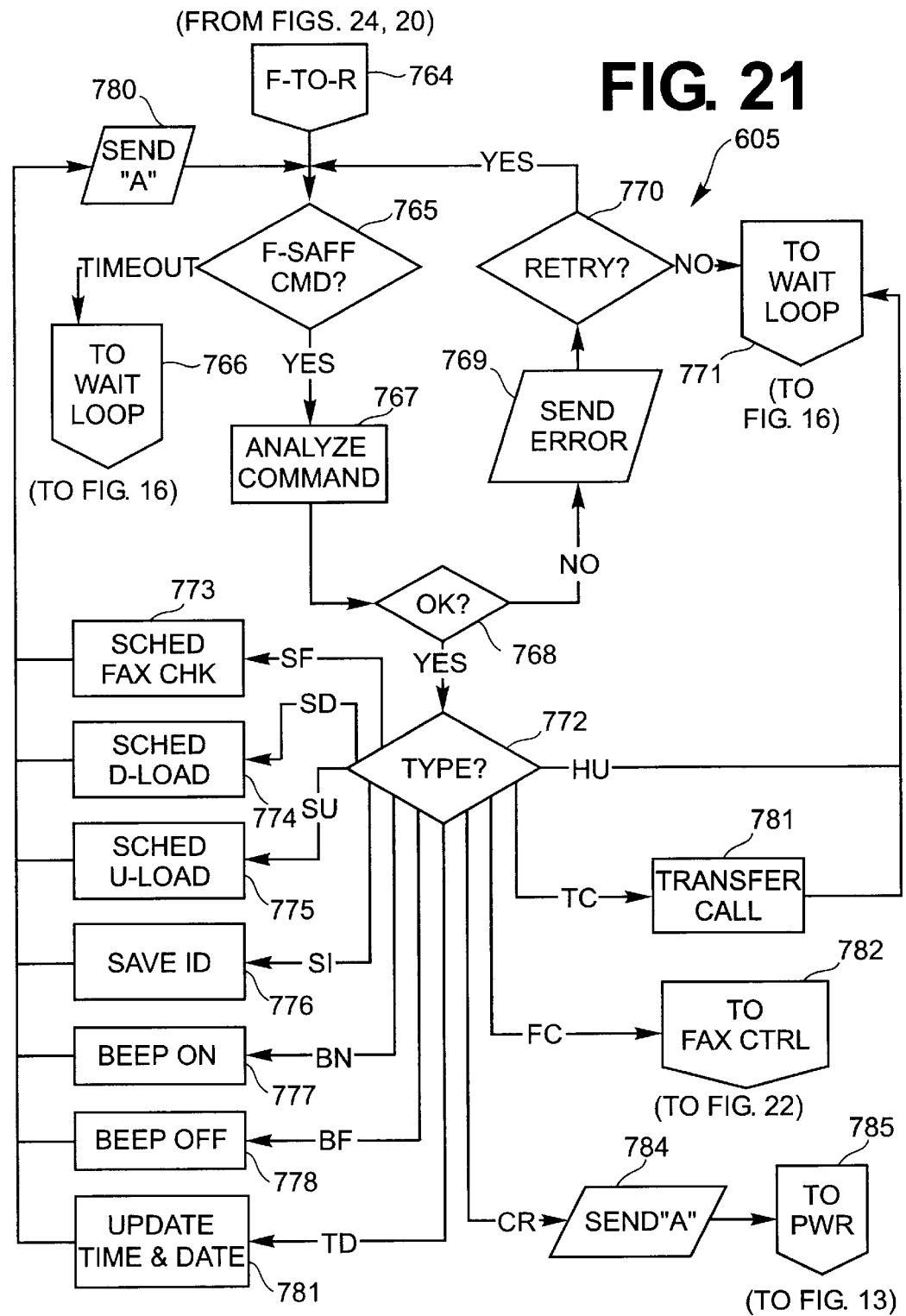
FIG. 21 is a flow chart representation of the F-to-R routine of FIG. 12.

The F-to-R routine 605 of FIG. 21 can be entered through the jump connector 757 of FIG. 20 where the router 112 has called and commanded the F-SAFF 116 and now gives the F-SAFF 116 an opportunity to respond with a command. The other path by which the F-to-R connector 764 can be reached is through FIG. 24 after the F-SAFF has called the router 112, as will be discussed in greater detail below. After the F-to-R connector 764, the router 112 looks for a command from the F-SAFF 116 in step 765. If no command is received within a predetermined amount of time, the TIMEOUT branch is taken to jump connector 766 where operation again returns to the wait loop 601 in FIG. 16. Otherwise, the router 112 analyzes the F-SAFF 116 command in step 767 and then determines whether the command is recognizable in decision block 768. If the command is not recognizable by the router 112, the NO branch of decision block 768 is taken to step 769 where an error message is sent to the F-SAFF 116, followed by a retry decision block 770. If a retry is in order, operation returns to decision block 765, otherwise the wait loop 601 of FIG. 16 is reached through another jump connector 771. If the command is acceptable, the YES branch of decision block 768 is taken to decision block 772 where the command is carried out.

There are several operations which are simply performed and followed by the transmission of an "A" in step 780 before returning to decision block 765 for another command. A first of these functions is step 773 which is reached through the SF (schedule fax check) branch of decision block 772 whereby the router 112 schedules a time when it will generate and transmit a ring signal to the local facsimile machine 130 to detect when the facsimile machine 130 is available to receive facsimile information, as will be discussed in greater detail below with respect to FIGS. 25 and 27. Two more of these functions are shown in steps 774 and 775 where the router 112 is commanded to schedule a download and an upload, respectively. The likelihood of unauthorized access and tampering with the router 112 programming is reduced by requiring that the router 112 always dial a pre-stored telephone number and initiate downloads and uploads. Another such function is shown in step 776 which indicates that the router 112 can be commanded to save information about itself in an ID block, such as the telephone number of the local facsimile machine 130 and the types of services to which it has access, to be used when communicating with a back-up F-SAFF 116n. Steps 777 and 778 indicate that the F-SAFF 116 can command initiation and cessation of piezo speaker 312 output. As is discussed in below, such emissions are used to notify a user that facsimile information has been received according to an urgent facsimile method or that facsimile information has been stored at the F-SAFF 116 because the local facsimile machine 130 has been unable to receive facsimile information. In alternate embodiments of the present invention, other methods are used to notify a user that facsimile information has been stored at the F-SAFF 116. One such embodiment includes selectively activating one of the indicators 186, 187 to signal such an event. Another embodiment includes adding an external device message waiting device between the router 112 and the local facsimile machine 130 which includes an audible and/or visual notification output which responds to activation and deactivation signals from the router 112. Still another embodiment includes providing a stutter dial tone to the fax phone line 151 whenever the user takes the local facsimile machine off-hook. Step 781 indicates that the F-SAFF 116 can update the time and date settings within the router 112.

The router 112 can also be commanded to simply hang-up, after which operation proceeds along the HU branch directly to the jump connector 771 through which operation returns to the wait loop 601 in FIG. 16. Step 782 indicates a transfer call function. Since this point in the operation of the router 112 can be reached when another call is suspended by virtue of the router 112 already having begun a call transfer function, this step 782 translates into the router 112 completing the transfer by, for example, simply hanging up the wall phone line 149 to connect the two calls and drop out of the loop. In addition, the F-SAFF command received in step 765 can include an encoded destination telephone number to which the router 112 should transfer the F-SAFF 116. In response, the router 112 suspends the connection with the F-SAFF 116, decodes the destination telephone number, dials the destination telephone number, connects the two calls, drops out of the connection, and returns to the wait loop 601 in FIG. 16. If a fax control command is received by the router 112, the jump connector 783 is taken to FIG. 22. If a complete re-initialization command is received, an "A" is sent back to the F-SAFF 116 according to the step 784, and operation continues at the PWR connector 627 in FIG. 13 by virtue of jump connector 785.

Figure 22:
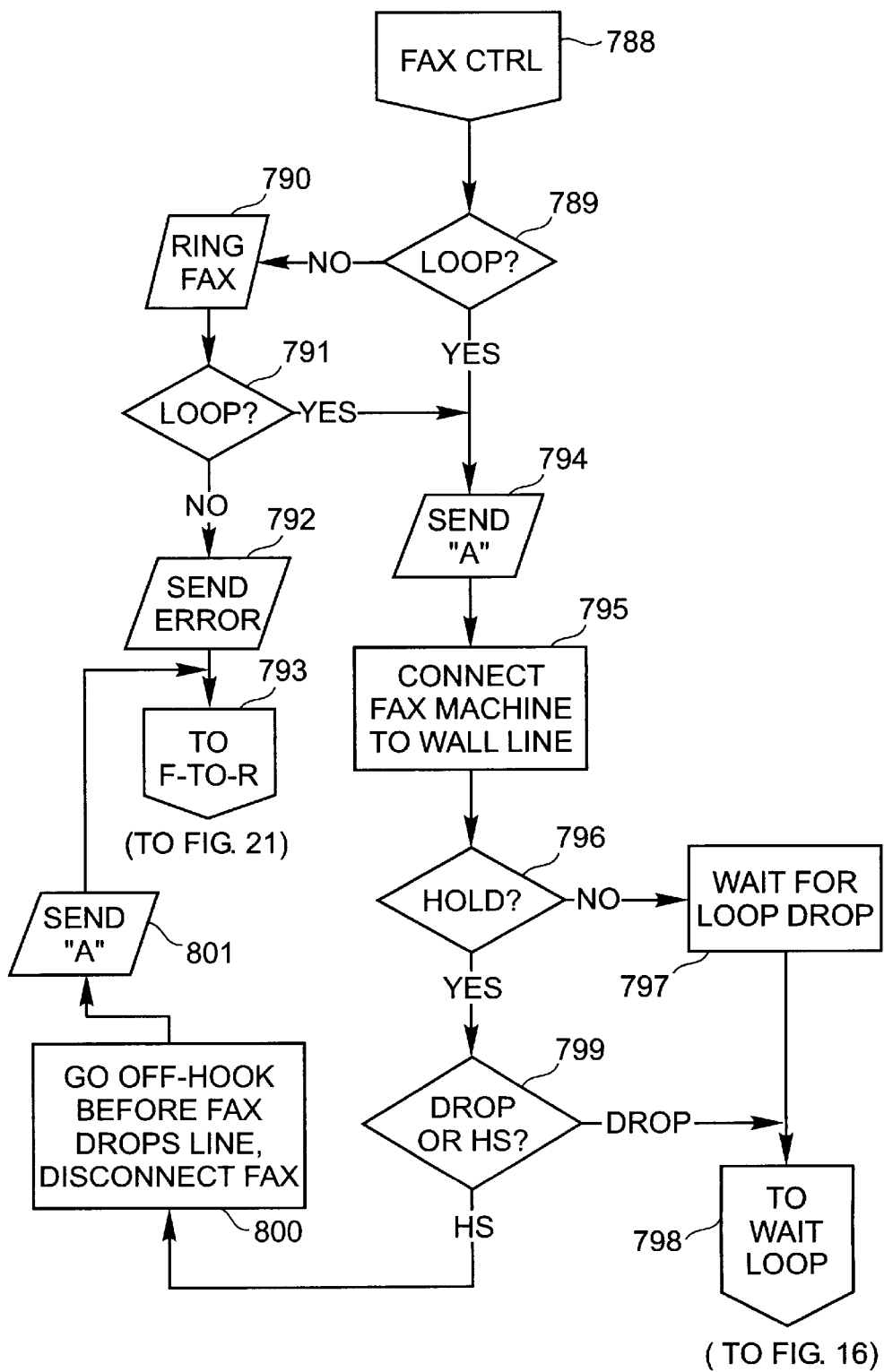
FIG. 22 is a flow chart representation of the fax control routine of FIG. 21.

Referring now to FIG. 22, if a fax control command is received, operation continues with the connector 788. If loop-current is not present, the NO branch of decision block 789 is taken to step 790 where the router 112 generates and transmits ring signals along the fax phone line 151. If the local facsimile machine 130 does not answer, the NO branch of decision block 791 is taken to step 792 which indicates than an error message is sent back to the F-SAFF 116, and operation returns to the F-to-R routine 605 in FIG. 21. Otherwise, if loop-current is detected with or without a ring to the local facsimile machine 130, an "A" is sent to the F-SAFF 116 in step 794, and the wall phone line 149 is connected to the fax phone line 151. As with previous connections, the release fax switch 408 closes shortly after the SLIC switch 426 opens, followed by the load switch 420 opening so that the router 112 monitors the wall phone line 149 but places negligible load on the wall phone line 149 which has a direct connection through to the fax phone line 151. If the fax control command received from the F-SAFF 116 was a connect command without a hold instruction, the NO branch of decision block 796 is taken to step 797 where the router 112 waits for the local facsimile machine 130 to automatically hang-up the line when the transmission is completed, after which operation is directed back to the wait loop 601 in FIG. 16 by jump connector 798.

On the other hand, if the router 112 received a connect/hold command from the F-SAFF 116, the YES branch of decision block 796 is taken to decision block 799 where the router 112 looks for concluding handshaking signals in the facsimile communication taking place along the wall phone line 149 and the fax phone line 151. According to the preferred embodiment of the present invention, the process of looking for concluding handshaking signals involves pre-CRC HDLC decoding to look at individual bits within the frames of facsimile information to find the specific DCN pattern which is normally communicated near the end of the facsimile communication. By not waiting to detect the entire frame of information, the router 112 is able to better ensure holding of the line. Thus, if the router 112 is able to detect the appropriate handshaking signals before sensing a drop of loop-current, the HS branch, rather than the DROP branch, is taken to step 800 where the router 112 goes off-hook and disconnects the local facsimile machine 130 before the local facsimile machine 130 hangs up on the F-SAFF 116. In doing this, the router 112 closes the load switch 420, opens the fax release switch 408, and closes the SLIC switch 426. Subsequently, according to step 801, an "A" is sent back to the F-SAFF 116 signifying that the router 112 was successful in holding the line, and operation returns to FIG. 21 through jump connector 793.

Figure 23:
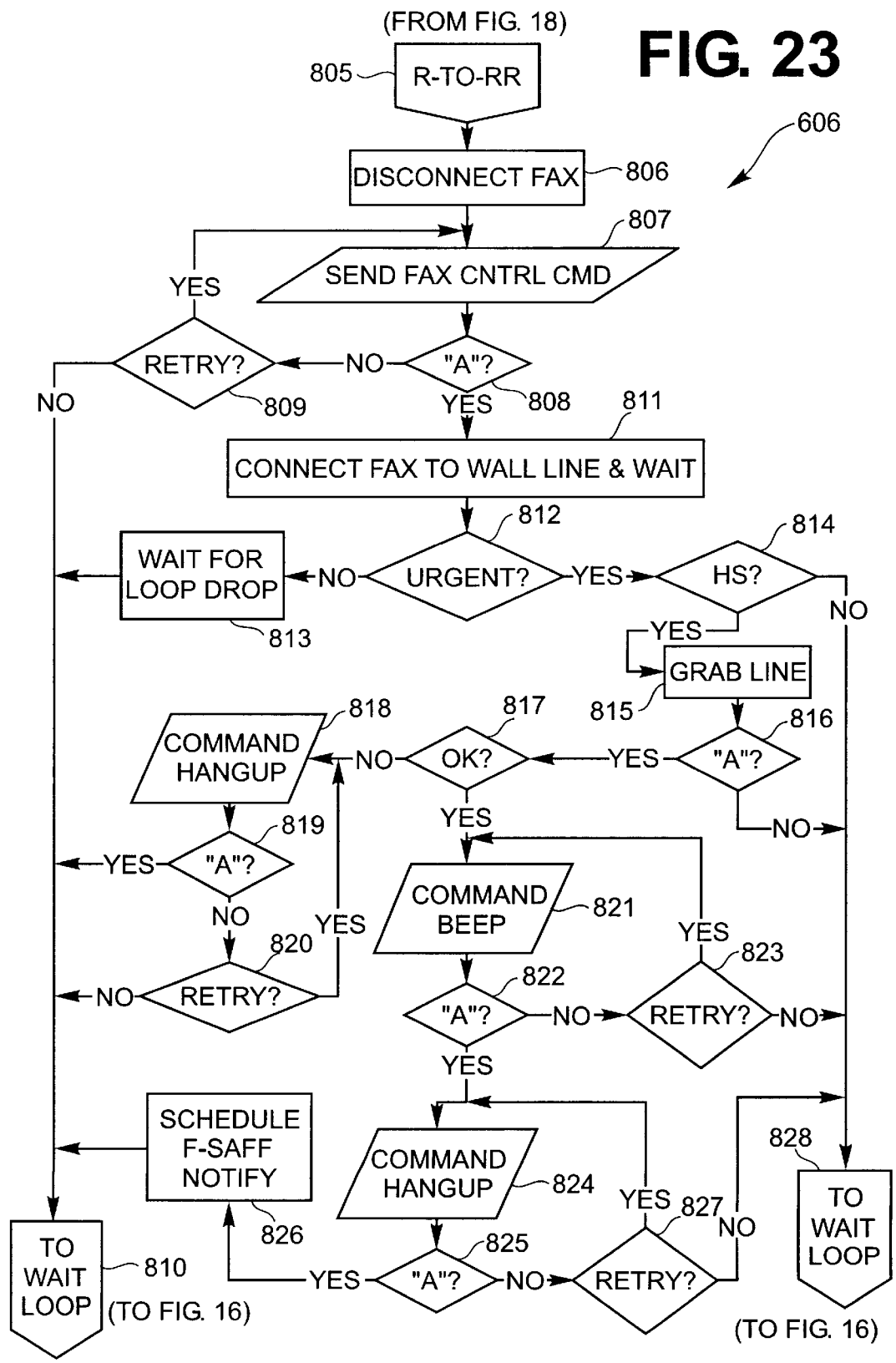
FIG. 23 is a flow chart representation of the R-to-RR routine of FIG. 12.

Referring briefly back to FIG. 18, if the local router 112a connected to the local facsimile machine 130a (both referred to with the suffix "a" whenever helpful to delineate them from a remote router 112n and a remote facsimile machine 130n) detects a router 112n after dialing a destination number dialed by the local user at the local facsimile machine 130 (with or without an urgent facsimile service prefix), the ROUTER branch of decision block 716 is taken to jump connector 718 which directs operation to FIG. 23. As will be discussed in greater detail below, a router 112n is easily detected by a local router 112a because of a distinctive "AA" transmitted by any router 112 after answering a call. Referring now to FIG. 23, the router-to-remote router (R-to-RR) routine 606 is shown beginning with connector 805. According to step 806, the local router 12a first disconnects the local facsimile machine 130a and grabs the wall phone line 149 by opening the fax release switch 408, closing the SLIC switch 426, and closing the load switch 420. Then, in step 807, the local router 112a sends a fax control command to the remote router 112n. If the user simply entered a destination number without an urgent facsimile method prefix, the fax control command transmitted to the remote router 112n is a connect command without a hold instruction. On the other hand, if the call is an urgent call, i.e., the local user dialed an urgent facsimile method prefix, the fax control command transmitted to the remote router 112n is a connect/hold command. In response, the local router 112a expects to receive a DTMF "A" from the remote router 112n. If not received, the NO branch of decision block 808 directs operation to decision block 809 which determines if the fax control command should again be transmitted to the remote router 112n, as indicated by the YES branch. If a retry is not in order, the NO branch of decision block 809 is taken to jump connector 810 which returns operation to the wait loop 601 in FIG. 810. If an "A" is received by the local router 112a, the router 112a connects the local facsimile machine 130a connected to the wall phone line 149 for communication of facsimile information, as indicated in step 811.

If the call is not an urgent call, the NO branch of decision block 812 directs operation to step 813 where the router 112a simply waits for a drop in loop-current before returning the wait loop 601 in FIG. 16. On the other hand, if the call is an urgent call, operation continues through the YES branch of decision block 812 to decision block 814. As concluding handshaking signals are exchanged between the local facsimile machine 130a and the remote facsimile machine 130n, both the local router 112a and the remote router 112n, as shown below, grab the phone line before either facsimile machine 130a,n is able to drop the connection. If the local router 112a sees the handshaking signals through the above discussed V.21 ability of the integrated modem chip 508, the YES branch of decision block 814 is taken to step 815 where the wall phone line 149 is grabbed by the local router 112a whose load switch 420 opens. An "A" is then expected from the remote router 130n indicating that it too was successful in grabbing the line from the remote facsimile machine 130n. If the "A" is received, the YES branch of decision block 816 is taken to the decision block 817. If, for some reason, handshaking signals are not recognized by the local router 112a or an "A" is not received from the remote router 112n, the wait loop 601 is again executed through the jump connector 828. While looking for the concluding handshaking signals at decision block 814, the router 112a also determines, through its V.21 examination capabilities, whether the facsimile transmission is successful. If the previous determination was positive, the YES branch of decision block 817 is taken to step 821 where the local router 112a transmits a command to the remote router 112n to starting emitting an urgent beep. Otherwise, the NO branch of decision block 817 is taken to step 818 where the local router 112a commands the remote router 112b to hang-up the line, and then expects to receive an acknowledging "A" in return, as indicated by decision block 819. If not received, at least one retry according to decision block 820 is executed before finally returning to the wait loop 601 in FIG. 810. After commanding the remote router 112*n* to sound an urgent beep, the local router 112*a* expects to receive an "A" and will retry the command at least once before jumping to the wait loop 601 if the "A" is not received, as indicated by decision blocks 822 and 823. If the "A" is received, the local router 112*a* commands the remote router 112*n* to hang-up the phone line and expects an "A" in return, the hang-up command being retried at least once before returning to the wait loop 601 in FIG. 16, as indicated by steps 824 and decision blocks 825 and 827. If the "A" is received, the YES branch of decision block 825 directs operation to step 826 which indicates that an F-SAFF 116 notification is scheduled to notify the F-SAFF 116 that a successful urgent delivery took place, thus initiating billing procedures, followed by a jump back to the wait loop 601 in FIG. 16.

Referring momentarily back to FIG. 16, if a ring is detected by the ring detector circuit 418 during the wait loop 601, the jump connector 685 is taken to the ring detect routine 607 in FIG. 24. Referring now to FIG. 24, the ring detect routine 607 begins after the connector 831 with the router 112 answering the call by going off-hook and delaying for a predetermined amount of time in step 832. At this point, the wall phone line 149 is connected through the load switch 420 to the active line load circuit 422 and through the CO release switch 404 to the detector amplifier circuit 430, but not to the fax phone line 151 since the fax release switch 408 is open. Although not shown in FIG. 24, the router 112 has the ability, with proper programming, to, while detecting the ring signals through the ring detect circuit 418, analyze the ring cadence. A caller can often have a local carrier assign two or more telephone numbers to a single line and differentiate calls received to the different numbers by varying ring cadences. Thus, upon hearing different ring cadences, a caller can know before answering a call whether the call is a voice call or a call for a facsimile machine. The router 1112 can take advantage of this ring cadence differentiation by analyzing the ring cadence to determine whether to answer the call or simply allow it to continue ringing. In addition, Caller ID (identification) information is often transmitted from a central office between ring signals. With its Bell 202 ability, the router 112 is also able to, with proper programming, receive the Caller ID information and provide additional services to the user. Such services include, automatically blocking out calls from certain locations, automatically routing calls from certain locations to predetermined facsimile mailboxes on the F-SAFF 116, or automatically forwarding calls from certain callers to alternate destinations.

After answering the wall phone line 149 in step 832, the router 112 then generates and transmits a DTMF "AA" signal through the integrated modem chip 508 onto the wall phone line 149. The router 112*a* then expects to receive and decode through the DTMF detector circuit 436 DTMF digits from the remote caller. If an illegal string of digits, i.e., digits in a format not recognized by the CPU chip 310, are received in step 834, the ILLEGAL branch of decision block 835 is taken to step 836 where an error tone is generated by the integrated modem chip 310 and transmitted onto the wall phone line 149, followed by steps 837 and 838 where the load switch 420 is opened to disconnect the call, transmission of the error tone is ceased, and operation continues again in the wait loop 601 in FIG. 16. If no digits are received at step 834 within a predetermined amount of time, the TIMEOUT branch of decision block 835 is taken to jump connector 839 where operation is directed to FIG. 25, discussed in greater detail below. On the other hand, if DTMF digits in a valid format are received at step 834, the O.K. branch of the decision block 835 is taken to decision block 840 where the digits are analyzed. If the router receives an F-SAFF command, operation of the router 112 jumps to the F-to-R routine 605 in FIG. 21. It is also understood that alternate handshaking digits and other encoding techniques can be used between the F-SAFF 116 and the router 112 to help prevent unauthorized access. If a remote caller dials a string of DTMF digits after hearing the "AA" in step 833, the CALLER branch of decision block 840 is taken to steps 841 and 842 where the digits are translated into a command for the F-SAFF 116 and the process continues back at the R-to-F XFER connector 640 in FIG. 19. If a remote router 112*n* is calling the local router 112*a*, the ROUTER branch is taken to jump connector 843 where operation continues in FIG. 26. If a remote caller inputs a bypass command, such as a "#", the BYPASS branch is taken to the jump connector 839 just as if no digits had been entered, but taking place faster.

Referring now to FIG. 25, which is reached when a remote caller fails to dial any DTMF digits within a predetermined amount of time or when the remote caller dials a bypass digit, after the ring fax connector 847, the router 112 rings the local facsimile machine 130 in step 848 and then connects the wall phone line 149 to the fax phone line 151 in step 850 if the fax phone line 151 is answered, as is determined by sensing loop-current through the loop-current detector circuit 412. The router 112 also determines in decision block 851 whether the device answering the ring on the fax phone line 151 is a facsimile machine such as the local facsimile machine 130. This determination also utilizes the V.21 capability of the integrated modem chip 508. If a facsimile machine did not answer the call, the wait loop is again executed after jumping from connector 854 to FIG. 16. Otherwise, the YES branch of decision block 851 is taken to step 852 where any scheduled no-answer check of the local facsimile machine 130 is converted into an F-SAFF notification command, the scheduling of such a no-answer check being described in more detail below. Afterward, step 853 indicates that the router 112 waits for a drop in loop-current signifying the end to a facsimile communication between a remote facsimile machine 130*n* and the local facsimile machine 130*a* before the wait loop 601 is again entered through the jump connector 854. If no answer in detected during the decision block 849, the NO branch is taken to decision block 855 where it is determined whether the NNAR (never no answer receive) function is enabled in this router 112. If the function is enabled, as would have been established in the downloading of RAM discussed above, the YES branch of the decision block 855 is taken to step 857 where the router 112 creates an R-to-F command which would invoke the NNAR service from the F-SAFF 116, as is discussed in greater detail below. Subsequently, before a jump to FIG. 19 through jump connector 859, a fax check is scheduled in step 858 whereby the router 112 will periodically generate and transmit a ring signal to the local facsimile machine 130 to detect when it is again available to receive facsimile information. If the NNAR function is not enabled, the NO branch of decision block 855 is taken to step 856 where the ring generation is ceased before operation is directed back to the wait loop 601.

Referring briefly back to FIG. 24, wherein the local router 112*a* detects that a remote router 112*n* is calling, the ROUTER branch of the decision block 840 directs operation to FIG. 26. Referring now to FIG. 26, the RR-to-R routine 608, which is, in essence, a complement to the R-to-RR routine 606 discussed above in FIG. 23, the local router 112*a* expects to receive a command from the remote router 112*n* in decision block 863 and returns to the wait loop 601 if such a command is not received. Otherwise, the YES branch of decision block 863 is taken to decision block 865 which determines if the command is a valid command. If not, an error sequence is returned to the remote router 112*n* in step 866, and the remote router 112*n* is given a limited number of retries through decision block 867 before the process ultimately returns to the wait loop through jump connector 868. If the command is valid, the YES branch of decision block 865 is taken to decision block 869 where the command is analyzed. If the command from the remote router 112*n* is a turn beep on command, the BEEP branch of the decision block 869 is taken to step 870 where the CPU chip 310 causes the piezo speaker 312 to emit an urgent beep. Subsequently, an "A" is sent to the remote router 112*n* before operation returns to the decision block 863 to await another remote router command. If the command from the remote router 112*n* is a hang-up command, the HANG-UP branch of the decision block 869 is taken to step 872 where a "A" is sent to the remote router 112*n* and operation returns to the wait loop 601 in FIG. 16 where the local router 112*a* hangs up the wall phone line 149. If the command from the remote router 112*n* is a fax control command, the FAX CNTRL branch of decision block 869 is taken to step 873 where an "A" is generated and sent back to the remote router 112*n*, and a ring signal is generated and transmitted to the local facsimile machine 130*a*. If an answer is detected, the YES branch of decision block 874 directs operation to step 875 where the wall phone line 149 is connected to the fax phone line 151. If the fax control command is a connect/hold command, the local router 112*a* looks for handshaking signals to catch the line before the local facsimile machine drops the connection, after which the local facsimile machine 130*a* is disconnected, another "A" is sent to the remote router 112*n*, and operation returns to the decision block 863, as indicated by decision blocks 876 and 878 and steps 879 and 871. If the fax control command is only a connect command without a hold component, the NO branch of the decision block 876 is taken to step 877 where the local router 112*a* simply waits for a drop in loop-current before returning to the wait loop through jump connector 868, as would also happen if the local router 112*a* is unsuccessful in catching the line before loop-current drops at decision block 878. If no answer was received from the local facsimile machine 130*a* within a predetermined amount of time, the NO branch of decision block 874 is taken to decision block 880 where it is determined whether NNAR is enabled for the local router 112*a*. If not, the ring generation is stopped in step 881, and operation returns to the wait loop 868, otherwise an R-to-F command is created requesting a NNAR service, and operation continues in FIG. 19 through jump connector 888.

Referring briefly back to FIG. 16, if the CPU chip 310 determines that it is time to execute one of the many scheduled events discussed above, operation is directed to the scheduler routine 609 in FIG. 27. Referring now to FIG. 27, the scheduler routine 609 begins by determining whether the scheduled event is a fax check, in which case the FAX CHK branch is taken away from decision block 893, or an F-SAFF notification event, in which case the F-SAFF CMD branch of decision block 893 is taken to jump connector 894 which directs operation back to FIG. 19. To perform a fax check, the router 112 first generates and transmits to the local facsimile machine 130 a ring signal in step 895. Then, according to decision block 896, the router 112 determines through the V.21 ability of the integrated modem chip 508 whether the local facsimile machine 130 answers the fax phone line 151. If not, the fax check is re-scheduled, and operation returns to the wait loop 601 in FIG. 16 through jump connector 900. Otherwise, the YES branch of decision block 896 is taken to step 898 where the router 112 schedules a notification of the F-SAFF 116 that the local facsimile machine 130*a* is now available. Subsequently, in step 899, the router 112*a* waits for the loop-current to drop before returning to the wait loop 601 in FIG. 16.

Figure 28:
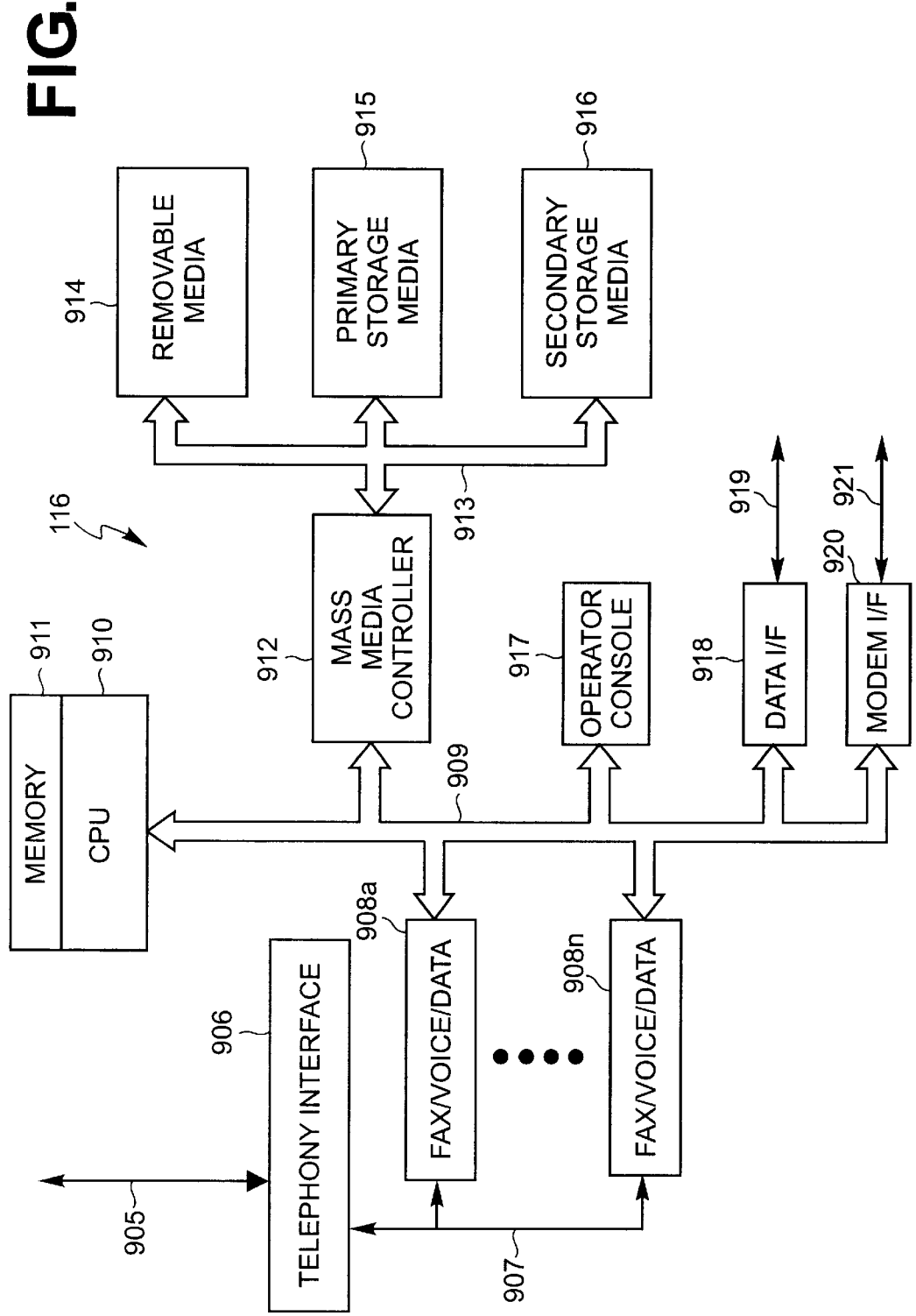
FIG. 28 is a block diagram representation of the F-SAFF of FIG. 1.

Referring temporarily back to FIG. 1, the F-SAFF 116 is shown connected to the PSTN 114, the data network 118, and the OCR/BBS platform 124, according to the preferred embodiment of the present invention. Refer now to FIG. 28 which shows a block diagram representation of the F-SAFF 116, according to the preferred embodiment of the present invention. An F-SAFF PSTN trunk 905 is shown connected to an F-SAFF telephony interface 906 to which a plurality of F-SAFF fax/voice/data subsystems 908*a–n* are connected through an F-SAFF analog bus 907. An F-SAFF CPU 910 with F-SAFF CPU memory 911 are shown connected through an F-SAFF I/O bus 909 to each of the F-SAFF fax/voice/data subsystems 908*a–n*, to an F-SAFF mass media controller 912, an F-SAFF operator console 917, an F-SAFF data interface 918 connected to an F-SAFF data network trunk 919, and an F-SAFF modem interface 920 connected to an F-SAFF modem trunk 921. The F-SAFF mass media controller 912 is shown connected through an F-SAFF media bus 913 to an F-SAFF removable media subsystem 914, an F-SAFF primary storage media subsystem 915, and an F-SAFF secondary storage media subsystem 916.

The F-SAFF telephony interface 906 provides signal transformation between the F-SAFF PSTN trunk 905 and the F-SAFF analog bus 907. According to the preferred embodiment of the present invention, one acceptable example of the F-SAFF PSTN trunk 905 is the standard T-1 digital communication link providing multiplexed, encoded carrier service. One example of an acceptable F-SAFF telephony interface 906 is the DTI 124 from Dialogic of Parisippany, N.J. The F-SAFF fax/voice/data subsystems 908 are discussed in more detail below with reference to FIG. 29. The F-SAFF data interface 918 and the F-SAFF modem interface 920 are each representative of one or more devices which provide signal conditioning and format conversions necessary for local and wide area communication with a variety of switched and direct networks for communication with other platforms of the present invention and for remote monitoring and programming, acceptable examples of which include an SMC-ENET ethernet network card from Standard Microsystems Corporation of Hauppauge, N.Y., a 1400FXSA modem from Practical Peripherals, Inc. of Thousand Oaks, Calif., and an Eiconcard X.25 modem from Eicon Technology Corporation of Montreal, Quebec, Canada. The F-SAFF mass media controller 412 controls the operation of the F-SAFF primary storage media subsystem 415, F-SAFF secondary storage media subsystem 916, and F-SAFF removable media subsystem 914. The F-SAFF secondary storage media subsystem 916 functions as a redundant backup of all information stored on the F-SAFF primary storage media subsystem 915, and the F-SAFF removable media subsystem 914 provides additional backup, download, and uploading capabilities. The following are examples of acceptable F-SAFF mass media controllers 912, F-SAFF primary storage media subsystem 915, F-SAFF secondary storage media subsystem 916, and F-SAFF removable media subsystem 914, respectively: a 1542C disk controller from Adaptec of Milpitas, Calif., an ST 11200N hard drive from Seagate Technologies, Inc. of Scotts Valley, Calif., a 1.3 GB SCSI DAT (digital audio tape) drive from Conner Peripherals, Inc. of San Jose, Calif., and a FD-235HF floppy drive from TEAC Corporation of Saitama-Ken, Japan.

The F-SAFF CPU 910 and F-SAFF CPU memory 911, according to methods discussed below and in conjunction with other control processes running on the F-SAFF fax/voice/data subsystems 908*a–n*, control operation of the elements of the F-SAFF 1116 through the F-SAFF I/O bus 909 which, in the preferred embodiment of the present invention, is a passive backplane bus. One example of an acceptable F-SAFF CPU 910 with memory 911 is the i486/33 microprocessor with 16 megabytes of RAM, available from Intel of Santa Clara, Calif. In addition, the F-SAFF operator console 917 includes a conventional keyboard, video adapter, and video display. Furthermore, the F-SAFF 116 includes, though not shown, a chassis, power supply, and any other necessary elements which would be understood by one skilled in the art to be necessary for operating the F-SAFF 116 with such an F-SAFF CPU 910 from a 120 volt AC power source. One example of acceptable operation system software is RUN&NET/UU SCSI UNIX from ESIX Systems, Inc. of Minneapolis, Minn., and one example of an acceptable database software program for implementing the methods of operation discussed below is Informix from Informix Software, Inc. of Menlo Park, Calif.

Figure 29:
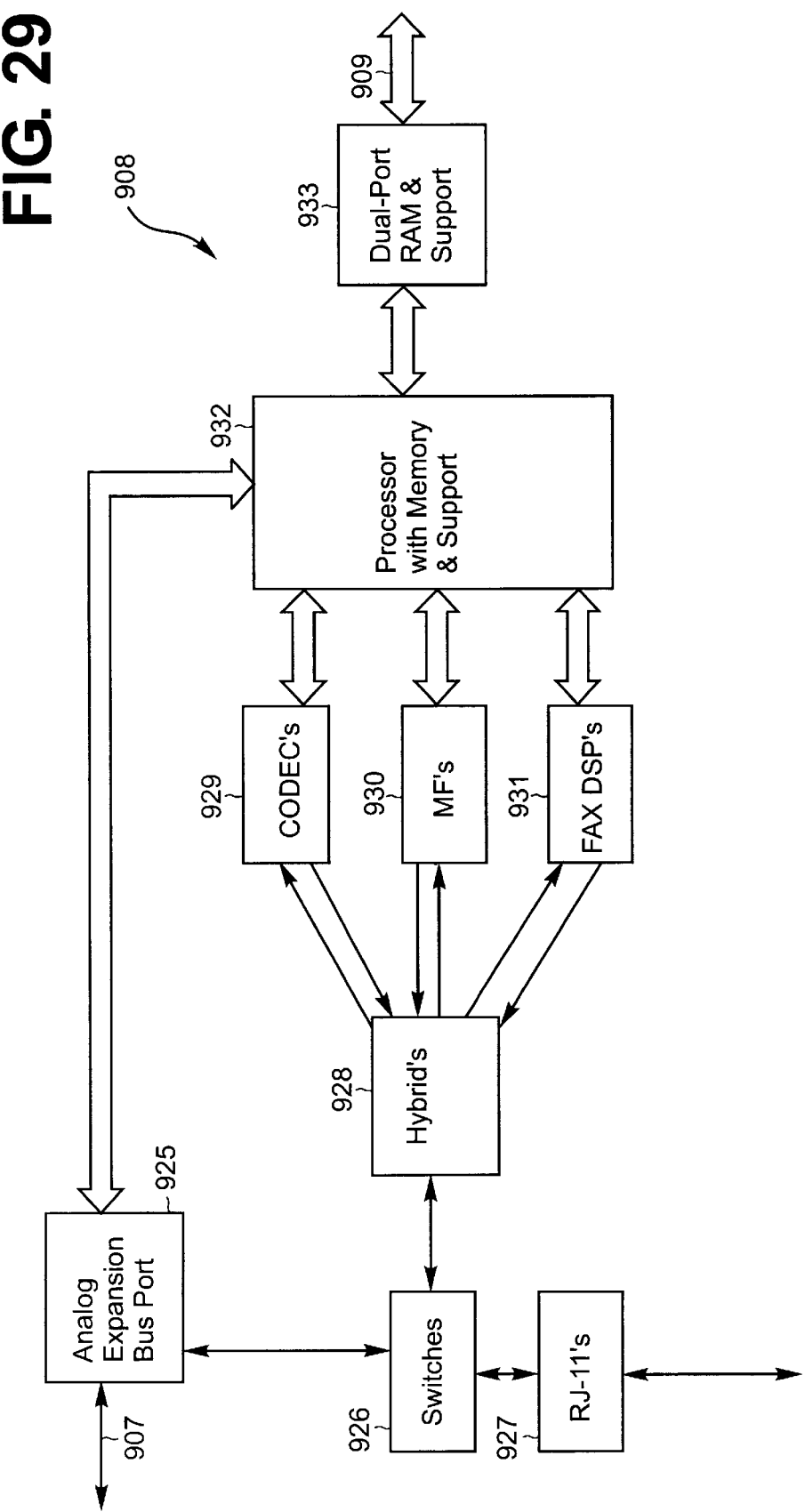
FIG. 29 is a block diagram representation of the fax/voice/data circuit of FIG. 28.

FIG. 29 shows a more detailed view of the F-SAFF fax/voice/data subsystem 908 of FIG. 28. According to the preferred embodiment of the present invention, the fax/voice/data subsystem 908 handles multiple facsimile and voice lines, thus accounting for the plural form of many element designations in FIG. 29. The F-SAFF analog bus 907 is shown connected to an analog expansion bus port 925 which is connected to a processor with memory and support 932 and to switches 926. The switches 926 selectively, based upon usage, connect the analog expansion bus port 925 and RJ-11 couplings 927 (for optional connection to ordinary telephone lines) to hybrid circuits 928 which convert between four-wire and two-wire circuits for each facsimile/voice/data line. The hybrid circuits 928 are connected to the processor with memory & support 932 through CODEC's (CODer-DECoder) 929 for converting voice signals between analog and digital formats and communicating Bell 202 modulated information, MF's (multi-frequency decoders) 930 for receiving ANI (automatic number identification—the number from which the caller called) and DNIS (dialed number identification service—the number dialed by the caller) information via Feature Group D, etc., and FAX DSP's (facsimile digital signal processors) 931 for facsimile information modulation and demodulation and DTMF (dual tone multi-frequency) detection and generation. A dual-port RAM and support resource 933 is shown connected between the F-SAFF I/O bus 909 and the processor with memory & support 932. The fax/voice/data subsystem 908 is capable of, in response to commands received through the F-SAFF I/O bus 909, performing the following functions, among others: pickup phone line, hang-up phone line, dial number (while informing of encountered call progress tones), send facsimile, receive facsimile, send modulated Bell 202 signals, receive modulated Bell 202 signals, play voice, and get DTMF tones. One example of an acceptable fax/voice/data subsystem 908 is the AudioFAX 4-port voice/fax/modem card available from AudioFAX, Inc. of Atlanta, Ga., which supports four channels of voice, facsimile, and modem communication through hardware and soft-loadable firmware.

Figure 30:
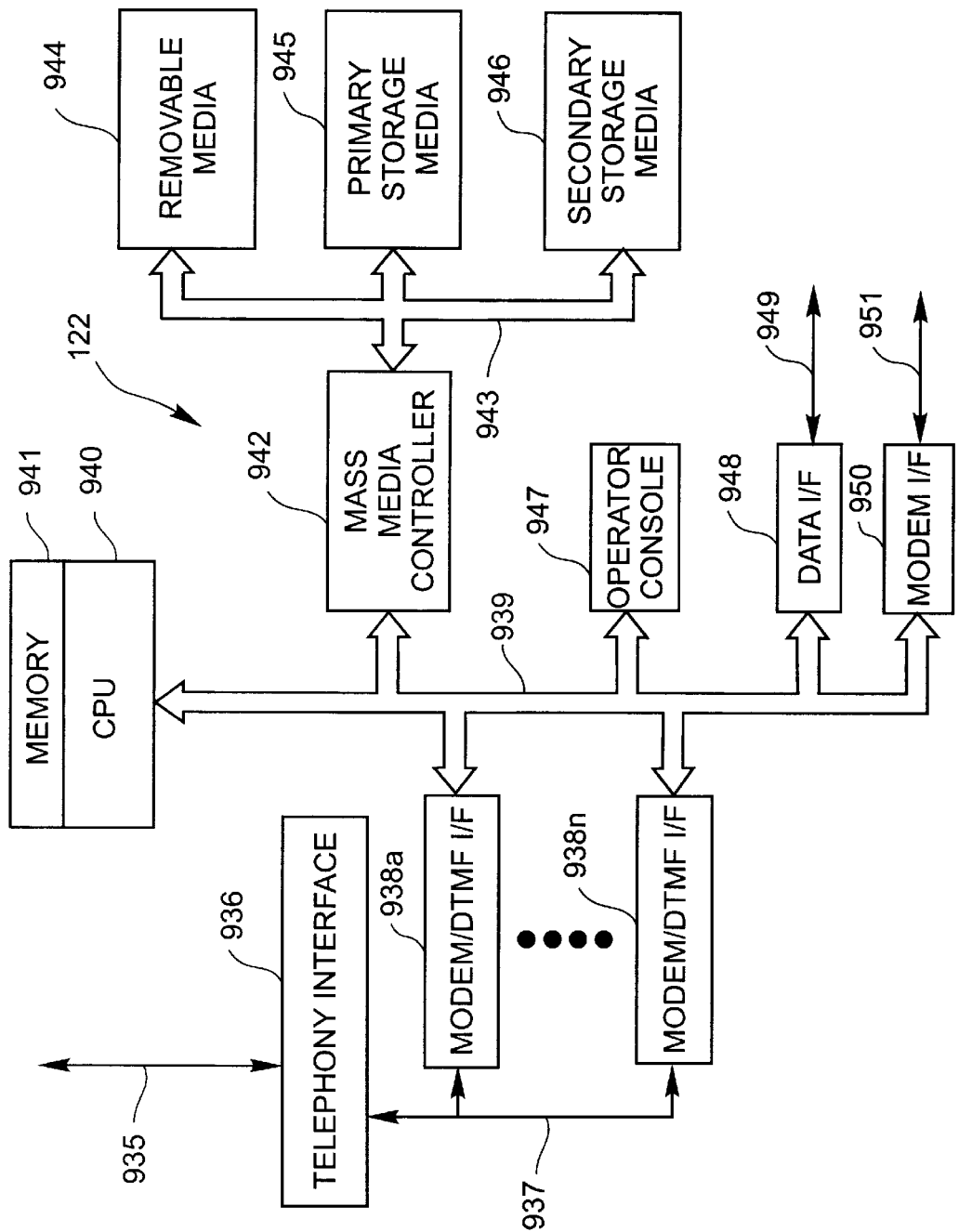
FIG. 30 is a block diagram representation of the universal platform of FIG. 1.
Figure 31:
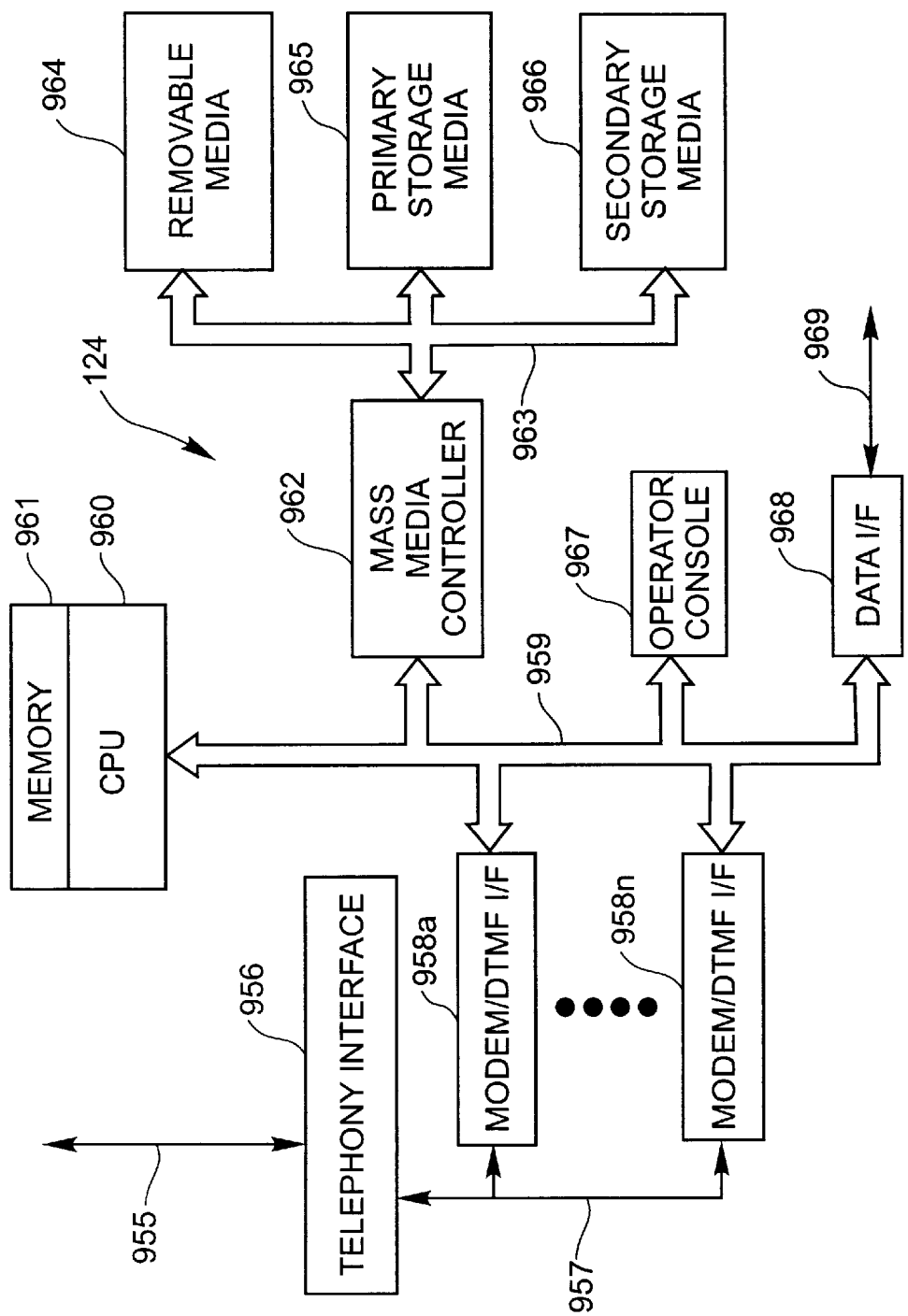
FIG. 31 is a block diagram representation of the OCR/BBS platform of FIG. 1.

Refer back again to FIG. 1 which shows the other platforms included in the facsimile store and forward system 10 of the preferred embodiment of the present invention, including the universal platform (UP) 122, the OCR/BBS platform 124, and the operator station platform 120. The operator station platform 120 is understood to include various types of installations where live operators or automated substitutes translate user requests received from setup forms or during telephone conversations into configuration data which is communicated to the UP 122. Referring now to FIG. 30, the UP 122 is shown in greater detail. A UP PSTN trunk 935 is shown connected to a UP telephony interface 936 which is connected through a plurality of modem/DTMF interfaces 938*a–n* to a UP I/O bus 939. A UP CPU 940 with UP CPU memory 941 is connected through the UP I/O bus 939 to a UP mass medial controller 942, a UP operator console 947, a UP data interface 948 connected to a UP data network trunk 949, and a UP modem interface 950 connected to a UP modem trunk 951. The UP mass media controller 942 is connected through a UP media bus 943 to a UP removable media subsystem 944, a UP primary storage media subsystem 945, and a UP secondary storage media subsystem 946. The similarly named elements of the UP 122 are very similar to those of the F-SAFF 116. The UP modem/DTMF interfaces 938*a–n* support modulated and DTMF communication with other devices, such as routers 112. An acceptable example of the UP modem/DTMF interface 938 is the U-1496E fax board, available from Zyxel of Anaheim, Calif. FIG. 31 shows a block diagram representation of the OCR/BBS platform 124. An OCR/BBS PSTN trunk 955 is shown connected to an OCRIBBS telephony interface 956 which is connected through a plurality of OCR/BBS modem/DTMF interfaces 958*a–n* to an OCRIBBS I/O bus 959. An OCR/BBS CPU 960 with OCR/BBS CPU memory 961 is connected through the OCR/BBS I/O bus 959 to an OCR/BBS mass medial controller 962, an OCR/BBS operator console 967, and an OCR/BBS data interface 968 connected to an OCRIBBS data network trunk 969. The OCR/BBS mass media controller 962 is connected through an OCRIBBS media bus 963 to an OCR/BBS removable media subsystem 964, an OCR/BBS primary storage media subsystem 965, and an OCR/BBS secondary storage media subsystem 966. The similarly named elements of the OCR/BBS platform 124 are very similar to those of the F-SAFF 116 and the UP 122. The OCR/BBS CPU 960 and OCR/BBS CPU memory 961 include software functions for converting facsimile image data into character data and making the character data available to remote callers through the OCR/BBS modem interfaces 958*a–n* to remote caller modems.

Figure 32:
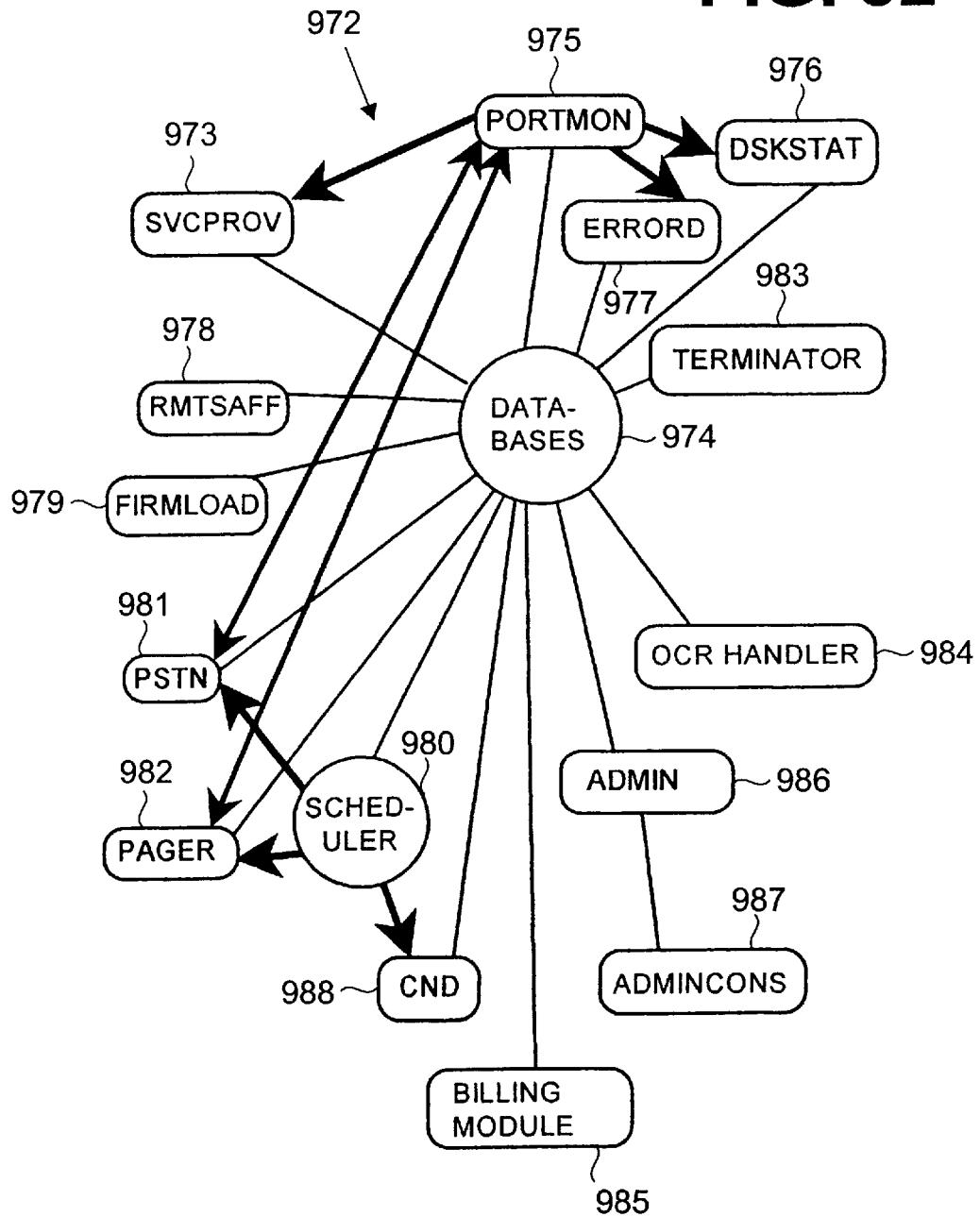
FIG. 32 is a block diagram representation of the process architecture of the F-SAFF of FIG. 28.

Referring now to FIG. 32, which shows a block diagram representation of an exemplary process architecture 972 of the F-SAFF 116 of the preferred embodiment of the present invention. The elements of the process architecture 972 are representative of software configurations of the F-SAFF CPU memory 911 and storage media subsystems 914–916, and the connecting lines represent various types of accessing, inter-process communications, and spawning operations, as would be understood by one reasonably skilled in the industry after understanding this specification in light of the functions discussed throughout. A service provider (SVCPROV) process 973 is shown accessing databases 974, which all processes of the process architecture 972 access directly or indirectly, and communicating with a port monitor (PORTMON) process 975 which also communicates with a disk status (DSKSTAT) process 976, an error (ERROR) process 977, a PSTN process 981, and a PAGER process 982. Each port on the F-SAFF fax/voice/data subsystems 908 (FIG. 28) is monitored by a SVCPROV process 973 to communicate with routers 112. The PORTMON process 975 keeps track of the activities of all of the ports on the F-SAFF fax/voice/data subsystems 908 to allocate their usage between the PSTN process 981 and the PAGER process 982, each of which is spawned by a SCHEDULER process 980 which, as will become clear below, provides a means for executing events at various predetermined times. The SCHEDULER process 980 is also shown spawning a CND (confirm/non-delivery) process 988 which also has access to databases 974. The ERRORD process 977, though not shown, communicates with other processes of the process architecture 972 to gather errors for subsequent processing. The DSKSTAT process 976 gathers disk statistics for system administration. A remote F-SAFF (RMTSAFF) process 978 is called to access the UP 122 when an unknown router 112 calls to determine which F-SAFF 116 should have received the information. A firmware loader (FIRMLOAD) process 979 communicates with routers 112 requesting firmware downloads. A TERMINATOR process 983 is shown for maintaining the databases 974 by deleting old records. An OCR HANDLER process 984 communicates with the OCR/BBS platform 124 in performing the OCRIBBS functions discussed below. An ADMIN process 986 and an ADMINCONS process 987 are accessed by system operators to configure and perform system administration on the F-SAFF 116. Finally, a BILLING MODULE process 985 is shown for assembling billing information recorded by other processes of the process architecture 972.

Figure 33:
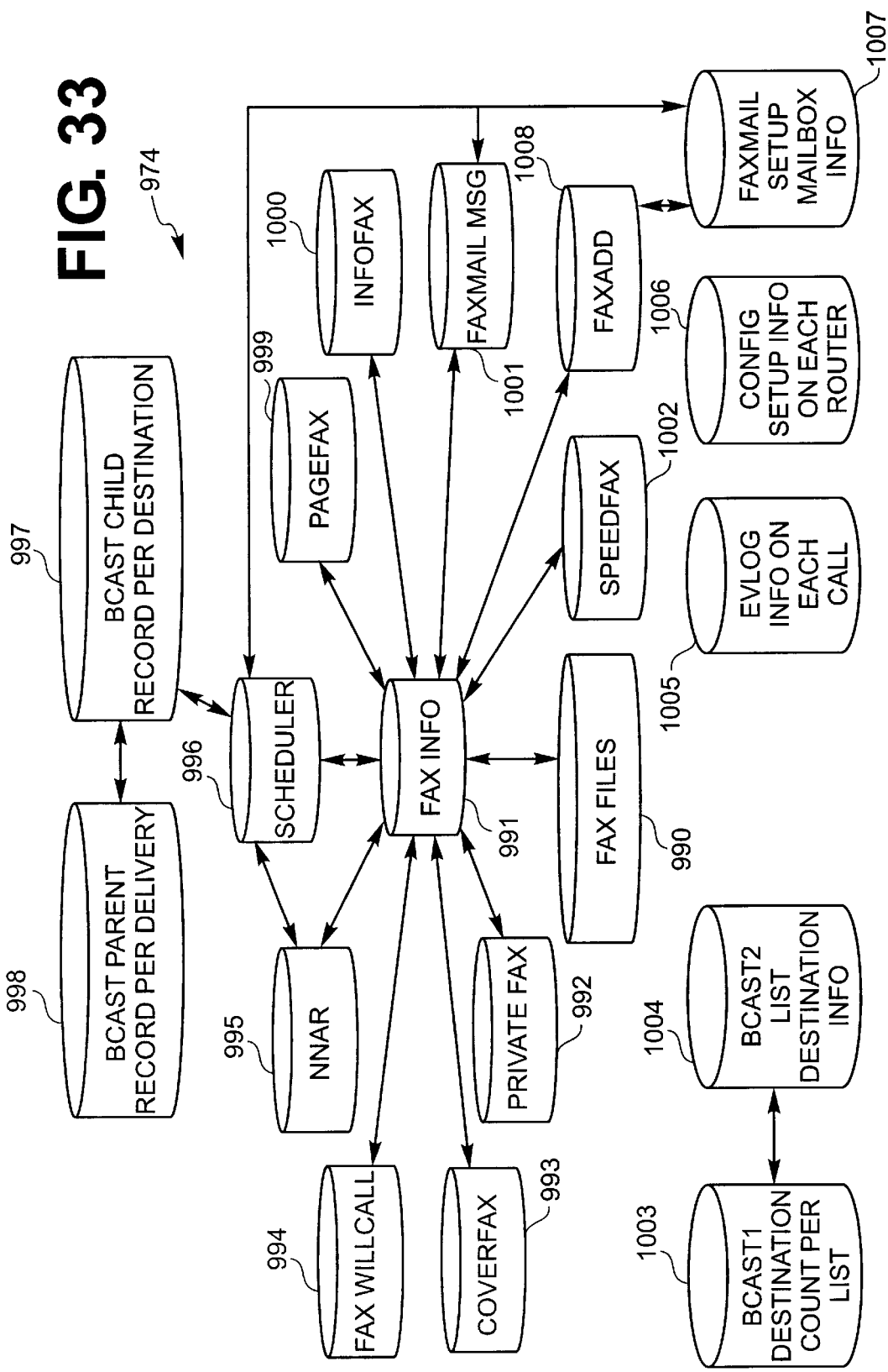
FIG. 33 is a block diagram representation of the databases maintained by the F-SAFF of FIG. 28.

Refer now to FIG. 33 which shows a block diagram representation of an exemplary structure for the databases 974 of the F-SAFF 116. Actual facsimile information is stored in FAX FILES database 990. A FAX INFO database 991 includes records which describe each facsimile information file within the FAX FILES database 990, including the number of pages per file, the size of the files, etc. Pointers exist between the FAX INFO database 991 and several other databases, including a PRIVATE FAX database 992, a COVER FAX database 993, a FAX WILLCALL database 994, a NNAR database 995, a SCHEDULER database 996, a PAGEFAX database 999, an INFOFAX database 1000, a FAXMAIL MSG (messages) database 1001, a SPEEDFAX database 1002, and a FAXADD database 1008, each of which includes records with router serial numbers, time entered, expiration time, and, where appropriate, retrieval codes and destination telephone numbers. The SCHEDULER database 996 is also shown communicating with the NNAR database 995, a BCAST (broadcast) CHILD database 997 which communicates with a BCAST PARENT database 998, the FAXMAIL MSG database 1001, and a FAXMAIL SETUP database 1007 which communicates with the FAXADD database 1008. As indicated, the BCAST CHILD database 997 includes one record per destination, whereas the BCAST PARENT database 998 includes one record per delivery function, each database including records not limited to broadcast events. A BCAST1 database 1003 and a BCAST2 database 1004 for keeping track of destination number lists are also shown referencing one another. To reduce time in updating the number of destinations per list, the BCAST1 database 1003 includes one record per list number which includes a router serial number, a list number, and the number of destinations, and the BCAST2 database 1004 includes one record per destination which includes a router serial number, a list number, and a destination telephone number. An EVLOG (event log) database 1005 is also included for keeping a log of call information for each call serviced by the F-SAFF 116. A CONFIG database 1006 includes setup information for each router 112 serviced by the F-SAFF 116. Finally, the FAXMAIL SETUP database 1007 stores setup information for facsimile mailboxes configured by each router 112.

In configuring a router 112, a user will first communicate with the operator station (OS) platform 120 through a telephone conversation or through faxing or mailing a completed setup form to provide the OS platform 120 configuration information including, for example, the telephone number of the local facsimile machine 130, the serial number of the router 112, a choice of services to which the user desires to subscribe, a choice of service providers where multiple service providers are available, and any long distance access codes necessary or desired during long distance calls. The OS 120 then communicates the information to the UP 122. For each router 112, the UP 122 examines the telephone number of the local facsimile machine 130 and any selected service provider information to determine which F-SAFF 116 will be preferred by the router 112 and which F-SAFFs 116n will be backups, and then schedules a call to the F-SAFF 116 to deliver the configuration information. Subsequent to receiving the configuration information from the OS platform 120, the UP 122 is able to receive telephone calls from the router 112 requesting the number of the preferred F-SAFF 116 and backup F-SAFFs 116n. To expedite this process, after receiving the configuration information from the UP 122, the F-SAFF 116 calls the router 112 with an instruction to call the UP 122 to receive the telephone number of the F-SAFF 116 and the telephone numbers of the backup F-SAFFs 116n. The above processes are shown in more detail in FIGS. 34–36 and discussed in greater detail below.

Figure 34:
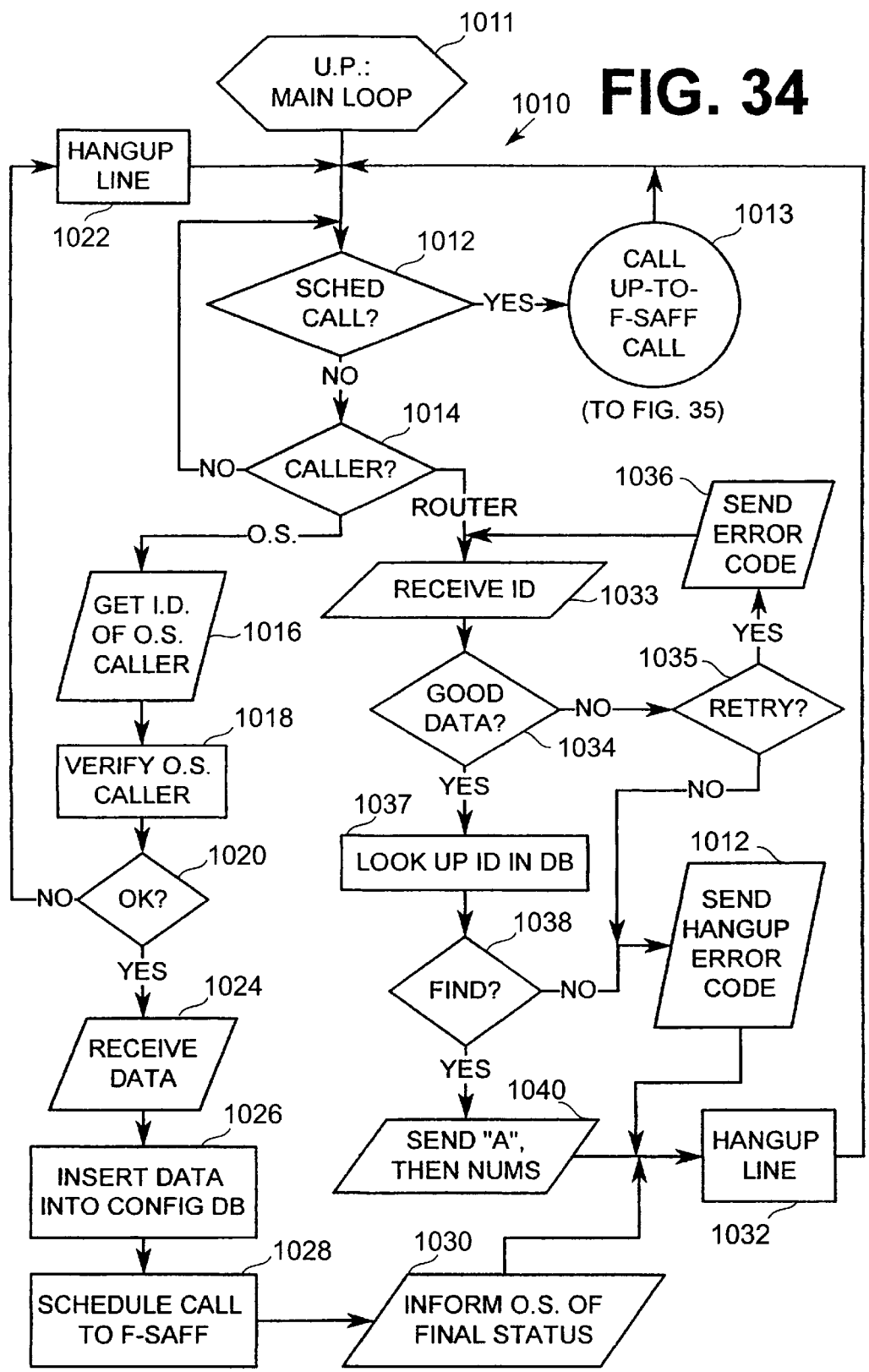
FIG. 34 is a flow chart representation of the main loop of the universal platform of FIG. 30.
Figure 35:
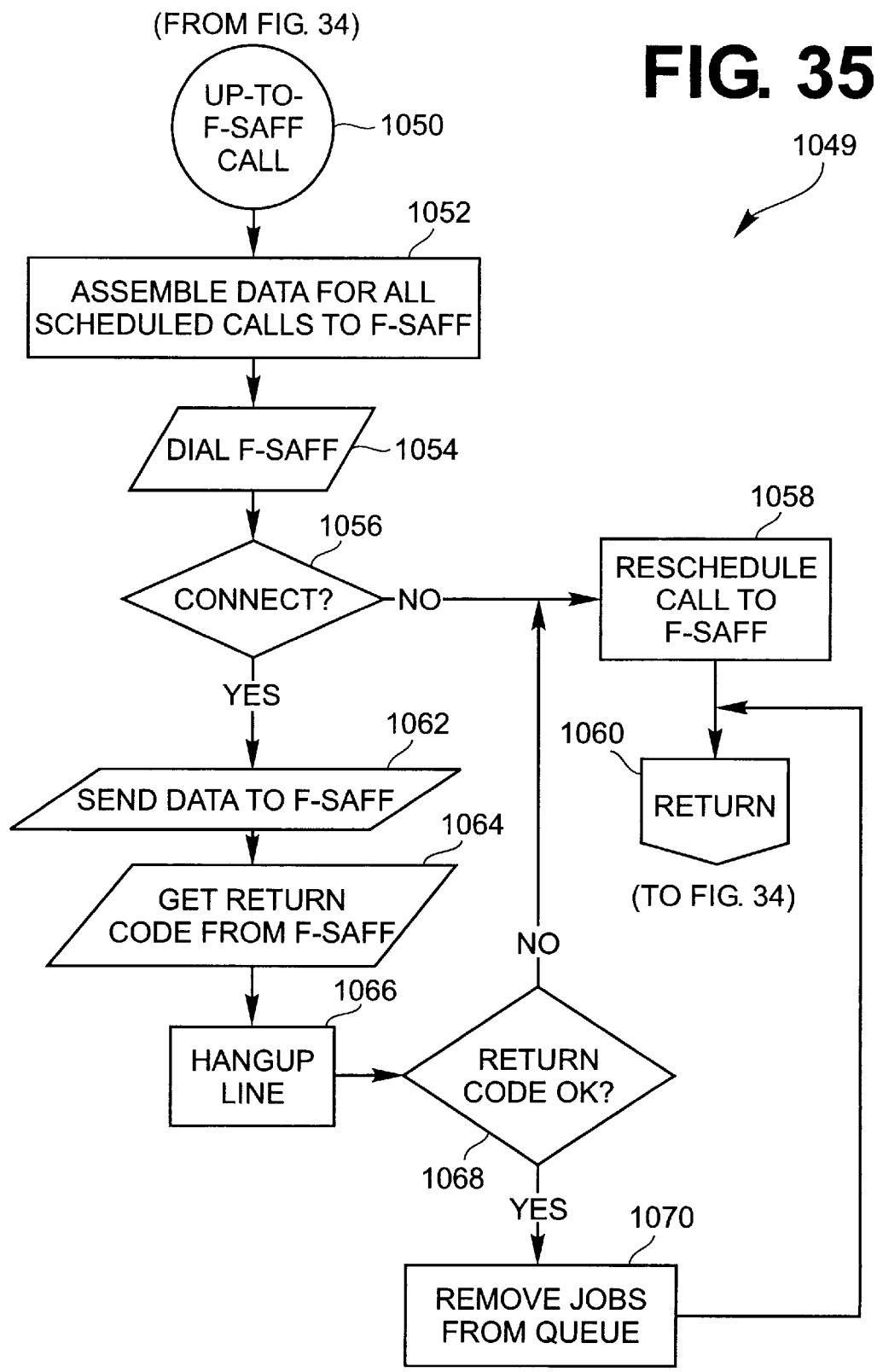
FIG. 35 is a flow chart representation of the UP-to-F-SAFF routine of FIG. 34.

FIG. 34 shows the UP: Main Loop 1010 of the UP 122 beginning with the terminal 1011. If the time for a scheduled call has been reached, the YES branch of decision block 1012 is taken to the call connector 1013 where the UP-to-F-SAFF call routine 1049 of FIG. 35 is called, as is discussed in greater detail below. Otherwise decision block 1014 indicates that if no incoming calls are being detected, the NO branch of decision block 1014 loops back up to the decision block 1012. If an operator station (OS) platform 120 is calling the UP 122, the O.S. branch of decision block 1014 is taken to step 1016 where the UP 122 receives identification information from the OS 120 to, in step 1018, verify authorization for the OS 120. If authorization is not verified, the NO branch of decision block 1020 is taken to step 1022 where the UP 122 hangs up the line and loops back to the decision block 1012. Otherwise, the UP 122 receives router configuration data in step 1024, inserts the data into a UP router configuration database in step 1026, schedules a call to the preferred F-SAFF 116 in step 1028 as identified by the configuration data (multiple calls to multiple F-SAFFs 116 if configuration information for multiple routers 112 is included in the communicated data), informs the OS 120 of the final status information verifying the communication in step 1030, and hangs up the line in step 1032 before looping back to the decision block 1012.

If a router 112 is calling the UP 122, as discussed above in FIG. 14, the ROUTER branch of decision block 1014 is taken to step 1033 where the UP 122 receives a serial number (ID) from the router 112. If the transmission is not successful and a predetermined retry limit has not yet been reached, the NO branch of decision block 1034 and the YES branch of decision block 1035 is taken to step 1036 where a bad data error code is transmitted back to the router 112 so that another attempt can be made to transmit the serial number. If the transmission is at first or eventually successful, the YES branch of decision block 1034 is taken to step 1037 where the UP 122 checks to see if configuration information has been added to the UP router configuration database for that particular router 112. If so, the YES branch of decision block 1038 is taken to step 1040 where the UP 122 transmits an "A" to the router 112 and then transmits the telephone numbers of the preferred F-SAFF 116a and backup F-SAFFs 116n. Subsequently, the UP 112 hangs up the telephone line in step 1032 and loops back to the decision block 1012. If a retry is not in order in decision block 1035 or of the router serial is not located in the UP router configuration database, step 1042 is executed whereby a hang-up error code is sent to the router 112 before the UP 122 hangs up the line in step 1032 and loops back up to decision block 1012.

Figure 36:
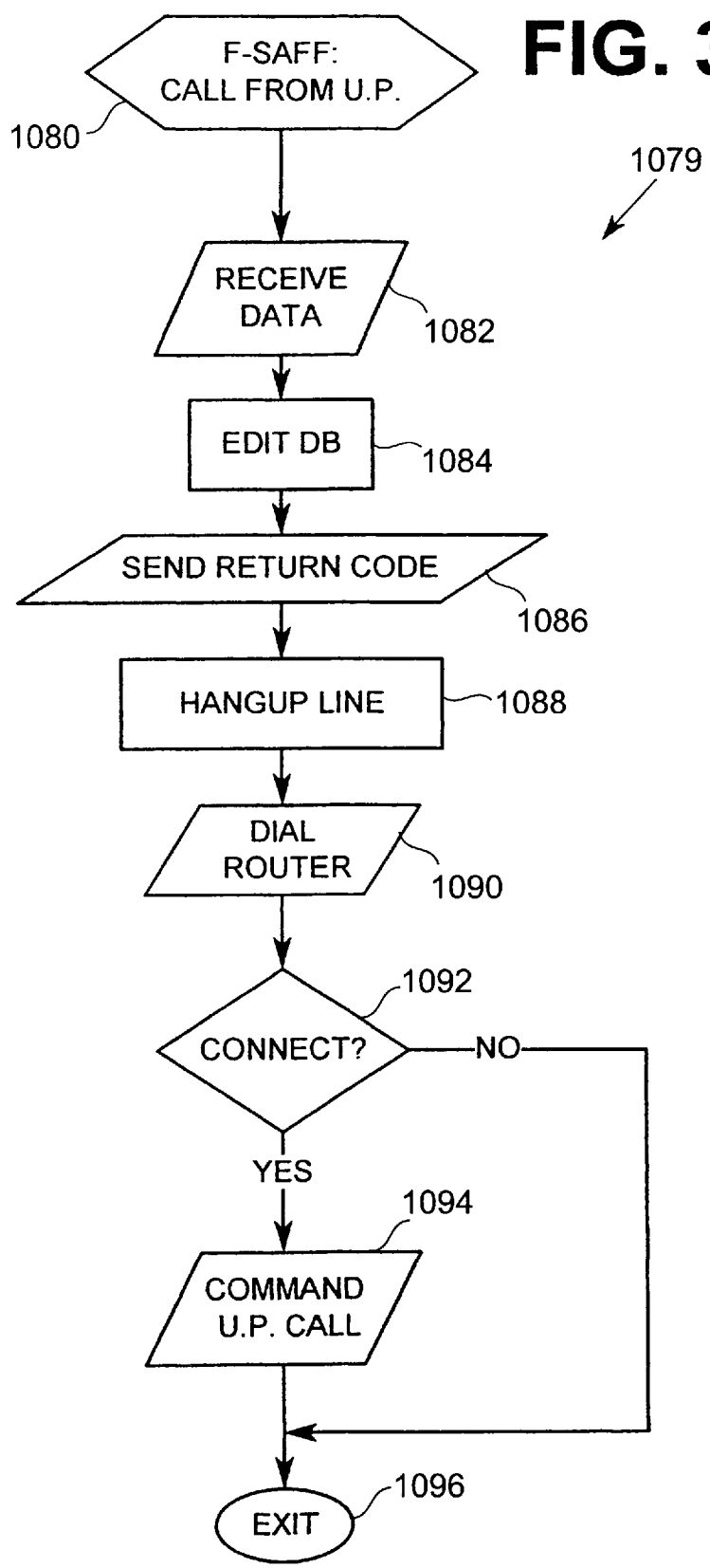
FIG. 36 is a flow chart representation of the call from UP routine of the F-SAFF of FIG. 28.

Referring now to FIG. 35, the UP-to-F-SAFF call routine 1049 begins after the connector 1050 with step 1052 where the UP 122 assembles configuration information received from the OS platform 120 for delivery to a particular F-SAFF 116. After dialing the F-SAFF 116 in step 1054, the UP 122 determines whether a connection can be established within a predetermined amount of time. If such a connection is not established, the NO branch of decision block 1056 is taken to step 1058 where the call is rescheduled, and a jump connector 1060 returns operation to the UP main loop 1010 in FIG. 34. On the other hand, if a connection is established, the configuration information is sent to the F-SAFF 116 in step 1062; a return code is received in step 1064; and a hang-up line step 1066 is executed. Subsequently, the UP 122 evaluates the return code in decision block 1068 and reschedules the call in step 1058 if the return code does not indicate successful transmission or recognition by the F-SAFF 116 or removes jobs from the queue in step 1070 if the return code indicates successful configuration of the F-SAFF 116, both followed by a return to FIG. 34 through jump connector 1060. FIG. 36 is, in some ways, complimentary to FIG. 35 by showing an F-SAFF: Call from UP routine 1079 which is the routine followed by the F-SAFF 116 when receiving a call from the UP 122 to communicate configuration information. After receiving a call on a telephone line designated to receive calls from UP 122, the F-SAFF 116 receives configuration information from the UP 122 in step 1082, edits its configuration database 1006 (FIG. 33) in step 1084, sends a return code to the UP 122 in step 1086, and hangs up the line in step 1088. Subsequently, the F-SAFF 116 dials the router 112 through step 1090 and, after detecting a connection in decision block 1092, commands the router 112 to call the UP 122 in step 1094 before exiting in step 1096. If no connection is established with the router 112, the NO branch of decision block 1092 is taken to skip step 1094 and exit in step 1096. According to an alternate embodiment of the present invention, a repeat dialing function is used whenever the F-SAFF 116 detects a busy router 112 so that the local carrier will notify the F-SAFF 116 whenever the telephone line to the router 112 is free, provided a local carrier can provide sufficient information to the F-SAFF 116 allowing it to process the call. In addition, although FIGS. 34–36 refer to inter-platform communication through the PSTN 114, the present invention includes alternate inter-platform communication methods through data network 118, including local and wide area data networks.

Figure 37:
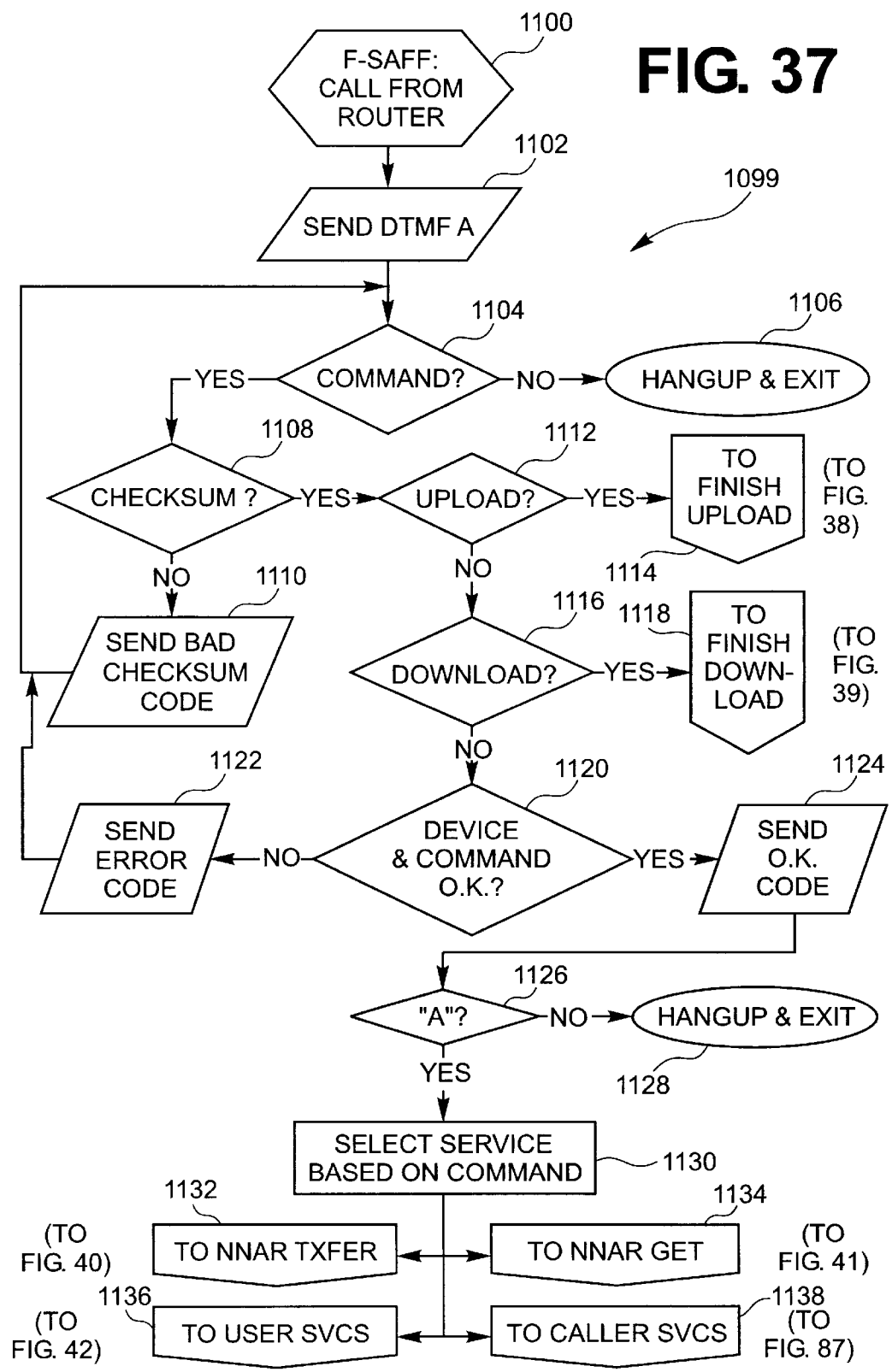
FIG. 37 is a flow chart representation of the call from router routine of the F-SAFF of FIG. 28.
Figure 80:
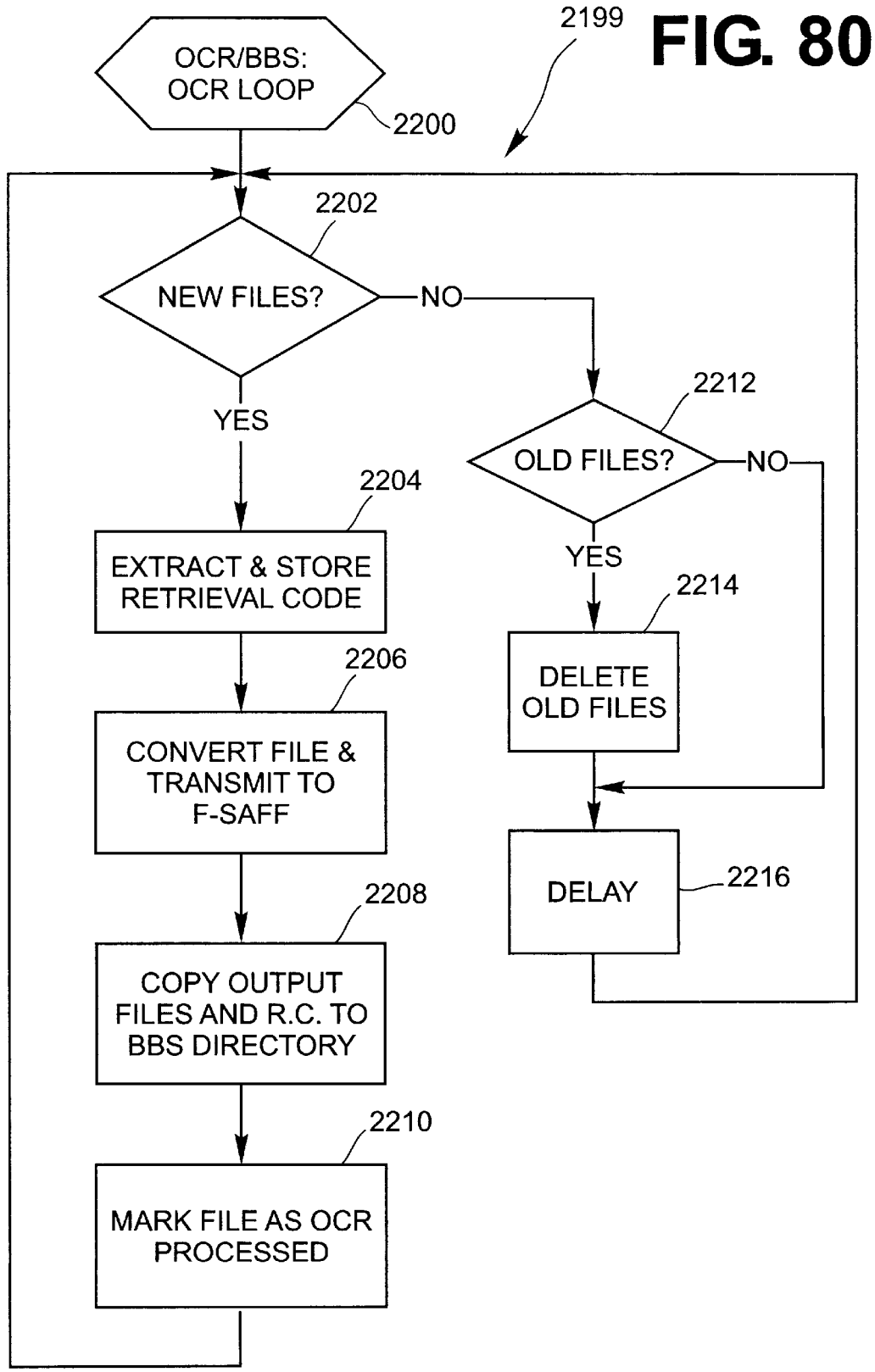
FIG. 80 is a flow chart representation of the ocr loop of the OCR/BBS platform of FIG. 31.
Figure 81:
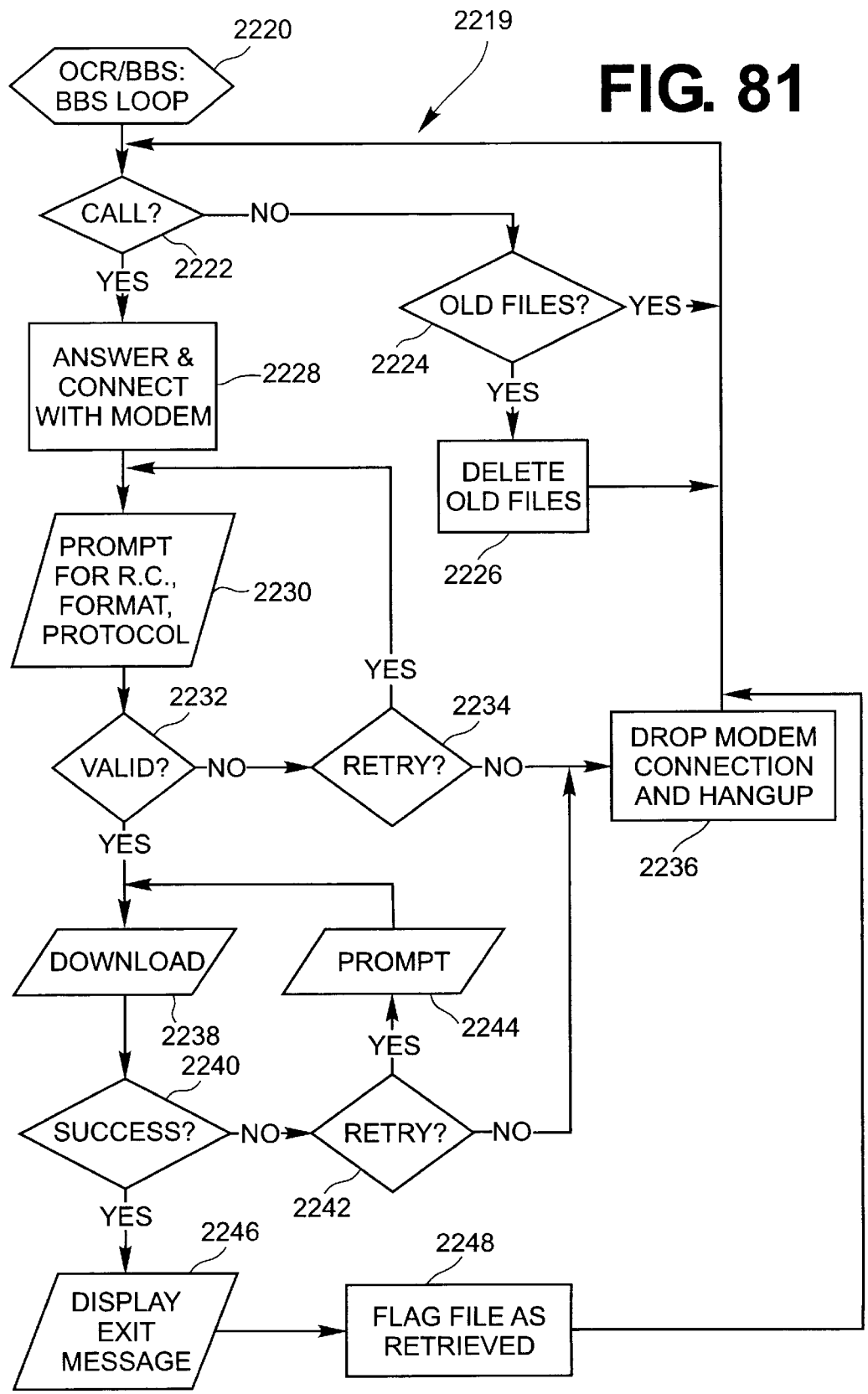
FIG. 81 is a flow chart representation of the bbs loop of the OCR/BBS platform of FIG. 31.

Beginning in FIG. 37, which initiates the F-SAFF: Call from router routine 1099, FIGS. 37–79, and 82–93 relate to routines followed after the router 112 calls the F-SAFF 116. FIGS. 80 and 81 relate to routines followed by the OCR/BBS platform 124. When the F-SAFF 1116 answers a call on a telephone line designated to receive calls from routers 1112, the F-SAFF 116 generates and transmits a handshaking signal, such as a DTMF "A", as indicated by step 1102. Complimentary router flowcharts are shown beginning in FIGS. 15 and 19. The F-SAFF 116 then expects to receive a router command in decision block 1104, directing operation along the NO branch to step 1106 where the F-SAFF 116 hangs up the telephone line and the process ends if a command is not received within a predetermined amount of time, or, if a command is received within the predetermined amount of time, along to the YES branch to decision block 1108 where the F-SAFF 116 determines whether the transmission produced good data by performing a checksum verification. Hangup and exit steps such as step 1106 should be understood to include transmitting a hangup command to the router 112 if the router 112 is waiting for another command and such a hangup command is not indicated in the flow chart, thereby reducing the amount of time the router 112 is unavailable. In addition, in many of the routines discussed below, the transmission of hangup commands and the hanging up of the F-SAFF 116 actually take place before steps which appear to be executed immediately before the hangup and exit steps in another effort to reduce the amount of time the router 112 is unavailable. If a bad checksum is detected, a bad checksum error code is generated and sent back to the router 112 in step 1110, after which operation loops back up to decision block 1104. If good data is received, the YES branch of decision block 1108 is taken to decision block 1112 where the F-SAFF 116 determines whether the command is a router upload command. If so, the YES branch is taken to jump connector 1114 which directs operation to FIG. 38, discussed in greater detail below. If not an upload command, the process continues to decision block 1116 where operation is directed to jump connector 1116 for further processing in FIG. 39 if the command is a download command or to decision block 1120 where the F-SAFF 116 determines whether the router 112 is known to the F-SAFF 116 and where the ability of this particular router 112 to perform the requested command is verified. If the command is unavailable to the router 112, or if the F-SAFF 116 does not recognize the serial number of the router 112, an appropriate error code, such as one requesting more information through the transmission of, for example, a DTMF "B", is generated and transmitted to the router 112 . Otherwise, the YES branch of decision block 1120 is taken to step 1124 where an O.K. code, such as a DTMF "A", for example, is generated and transmitted back to the router 112. The F-SAFF 116 then looks for an acknowledgment signal, such as a DTMF "A", from the router 112, hanging up and exiting through step 1128 if such an signal is not received, otherwise proceeding to step 1130 where an enhanced facsimile service is selected based upon the router command. For the sake of clarity, additional steps of parsing or analyzing the router command are included in subsequent routines shown below even though much of such parsing or analyzing actually takes place at step 1130. As discussed in greater detail below, if the router command is a NNAR (never no answer receive) transfer command, the jump connector 1132 directs operation to FIG. 40; if the router command is a NNAR get command, the jump connector 1134 directs operation to FIG. 41; if the router command is a user services command, the jump connector 1136 directs operation to FIG. 42; and if the router command is a caller services command, the jump connector 1138 directs operation to FIG. 87.

Figure 38:
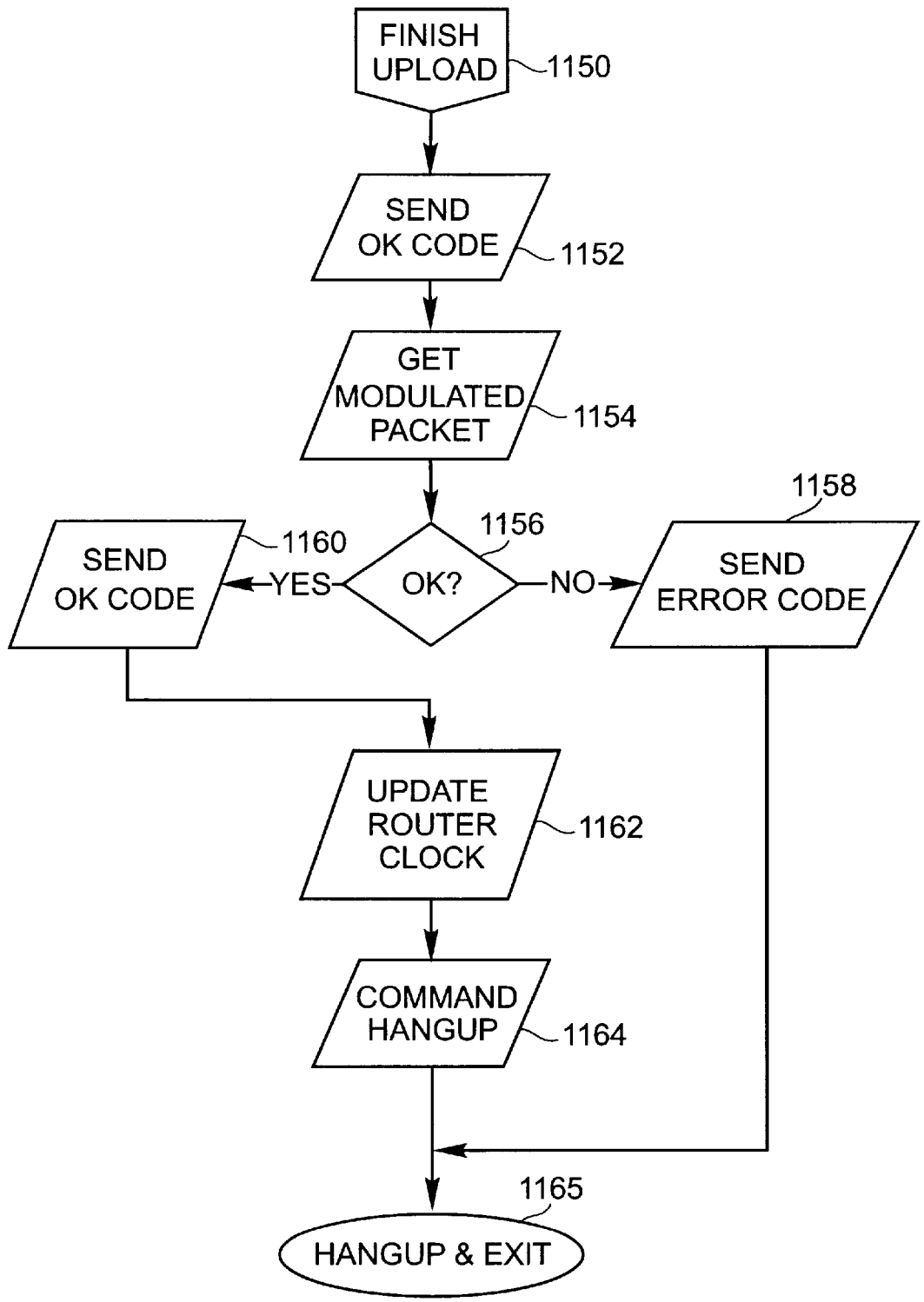
FIG. 38 is a flow chart representation of the finish upload routine referenced by FIG. 37.

Referring now to FIG. 38, as directed by jump connector 1114 of FIG. 37, the F-SAFF 116 begins after a FINISH UPLOAD connector 1150 by sending an OK code, such as an "A", to the router 112 in step 1152 and then receives a modulated packet of information from the router 112 in step 1154, in accordance with step 759 in FIG. 20. Once the information, such as call usage information, is uploaded, other F-SAFF processes can access the information. If the transmission is not successful, the F-SAFF 116 sends an error code in step 1158 and then hangs up the line and exits in step 1165. Otherwise, an "A" is sent to the router 112 in step 1160, followed by a command in step 1162 to update the clock in the router 112 and a command in step 1164 to hang-up the line before the routine ends in step 1165.

Figure 39:
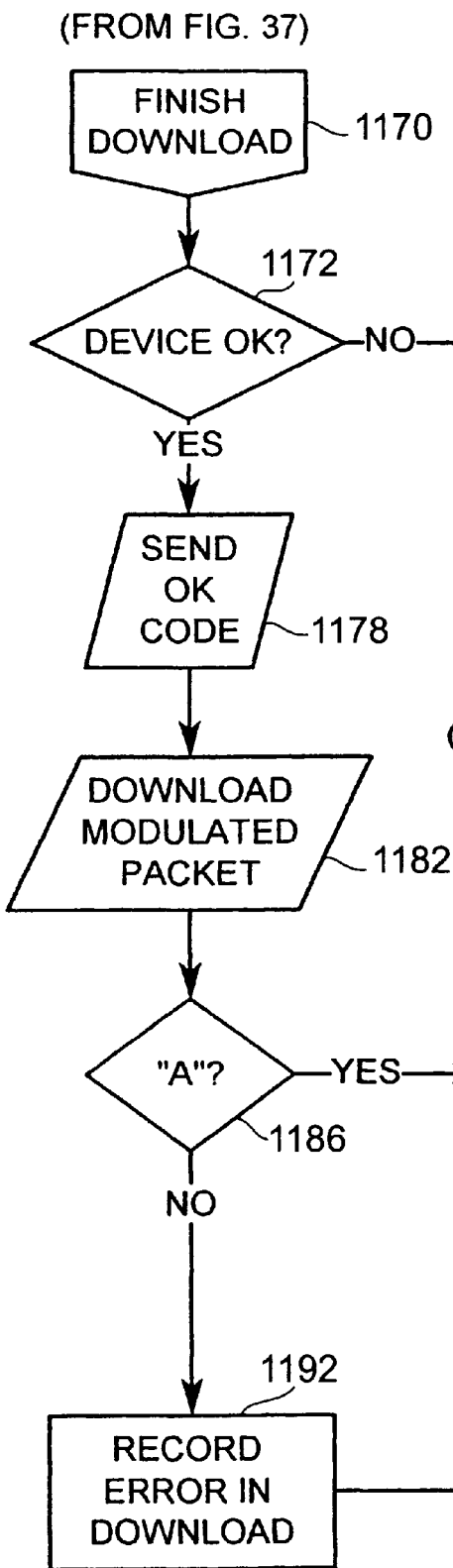
FIG. 39 is a flow chart representation of the finish download routine referenced by FIG. 37.

Referring now to FIG. 39, as directed by jump connector 1116 in FIG. 37, the F-SAFF 116 begins after the FINISH DOWNLOAD connector 1170 by determining in decision block 1172 whether the F-SAFF 116 can download information to that particular router 112. If not, the NO branch is taken to step 1174 where an error code is sent to the router 112 before the process ends with a hang-up and exit in step 1176. Otherwise, the YES branch is taken to step 1178 where an OK code, such as a DTMF "A", is transmitted to the router 112 before modulated data corresponding to router RAM information is downloaded to the router 112 in step 1182, in accordance with step 661 in FIG. 15. If an "A" is received from the router 112, indicating successful transmission, the YES branch of decision block 1186 is taken to step 1188 where the F-SAFF 116 makes a record of the successful transmission, to step 1190 where the router 112 is commanded to hang-up the telephone line, and to step 1176 where the F-SAFF 116 hangs up the line and exits the routine. Otherwise, if an error code is received from the router 112, the F-SAFF 116 records the error in step 1192 and, in step 1176, hangs up the line and exits.

Figure 40:
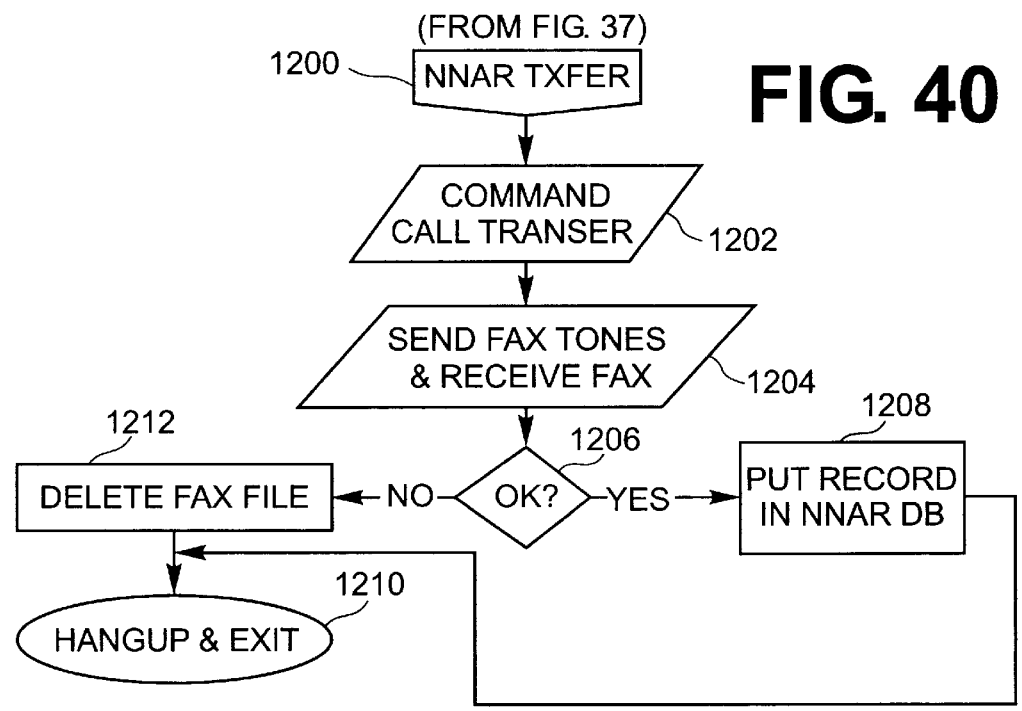
FIG. 40 is a flow chart representation of the NNAR transfer routine referenced by FIG. 37.

Refer now to FIG. 40, as directed by the jump connector 1132 in FIG. 37, in accordance with a no answer situation at the router 112 resulting in router operation flowing through FIGS. 24, 25, 19, 20, and 21 to decision block 765 where the router 112 waits for an F-SAFF command. At step 1202 in FIG. 40, the F-SAFF 116 sends a transfer call command to the router 112 commanding the router 112 to transfer to the F-SAFF 116 the call currently suspended by the router 112. When the call is transferred, the F-SAFF 116 is connected directly to a remotely located facsimile machine 130n which was attempting to deliver facsimile information to the local facsimile machine 130a before the local router 112 detected that the local facsimile machine 130a was unable to the receive facsimile information. Thus, the F-SAFF 116 begins sending out facsimile initiation tones (CED tones) and receives and stores the facsimile information from the remote facsimile machine 130n in step 1204. If the transmission is successful, the YES branch of decision block 1206 is taken to step 1208 where a record is inserted into the NNAR database 995 (FIG. 33) before the F-SAFF 116 hangs up the telephone line and exits the process in step 1210. As will be discussed in greater detail below with respect to FIG. 100, another process will find the NNAR record relatively quickly and initiate a call to the router 112 to cause the router to emit a message waiting sound and to schedule a check of the local facsimile machine 130. If the transmission is not successful, the facsimile information is deleted in step 1212 before the F-SAFF 116 hangs up and exits in step 1210.

Figure 41:
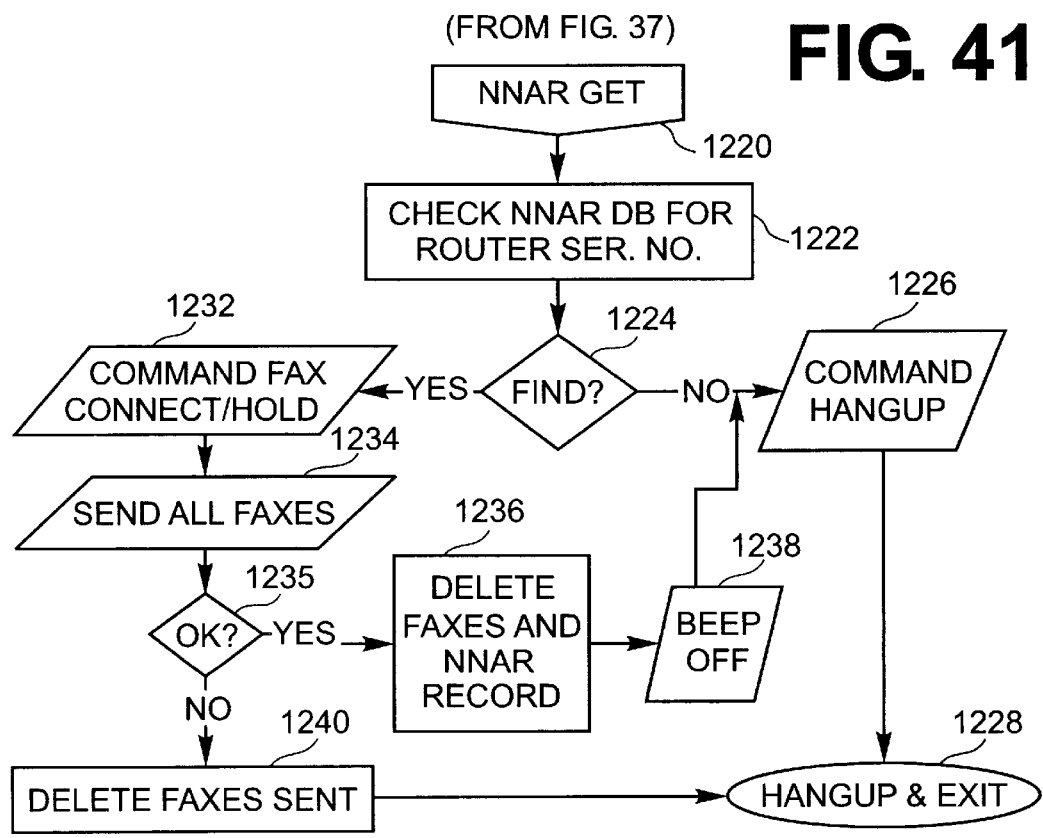
FIG. 41 is a flow chart representation of the NNAR get routine referenced by FIG. 37.

Referring now to FIG. 41, as directed from FIG. 37 through the jump connector 1134, and in accordance with receiving a scheduled F-SAFF notify command from the router 112 after the router 112 determines that the local facsimile machine 130 is available to receive facsimile information, the F-SAFF 116 checks the NNAR database 995 for the serial number of the router 112 (received with the F-SAFF notify command, as with all commands from the router 112) to determine if any facsimile information is pending delivery through that router 112 to its local facsimile machine 130. If so, the YES branch of decision block 1224 is taken to step 1230 where the F-SAFF 116 transmits a fax control command to the router 112 commanding the router 112 to connect the local facsimile machine 130 to the wall phone line 149, hold the line after the communication of facsimile information, and send an "A" signifying successful retention of the line, a so-called fax connect/hold command, as opposed to a fax connect command which would not cause the router 112 to hold the line open after communication of facsimile information. Subsequently, although not shown, the F-SAFF 116 receives an "A" from the router 1112 signifying the local facsimile machine 130 is about to be connected. Then, the F-SAFF 116 sends all facsimile information pending for that particular router 112. Thus, a user need not be present at the local facsimile machine 130 to have stored facsimile information delivered to the local facsimile machine 130 after a period of unavailability. If the transmission was successful and the F-SAFF 116 receives an "A" from the router 112 signifying retention of the line, the facsimile information and the NNAR database record is deleted in step 1236 and the F-SAFF 116 commands the router 112 to turn off the no answer alarm beep in step 1238 before the call is disconnected and the process ends in step 1228. Otherwise, in step 1240, if the transmission was not completely successful, the F-SAFF 116 deletes any facsimile information and the NNAR record which corresponds to any facsimile information which was successfully transmitted.

Figure 42:
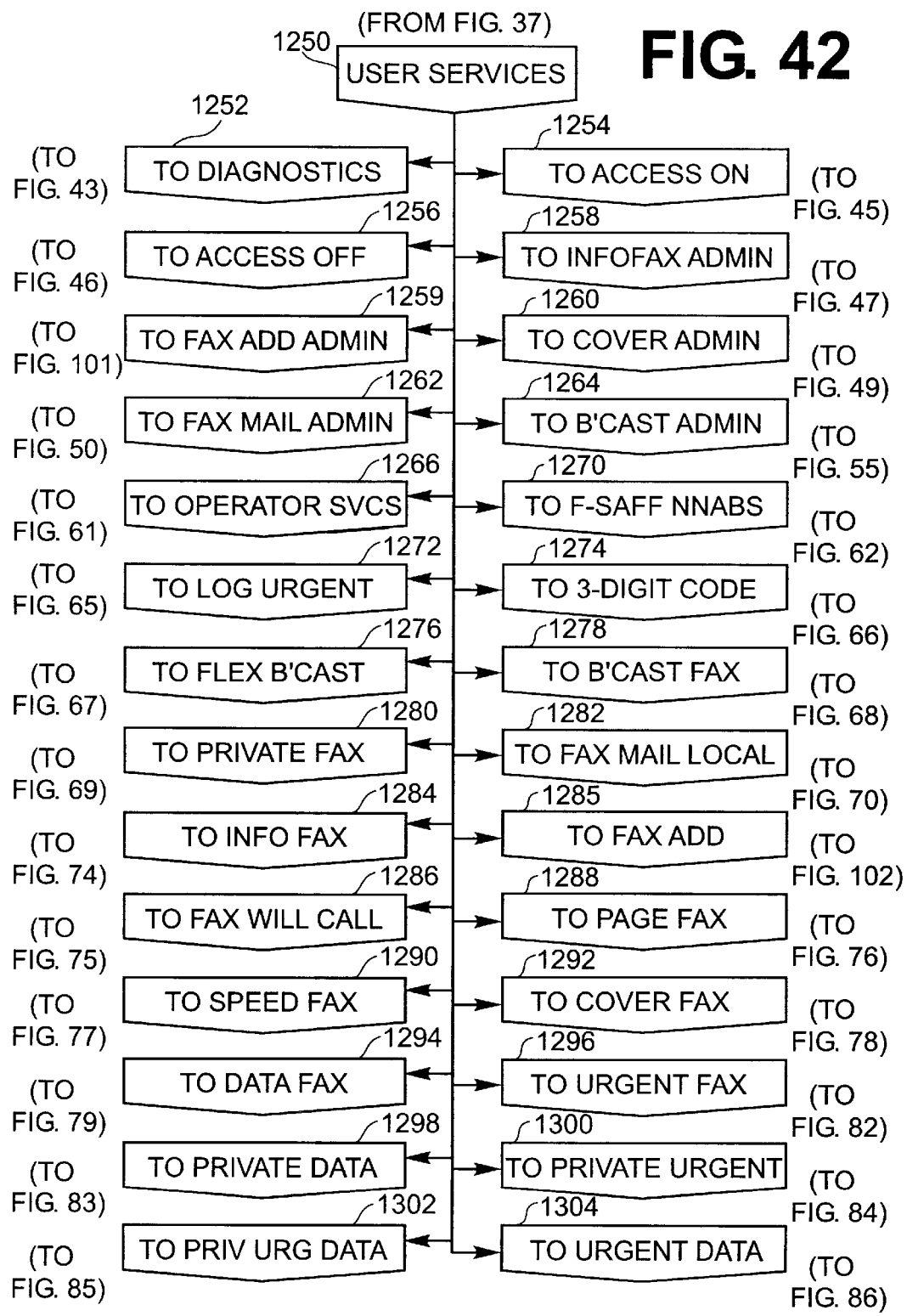
FIG. 42 is a flow chart representation of the user services routine referenced by FIG. 37.
Figure 43:
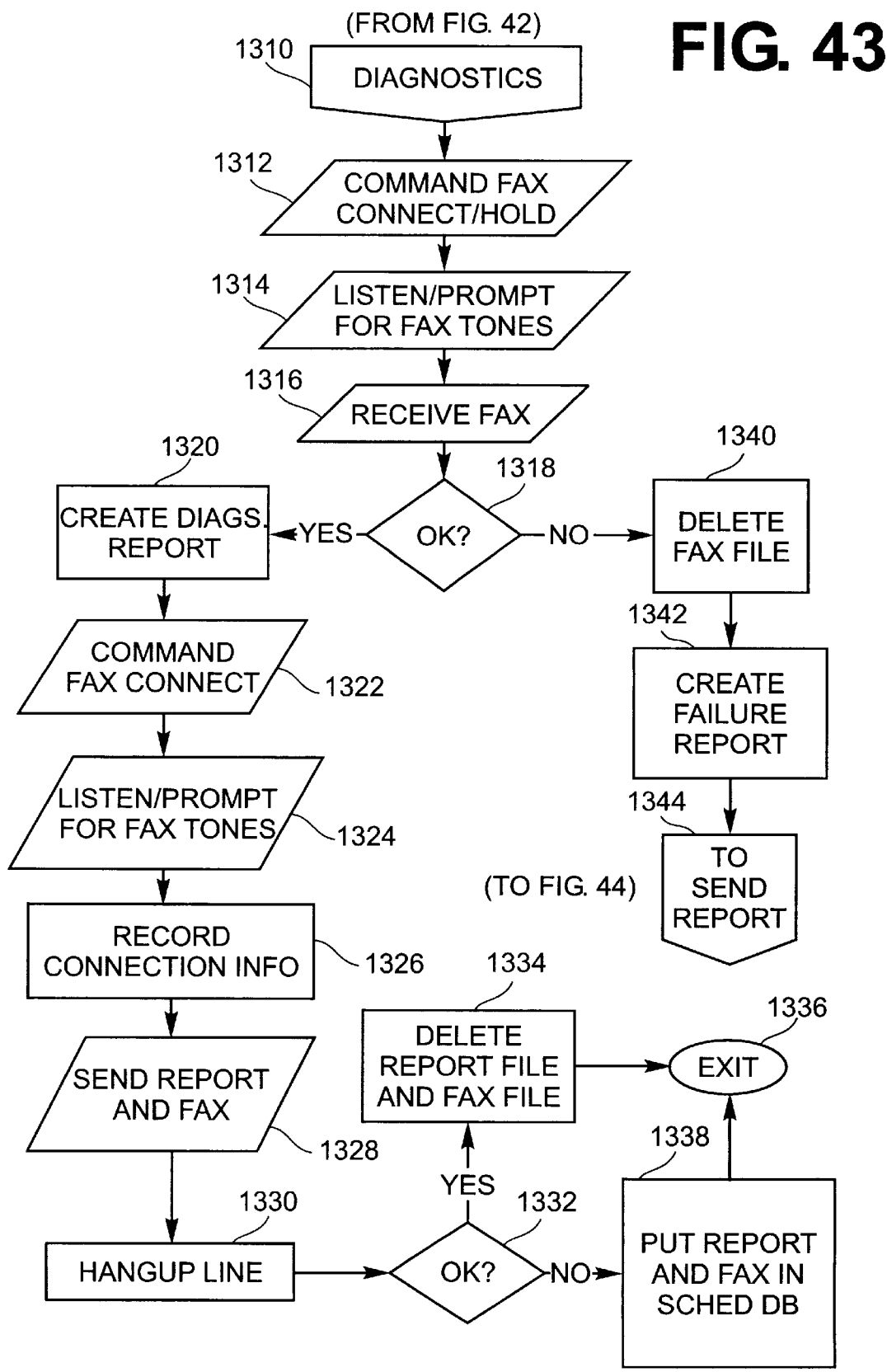
FIG. 43 is a flow chart representation of the diagnostics routine referenced by FIG. 42.

As directed by FIG. 37 through jump connector 1136, refer now to FIG. 42 where a large number of jump connectors are connected to USER SERVICES connector 1250. All of the services referenced in FIG. 42 are initiated by a local user going off-hook at the local facsimile machine 130 and dialing digits which are detected and translated by the router 112 which eventually accesses the F-SAFF 116 on the user's behalf A first jump connector shown in FIG. 42 is a TO DIAGNOSTICS jump connector 1252 directing operation to FIG. 43. Referring now to FIG. 43, after a DIAGNOSTICS connector 1310, the F-SAFF 116 transmits a fax connect/hold command to the router 112 in step 1312. In step 1314, the F-SAFF 116 first listens for CNG fax tones from the local facsimile machine 130 and, if not detecting the tones, plays one or more audio voice prompts requesting the local user to press the start button on the local facsimile machine 130. Although not shown after step 1314 the F-SAFF 116 will simply hang-up and exit if fax tones are never received. Likewise, in any other place throughout the flowcharts of the present invention where a large wait time could be encountered, the F-SAFF 116 will hang-up the line and exit, scheduling any necessary follow-up events or providing one or more retries if practical. When the fax tones are finally detected at the F-SAFF 116, the F-SAFF 116 will receive facsimile information transmitted from the local facsimile machine 130 corresponding to a document placed in the local facsimile machine 130 by the user. If the facsimile information is not received successfully, the NO branch of decision block 1318 will be taken to step 1340 where any facsimile information stored during the transmission is deleted, after which the F-SAFF 116 will create a failure report in step 1342 and then jump through jump connector 1344 to FIG. 44, discussed in greater detail below.

Otherwise, if the transmission is successful, a diagnostics report is created in step 1320 including details about the transmission, such as connection speed, resolution, G3 (or other more advanced standard) features supported by the local facsimile machine 130, etc. Subsequently, the F-SAFF 116 transmits a fax connect command to the router 112 in step 1322, listens for fax tones (CED tones) and prompts as necessary in step 1324, records and adds to the diagnostics report additional facsimile transmission details regarding the ability of the local facsimile machine 130 to receive facsimile information in step 1326, transmits the created diagnostics report and the stored facsimile information in step 1328, and hangs up the line in step 1330. If the transmission is successful, the F-SAFF 116 deletes the report and facsimile information from storage in step 1334 and exits through step 1336. On the other hand, if the. transmission is not successful, records are added to the scheduler database 996 for subsequent delivery of the diagnostics report and the facsimile information, as is discussed below with respect to FIG. 94.

Figure 44:
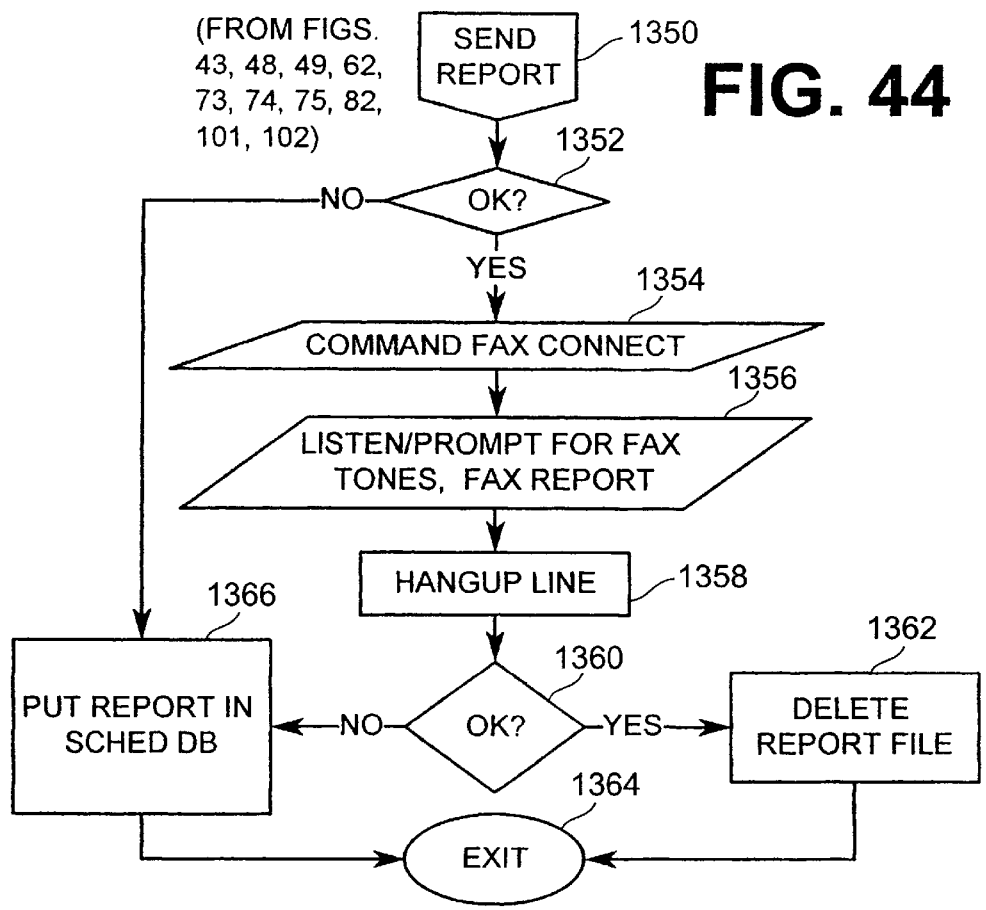
FIG. 44 is a flow chart representation of the send report routine referenced by FIG. 43.

Jump connector 1344 in FIG. 43 directs operation to FIG. 44 when a failure report is to be delivered. In addition, as shown in FIG. 44 and discussed in many instances below, other routines of the present invention direct operation to the send report routine 1349 of FIG. 44, including FIGS. 48, 49, 62, 73, 74, 75, 82, 101, and 102 for sending various types of reports to a facsimile machine 130. Referring now to FIG. 44, if the router 112 is successful in holding the line open after the erroneous facsimile transmission, an "A" will be received by the F-SAFF 116 so that the YES branch of decision block 1352 is taken to step 1354 where the F-SAFF 116 transmits a fax connect command to the router 112. Subsequently, the F-SAFF 116 listens for, and if absent prompts a user for, fax tones after which the generated report is transmitted by the F-SAFF 116 in step 1356. In step 1358, the F-SAFF 116 hangs up the line, and in decision block 1360, the F-SAFF 116 determines whether the facsimile transmission was successful. If so, the report is deleted from storage in step 1362, and the routine ends in step 1364. Otherwise, and also if the connection with the facsimile machine 130 was lost before decision block 1352, the report is scheduled in step 1366.

Figure 45:
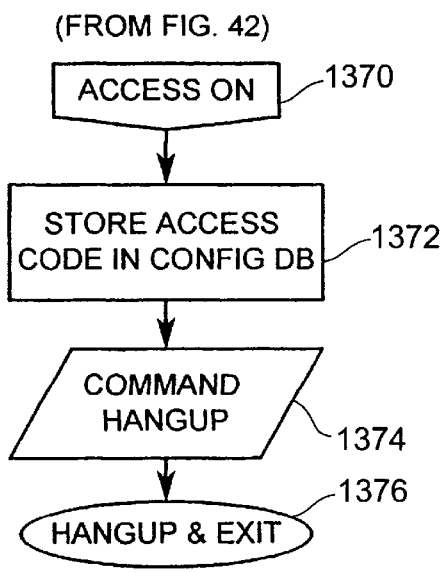
FIG. 45 is a flow chart representation of the access on routine referenced by FIG. 42.
Figure 46:
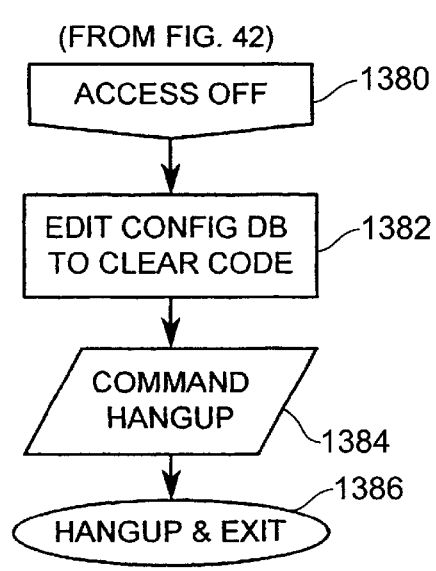
FIG. 46 is a flow chart representation of the access off routine referenced by FIG. 42.

Referring briefly back to FIG. 42, a TO ACCESS ON jump connector 1254 and a TO ACCESS OFF jump connector 1256 direct operation to FIG. 45 and FIG. 46, respectively, when determining that the local user desires to change the configuration of the facsimile access restriction method of the preferred embodiment of the present invention. Referring now to FIG. 45, in step 1372, the F-SAFF 116 simply stores in the router CONFIG database 1006 (FIG. 33) the access code included in the command from the router 112. Subsequently, the router 112 is commanded to hang-up in step 1374 before the F-SAFF 116 hangs up and exits in step 1376. Referring now to FIG. 46, in step 1382, the F-SAFF 116 edits the CONFIG database 1006 to clear the previously entered access code before commanding the router 112 to hang-up in step 1384 and hanging up and ending the routine in step 1386. By saving the access code at the F-SAFF 116, the facsimile store and forward system 10 of the present invention is not vulnerable to an unauthorized individual simply removing power to the router 112 since, upon subsequent download of RAM, the router 112 will be given the same access code to restrict usage.

Figure 47:
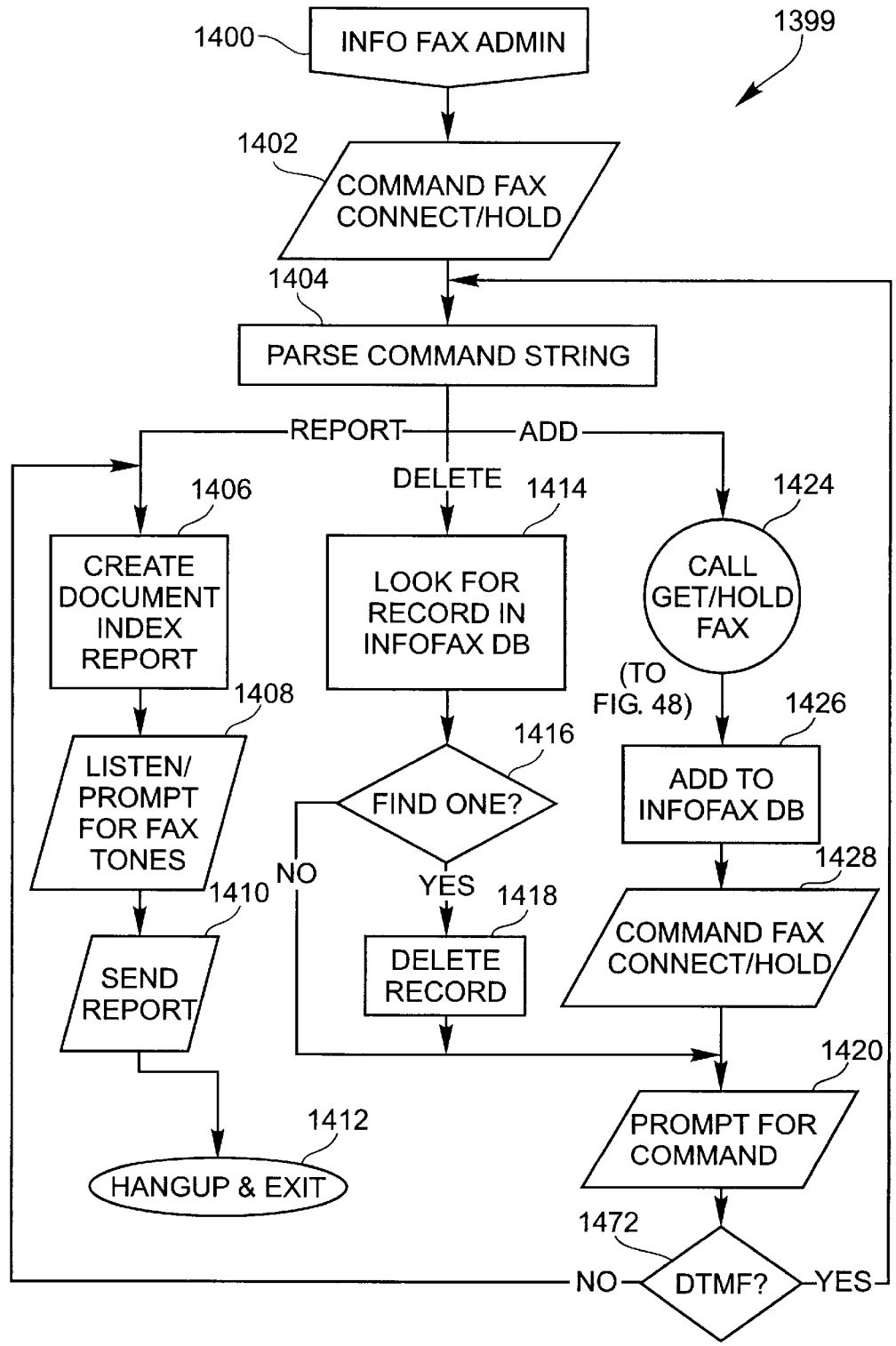
FIG. 47 is a flow chart representation of the info fax admin routine referenced by FIG. 42.

Referring now to FIG. 47, an information facsimile service administration routine 1399 is shown beginning with an INFO FAX ADMIN connector 1400 which is reached when the F-SAFF 116 determines that a user has input a command evidencing a desire to submit facsimile information for use with either the facsimile information send or the facsimile information retrieve methods of the present invention and directs operation through a jump connector 1258 in FIG. 42. The F-SAFF 116 first transmits a fax connect/hold command to the router 112 in step 1402 and then, in step 1404, parses the command received from the router 112 to determine which action should be taken. In addition, as discussed below with respect to step 1420 and decision 1422, the user is given the ability to supply additional commands to the F-SAFF 116, which are also parsed by step 1404. If the command requests that an index report be generated and transmitted to the local facsimile machine 130, the REPORT branch from step 1404 is taken to step 1406 where an index report is generated. Examples of acceptable types of information found on an index report for the INFO FAX method of the present invention include, for example, actions taken during this telephone call, all document retrieval codes for that router 112, the number of pages per document, the date last updated, etc. After the report is generated, the F-SAFF 116 listens for fax tones from the local facsimile machine 130 in step 1408, sends the index report in step 1410, and exits after hanging up in step 1412. On another hand, if the command parsed in step 1404 requests a deletion of an INFO FAX document corresponding to facsimile 27 previously stored on the F-SAFF 116, the DELETE branch is taken to step 1414 where the F-SAFF 116 looks for a corresponding record in the INFOFAX database 1000. If such a record is found, the YES branch of decision block 1416 is taken to step 1418 where the record and corresponding facsimile information is deleted. After such a deletion, or if a record was not found, operation proceeds to step 1420 where the F-SAFF 116 transmits audio voice prompts to the user prompting the user to enter an additional command through pressing DTMF keys on the local facsimile machine 130. If no DTMF digits are received within a predetermined amount of time, the NO branch of decision block 1422 loops back up to step 1406 where an index report is generated and sent to the local facsimile machine 130 as discussed above. Otherwise, the YES branch of decision block 1422 is taken back up to step 1404 where the DTMF digits are analyzed in step 1404. Finally, if the command analyzed by step 1404 is a command attempting to add information currently waiting to be scanned and transmitted from the local facsimile machine 130, the ADD branch is taken from step 1404 to call connector 1424 which directs operation to a get/hold fax subroutine 1439 shown in FIG. 48 where facsimile information is received from the facsimile machine 130, as is discussed in detail below. After the facsimile information is received in the get/hold subroutine 1439, operation returns to step 1426 where a record is added to the INFOFAX database 1000, after which the F-SAFF 116 transmits another fax connect/hold command to the router 112 before step 1420 is again encountered to proceed as discussed above.

Figure 48:
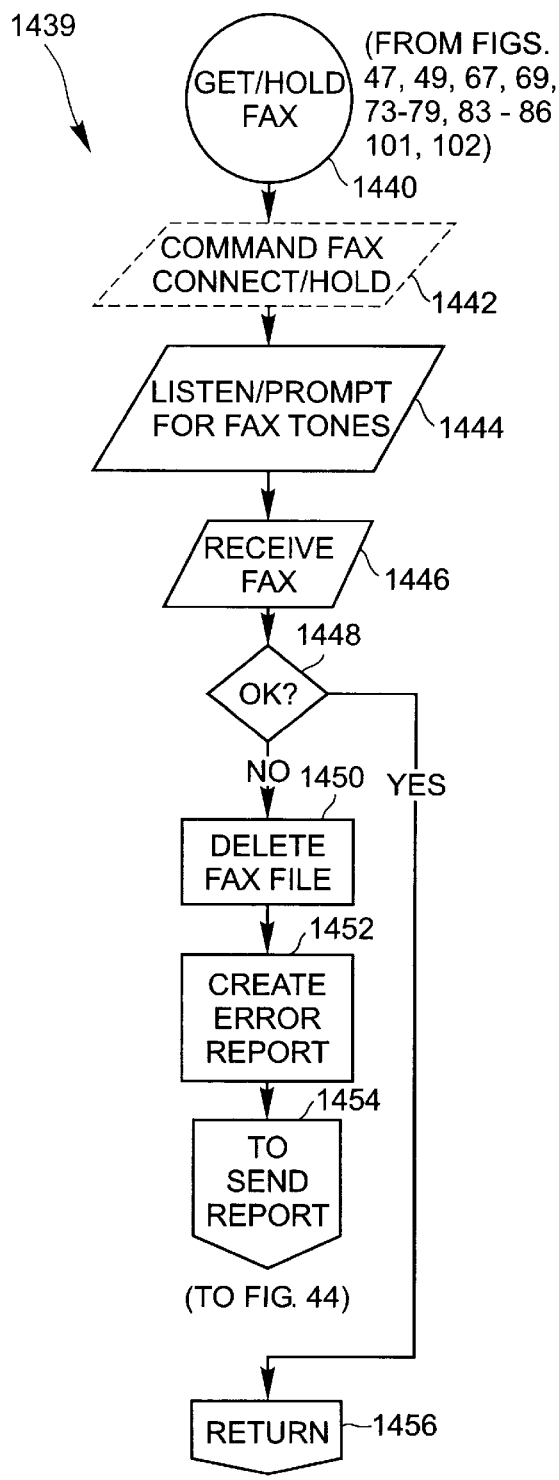
FIG. 48 is a flow chart representation of the get/hold fax routine referenced by FIG. 47.

Refer now to FIG. 48 which shows a get/hold fax subroutine 1439 beginning with the GET/HOLD FAX connector 1440 which is called by many processes, including those found in FIGS. 47, 49, 67, 69, 73–79, 83–86, 101, and 102). The F-SAFF 116 begins in step 1442 by transmitting a connect/hold command to the router 112. Step 1442 is shown in dotted lines to indicate that the F-SAFF 116 does not send such a command if the router 112 is already in a connect/hold mode as a result of the F-SAFF 116 having previously sent such a command. Then, in step 1444, the F-SAFF 116 listens for fax tones from the facsimile machine 130 and prompts for the user to press the start key on the facsimile machine if the tones are not detected. The facsimile information is then received and stored in step 1446. If the transmission is successful, the YES branch of decision block 1448 is taken to return connector 1456 which returns operation to the point before the get/hold fax subroutine 1439 is called. Otherwise, any facsimile information received during step 1446 is deleted in step 1450, an error report is created in step 1452, and operation is directed back to FIG. 44 through jump connector 1454 where the error report is sent or scheduled to be sent to the facsimile machine 130.

Figure 101:
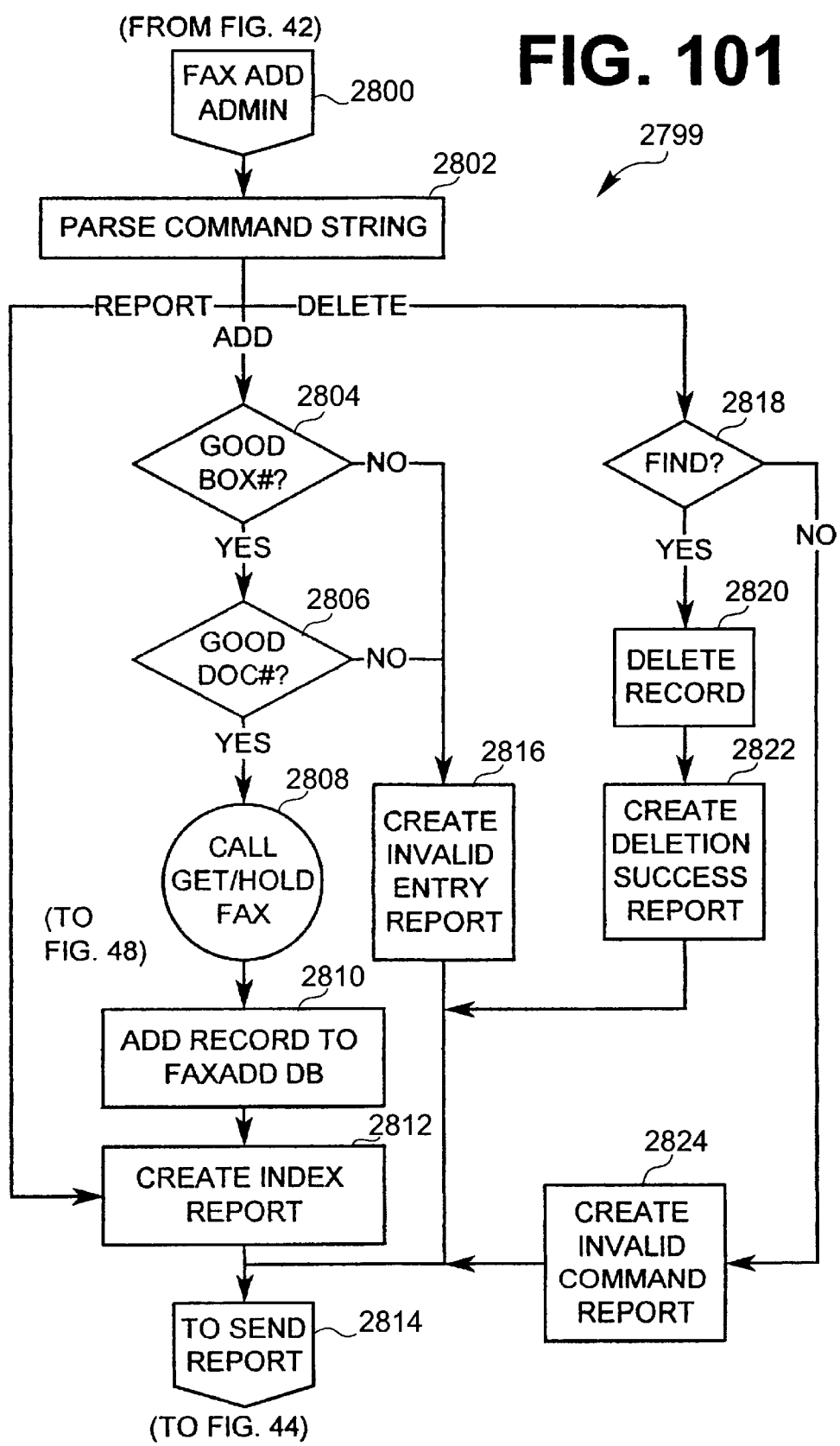
FIG. 101 is a flow chart representation of the fax add admin routine referenced by FIG. 42.

Referring back to FIG. 42, when the F-SAFF 116 receives a command evidencing a user's desire to submit facsimile information for use with the facsimile addition method of the present invention, a facsimile addition administration method is initiated through a FAX ADD ADMIN jump connector 1259 to FIG. 101. In accordance with the preferred embodiment of the present invention, the facsimile addition method of the present invention provides a user the ability to conveniently transmit ad hoc combinations of facsimile information by temporarily storing a first portion of facsimile information at the F-SAFF 116 until a second portion of information is received and matched with the first portion, at which time the combination facsimile information is transmitted to the destination identified during the first transmission. Since the facsimile addition method of the preferred embodiment of the present invention is especially useful when a user desires to send information stored in a facsimile equipped computer 132*a* along with information embodied in a physical document, this method will be described in terms of sending combination transmissions consisting of information from a facsimile equipped computer 132*a* during a facsimile addition administration routine and information from a conventional facsimile machine 130*a* during a facsimile addition usage routine.

Referring now to FIG. 101, a facsimile addition administration routine 2799 is shown beginning with a FAX ADD ADMIN connector 2800, and in step 2802, the F-SAFF 116 parses the command received from the router 112 to determine whether a user is desiring to add information, delete information, or simply request an index report. Commands for the facsimile addition administration method 2799 typically include a desired operation indication, a facsimile mailbox number, a facsimile addition document number, and a destination telephone number. If the command includes a desired operation indication identifying the command as an add command, operation proceeds to decision blocks 2804 and 2806 where the F-SAFF 116 determines if the mailbox number has been defined for the router 112 and if the facsimile addition document number is an available number. If so, a call connector 2808 directs operation to the get/hold fax subroutine of FIG. 48 where facsimile information is received from the facsimile equipped computer 132*a*, as is discussed above in terms of a conventional facsimile machine 130, yet easily understood in terms of the facsimile equipped computer 132*a*. After the facsimile information is received and stored, a record is added to the FAXADD database 1008 in step 2810 including the destination telephone number, the facsimile mailbox number, and facsimile addition document number associated with the facsimile information. Subsequently, and as if only an index report were requested originally, an index report is created according to step 2812. Finally, operation is directed through a jump connector 2814 back to the send report routine of FIG. 44 where, as discussed above, the index report is sent back through the router 112 or scheduled for later delivery. Referring back to decision blocks 2804, 2806, if the command contains an invalid facsimile mailbox number or facsimile addition document number, the F-SAFF 116 creates an invalid entry report in step 2816 before jumping to the send report routine of FIG. 44. Also, the DELETE branch is taken from step 2802 to decision block 2818 if a delete operation is identified by the command received from the router 112. If the facsimile addition document number is not found, an invalid command report is created in step 2824 and transmitted back to the facsimile equipped computer 132*a* through the send report routine of FIG. 44. Otherwise, the corresponding record is deleted from the FAXADD database 1008 in step 2820, and a deletion success report is created in step 2822 for transmission through the send report routine of FIG. 44.

Figure 49:
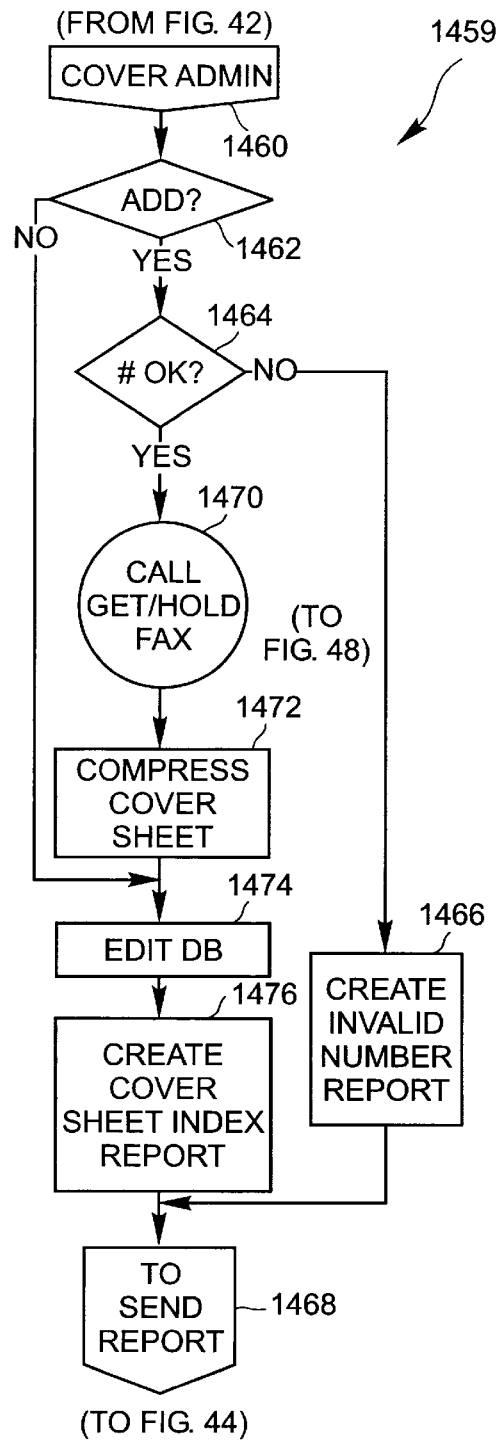
FIG. 49 is a flow chart representation of the cover admin routine referenced by FIG. 42.

Refer briefly back to FIG. 42. When a command is entered evidencing a user's desire to submit or delete information for use with the facsimile cover or the facsimile speed cover method of the present invention, a facsimile cover administration method is initiated when operation is directed through a COVER ADMIN jump connector 1260 to FIG. 49. Referring now to FIG. 49, a cover administration routine 1459 is shown beginning with a COVER ADMIN connector 1460. Since a command for the facsimile cover administration routine 1459, and many other commands of other methods of the present invention, can include multiple requests for additions and deletions, after connector 1459, the cover administration routine 1459 analyzes the command in step 1462 to determine if the command contains an indication that the user desires to send additional facsimile information to the F-SAFF 116. If the user indicated a desire to submit additional information, the YES branch of decision block 1462 is taken to decision block 1464 where the F-SAFF 116 determines if the cover number entered by the user to be assigned to the facsimile information has already been assigned. If so, the YES branch is taken to step 1466 where an invalid number report is generated, after which jump connector 1468 directs further operation to the send report routine of FIG. 44 where the invalid number report is sent or scheduled to be sent to the local facsimile machine 130. If the cover number is not already assigned, the YES branch of decision block 1464 is taken to call connector 1464 which calls the get/hold fax subroutine of FIG. 48 to receive cover facsimile information from the facsimile machine 130. After receiving the facsimile cover information, operation returns to step 1472 where the facsimile cover information is compressed into a smaller image. Then, in step 1474, to which the NO branch of decision block 1462 is also shown connected, the F-SAFF 116 edits the COVERFAX database 993 by deleting previously stored facsimile cover information and/or assigning a cover number, with or without a destination telephone number, to received facsimile cover information, according to the command received from the user. Subsequently, a cover sheet index report is created in step 1476 and sent or scheduled to be sent to the local facsimile machine 130 through the send report subroutine of FIG. 44.

Figure 50:
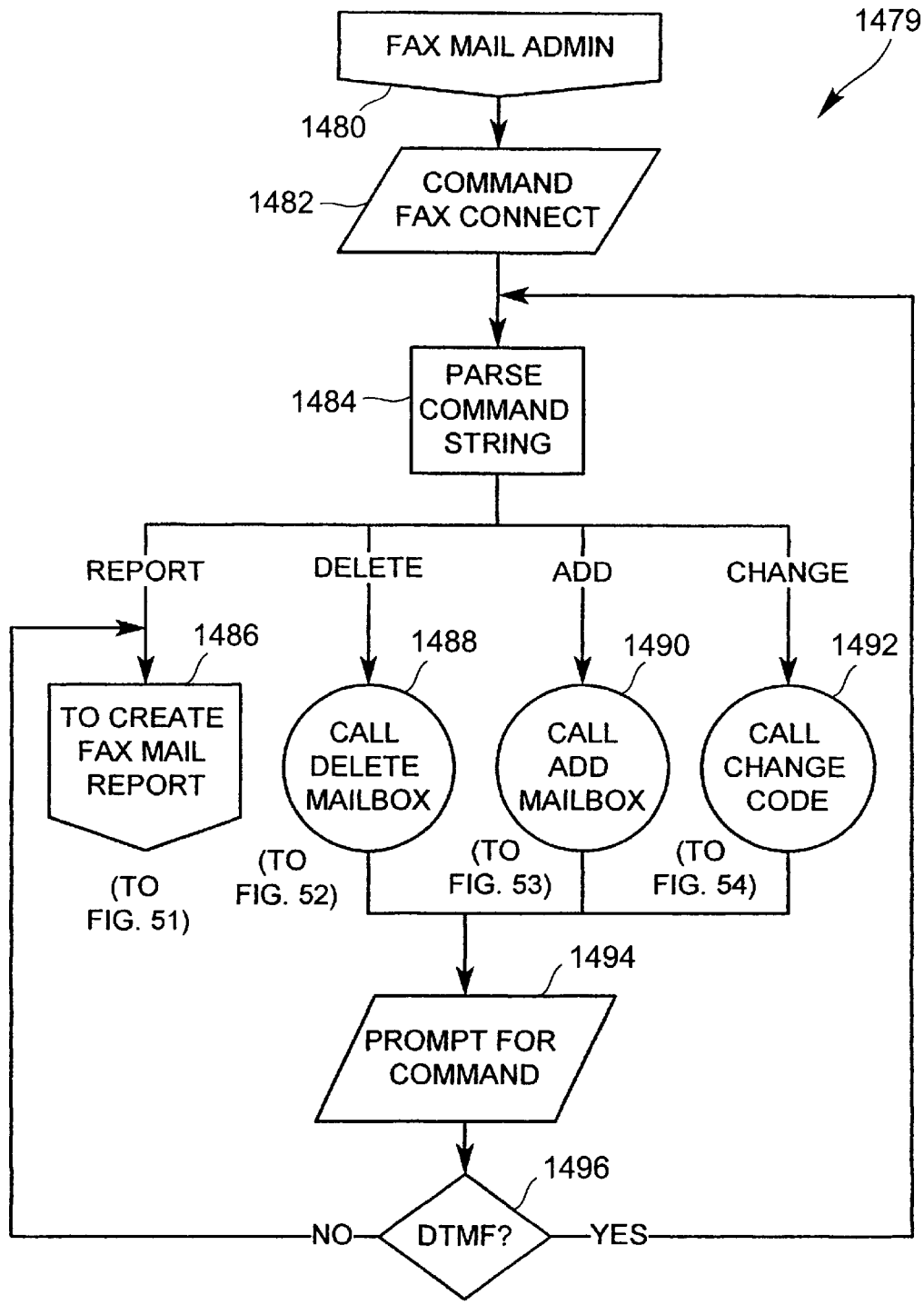
FIG. 50 is a flow chart representation of the fax mail admin routine referenced by FIG. 42.

Referring again to FIG. 42, a fax mail administration method is initiated through jump connector 1262 to FIG. 50 as a result of a command regarding fax mailbox configuration for the router 112. Referring to FIG. 50, a fax mail administration method 1479 begins after a connector 1480 with step 1482 where the F-SAFF 116 transmits a fax connect command to the router 112. The fax mail administration method 1479 is in many ways similar to the info fax administration routine 1399 of FIG. 47. In step 1484, the fax mail administration command is parsed. If a report is requested in a command, the REPORT branch is taken to jump connector 1486 where operation is directed to FIG. 51, which also takes place after no DTMF digits are sensed in decision block 1496. If the user requests a deletion of a mailbox, a call connector 1488 calls a delete mailbox routine of FIG. 52, after which the user is prompted for another command and returned to step 1484 if a DTMF command is entered at the local facsimile machine 130. Likewise, if the fax mail administration command includes a request to add a mailbox or change the passcode of a mailbox, call connectors 1490 or 1492, respectively, direct operation to FIG. 53 or FIG. 54, respectively, before returning to step 1494.

Referring now to FIG. 51, a create fax mail report routine 1499 is shown beginning with a connector 1500. Subsequently, the F-SAFF 116 creates a mailbox index report, listens for, and prompts in the absence of, fax tones from the local facsimile machine 130, and sends the mailbox index report to the local facsimile machine 130 before hanging up the telephone line and ending the routine. FIG. 52 shows a delete mailbox subroutine 1509 called from the call connector 1488 in FIG. 50. In step 1512, the F-SAFF 116 looks for a mailbox record in the FAXMAIL SETUP database 1007 corresponding to the mailbox number the user wishes to delete. If the record is not found, the NO branch of decision block 1514 is taken to return connector 1520 which directs operation back to FIG. 50. Otherwise, if a record corresponding to the mailbox number is found, a delete flag is set on the record in step 1516, and the expire time for the record is set to a point in the near future, according to step 1518, before returning through connector 1520. Referring now to FIG. 53, an add mailbox subroutine 1529 is shown beginning with connector 1530. In step 1532, the F-SAFF 116 looks for a record in the FAXMAIL SETUP database 1007 matching the number of the mailbox the user wishes to add. If the number is not found, the record is added to the database 1007 in step 1538, and operation returns to FIG. 50 through a return connector 1540. Otherwise, if the record is found and set to be deleted, the delete flag is unset and the expiration time of the record is reset before returning to FIG. 50 through the connector 1540. Referring to FIG. 54, a change code routine 1549 is shown beginning with connector 1550 and step 1552 where the FAXMAIL SETUP database 1007 is checked for the mailbox number which the router command is attempt to change. If the mailbox number is not found in the FAXMAIL SETUP database 1007, the NO branch of decision block 1554 is taken to step 1564 where a "wrong code" audio message is played through the router 112 to the local facsimile machine 130 before operation is returned to FIG. 50 through connector 1562. Otherwise, if the record is found, the passcode in the record is compared with the passcode entered in the command as the old passcode. If the passcodes match, the code is changed in step 1560 before returning to FIG. 50, and otherwise plays the "wrong code" audio message in step 1564 before returning. The "wrong code" message is also indicated on the fax mail report which is transmitted to the local facsimile machine 130, as is also the case with other audio messages and reports of other services of the present invention.

Figure 55:
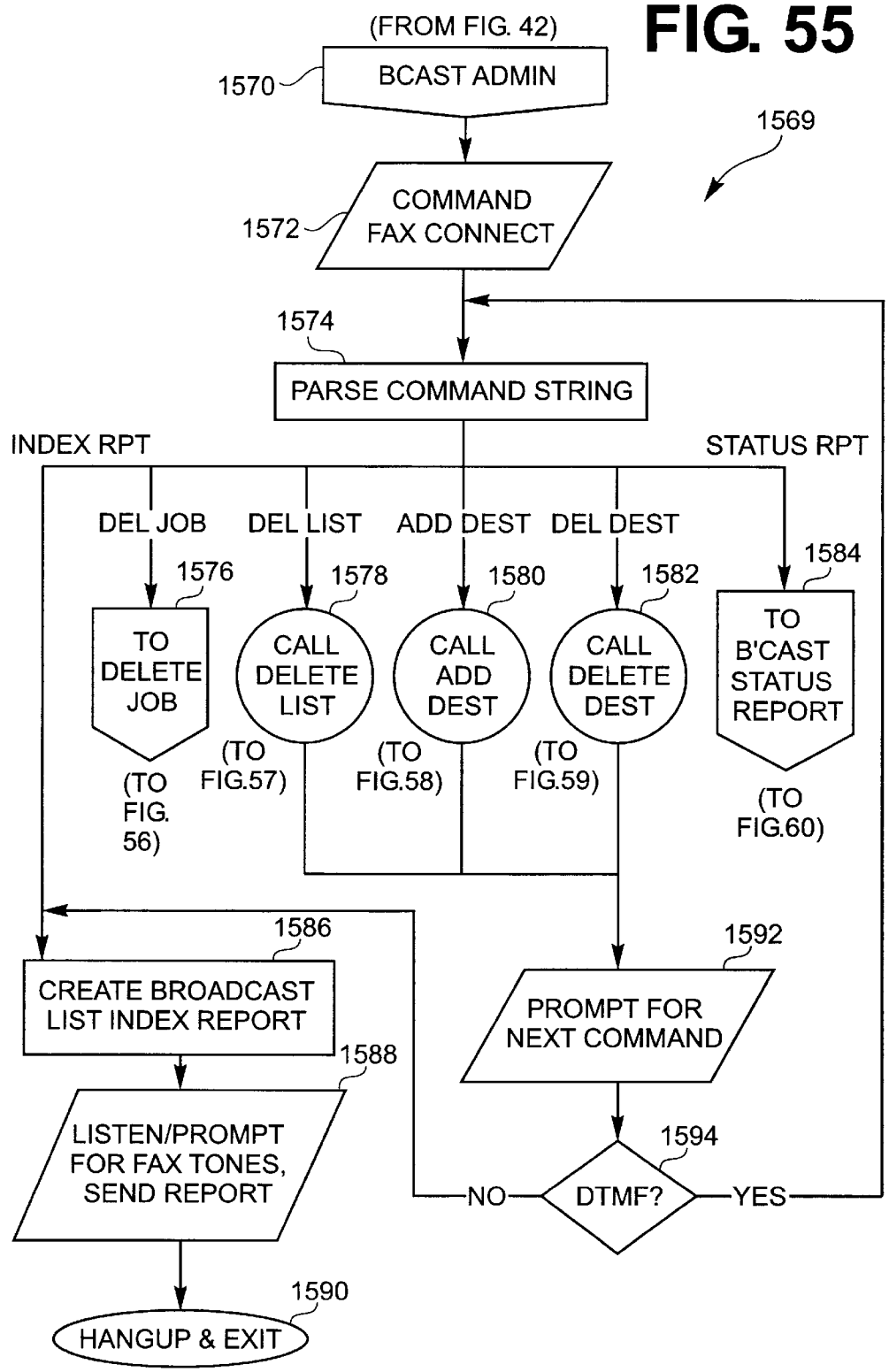
FIG. 55 is a flow chart representation of the broadcast admin routine referenced by FIG. 42.

FIG. 55 shows a facsimile broadcast administration routine 1569 which is referenced by a jump connector 1264 in FIG. 42 and invoked when a caller inputs a command evidencing a desire to change broadcast settings within the F-SAFF 116. Like the previous fax mail administration routine of FIG. 50 and the information facsimile administration routine of FIG. 47, the facsimile broadcast administration routine 1569 of FIG. 55 includes a step 1572 where the F-SAFF 116 transmits a fax connect command to the router 112 before a parsing step 1574. Subsequently, if the command contains an index report request, the INDEX RPT branch directs operation to step 1586 where a broadcast list index report is created including broadcast list numbers and destination numbers assigned to the list numbers. Then, in step 1588, the F-SAFF 116 listens/prompts for fax tones and sends the index report, followed by a hang-up and exit in step 1590. If a delete broadcast job request is received in the broadcast administration command, the DEL JOB branch is taken to jump connector 1576 which directs operation to FIG. 56. If a delete list, add destination, or delete destination request is included in the command, the DEL LIST, ADD DEST, or DEL DEST branches, respectively, are taken to call FIG. 57, 58 or 59, respectively. Upon returning, the F-SAFF 116 prompts the user for another command in step 1592 before looping back to step 1574 if a command is received or continuing with step 1586 when no additional command is received. Finally, the STATUS RPT branch is taken to jump connector 1584 which directs operation to FIG. 60 when the user requests a broadcast status report indicating the states of pending broadcast jobs.

Figure 56:
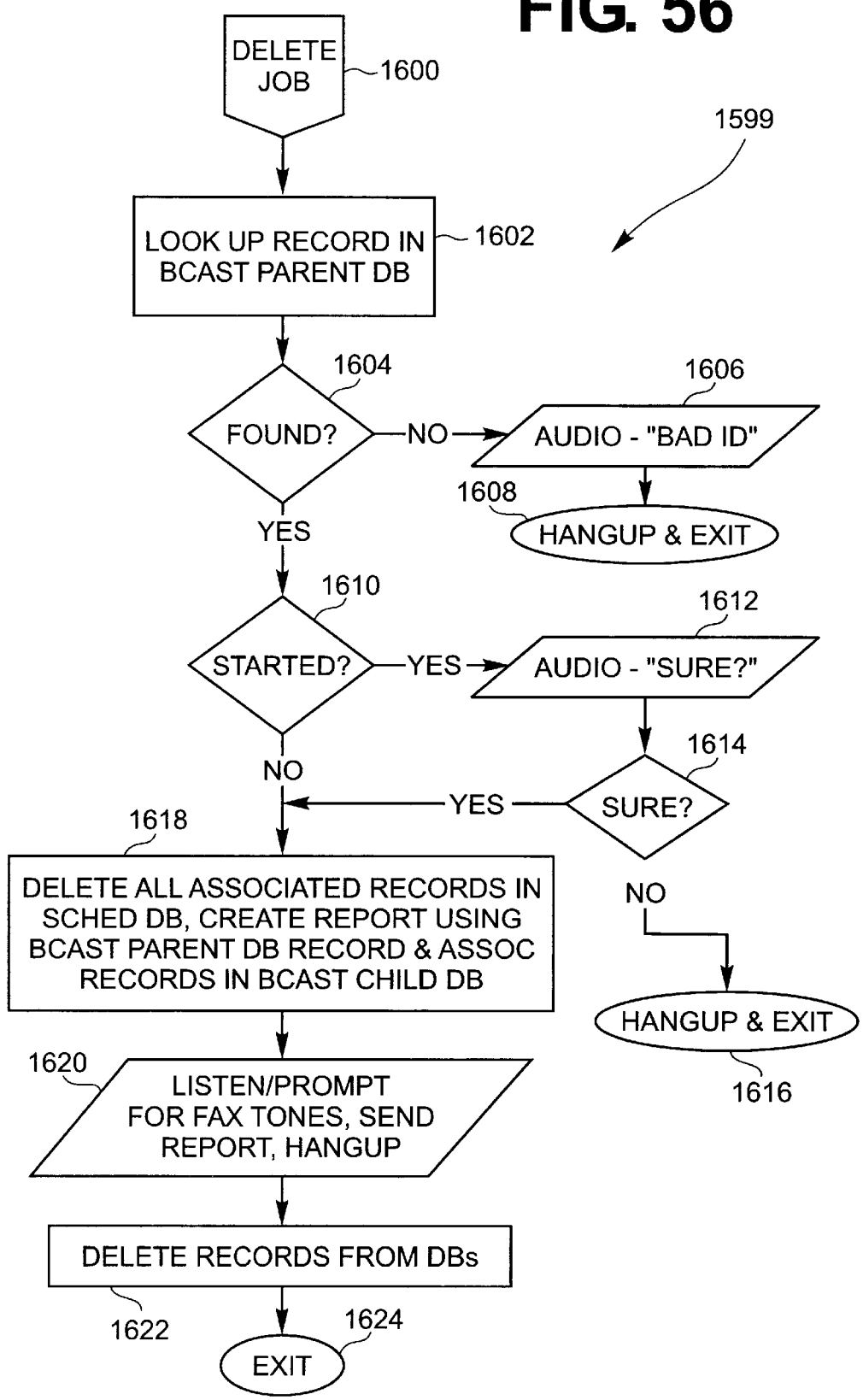
FIG. 56 is a flow chart representation of the delete job routine referenced by FIG. 55.

Referring now to FIG. 56, a delete broadcast job routine 1599 is shown in FIG. 56 where the F-SAFF 116 looks up a broadcast job by its job identification number which is supplied by the user in the broadcast administration command. If the record is not found within the BCAST PARENT database 998 in step 1602, the NO branch of decision block 1604 is taken to step 1606 where the F-SAFF 116 plays an audio message to the user informing the user that a bad job identification number was entered, and then hangs up the line and exits in step 1608. On the other hand, if the record is found, the F-SAFF 116 determines in step 1610 if deliveries have already started to at least one of the destinations. If so, an audio message requesting a verification of the deletion is played in step 1612, with operation ending in step 1616 if the user changes his or mind or continuing with step 1618, just as if the job had not begun. In step 1618, all associated records in the SCHEDULER database 996 are deleted, and a report with the broadcast job information is generated. In step 1620, the F-SAFF 116 listens/prompts for fax tones, sends the report, and hangs up before deleting the broadcast records in step 1622 and exiting in step 1624.

If the user requests a list deletion, a delete list subroutine 1629 in FIG. 57 is called by the facsimile broadcast administration routine of FIG. 55. According to steps 1632 and 1634, if a record is found within the BCAST1 database 1003 having the serial number of the calling router 112 and the designated broadcast list number, the BCAST1 record is deleted, step 1636, along with associated records in the BCAST2 database 1004, step 1638, before operation returns through connector 1640. Otherwise, the NO branch of decision block 1634 is taken so that no action is taken and operation returns to FIG. 55. FIG. 58 shows an add destination routine 1641 which, in step 1644, looks for a record in the BCAST1 database 1003 with the router serial number and the broadcast list number. If a record is not found in step 1650, according to step 1646, a record is added to the BCAST1 database 1003, and an associated record for the destination is inserted into the BCAST2 database 1004 before operation returns through jump connector 1648. On the other hand, if a BCAST1 record is found, the F-SAFF 116 verifies in decision block 1652 that the maximum number of destination telephone numbers has not been reached, otherwise directing operation to step 1654 where an "illegal entry" audio message is played to the user before returning to FIG. 55. If the limit has not been reached, the F-SAFF 116 then looks for the destination telephone number in a BCAST2 record, also directing operation to step 1654 upon finding a matching BCAST2 record. In an alternate embodiment of the present invention, duplicate broadcast destinations are allowed. Finally, the F-SAFF 116 verifies in step 1660 that the destination telephone number is a valid number, otherwise directing operation to step 1654. If the telephone number is valid, step 1662 indicates that a BCAST2 record is added and the BCAST1 record is modified to increase the number of destinations for a particular list number before operation returns to FIG. 55. A delete destination subroutine 1669 is shown in FIG. 59. In step 1672, the F-SAFF 116 looks for a record in the BCAST2 database 1004 with the destination telephone number. If the record is not found, an "illegal destination deletion command" audio message is played in step 1675 before returning through connector 1676 to FIG. 55. Otherwise, if the BCAST2 record is found, it is deleted in FIG. 1678, and the corresponding BCAST1 record is edited in step 1680 before returning to FIG. 55. FIG. 60 shows a broadcast status report routine 1689. In step 1692, the F-SAFF 116 looks for a BCAST parent record corresponding to the job identification number entered by the user and contained in the broadcast administration command. If the record is not found, step 1696 indicates that an "illegal broadcast job identification number" audio message is played to the user before the F-SAFF 116 hangs up the line and exits the routine at step 1698. Otherwise, if a BCAST parent record is found matching the input job ID, a report is created in step 1700 detailing the status of the job. The F-SAFF 116 then listens/prompts for fax tones and sends the report in step 1702 before hanging up and exiting in step 1698.

Figure 61:
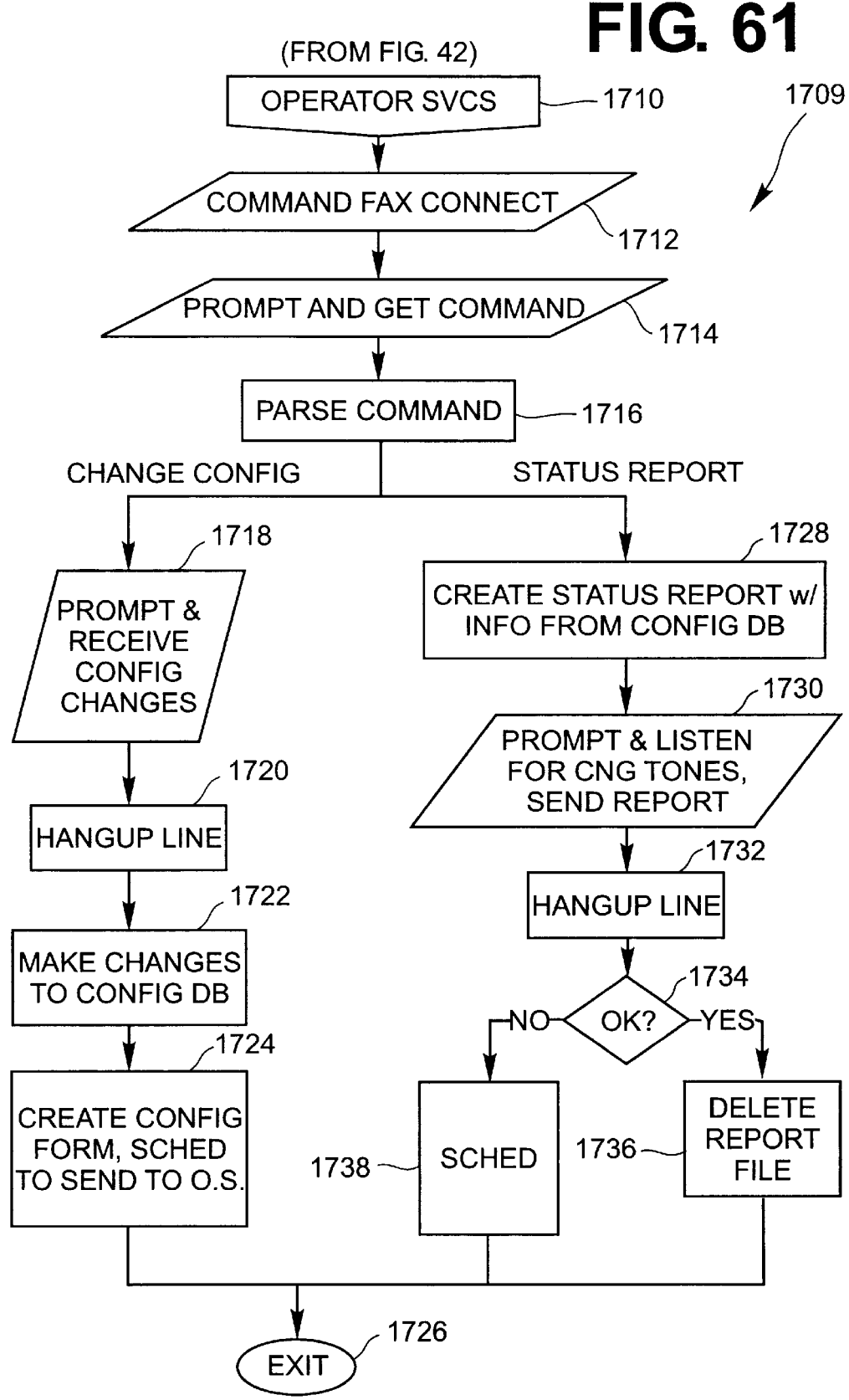
FIG. 61 is a flow chart representation of the operator services routine referenced by FIG. 42.

If the user enters a command evidencing a desire to access an operator service, an operator services routine 1709 shown in FIG. 61 is executed after being directed from FIG. 42 through a jump connector 1266. After commanding the router 112 to connect the local facsimile machine 130 by transmitting the fax connect command in step 1712, the F-SAFF 116 transmits voice prompts to the user prompting the user for a command in step 1714, after which the command is parsed in step 1716. Among others, exemplary operator services include making changes to the configuration of a particular router 112 or receiving a report describing the current configuration of the router 112, as understood by the F-SAFF 116. If a user evidences a desire to make a change to the current configuration for the calling router 112, the CHANGE CONFIG branch is taken to step 1718 where the user is prompted for the changes, and where the F-SAFF 116 receives the users responses. The F-SAFF 116 then hangs up the line in step 1720, makes the appropriate changes to the CONFIG database 1006 in step 1722, and, in step 1724, creates and schedules to be sent to the operator station platform 120 a configuration change report, after which operation ends in step 1726. If a status report is requested, the STATUS REPORT branch is taken to 1728 where a status report is created from information within the CONFIG database 1006 before the F-SAFF 116 listens and prompts for fax tones and sends the report in step 1730 and hangs up the line in step 1732. If the transmission was successful, the report file is deleted in step 1736, otherwise the report is scheduled for future delivery in step 1738.

Referring briefly back to FIG. 42, when a router 112 invokes the NNABS method of the present invention after a user dials a destination telephone number which is busy or does not answer, a connector 1270 directs further operation to FIG. 62. Refer now to FIG. 62 which shows an F-SAFF NNABS routine 1749 beginning after a connector 1750. In step 1752, the F-SAFF 116 transmits a fax connect/hold command to the router 112 before listening/prompting for fax tones in step 1754 and receiving/storing the facsimile information from the local facsimile machine 130 in step 1756. If the facsimile information is received in good form, a confirmation report is created in step 1760 before operation is directed to FIG. 63 through jump connector 1762 where the confirmation report is sent or scheduled to be sent to the router 112 and the F-SAFF 116 commands the router 112 to transfer the call to the destination telephone number in another attempt to deliver the facsimile information. Examples of acceptable types of information to be included on the confirmation report include the reason (busy or no answer) for the transfer to the F-SAFF 116, a job identification number, the time of the next status report, and a reduced image of the first page of the facsimile information. If the transmission is not successful in step 1756, the NO branch of decision block 1758 is taken to step 1764 where any stored facsimile information is deleted before an error report is created in step 1766 and operation is transferred to FIG. 44 through jump connector 1768 where the error report is sent or scheduled to be sent to the local facsimile machine 130.

Figure 63:
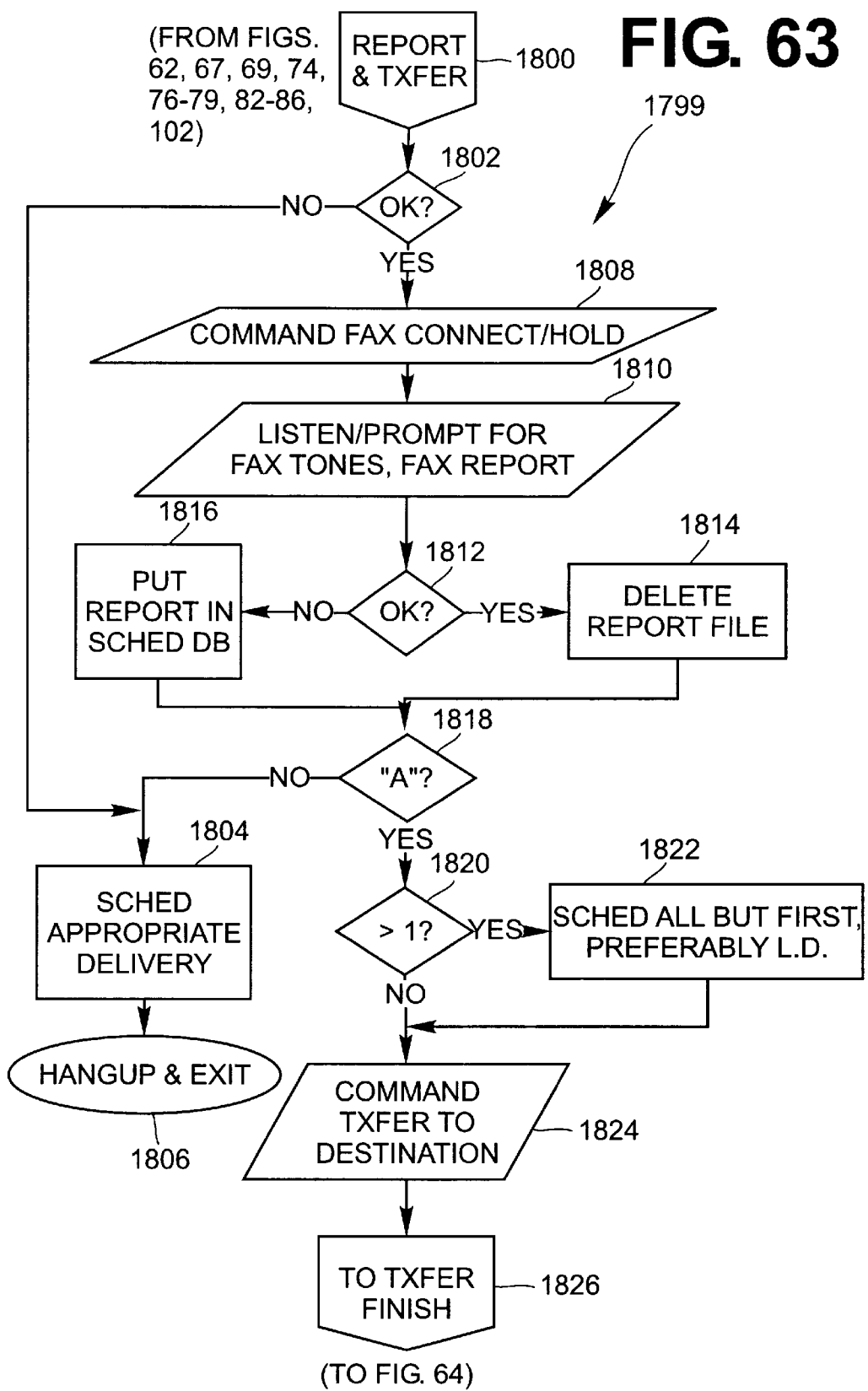
FIG. 63 is a flow chart representation of the report & transfer routine referenced by FIG. 62.

As directed by the jump connector 1762 in FIG. 62, refer now to FIG. 63 which shows a report and transfer routine 1799 to which many other processes of the present invention jump, including those in FIGS. 67, 69, 74, 76–79, 82–86, and 102 for immediately delivering a report to the router 112 and using the router 112 to make a phone call to a destination telephone number to deliver stored information. Much of the discussion regarding FIGS. 63 and 64 will become clearer with additional discussion regarding remaining methods. If the connection between the F-SAFF 116 and the router 112 has been lost before the report and transfer routine 1799 begins, the NO branch of decision block 1802 is taken to step 1804 where the report to be sent is scheduled for future delivery before the F-SAFF 116 hangs up the line and exits in step 1806. On the other hand, if the connection is good, the F-SAFF 116 transmits a fax connect/hold command to the router 112 in step 1808 and listens/prompts for fax tones before sending the report in step 1810. If the transmission is successful, the report file is deleted in step 1814 or, if the transmission is bad, scheduled for future delivery in step 1816. Then, if the F-SAFF 116 does not receive an "A" from the router 112 which would have indicated that the router 112 was successful in grabbing the line to hold the connection open, the F-SAFF 116 schedules any remaining deliveries for future delivery in step 1804 before hanging up and exiting in step 1806. Otherwise, if an "A" is received, operation continues with decision block 1820 where the F-SAFF 116 determines if the current method will deliver information to more than one destination. If so, step 1822 indicates that the F-SAFF 116 then picks the first long distance telephone number of the group of telephone numbers for immediate delivery (the term "long distance telephone number" should be understood to include any telephone number for which the caller would be charged a toll). If no long distance telephone number exists, then the F-SAFF 116 simply picks the first number in the group of telephone numbers. After choosing one telephone number for immediate delivery, the F-SAFF 116 schedules the deliveries to the remaining destinations. Then, regardless of the branch taken from decision block 1820, operation continues with step 1824 where the F-SAFF 116 transmits a command to the router 112 to transfer the F-SAFF 116 to a new destination, corresponding to the (first long distance) destination telephone number, after which the router 112 drops out of the connection and operation is directed to FIG. 64 through connector 1826.

Figure 64:
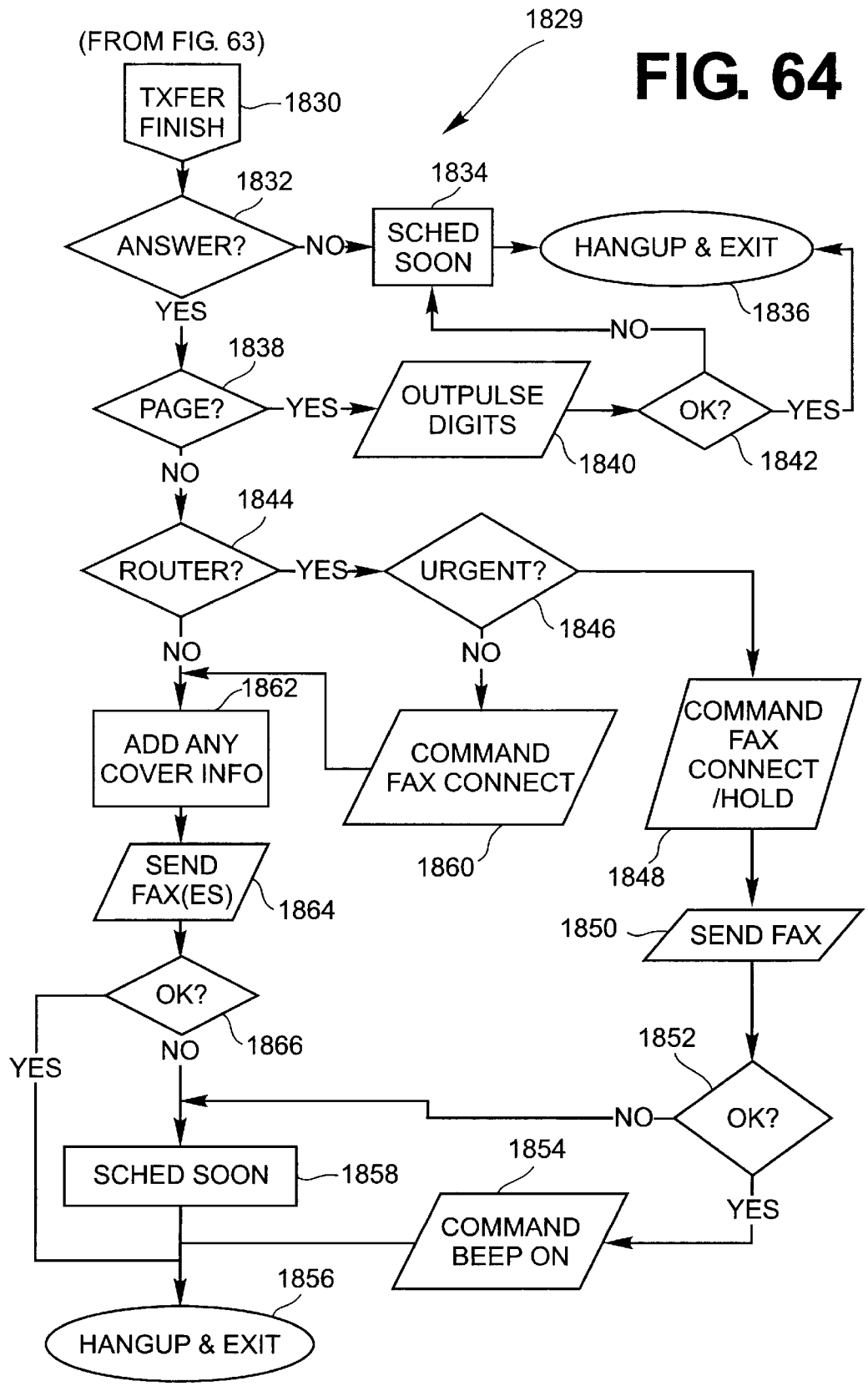
FIG. 64 is a flow chart representation of the transfer finish routine referenced by FIG. 63.
Figure 72:
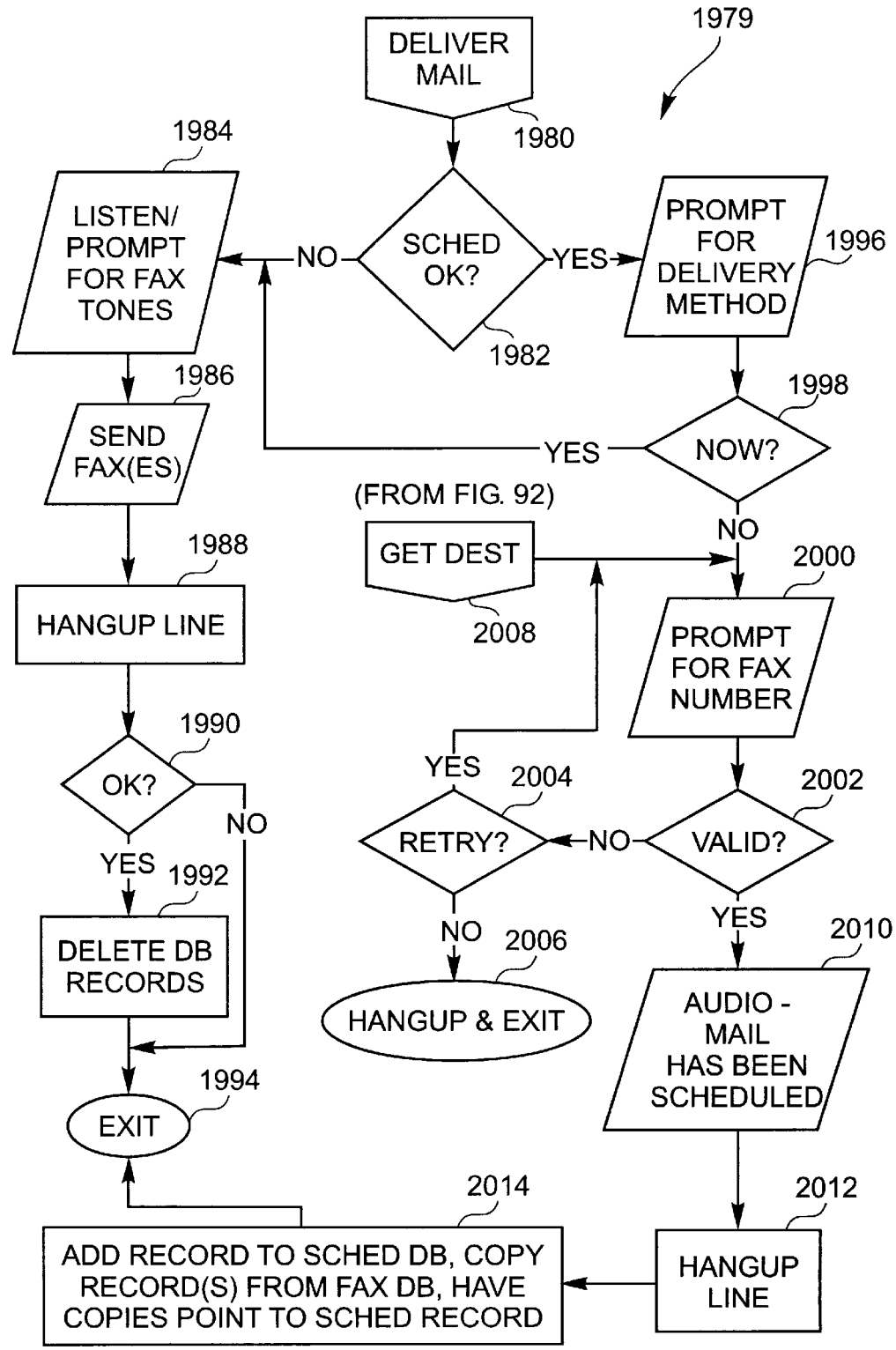
FIG. 72 is a flow chart representation of the deliver mail routine referenced by FIG. 71.

Continuing in FIG. 64, if no answer is detected within a predetermined amount of time, or if a busy signal is detected, after dialing the destination telephone number, NO branch of decision block 1832 is taken to step 1834 where the F-SAFF 116 schedules a soon delivery of the stored information before hanging up and exiting in step 1836. On the other hand, if an answer is detected, operation is directed through the YES branch of decision block 1832 to decision block 1838 where the F-SAFF 116 determines if the present method is a pager facsimile method. If so, in step 1840, the F-SAFF 116 outpulses digits identifying the telephone number of the router 112, a retrieval code, and the number of pages of stored facsimile information to the pager service answering the telephone call. Then, the F-SAFF 116 hangs up and exits in step 1836 if the transmission was successful, otherwise scheduling soon the delivery of the stored retrieval information in step 1834 before reaching step 1836. If the present method is not a pager facsimile method and a remote router 112n answers the telephone call transferred from the local router 112a, the YES branch of decision block 1844 is taken to decision block 1846 where the F-SAFF 116 determines whether the present method is an urgent method. If so, the YES branch is taken to step 1848 where the F-SAFF 116 transmits a fax connect/hold command to the remote router 130n after which the stored facsimile information is transmitted to the remote facsimile machine 130n in step 1850. If the transmission was successful, the F-SAFF 116 commands the remote router 112n in step 1854 to begin emitting an urgent beep before the F-SAFF 116 hangs up and exits in step 1856. If the transmission is not successful, the NO branch of decision block 1852 is taken to step 1858 where the stored information is scheduled for soon later delivery before the F-SAFF 116 hangs up and exits in step 1856. If the present method is not an urgent method, but a remote router 112n answered, the F-SAFF 116 transmits a fax connect command in step 1860 before reaching step 1862 which is reached directly if a remote router does not answer the call. In step 1862, the F-SAFF 116 determines if the present method is a facsimile cover method or a facsimile speed cover method. If so, delivery time and date information are added to the generated cover sheet. In any event, the stored information is transmitted to the remote facsimile machine in step 1864. If the transmission is not successful, the delivery is scheduled for the near future in step 1858, with the F-SAFF 116 hanging up and exiting in step 1856 regardless.

Refer now to FIG. 65 which is reached from a jump connector 1272 in FIG. 42 when a router 112 has completed an urgent call and needs to simply notify the F-SAFF 116 of the occurrence for billing purposes. A log urgent routine 1779 is shown FIG. 65 where the F-SAFF 116 simply updates the EVLOG database 1005 before commanding the router 112 to hang-up in step 1784 and hanging up and exiting in step 1786. A 3-digit code routine 1787 is shown in FIG. 66 and is reached through a jump connector 1274 in FIG. 42 when a user requests a service by dialing three identical digits assigned to a 3-digit command from the local facsimile machine 130. One example of an acceptable 3-digit code service includes providing national advertising information available to all routers 112 after a particular 3-digit code is entered. After the F-SAFF 116 determines the function associated with the 3-digit code in step 1790, the function is performed in step 1792 before the routine ends in step 1794. Thus, according to the above example, the F-SAFF 116 would transmit a fax connect command to the router 112, listen/prompt for fax tones, and deliver the requested stored facsimile information.

Referring momentarily back to FIG. 42, if the user requests a facsimile flexible broadcast method, a jump connector 1276 directs operation to FIG. 67. Refer now to FIG. 67 which shows a flexible broadcast method 1879 which calls the get/hold fax subroutine of FIG. 48 from call connector 1882 to, while keeping the router 112 on the line for further communication, receive/store facsimile information from the local facsimile machine 130 to be broadcast to multiple destinations identified in the command from the user. In step 1884, the F-SAFF 116 generates a unique job ID, a job start time, and an estimated finish time, and, in step 1886, the F-SAFF 116 adds one record to the BCAST PARENT database 998 and multiple records, corresponding to each destination, to the BCAST CHILD database 997 and then creates a job confirmation report including the information generated in step 1884, a reduced image of the first page of the stored facsimile information, and the destination telephone numbers to which the stored facsimile information will be delivered, the invalid numbers being indicated and not acted upon. Then, through jump connector 1888, operation is directed to FIG. 63 where the F-SAFF 116 attempts to immediately transmit the job confirmation report to the router 112 and then use the router to call the first, preferably long distance, destination telephone number and then transfer the call, while scheduling delivery to the remaining destinations. It should also be understood that the flexible broadcast method can be combined with most other methods of the present invention by simply stringing destination telephone numbers together, separated by a delineation digit. FIG. 68 shows a so-called one-touch facsimile broadcast method 1891 which is executed from a connector 1278 in FIG. 42 when a caller enters a broadcast usage command identifying a previously stored broadcast list. The F-SAFF 116 analyzes the command to identify the broadcast list number(s) and then looks to the BCAST1 database 1003 to determine if such a list has been previously created for that particular router 112. If so, the F-SAFF 116 reads the destination telephone numbers from the BCAST2 database 1004 before jumping to the flexible broadcast method 1880.

Refer now to FIG. 69 which shows a private facsimile method 1899 which is reached through a jump connector 1280 in FIG. 42. Since the user is given the option of choosing a retrieval code, which would be included in the command received from the router 112, the F-SAFF 116 first verifies that the retrieval code does not conflict with other commands or retrieval codes for the router 112. If a conflict exists, an error report is created and scheduled for delivery to the local facsimile machine 130 since a document is currently sitting in the local facsimile machine 130 waiting to be transmitted, the failure of which would also serve to notify the user of an unsuccessful command attempt. Subsequently, the F-SAFF 116 hangs up the line and exits the routine in step 1906. If a user-supplied retrieval code is satisfactory, or if no code was supplied by the user, the NO branch of decision block 1902 is taken to call connector 1908 which directs operation to the get/hold fax subroutine of FIG. 48 where facsimile information is received from the local facsimile machine 130. Then, if a retrieval code was not entered by the user, the F-SAFF 116 generates a retrieval code in step 1912 and, in any event, generates and stores a notification report and a job confirmation report and adds a record to the PRIVATE FAX database 992 in step 1914, after which operation is directed to the report and transfer routine of FIG. 63 where the job confirmation report is transmitted to the local facsimile machine 130a and the notification report is transmitted to a remote facsimile machine 130n after the router 112 transfers the call to the destination telephone number. The job confirmation report includes a job ID, a reduced image of the first page of the stored facsimile information, the retrieval code (user-supplied or system generated), the destination telephone number, and a delivery expiration time. The notification report includes the job ID, a reduced image of the first page of the stored facsimile information, retrieval instructions with the telephone number of the local facsimile machine 130, and the retrieval code if generated by the system, but not if user-supplied. Retrieval of the stored facsimile information is discussed in greater detail below in FIG. 90.

Refer now to FIG. 70 which shows a fax mail local routine 1919 which is reached through a jump connector 1282 in FIG. 42 when a user enters a command to store or retrieve information from the a previously established fax mailbox. A first step 1921 indicates that the F-SAFF 116 immediately transmits a connect/hold command to the router 112. After parsing the command in step 1922, the F-SAFF 116 determines if the command is valid, playing an "invalid command" audio message in step 1924 if the command is not valid before hanging up and exiting the routine in step 1926. If the command is valid and a store command, operation continues in FIG. 73 by virtue of jump connector 1930. Otherwise, the command is a retrieve command which directs operation to decision block 1932 where the F-SAFF 116 determines whether a mailbox passcode was entered with the command by the user. If not, and for a predetermined number of retries, the F-SAFF 116 prompts for the user to enter a passcode in step 1938. When a passcode is finally entered, operation is directed to FIG. 71 through jump connector 1934. Referring to FIG. 71, a check & retrieve routine 1949 is shown beginning with a connector 1950. Subsequently, the F-SAFF 116 checks the FAXMAIL SETUP database 1007 to determine if the router 112 has a mailbox assigned to the mailbox number entered in the command. If not, the F-SAFF 116 hangs up and exits in step 1954. Otherwise, the passcode is verified in step 1956, after which the user is given additional chances to enter the correct code if the entered passcode is incorrect, as shown by decision block 1958 and step 1960, before the F-SAFF 116 hangs up and exits in step 1962. If a valid passcode is entered, the F-SAFF 116 checks to see if a delete flag has been set for the mailbox, hanging up and exiting through step 1962 if so. Otherwise, the FAXMAIL MSG database 1001 is checked at decision block 1966 to determine whether messages exist for the mailbox, in which case an audio message is transmitted to the user informing of an empty mailbox. Otherwise, if facsimile information is stored in the mailbox, operation continues in FIG. 72 through jump connector 1968.

If the mailbox is not configured to allow scheduled delivery to an alternate destination, the NO branch of decision block 1982 directs operation to step 1984 where the F-SAFF 116 listens/prompts for fax tones, after which the stored facsimile is sent to the local facsimile machine 130 in step 1986, and the F-SAFF 116 hangs up the line in step 1988. If the transmission is successful, in step 1992 the records in the various databases corresponding to the stored facsimile information delivered to the local facsimile machine 130 are deleted. Otherwise, and in any event, the routine ends in step 1994. If the mailbox is configured to allow scheduled delivery to an alternate destination, the YES branch of decision block 1982 is taken to step 1996 where the user is prompted for a delivery method. If the user chooses to receive the stored facsimile information now, or if the start button has already been pressed, operation proceeds again to step 1984. Otherwise, the NO branch of decision block 1998 is taken to step 2000 where the F-SAFF 116 prompts the user for a telephone number of an alternate remote facsimile machine 130. Through decision blocks 2002 and 2004 and step 2006, the user is given a limited number of additional opportunities to supply the telephone number if unsuccessful at inputting a valid telephone number. When a valid number is finally supplied by the user, in step 2010 the F-SAFF 116 generates and transmits an audio message notifying the user that delivery of the stored facsimile information has been scheduled. Subsequently, the F-SAFF 116 hangs up the line in step 2012, edits the SCHEDULER and FAXMAIL MSG databases 996, 1001 as stated in step 2014 to schedule delivery of the stored facsimile information, and exits through step 1994.

If the user indicates in the facsimile mailbox command a desire to transmit information from the local facsimile machine 130 to store information in one or more facsimile mailboxes, the F-SAFF 116 performs a local store routine 2019 shown in FIG. 73. A call connector 2022 directs operation to the get/hold fax subroutine of FIG. 48, after which the F-SAFF 116 determines in decision block 2024 if the FAXMAIL SETUP database 1007 has been previously configured to have a mailbox corresponding to the mailbox number entered by the user in the initial command. If not, an error delivery report is created in step 2030 and transmitted to the local facsimile machine 130 after operation is directed to the send report routine of FIG. 44 through jump connector 2032. Otherwise, a record is added to the FAXMAIL MSG database 1001 in step 2026, and the record in the FAXMAIL SETUP database 1007 is updated with the page and bytes counts of the stored facsimile information before a successful delivery report is created in step 2030 and sent to the user after operation jumps to the send report routine of FIG. 2032 through jump connector 2032.

Referring briefly back to FIG. 42, as a result of a user inputting a command requesting to use a facsimile information send service, a jump connector 1284 directs operation to FIG. 74. Such a command includes at least one document number corresponding to previously stored facsimile information and a destination telephone number to which both the previously stored facsimile information and presently submitted facsimile information is to be transmitted. Referring now to FIG. 74, a facsimile information send routine 2039 is shown including a call connector 2042 calling the get/hold fax subroutine of FIG. 48. After the present facsimile information is received from the local facsimile machine 130 and stored at the F-SAFF 116, the F-SAFF 116 checks the INFOFAX database 1000 to determine if the document number entered by the user corresponds to previously stored facsimile information. If so, the present facsimile information is prepended to the previously stored facsimile information to create new combination facsimile information in step 2046, after which a job confirmation report is created in step 2048. Subsequently, operation is directed to the report and transfer routine of FIG. 63 after which the confirmation report is transmitted back to the local facsimile machine 130 and the combination facsimile information is transmitted to a remote facsimile machine at the destination telephone number. Otherwise, if the document number is invalid, the NO branch of decision block 2044 is taken to step 2052 where the present facsimile information is deleted, to step 2054 where an index report with the current document numbers and an error message is created, and to jump connector 2058 where operation is directed to the send routine of FIG. 44 after which the index report is sent to the local facsimile machine 130.

Figure 102:
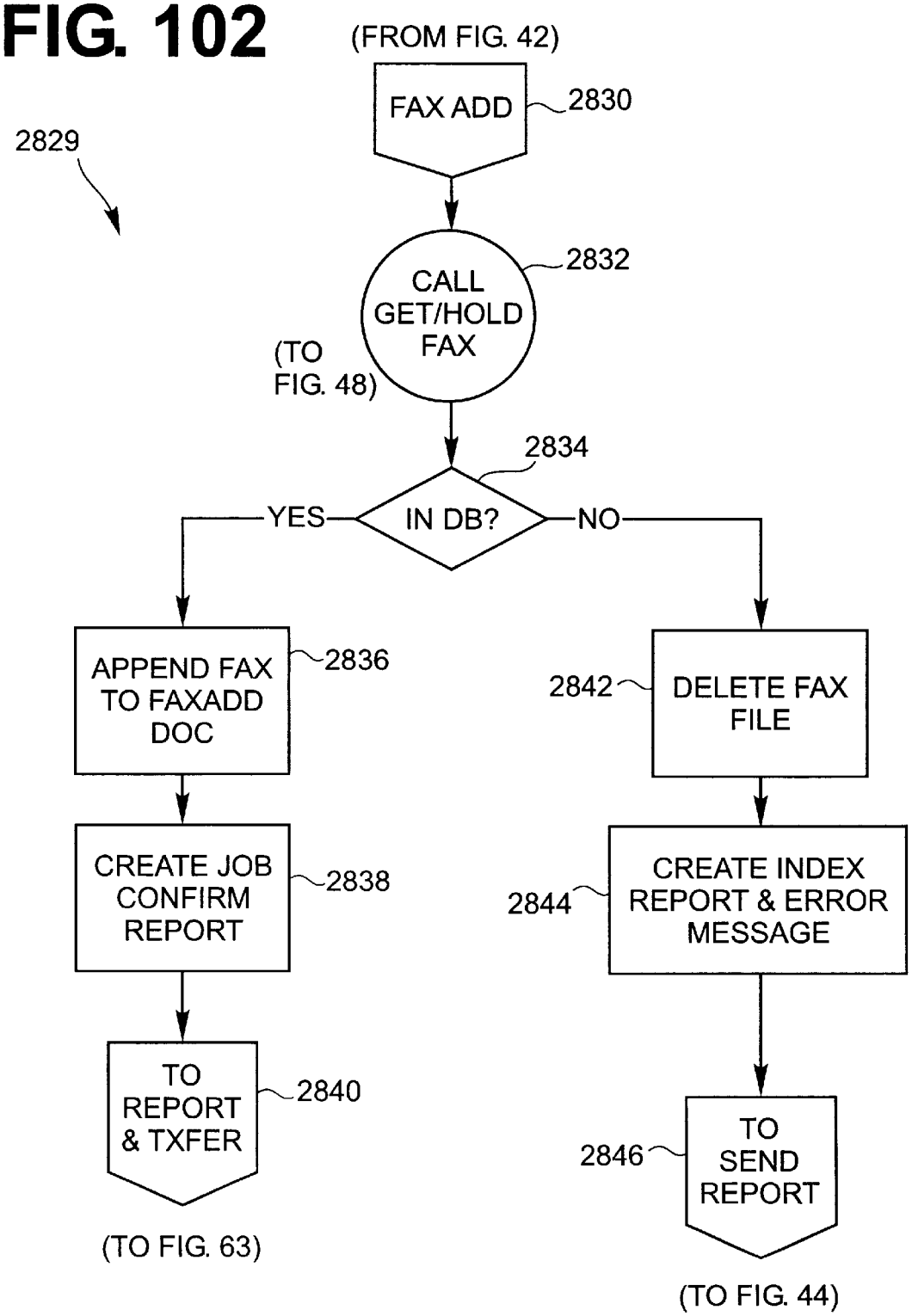
FIG. 102 is a flow chart representation of the fax add routine referenced by FIG. 42.

Referring again to FIG. 42, when a user inputs a command from a facsimile machine 130 in an attempt to complete a previously initiated facsimile addition method which began with the facsimile addition administration routine of FIG. 101, operation proceeds through a jump connector 1285 to FIG. 102 which shows a facsimile addition usage method 2829. After a jump connector 2830, the get/hold fax subroutine of FIG. 48 is called through call connector 2832 where present facsimile information is received from the facsimile machine 130 and stored at the F-SAFF 116. If the command from the user contains a facsimile mailbox number and facsimile addition document number which are contained in the FAXADD database 1008 indicating the existence of previously stored facsimile information, the YES branch of decision block 2834 directs operation to step 2836 where the present facsimile information is appended to the previously stored facsimile information referenced by the record in the FAXADD database 1008 to form combination facsimile information. Subsequently, a job confirmation report is created in step 2838 before operation is directed to the report and transfer routine of FIG. 63 where the report is transmitted back to the facsimile machine 130 and the combination facsimile information is transmitted to the destination identified during the facsimile addition routine of FIG. 101. Otherwise, if the facsimile mailbox number or facsimile addition document number are invalid, the NO branch of decision block 2834 directs operation to step 2842 where the present facsimile information is deleted. Subsequently, an index report with an error message is created in step 2844 before operation is directed to FIG. 44 where the index report is sent to the local facsimile machine 130.

With respect to FIGS. 101 and 102, facsimile information is transmitted to the F-SAFF 116 through a first router 112x in FIG. 101 and through a second router 112a in FIG. 102. Thus, at decision block 2834, during a call from the second router 112a, F-SAFF 116 references records in the FAXADD database 1008 for the first router 112x. To enable this, in one preferred embodiment of the present invention, the routers 112 are user addressable in that the user of one router 112a is able to access service databases of another router 112x. Accordingly, a record in the CONFIG database 1006 for the second router 112a includes a reference to a record of the first router 112x with a separate serial number. Thus, when actions are taken on behalf of the second router 112a, the database records, fax mailboxes, etc. for the first router 112x are accessed by the F-SAFF 116. With reference to FIG. 37, when the F-SAFF 116 analyzes the serial number and command from the second router 112a in decision block 1120, the F-SAFF 116 actually references records of the first router 112x. Clearly, this feature of user addressability of routers 112 has broader implications extending to the other methods of the present invention whereby a user is not required to program features for each commonly owned router 112, and whereby a large number of users have access to similar databases. In another embodiment of the present invention, the information stored during the facsimile addition administration routine of FIG. 101 is not stored in a manner related to a particular router's 112 mailbox but is stored with reference to a truly distinct (router independent) retrieval code whereby there would be no user addressability or mailbox allocation concerns.

Refer now to FIG. 75 which shows a will call facsimile method 2069 which is reached after a caller inputs a command including a retrieval code and requesting a will call facsimile method which causes a jump connector 1286 in FIG. 42 to direct operation to FIG. 75. If the retrieval code is already in use or invalid for any other reason, an error report is created and scheduled in step 2074 before the F-SAFF 116 hangs up the line and exits through step 2076. Otherwise, the get/hold fax routine of FIG. 48 is called through call connector 2078, after which the F-SAFF 116 computes an expiration time for the stored information in step 2080, adds a record to the FAX WILLCALL database 994 in step 2082, creates a job confirmation report with the retrieval code, a reduced image of the first page of the facsimile information, a job ID, and the expiration time in step 2084, and directs operation to the send report routine of FIG. 44 through jump connector 2086 after which the job confirmation report will be transmitted back to the local facsimile machine 130.

Refer now to FIG. 76 which shows a pager facsimile method 2099 which the F-SAFF 116 executes after receiving a command requesting a pager facsimile service from a user which causes a jump connector 1288 in FIG. 42 to direct operation to FIG. 76. Such a command includes the telephone number, and any additional necessary digits, of a pager service through which a portable pager with a numeric display can be reached. After the present facsimile information is received from the local facsimile machine 130 through the get/hold fax subroutine of FIG. 48 called by a call connector 2102, the F-SAFF 116 generates a unique retrieval code in step 2104, computes an expiration time in step 2106, adds a record to the PAGEFAX database 999 in step 2108, generates a job confirmation report with the retrieval code, a job ID, a reduced image of the first page of the present facsimile information, and the expiration time in step 2110, and directs operation to the report and transfer routine of FIG. 63 through jump connector 2112 after which the job confirmation report is transmitted back to the local facsimile machine 130, and the router 112 is used to transfer a call to a pager service at the destination telephone number so that the F-SAFF 116 can transmit digits identifying the telephone number of the local facsimile machine 130, the retrieval code, and the number of pages in the facsimile transmission. While the steps of dialing a pager service to relay notification of stored information are shown with the pager facsimile method 2099, in alternate embodiments of the present invention, the F-SAFF 116 notifies an intended recipient through a variety of notification methods of the existence of stored information received in accordance with any of the methods of the present invention, such notification methods including this pager service notification, a voice notification to live or automatic recording devices, E-mail transmissions, etc.

Referring briefly back to FIG. 42, when a user inputs a command requesting a facsimile speed cover method which includes a speed cover number corresponding to previously stored facsimile cover information assigned to a predetermined destination, a jump connector 1290 directs operation to FIG. 77. Referring now to FIG. 77, after a call connector 2122 calls the get/hold fax subroutine of FIG. 48 and current facsimile information is transmitted from the local facsimile machine 130 to be stored on the F-SAFF 116, the speed cover number supplied by the user is compared to the SPEEDFAX database 1002. If previously stored facsimile cover information with a predetermined destination is found corresponding to the speed cover number, the previously stored facsimile cover information is prepended to the current facsimile information in step 2126 to form combination facsimile information before a job confirmation report is created in step 2128 including a job ID, a reduced cover sheet image, the predefined destination telephone number, and a delivery expiration time calculated during creation of the report. Operation is then directed to the report and transfer routine of FIG. 63 after which the job confirmation report is transmitted back to the local facsimile machine 130a and the combination facsimile information is transmitted, via call transfer by the router 112, to a remote facsimile machine 130n at the predefined destination telephone number. If previously stored facsimile cover information with a predetermined destination is not found corresponding to the speed cover number, the NO branch of decision block 2124 is taken to step 2132 where the current facsimile information is deleted, after which an index report with an invalid entry message is created in step 2134 before operation is directed to the send report routine of FIG. 44 through jump connector 2136 after which the index report is transmitted back to the local facsimile machine 130.

Referring briefly back to FIG. 42, when a user inputs a command requesting a facsimile cover method which includes a user-supplied destination number and a cover number corresponding to previously stored facsimile cover information, a jump connector 1292 directs operation to FIG. 78. Referring now to FIG. 78, after a call connector 2142 calls the get/hold fax subroutine of FIG. 48 and current facsimile information is transmitted from the local facsimile machine 130 to be stored on the F-SAFF 116, the cover number supplied by the user is compared to the COVER-FAX database 993. If previously stored facsimile cover information is found corresponding to the cover number, data corresponding to a one (1) inch strip across the top of the first page of the current facsimile information (designed to be where the user places the name of the addressee) is combined with the previously stored cover information to form new cover information which is prepended to the current facsimile information (with a blank space replacing the one inch strip) to form combination facsimile information in step 2146. In step 2148, a job confirmation report is generated including a job ID, a reduced cover sheet image, the user-supplied destination telephone number, and a delivery expiration time calculated during creation of the report. Operation is then directed to the report and transfer routine of FIG. 63 after which the job confirmation report is transmitted back to the local facsimile machine 130a and the combination facsimile information is transmitted, via call transfer by the router 112, to a remote facsimile machine 130n at the user-supplied destination telephone number. If previously stored facsimile cover information is not found corresponding to the cover number, the NO branch of decision block 2144 is taken to step 2152 where the current facsimile information is deleted, after which an index report with an invalid entry message is created in step 2154 before operation is directed to the send report routine of FIG. 44 through jump connector 2156 after which the index report is transmitted back to the local facsimile machine 130.

Referring briefly back to FIG. 42, when a user inputs a command requesting a facsimile conversion method which includes a user-supplied destination number, a jump connector 1294 directs operation to FIG. 79. Referring now to FIG. 79, after a call connector 2162 calls the get/hold fax subroutine of FIG. 48 and current facsimile information is transmitted from the local facsimile machine 130 to be stored on the F-SAFF 116, the F-SAFF 116 generates a retrieval code in step 2164 and, in step 2166, transfers a file including a copy of the current stored facsimile information along with the retrieval code to the OCR/BBS platform 124 and receives OCR results from the OCR/BBS platform 124 to verify that converted data will be available to the user. Subsequently, in step 2168, the F-SAFF 116 generates and prepends to the current stored facsimile information cover sheet facsimile information including OCR retrieval instructions with a telephone number for a user to access the OCR/BBS platform 124, a job ID, and the retrieval code to form combination facsimile information. A job confirmation report is also created in step 2170 which includes the job ID, a reduced image of the first page of the current facsimile information, the user-supplied destination telephone number, the retrieval code, and retrieval instructions including a telephone number for a user to access the OCR/BBS platform 124. Operation is then directed to the report and transfer routine of FIG. 63 through jump connector 2172 after which the job confirmation report is transmitted back to the local facsimile machine 130a and the combination facsimile information is transferred to a remote facsimile machine 130n at the destination telephone number. If the OCR results are not received from the OCR/BBS platform 124, the F-SAFF 116 will schedule delivery of the combination facsimile information rather than tie up the router 112.

FIG. 80 shows what the OCR/BBS platform 124 does after receiving the file containing a copy of the current stored facsimile information file and the corresponding retrieval code from the F-SAFF 116. An OCR loop 2199 begins with a terminal 2200. Subsequently, the OCR/BBS platform 124 looks for new files in decision block 2202, and, according to decision block 2212 and steps 2214 and 2216, deleting older files and delaying before looping back to decision block 2202. If new files are found, the YES branch of decision block 2202 is taken so that the OCR/BBS platform 124 extracts the retrieval code from the file in step 2204, converts the facsimile information into character-based information through a character recognition process and transfers the conversion results to the F-SAFF 116 in step 2206, copies the character-based file along with the retrieval code to a BBS directory in step 2208, and marks the file from F-SAFF 116 as processed in step 2210 before looping back to decision block 2202. According to FIG. 81, which shows a BBS loop 2219, the OCR/BBS platform 124 looks to receive a call from a user in decision block 2222, and, according to decision block 2224 and step 2226, deletes old files before returning to decision block 2222. When a call is received from a user with a modem, the OCR/BBS platform 124 answers the call and connects in a modem format in step 2228 and, in step 2230, prompts the user for a retrieval code, a data format for the character-based file, including popular wordprocessing formats, and a transfer protocol, such as XMODEM, etc. If the information supplied by the user is not valid, a limited number of retries are allowed through decision block 2234 before the connection is dropped in step 2236. If valid information is supplied, the character-based file is downloaded to the user in the requested format through the requested transfer protocol. If the download is not a success, a limited number of retries are allowed after a prompt through decision block 2242 and step 2244. If the download is a success, an exit message is displayed in step 2246, and the file is flagged as retrieved before the connection is dropped in step 2236.

Referring briefly back to FIG. 42, when, because of a busy or no answer condition, a router 112 is unable to deliver facsimile information according to the urgent facsimile method ordinarily provided between routers 112 alone, the router 112 will call the F-SAFF 116 with an urgent facsimile command including a destination telephone number, thereby invoking a jump connector 1296 to direct operation to FIG. 82. Referring now to FIG. 82, an F-SAFF urgent facsimile method 2179 is shown transmitting a fax connect/hold command to the router 112 in step 2182. Subsequently, in step 2184, the F-SAFF 116 listens/prompts for fax tones and receives facsimile information from the local facsimile machine 130. If the facsimile information is not received in a good form, any stored information is deleted in step 2188, an error report is created in step 2190, and operation continues in the send report routine of FIG. 44 through jump connector 2192. Otherwise, the YES branch of decision block 2186 is taken to step 2194 where a job confirmation report is created, and operation is directed to the report and transfer routine of FIG. 63 by a jump connector 2196, after which the job confirmation report is transmitted back to the local facsimile machine 130 and the received facsimile information is transmitted to a facsimile machine at the destination telephone number.

Referring briefly back to FIG. 42, if a user enters a combination command requesting a service with both private and conversion qualities, a jump connector 1298 directs operation to FIG. 83. Referring now to FIG. 83, a private data routine 2259 is shown representing a combination of the private facsimile routine of FIG. 69 and the facsimile conversion method of FIG. 79. After facsimile information is received from the local facsimile machine 130 through the get/hold fax subroutine of FIG. 48 called through a call connector 2262, the F-SAFF 116 generates in step 2264 a retrieval code for the stored facsimile information and a retrieval code for retrieving character-based data generated as a result of step 2266 where the F-SAFF 116 transmits a copy of the stored facsimile information to the OCR/BBS platform 124 and receives conversion results. In step 2268, the F-SAFF 116 creates a cover sheet to serve as a private method notification report with instructions for retrieving both the facsimile information from the F-SAFF 116 and the character-based data from the OCR/BBS platform 124. Subsequently, the F-SAFF 116 edits the PRIVATE FAX database 992 in step 2270 and creates a job confirmation report in step 2272 before directing operation to the report and transfer routine of FIG. 63 through a jump connector 2274 after which the job confirmation report is transmitted to the local facsimile machine 130 and the cover sheet with OCR retrieval instructions is transmitted to a remote facsimile machine at a user-supplied destination telephone number.

FIG. 84 shows a private urgent routine 2275 which represents a combination of the private facsimile method of FIG. 69 and the F-SAFF urgent facsimile method of FIG. 82 which is reached through a jump connector 1300 in FIG. 42. After facsimile information is received from the local facsimile machine 130 through the get/hold fax subroutine of FIG. 48 called through a call connector 2278, the F-SAFF 116 generates in step 2280 a retrieval code for the stored facsimile information after which the F-SAFF 116 edits the PRIVATE FAX database 992 in step 2282 and generates a cover sheet with retrieval instructions, including the telephone number of the local facsimile machine 130 and the generated retrieval code. The F-SAFF 116 then creates a job confirmation report in step 2286 before operation is directed to the report and transfer routine of FIG. 63 through a jump connector 2288 after which the job confirmation report is transmitted to the local facsimile machine 130 and the cover sheet is transmitted to a remote facsimile machine at a user-supplied destination telephone number.

A jump connector 1302 in FIG. 42 directs operation to a private urgent data method 2299 in FIG. 85 representing a combination of the private facsimile method of FIG. 69, the F-SAFF urgent facsimile method of FIG. 82, and the conversion method of FIG. 79. Referring now to FIG. 85, the steps of the private urgent data method 2299 are very similar to the steps of the private data method 2259 of FIG. 83, with the only difference being seen in the execution of the report and transfer routine of FIG. 63 where an urgent beep is turned on if a remote router 112n answers the telephone call to a remote facsimile machine 130n at a user-supplied destination telephone number. In addition, although not explicitly shown in FIGS. 83–84, the private combination methods also provide for receiving user-generated retrieval codes for the stored facsimile information in a manner similar to steps 1910 and 1912 of FIG. 69.

Finally, a jump connector 1304 in FIG. 42 directs operation to an urgent data method 2319 in FIG. 86 representing a combination of the conversion method of FIG. 79 and the F-SAFF urgent facsimile method of FIG. 82. Refer now to FIG. 86, which is very similar to FIG. 85. After performing similar first steps, a cover sheet is created with OCR retrieval instructions and prepended to the presently received facsimile information to form combination facsimile information. Subsequently, a job confirmation report is created in step 2330, and operation is directed to the report and transfer routine of FIG. 63 through a jump connector 2332 after which the job confirmation report is transmitted to local facsimile machine 130 and the combination facsimile information is transmitted to a remote facsimile machine at a user-supplied destination telephone number.

Figure 87:
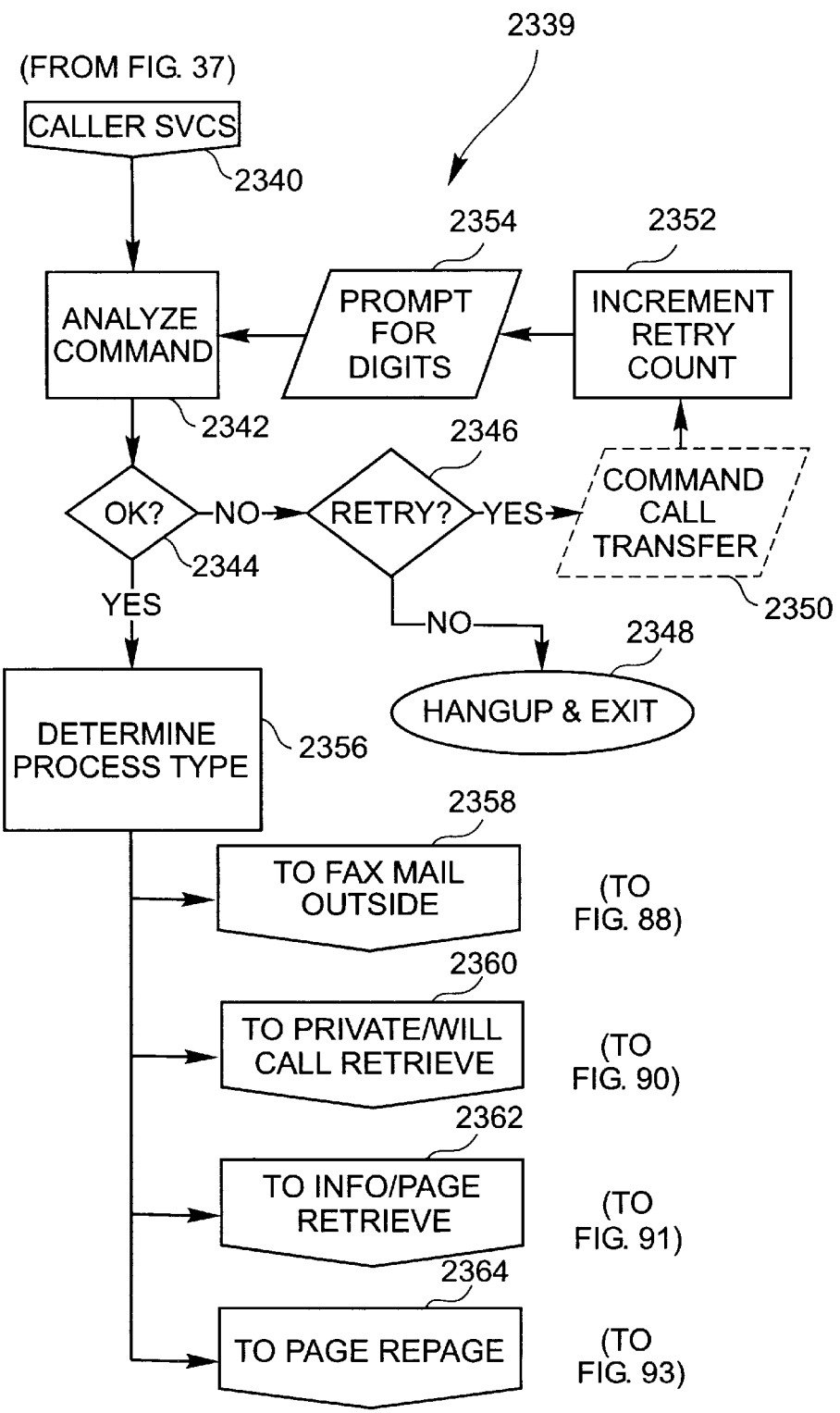
FIG. 87 is a flow chart representation of the caller services routine referenced by FIG. 37.

Referring briefly back to FIG. 37, when the router 112 receives a telephone call from a remote caller during which the remote caller enters a command causing the router 112 to suspend the call from the caller, dial the F-SAFF 116, and transmit a corresponding command to the F-SAFF 116 which is analyzed in step 1130 and directed through a jump connector 1138 to FIG. 87. Referring now to FIG. 87, a caller services routine 2339 is shown beginning with a connector 2340. In step 2342, the F-SAFF 116 analyzes the command and then provides a limited retry function through decision blocks 2344 and 2346, step 2350 where the F-SAFF 116 commands the router 112 to connect the F-SAFF 116 to the suspended telephone call with the remote caller, step 2352 where the retry count is incremented, and step 2354 where the F-SAFF 116 prompts the remote caller to resubmit the command. Step 2350 is, like similar commands discussed below, shown in dotted lines since such a command is only issued once by the F-SAFF 116 at any point after the connector 2340. If a proper command is finally dialed by the remote caller, the YES branch of decision block 2344 is taken to step 2356 where the F-SAFF 116 analyzes the command to determine which process to execute. If a remote caller evidences a desire to use a facsimile mailbox store or retrieve facsimile information, a jump connector 2358 directs operation to FIG. 88. If the user evidences a desire to retrieve facsimile information stored during the will call facsimile method of FIG. 75 or one of the private facsimile methods of the present invention of FIGS. 69, 83, 84, or 85, a jump connector 2360 directs operation to FIG. 90. If a user dials a command to retrieve facsimile information stored according to the pager facsimile method of FIG. 76 or retrieve facsimile information according to a facsimile information retrieve method of the present invention, a jump connector 2362 directs operation to FIG. 91. If a caller is requesting a pager re-page function, jump connector 2364 directs operation to FIG. 93.

Figure 88:
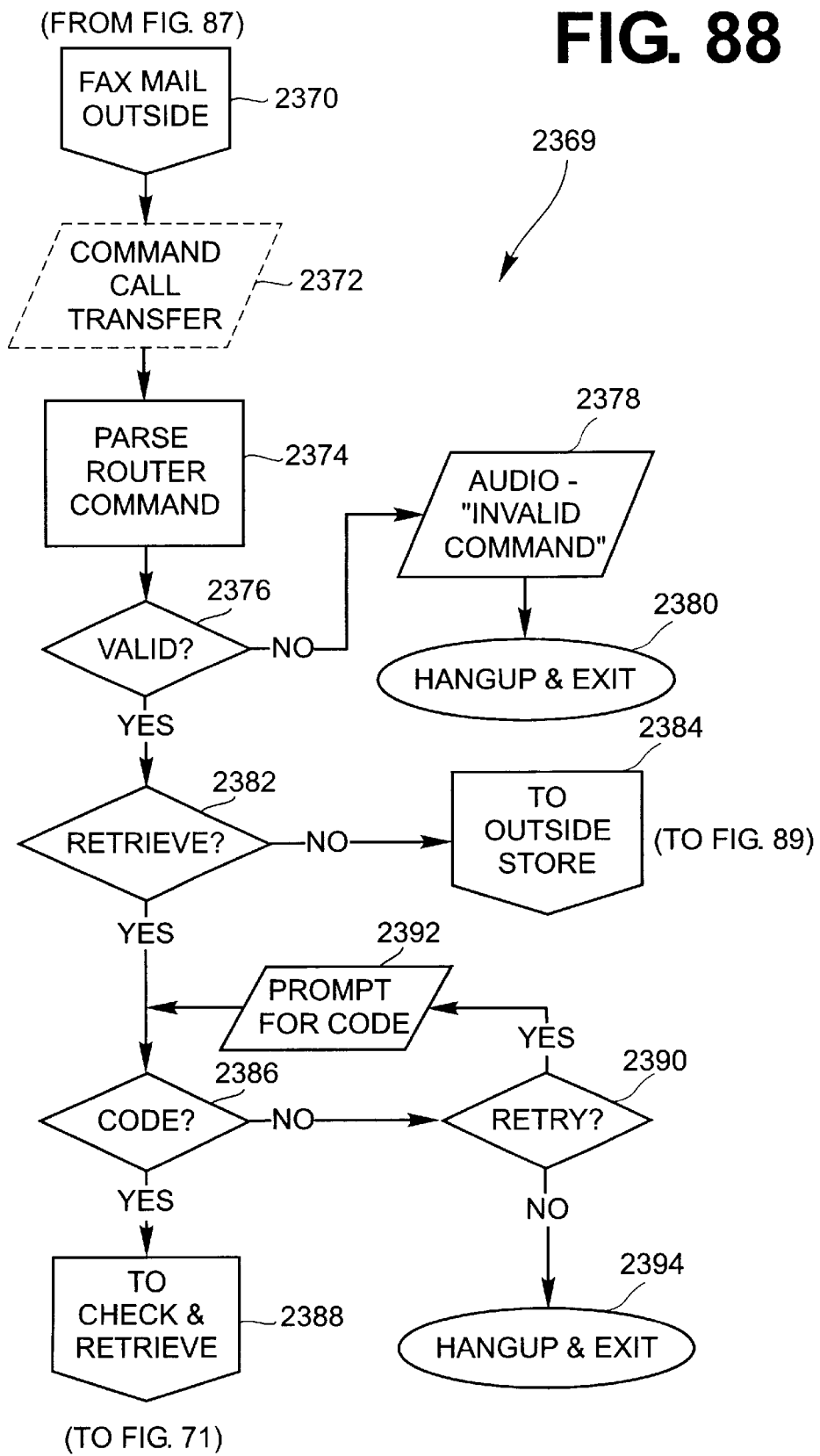
FIG. 88 is a flow chart representation of the fax mail outside routine referenced by FIG. 87.
Figure 89:
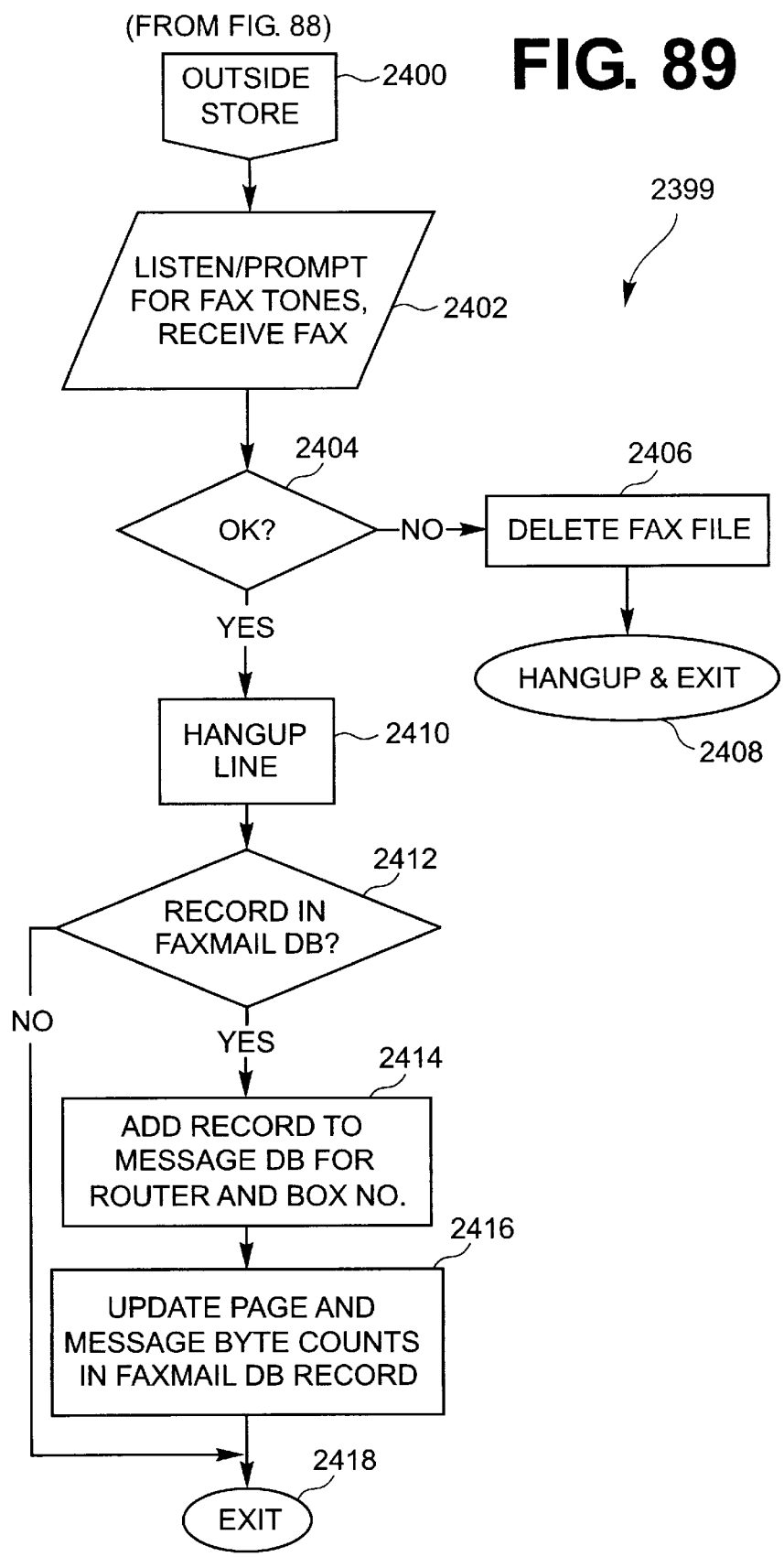
FIG. 89 is a flow chart representation of the outside store routine referenced by FIG. 88.

Following jump connector 2358, refer now to FIG. 88 which shows a faxmail outside routine 2369. If the call has not yet been transferred through step 2350 in FIG. 87, the F-SAFF 116 commands the router 112 to complete the transfer by connecting the F-SAFF 116 to the remote caller currently suspended from the router 112. After a connection is established with the remote caller, the command is parsed in step 2374 so that an "invalid command" message is transmitted to the caller if the command is invalid according to decision block 2376 and steps 2378 and 2380 through which the F-SAFF 116 hangs up the telephone line and exits. Otherwise, if the faxmail command indicates a caller's desire to retrieve information from a facsimile mailbox, the YES branch of decision block 2382 is taken to decision block 2386 which requires, with limited retry capabilities in decision block 2390 and steps 2392 and 2394, that a passcode be entered before the information can be retrieved through the check and retrieve routine of FIG. 71, as discussed above. If the faxmail command is a store command, the NO branch of decision block 2382 is taken to jump connector 2384 which directs operation to FIG. 89. Referring now to FIG. 89, an outside store routine 2399 is shown where the F-SAFF 116 listens/prompts for fax tones and receives facsimile information from the remote facsimile machine 130n for storage in the F-SAFF 116. If the transmission is not successful, the F-SAFF 116 deletes any of the facsimile information received in step 2406 before hanging up and exiting through step 2408. If the transmission is successful, the YES branch is taken to step 2410 where the F-SAFF 116 hangs up the line. Then, if the facsimile mailbox number exists, the FAXMAIL MSG database 1001 and FAXMAIL SETUP database 1007 are edited as shown in steps 2414 and 2416 before exiting through step 2418, as would happen if the facsimile mailbox number does not exist.

Figure 90:
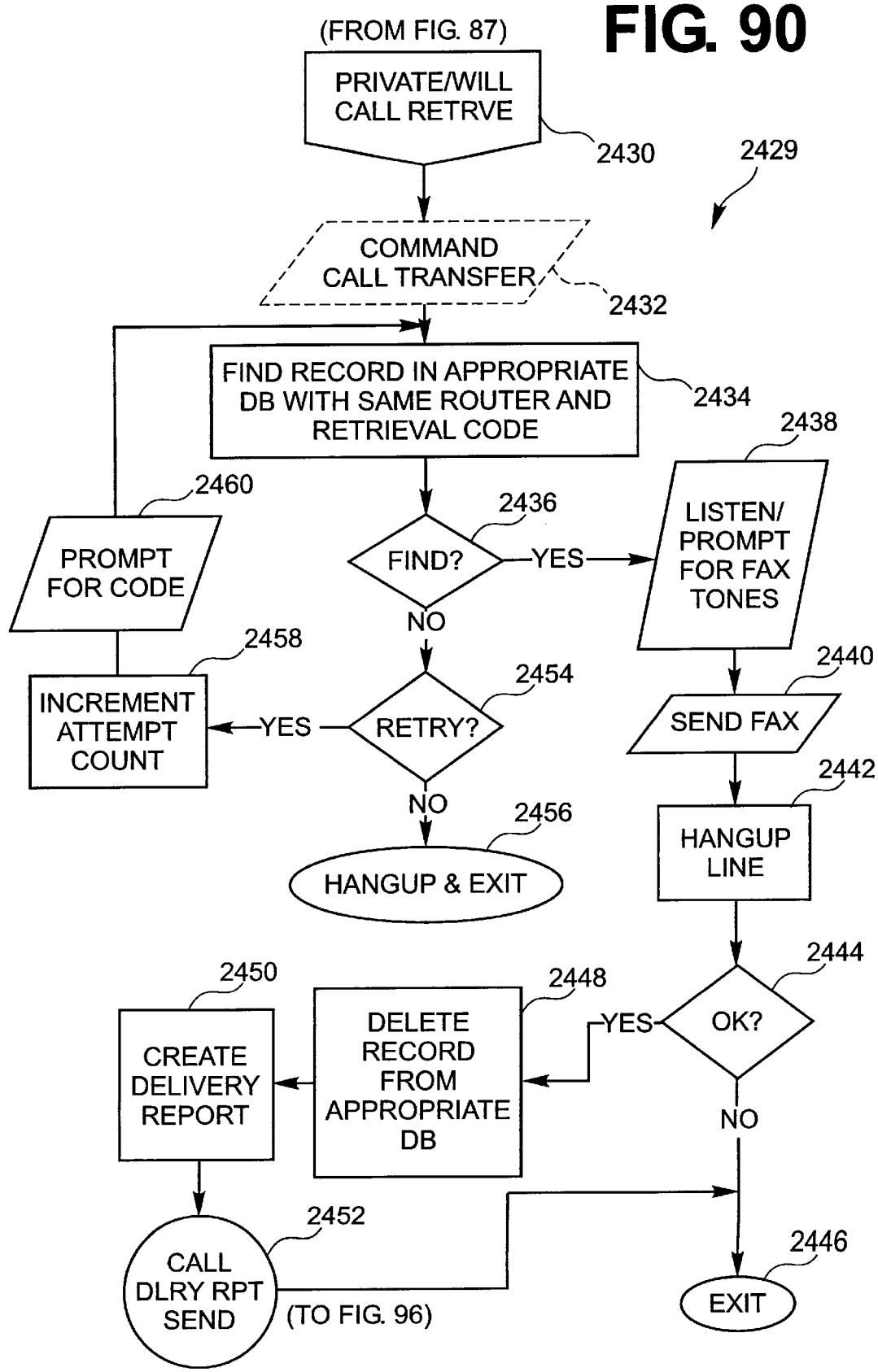
FIG. 90 is a flow chart representation of the private/will call retrieve routine referenced by FIG. 87.

Referring briefly back to FIG. 87, the jump connector 2360 is shown directing operation to FIG. 90 when a caller inputs a retrieval code evidencing a desire to retrieve facsimile information stored during the will call facsimile method of FIG. 75 or one of the private facsimile methods of the present invention of FIGS. 69, 83, 84, or 85. Refer now to FIG. 90 which shows a private/will call retrieve method 2429. In step 2432, the F-SAFF 116 directs the router 112 to complete the transfer of the remote caller if the remote caller is not already connected. Then, depending on the type of retrieval code received from the caller in the initial command, the F-SAFF 116 looks in the appropriate database (the FAX WILLCALL database 994 or the PRIVATE FAX database 992) to find a record matching the retrieval code in step 2434. If a matching record is not found, a limited prompt/retry routine is executed as shown in decision blocks 2436 and 2454 and steps 2456, 2458, and 2460. If a matching record is found, the YES branch of decision block 2436 is taken to step 2438 where the F-SAFF 116 listens/prompts for fax tones, after which the stored facsimile information is sent in step 2440 and the F-SAFF 116 hangs up the line in step 2442. If the transmission was not successful, the process ends in step 2446 after which the caller is free to call and try again. Otherwise, the stored facsimile information which was transmitted to the caller is deleted from the appropriate database in step 2448, a delivery report is created in step 2450 including the job ID, a reduced image of the first page of the transmitted facsimile information, the delivery time, etc, and operation is directed to a delivery report send subroutine in FIG. 96, discussed in detail below, where delivery of the delivery report is scheduled, after which operation ends in step 2446.

Figure 91:
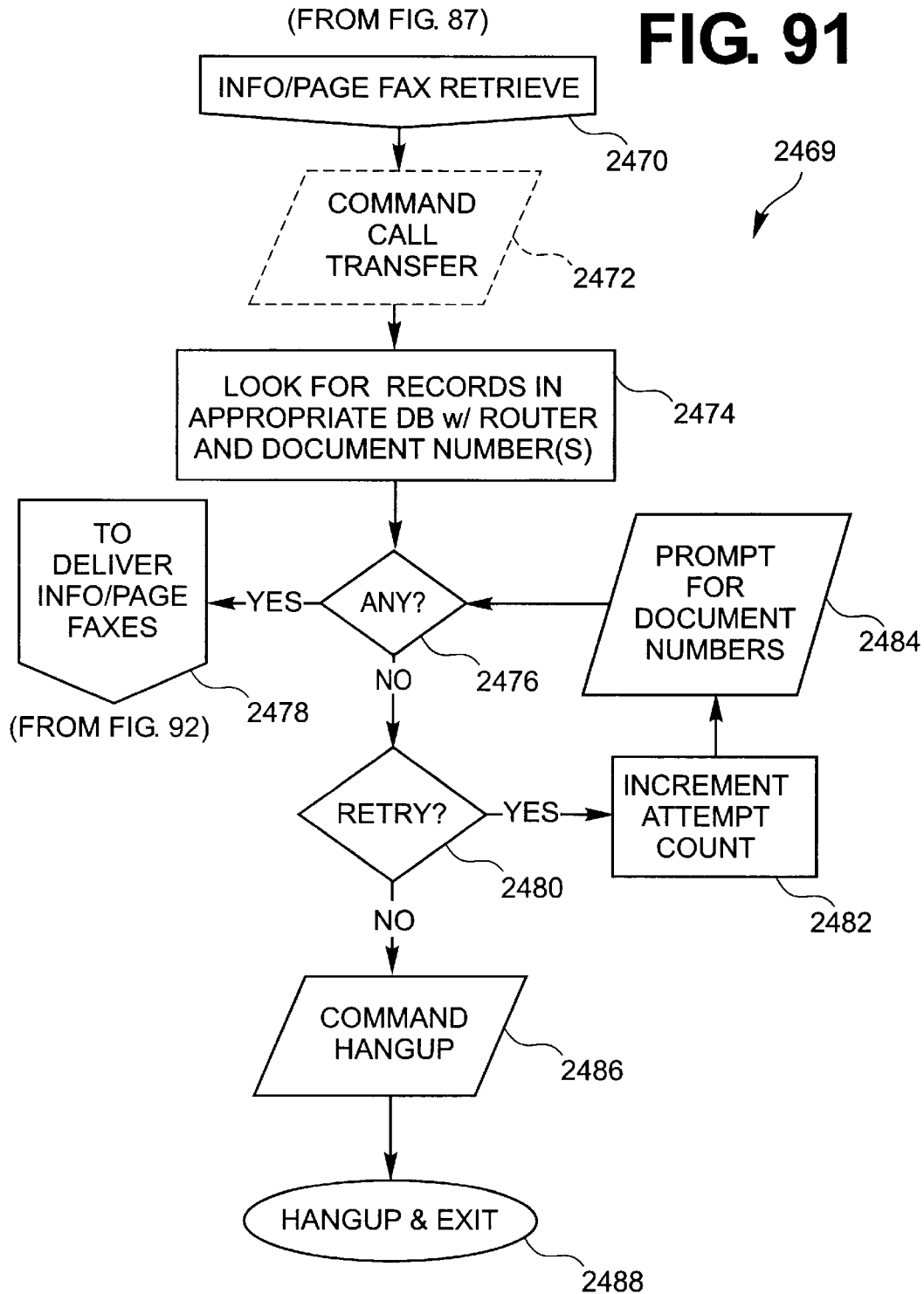
FIG. 91 is a flow chart representation of the info/page retrieve routine referenced by FIG. 87.
Figure 92:
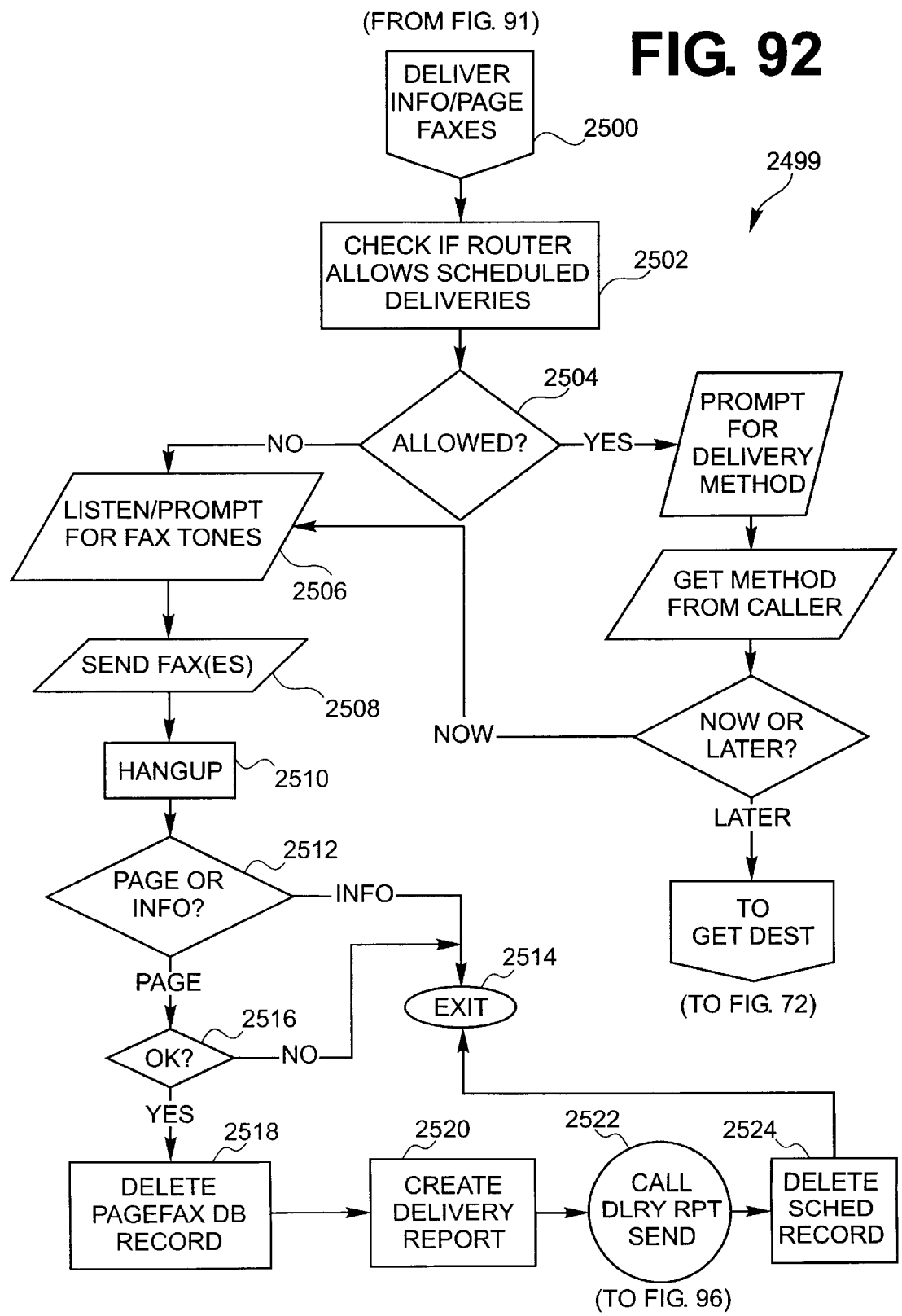
FIG. 92 is a flow chart representation of the deliver info/page faxes routine referenced by FIG. 91.
Figure 96:
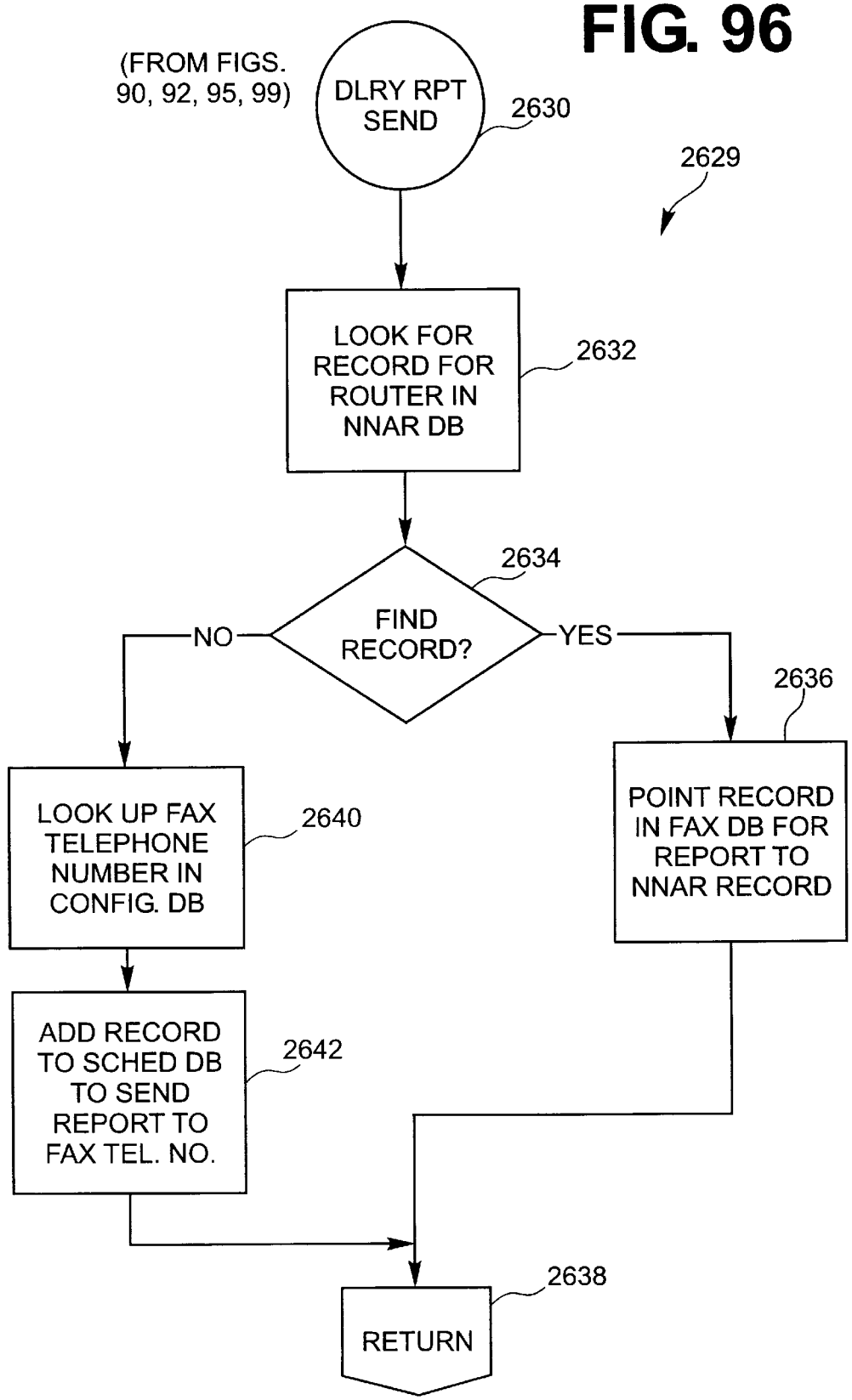
FIG. 96 is a flow chart representation of the delivery report send routine referenced by FIG. 94.

Referring briefly back to FIG. 87, the jump connector 2362 is shown directing operation to FIG. 91 when a caller inputs a retrieval code indicating a desire to retrieve facsimile information stored during the pager facsimile method of FIG. 76 or to retrieve facsimile information according to a facsimile information retrieve method of the present invention. Refer now to FIG. 91 which shows an info/page facsimile retrieval method 2469 which accommodates both type of requests from a caller. In step 2472, the F-SAFF 116 directs the router 112 to complete the transfer of the remote caller if the remote caller is not already connected. Then, depending on the type of retrieval code received from the caller in the initial command, the F-SAFF 116 looks in the appropriate database (the INFOFAX database 1000 or the PAGEFAX database 999) to find a record matching the retrieval code in step 2474. If a matching record is not found, a limited prompt/retry routine is executed as shown in decision blocks 2476 and 2480 and steps 2486, 2488, 2482, and 2484. If a matching record is found, the YES branch of decision block 2476 is taken to a jump connector 2478 which directs operation to FIG. 92. Refer now to FIG. 92 which shows a deliver info/page faxes method 2499 which is similar in many ways to the method of FIG. 72. If the router 112 through which the call was directed is not configured to allow remote callers to schedule deliveries to alternate destination, the NO branch of decision block 2504 directs operation to step 2506 where the F-SAFF 116 listens/prompts for fax tones, after which the stored facsimile is sent to the remote facsimile machine 130n in step 2508, and the F-SAFF 116 hangs up the line in step 2510. If a facsimile information retrieve method was performed by virtue of sending the stored facsimile information, the method ends in step 2514. On the other hand, for the pager facsimile method, the PAGE branch of decision block 2512 is taken to decision block 2516 where the F-SAFF 116 determines if the transmission was successful. If not, the method ends in step 2514. Otherwise, the PAGEFAX record is deleted in step 2518, a delivery report is created step 2520, the delivery report send subroutine of FIG. 96 is called in call connector 2522, and any remaining scheduled pager notification record is deleted from the SCHEDULER database 996 before the method ends in step 2514. If the router 112 is configured to allow a remote caller to schedule delivery to an alternate destination, the YES branch of decision block 2504 is taken to step 2526 where the remote caller is prompted for a delivery method. If the user chooses in step 2528 to receive the stored facsimile information now, or if the start button has already been pressed, operation proceeds again to step 2506. Otherwise, the LATER branch of decision block 2530 is taken to jump connector 2532 which directs operation to the GET DEST connector in FIG. 72 where processing proceeds as discussed above allowing the remote caller to schedule delivery of the facsimile information stored in the PAGEFAX or INFOFAX databases 999 or 1000, respectively.

Figure 93:
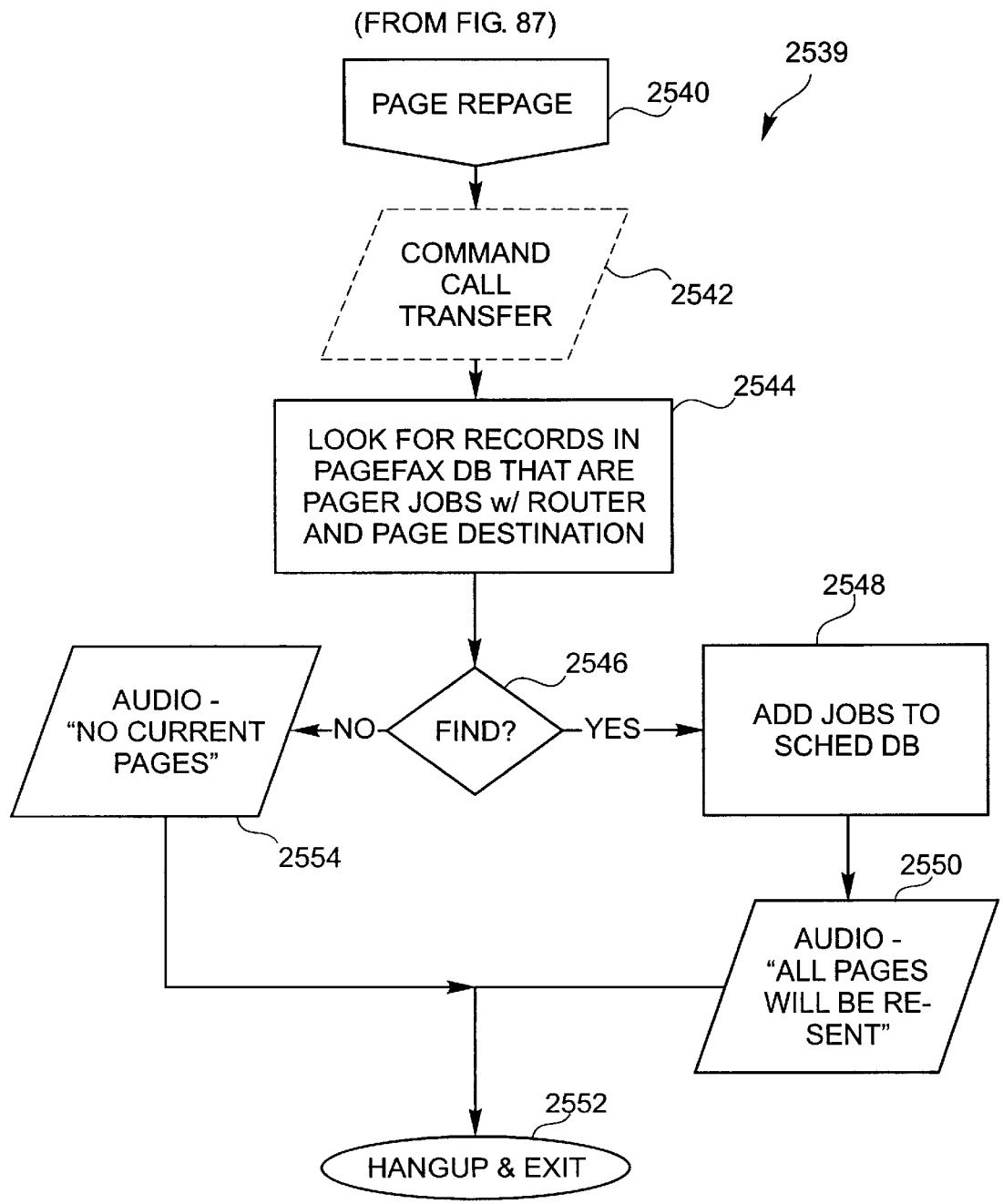
FIG. 93 is a flow chart representation of the page repage routine referenced by FIG. 87.

Referring back to FIG. 87, when a caller desires to have the F-SAFF 116 repeat part of the pager facsimile method of FIG. 76 by paging the intended recipient again, a pager re-page command is entered which causes the jump connector 2364 to direct operation to FIG. 93. Refer now to FIG. 93 which shows a pager re-page routine 2539. After the caller is connected through or before step 2542, the F-SAFF 116 looks in step 2544 for records with the router 112 serial number and the pager destination supplied by the caller. If the record is not found, a "No current pages pending" audio message is transmitted to the caller before the F-SAFF 116 hangs up the line and exits in step 2552. Otherwise, another paging job is added to the SCHEDULER database 996 in step 2548, and an audio message indicating that the re-paging will occur is sent to the caller in step 2550 before the F-SAFF 116 hangs up and exits in step 2552.

Figure 94:
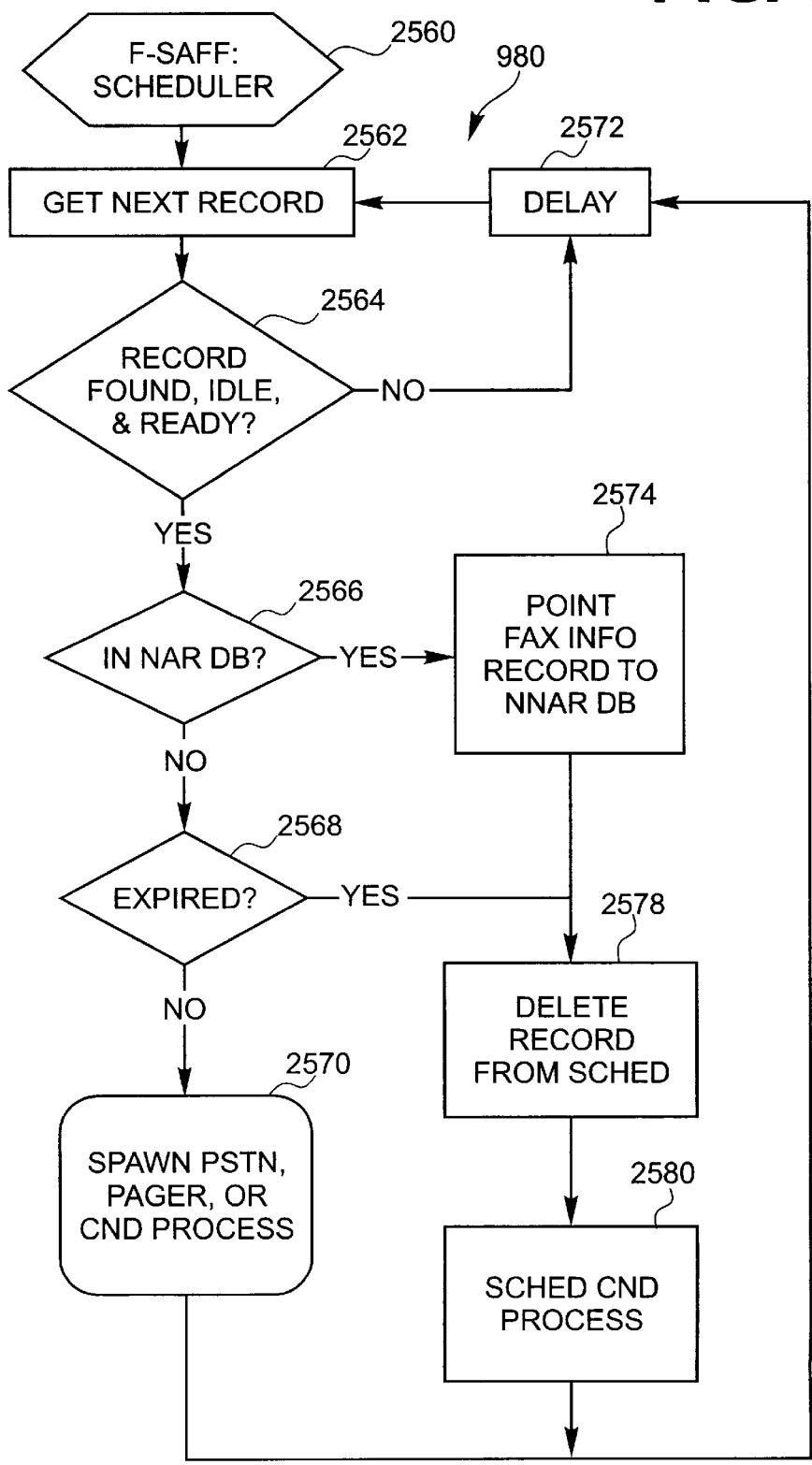
FIG. 94 is a flow chart representation of the scheduler routine of the F-SAFF of FIG. 28.

Refer now to FIG. 94 which shows an F-SAFF scheduler process 980 which runs independently from previous routines discussed above. In step 2562, the F-SAFF 116 scans the SCHEDULER database 996 for a record of a scheduled delivery of stored information, such as user-supplied facsimile information, F-SAFF-generated facsimile information, including cover sheets, reports, etc., and DTMF digit information for pager access and notification. If no records are found, if the record is already being processed, or if the record is not yet ready to be processed, the NO branch of decision block 2564 is taken to step 2572 where the F-SAFF 116 delays for a predetermined period before returning to step 2562, the period varying depending on why the delay is instigated. On the other hand, if a scheduled event is found, not already being processed, and ready, the F-SAFF 116 checks to see if the destination telephone number corresponds to that of a router 112 already having a record in the NNAR database 995. If so, the local facsimile machine 130 connected to the router 112 would not likely be available to receive a delivery at this point, thus the corresponding record in the FAX INFO database 991 is pointed to the record in the NNAR database 995 in step 2574. Subsequently, the SCHEDULER record is deleted in step 2578, and a CND (confirm/non-delivery) process is scheduled in step 2580 before operation loops back to the delay step 2572. If the router 112 is not in the NNAR database 995, the NO branch of decision block 2566 is taken to decision block 2568 where it is determined if the record is expired. If so, operation proceeds to step 2578 as discussed above. Finally, if the SCHEDULER record is not expired, the NO branch of decision block 2568 is taken to step 2570 where a PSTN process, a PAGER process for paging deliveries related to the pager facsimile method of FIG. 76, or a CND process is spawned, each of which is an independent process discussed in greater detail below.

Figure 95:
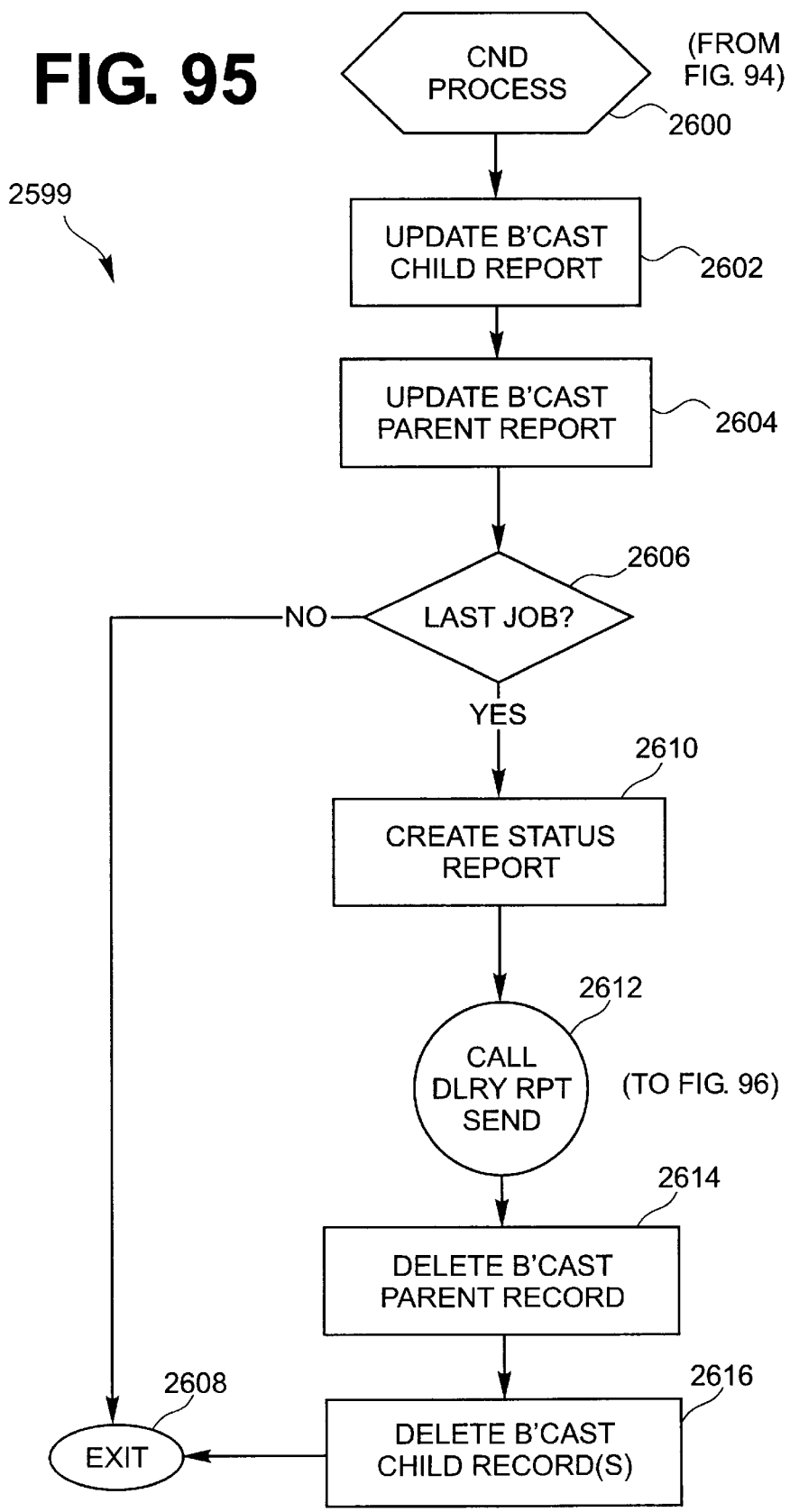
FIG. 95 is a flow chart representation of the CND process referenced by FIG. 94.
Figure 98:
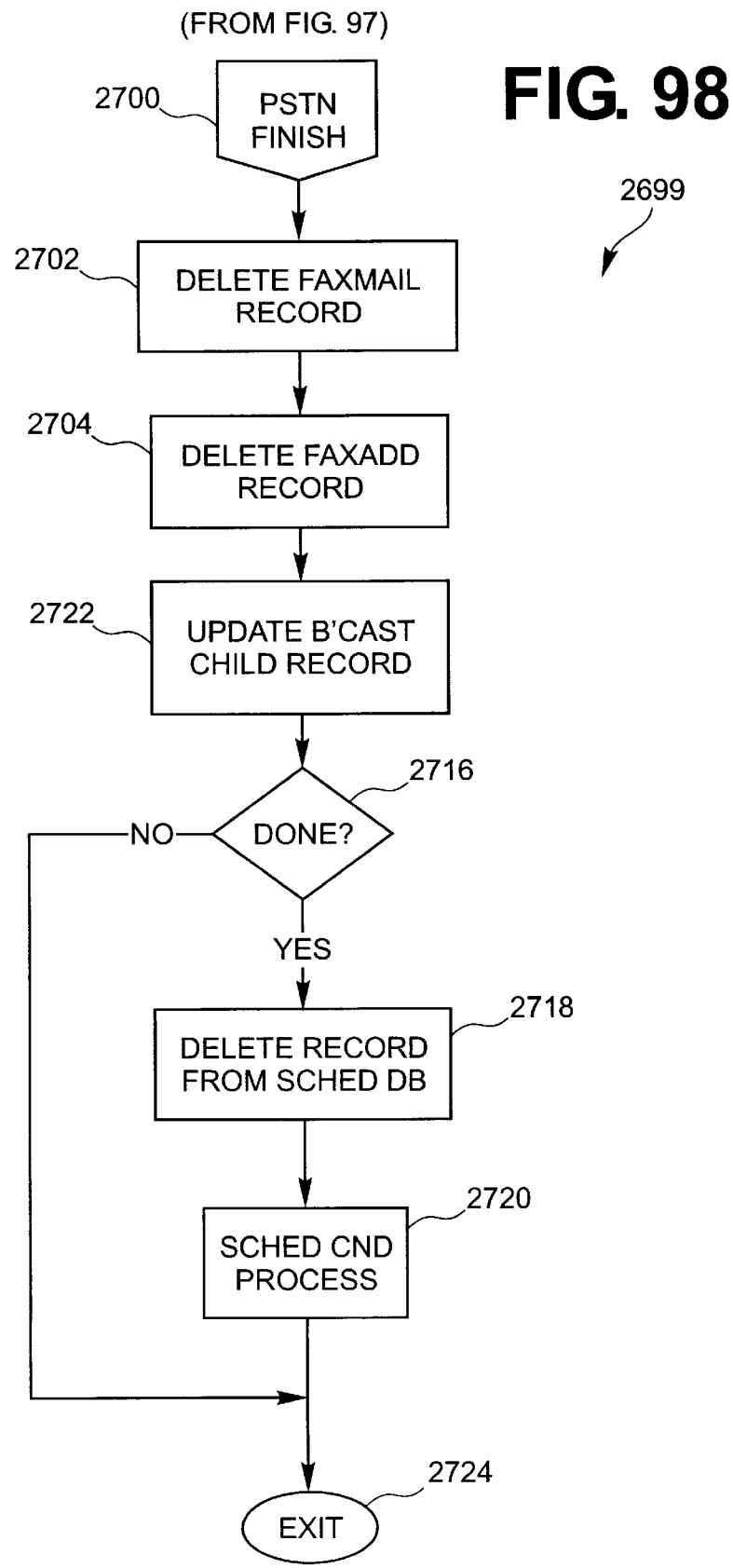
FIG. 98 is a flow chart representation of the PSTN finish routine referenced by FIG. 97.
Figure 99:
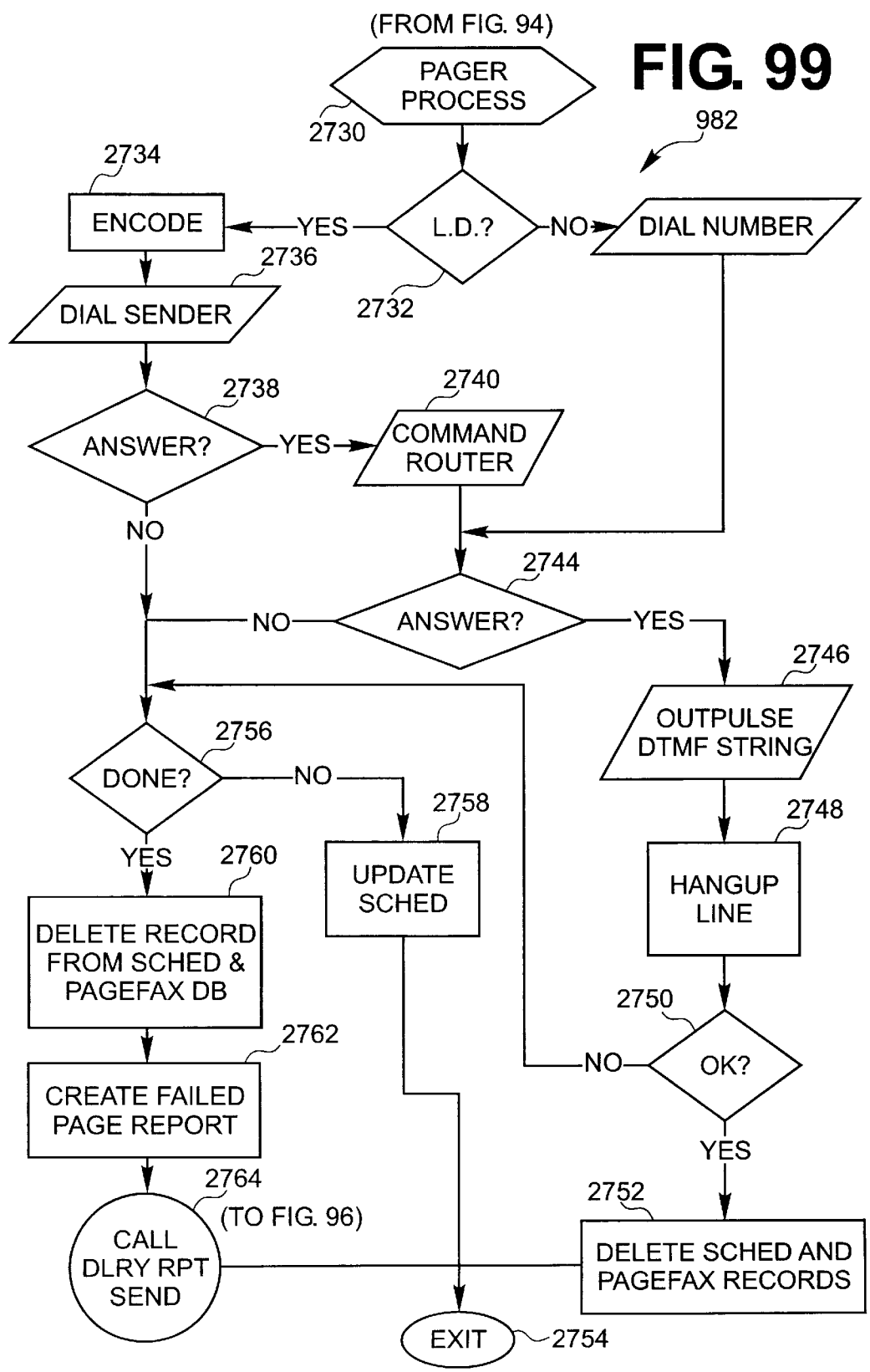
FIG. 99 is a flow chart representation of the pager process referenced by FIG. 97.
Figure 100:
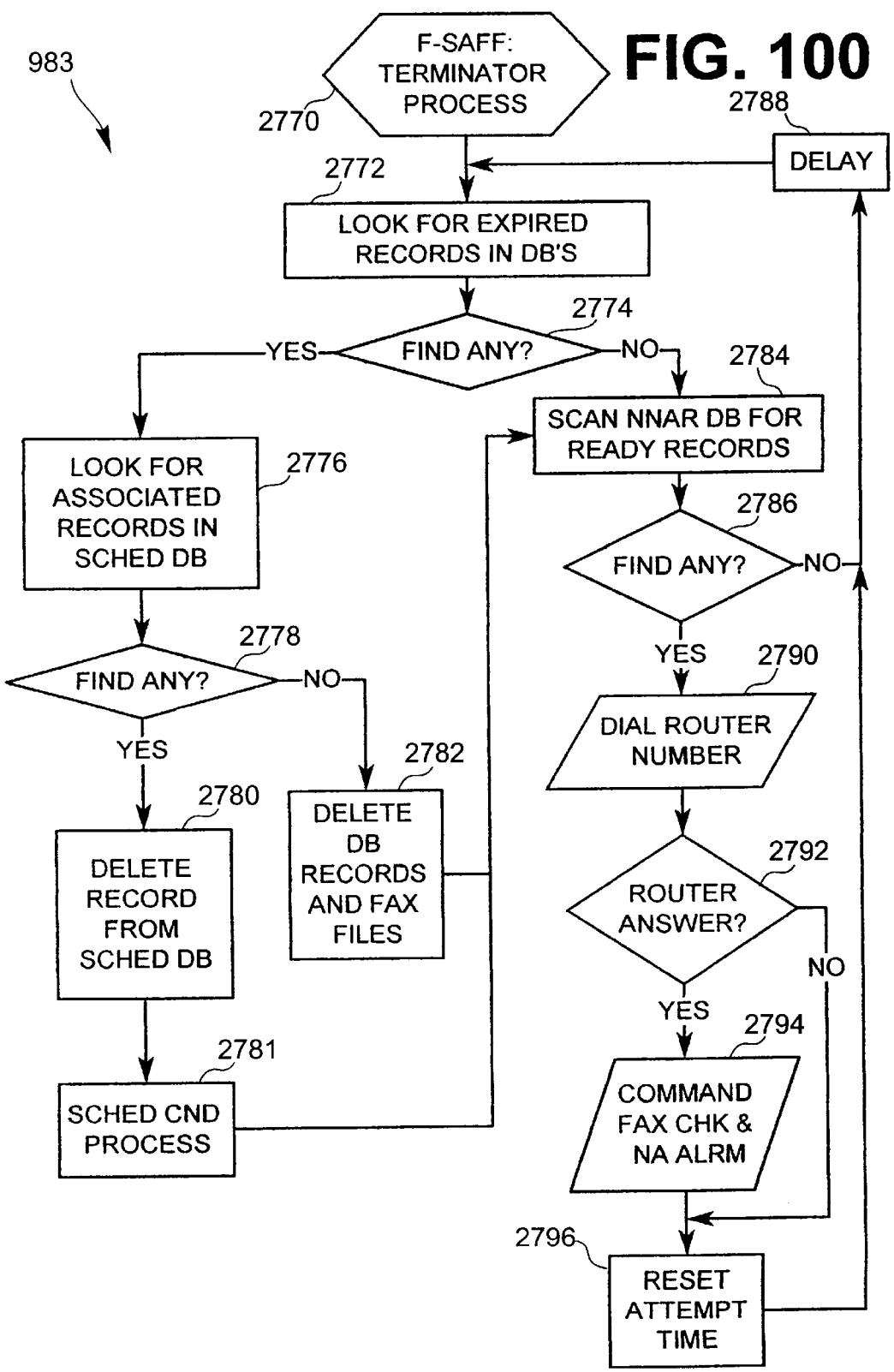
FIG. 100 is a flow chart representation of the terminator process of the F-SAFF of FIG. 28.

Refer now to FIG. 95 which shows a CND process 2599 which is spawned from FIG. 94 after being scheduled in one of FIGS. 94, 98 or 100. The BCAST PARENT database 998 and the BCAST CHILD database 997 are updated in steps 2602 and 2604 according to the previous action before which the CND process 2599 is scheduled, including recognition that a delivery has been made, cannot be made, or has been assigned to be handled with other records pointing to the NNAR database 995. Next, if the event is not the last job of the overall broadcast job, operation ends through exit step 2608. On the other hand, if the overall broadcast job is now complete, or if the event was not part of a broadcast job, a delivery status report is created in step 2610, the delivery report send subroutine of FIG. 96 is called through call connector 2612 to send the report, and any relevant records in the BCAST databases 997, 998 are deleted in steps 2614, 2616 before operation ends through exit step 2608. Referring now to FIG. 96, a delivery report send subroutine 2629 is called in FIGS. 90, 92, 95, and 99 to schedule delivery of the delivery status report. If the router 112 to which the delivery report is to be sent is referenced in the NNAR database 995, the record for the delivery report in the FAX INFO database 991 is caused to point to the NNAR record in step 2636 before operation is returned through jump connector 2638. If not, a record is added to the SCHEDULER database 996 for delivering the delivery report to the telephone number of the router 112, as discovered from the CONFIG database 1006, according to steps 2640 and 2642, before returning in step 2638.

Figure 97:
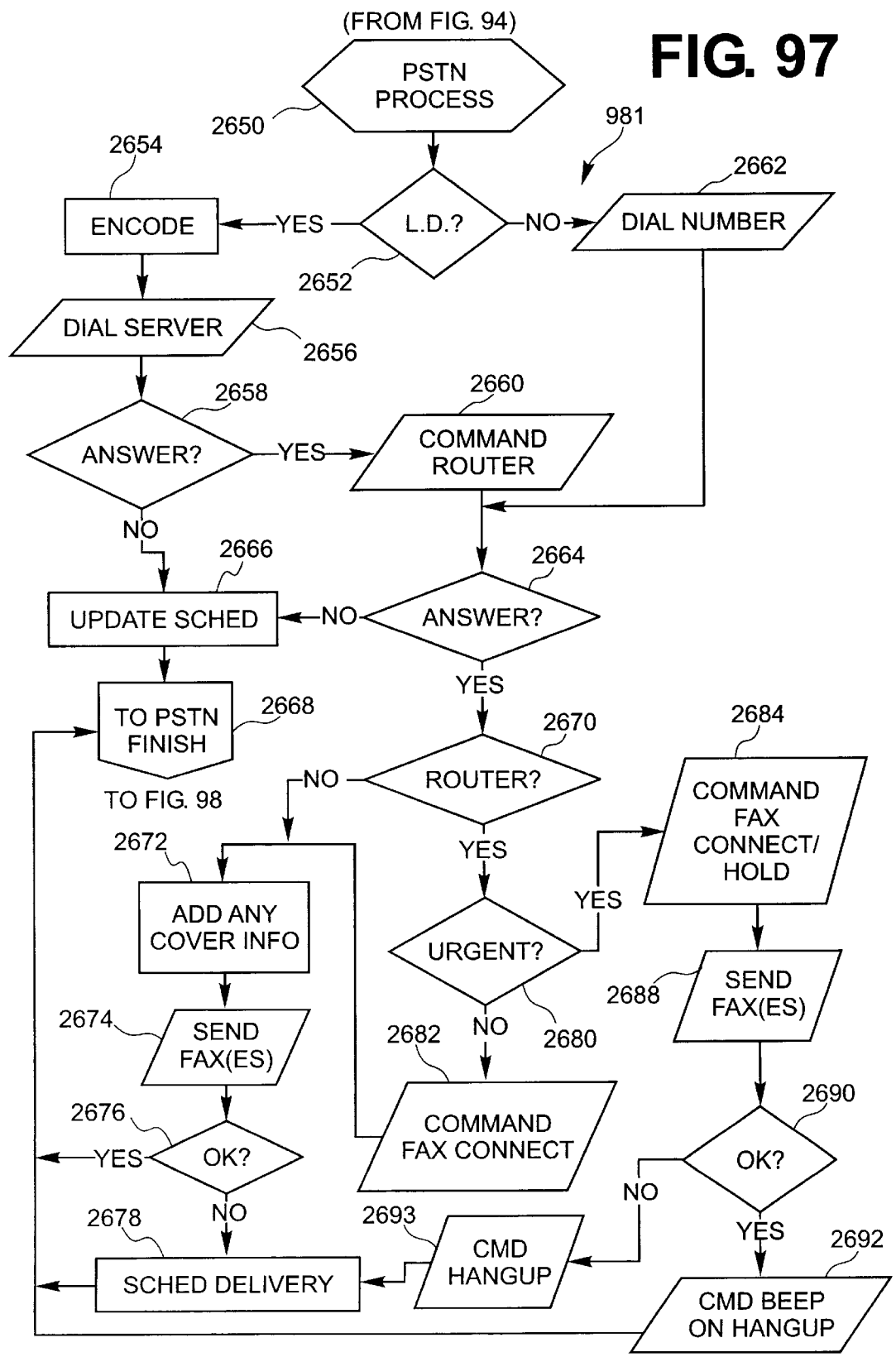
FIG. 97 is a flow chart representation of the PSTN process referenced by FIG. 94.

Refer now to FIG. 97 which shows a PSTN process 981 as spawned by the scheduler process 980 of FIG. 94. If the destination telephone number to which the scheduled information is to be delivered is not long distance telephone number, or any other type of number for which the user would normally pay an additional charge to access, the F-SAFF 116 simply dials the telephone number in step 2662 and waits for an answer at decision block 2664. On the other hand, if a call to the destination telephone number would normally create a charge to the user, the F-SAFF 116 encodes the destination telephone number in step 2654 and, in step 2656, dials the telephone number of the router 112 which started the method which created the information to be delivered. If the router 112 answers the call, the F-SAFF 116 commands the router 112 in step 2660 to transfer the call to the an encoded destination telephone number, after which the router 112 drops out and only the F-SAFF 116 is on line waiting for an answer at the destination telephone number at decision block 2664, just as if the F-SAFF 116 had dialed the number in step 2662, without incurring any charges. If the F-SAFF 116 receives a busy signal or does not receive an answer within a predetermined amount of time in decision block 2658 or 2664, the record in the SCHEDULER database 996 is updated in step 2666 before operation is directed to a PSTN finish routine in FIG. 98 through jump connector 2668. If an answer is detected at decision block 2664, the F-SAFF 116 determines if the answering device is a router 112. If not, the F-SAFF 116, in a manner similar to step 1862 in FIG. 64, adds any necessary delivery time information, etc., to any generated cover page in step 2672. Subsequently, the scheduled facsimile information is transmitted to the destination facsimile machine 130 in step 2674. Although not explicitly shown, the F-SAFF 116 will listen/prompt for fax tones before sending the information. If the transmission is not successful, delivery of the previously scheduled facsimile information will be re-scheduled in step 2678. Subsequently, an in the event the transmission is successful, operation continues to FIG. 98 through the jump connector 2668. If a router 112 answers the call, the YES branch of decision block 2670 is taken to decision block 2680 which determines if the scheduled facsimile information to be delivered with an urgent notification. If not, the router 112 is directed to connect the facsimile machine 130, and operation continues as before with step 2672. Otherwise, for urgent information, the F-SAFF 116 first transmits a connect/hold command to the router 112 in step 2684, listens/prompts for fax tones (not explicitly shown), and sends the scheduled facsimile information in step 2688. If the transmission is successful, in step 2692 the F-SAFF 116 commands the router 112 to emit an urgent beep and then hang-up the line before jumping to FIG. 98, and if the transmission is not successful, in step 2693, the F-SAFF 116 commands the router 112 to hang-up before the F-SAFF 116 reschedules delivery of the previously scheduled facsimile information in step 2678, after which operation is directed to FIG. 98.

Refer now to FIG. 98, which shows a PSTN finish routine 2699. If the current transmission of facsimile information is facsimile mail information or facsimile addition information, records are deleted from the FAXMAIL MSG database 1001 or the FAXADD database 1008, respectively, according to steps 2702 and 2704. Then, a record in the BCAST CHILD database 997 is updated according to step 2722. Subsequently, if the job has not been successfully delivered, reached a maximum number of delivery attempts, or expired, it is not done according to decision block 2716, thus the NO branch is taken to exit through step 2710. Otherwise, if the job has been successfully delivered, reached a maximum number of delivery attempts, or expired, it is deleted from the SCHEDULER database 996 in step 2718, and a CND process is scheduled in step 2720 before the exit step 2724.

Referring now to FIG. 99, a pager process 989 is shown including instructions which are very similar to initial instructions of the PSTN process of FIG. 97 in that the sender router 112 is used to make a long distance call which is otherwise dialed directly back the F-SAFF 116. At decision block 2744, only the F-SAFF 116 is on the line waiting for an answer from a destination telephone number of a pager service. If a busy signal is received or if an answer signal is not received within a predetermined amount of time at decision block 2738 or 2744, the F-SAFF 116 determines in decision block 2756 whether the job is done, according to the factors discussed above. If not, the SCHEDULER database 996 is updated to re-schedule the job in step 2758 before the process ends in step 2754. If the job is done, corresponding records are deleted from the SCHEDULER database 996 and the PAGEFAX database 999 in step 2762, a failed delivery report is created in step 2762 which is scheduled after a call to the delivery report subroutine of FIG. 96, and operation ends in step 2754. If an answer is received in decision lock 2744, the pager DTMF digits are output to the pager service in step 2746, and the F-SAFF 116 hangs up the line in step 2748. If the transmission is not successful, operation continues with decision block 2756, otherwise records are deleted from the SCHEDULER and PAGEFAX databases 996, 999 before the process ends in step 2754.

Refer now to FIG. 100 which shows a flowchart representation of the independent terminator process 983. In step 2772, the F-SAFF 116 looks for expired records in all of the various databases of the present invention. If any expired records are found, the F-SAFF 116 looks for associated records in the SCHEDULER database 996. If associated records are found, they are deleted in step 2780, and a CND process is scheduled in step 2781. Otherwise, the expired records and fax files are deleted in step 2782. Subsequently, according to step 2784, and as if no expired records had been found in decision block 2774, the NNAR database 995 is scanned for records which are ready for the F-SAFF 116 to call the router 112. If such records are found, the F-SAFF 116 dials the telephone number of the router 112 in step 2790 and commands the router 112 to schedule a fax check and activate the NA alarm if the router 112 answers, otherwise, and in any event, the NNAR record ready time is reset before operation continues to a delay step 2788 which is also reached if no ready records had been found in the NNAR database 995. When setting the ready times of the NNAR records, the F-SAFF 116 sets the first ready time to be short to cause the F-SAFF 116 to call the router 112 and turn on the NA alarm very soon after the F-SAFF 116 learns of the unavailability of the local facsimile machine 130.

Figure 103:
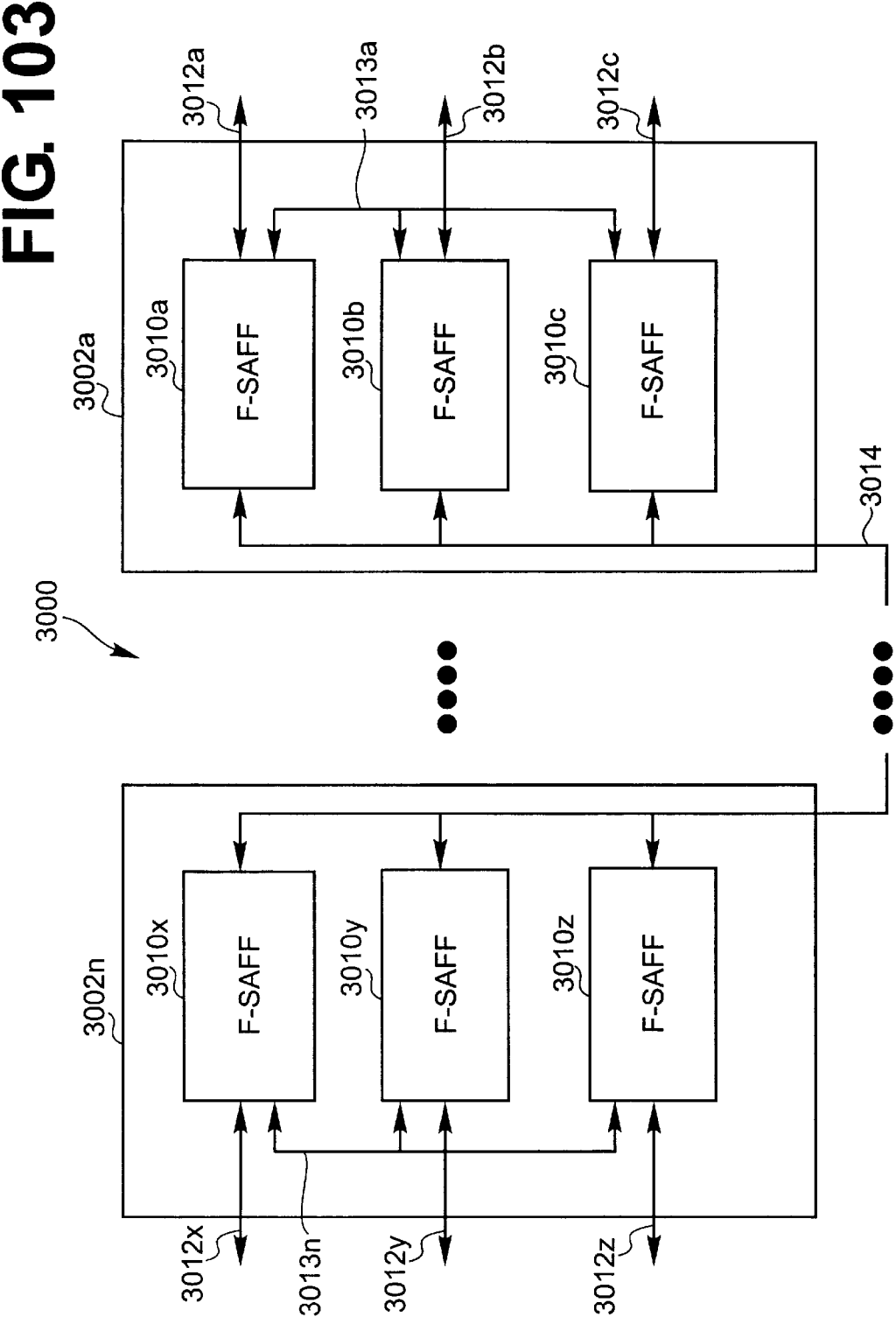
FIG. 103 is a block diagram representation of a large F-SAFF installation.

In addition to the preferred embodiment of the present invention, several alternate embodiments are also included. One alternate embodiment includes a larger facsimile store and forward system which includes a large F-SAFF installation 3000, as is shown in FIG. 103. Multiple F-SAFF racks 3002a–n, each of which includes multiple network F-SAFFs 3010a,b,c connected to outside lines 3012a–c and to each other through an intra-rack link 3013, are shown connected through an inter-rack link 3014. Each specific router 112 is assigned a specific preferred network F-SAFF 3010 on a preferred F-SAFF rack 3002. If all the ports on the preferred network F-SAFF 3010 are completely busy when the router 112 calls, the call is automatically routed through the intra-rack link 3013 to another network F-SAFF 3010 on that preferred F-SAFF rack 3002. If all of the ports on all of the network F-SAFFs 3010 on the preferred F-SAFF rack 3002 are busy, the call is automatically routed through the inter-rack link to another network F-SAFF 3010 on another F-SAFF rack 3002. Finally, if all of the ports on all of the network F-SAFFs 3010 on all of the F-SAFF racks 3002 in a large F-SAFF installation 3000 are busy, the call is routed to another remotely located large F-SAFF installation 3000. If a network F-SAFF 3010a becomes heavily loaded, a router 112 can be re-assigned to another network F-SAFF 301 Ob to which all of the associated records and facsimile information for that router 112 is transferred. In this embodiment, databases on each F-SAFF 3010 are shared among the network F-SAFFs 3010, and a larger data platform can be used centralize information accessed by all network F-SAFFs 3010. It is understood that each network F-SAFF 3010 will include additional processes for handling communication between network F-SAFFs 3010.

Figure 104:
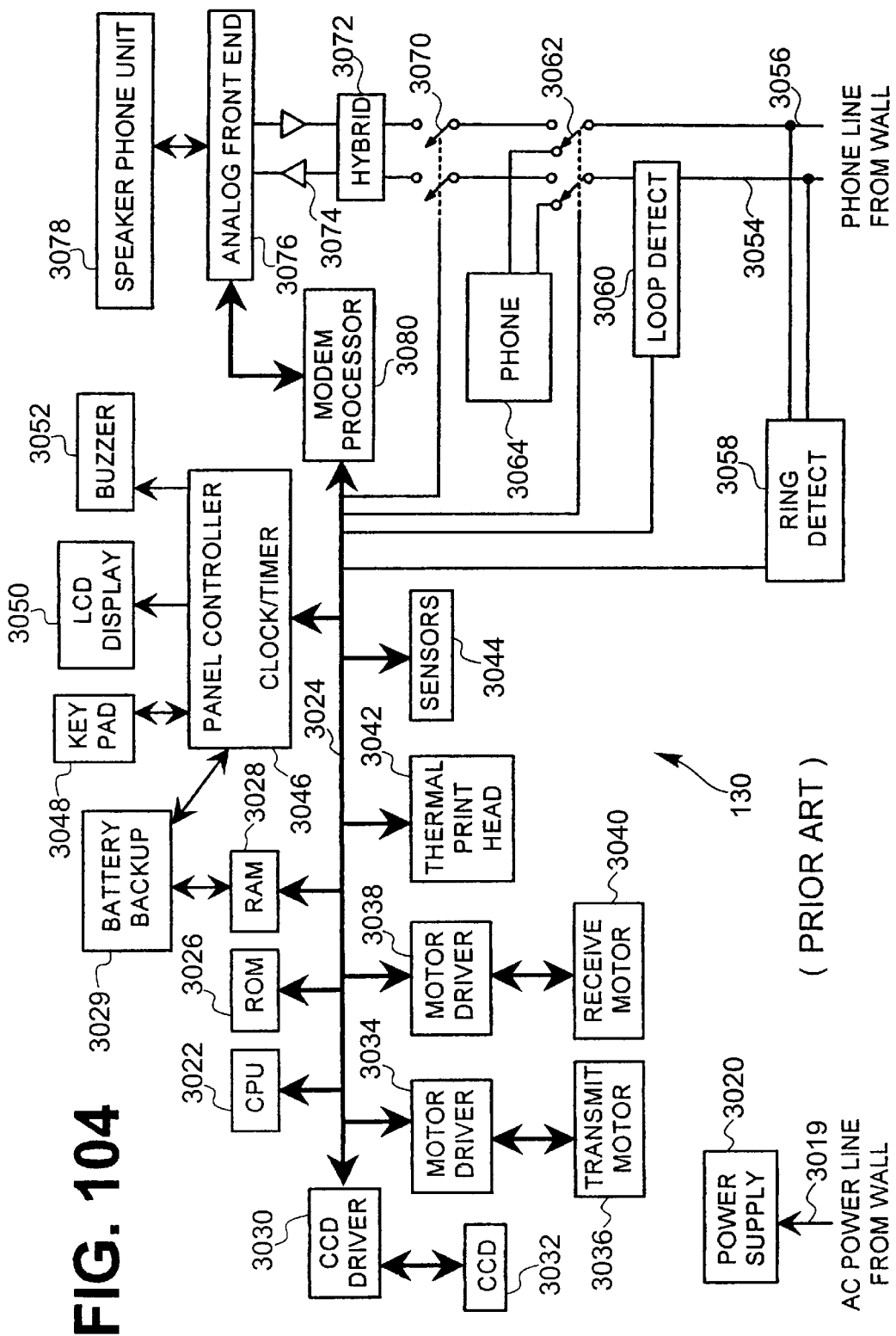
FIG. 104 is a block diagram representation of a conventional facsimile machine.
Figure 105:
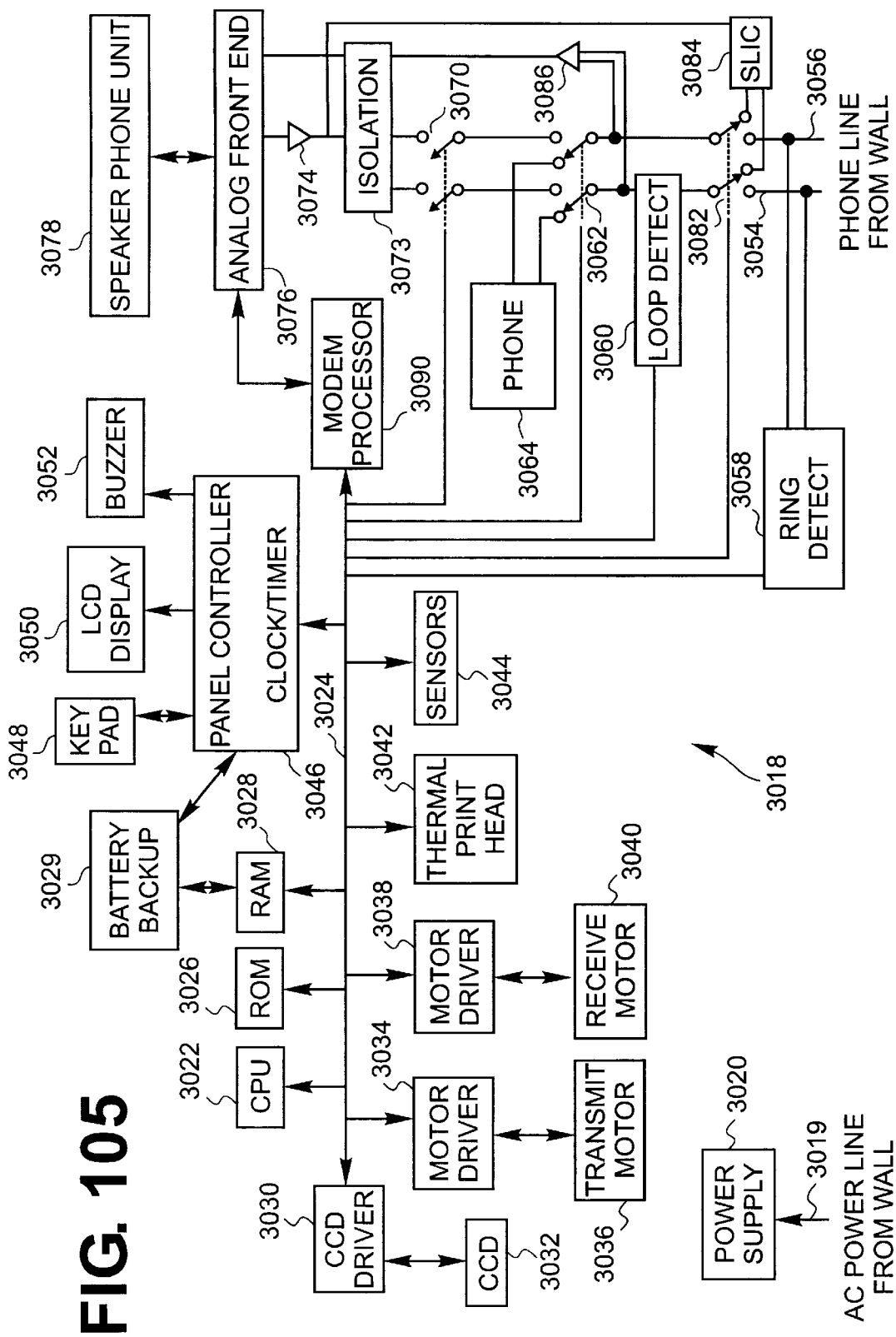
FIG. 105 is a block diagram representation of an improved facsimile machine in accordance with an alternate embodiment of the present invention.

As discussed above with respect to FIG. 1, in the preferred embodiment of the present invention, a router 112 is shown providing an external interface between a conventional facsimile machine 130 and the PSTN 114, between a conventional facsimile machine 130 and a PBX 117 connected to the PSTN 114, and between a facsimile equipped computer 132 and the PSTN 114. In three other alternate embodiments, a majority of the functionality of the router 112 is moved into each of the other components to form an improved facsimile machine, and improved PBX, and an improved facsimile equipped computer. While FIG. 104 shows a block diagram representation of a conventional facsimile machine 130, FIG. 105 shows a block diagram representation of an improved facsimile machine 3018. Referring now to FIG. 104, the conventional facsimile machine 130 is shown including an AC power cord 3019, receiving power from the router 112 in the preferred embodiment of the present invention, connected to a power supply 3020 through which other elements of the conventional facsimile machine 130 receive power. A central processing unit 3022 is shown connected through a bus 3024 to ROM 3026, RAM 3028 with a backup battery circuit 3029, a CCD (charge coupled device) driver 3030 connected to a CCD 3032, a motor driver 3034 connected to a transmit motor 3036, a motor driver 3038 connected to a receive motor 3040, a thermal print head 3042, sensors 3044, and a panel controller 3046 with clock/timer connected to the battery backup circuit 3029, a keypad 3048, an LCD display 3050, and a buzzer 3052. The bus 3024 is also shown connected to a modem processor 3080, a ring detect circuit 3058 connected to a fax tip line 3054 and fax tip line 3056, a loop detect circuit 3060, a phone switch 3062, and a hook switch 3070. The modem processor 3080 is connected to an analog front end 3076 which is connected to a speaker phone unit 3078. A hybrid circuit 3072 is connected through one-way lines with buffer amplifiers 3074 to a hybrid circuit 3072 which is also connected through tip-and-ring lines to the hook switch 3070. The hook switch is connected through tip-and-ring lines to the phone switch 3062 which is also connected through tip-and-ring lines to a phone 3064 with a bell included.

In operation, the CPU 3022 directs operation of the conventional facsimile machine 130 in response to program control with ROM 3026 and RAM 3028. The CCD driver 3030 provides an interface to the CCD 3032 which is used for scanning images into the conventional facsimile machine 130. The motor driver 3034 provides an interface to the transmit motor 3036 used to pull paper into the conventional facsimile machine 130 for scanning and transmission. The motor driver 3038 provides an interface to the receive motor 3040 used to push paper out from the conventional facsimile machine 130 when receiving facsimile information or printing a generated report. The thermal print head 3042 is used to print information on paper stored within the conventional facsimile machine 130, and the sensors 3044 enable the CPU to monitor various events associated with usage of the conventional facsimile machine 130, including whether the case is open, paper is out, a document has been placed within the input tray, etc. The panel controller 3046 provides an interface to the keypad 3048 where a user dials a number, enters commands, etc, the LCD display where various types of information are displayed for the user to view, and a buzzer 3052 for providing audible notification of various events. The modem processor 3080 is a digital signal processor for modulating and demodulating data according to facsimile transmission protocols, such as the V.29 protocol. The analog front end circuit 3076 provides digitizing, filtering, and other functions for providing an interface to the modem processor 3080. The hybrid circuit 3072 provides isolation and conversion between two-wire (two-way per pair) and four-wire (one-way per pair) communication. The speaker phone unit includes a microphone and speaker for hands-free operation of the conventional facsimile machine 130. The ring detector circuit 3058 provides notification to the CPU 3022 of the existence of a ring signal on the fax tip and ring lines 3054, 3056. The loop current detector 3060 provides notification to the CPU 3022 that the phone 3064 is off-hook. The phone switch 3062 provides the conventional facsimile machine 130 with the ability to switch between allowing communication with the with the phone 3064 or the facsimile components of the conventional facsimile machine 130, including the analog front end 3076 and the modem processor 3090. The hook switch 3070 provides the conventional facsimile machine 130 with the ability to go off-hook with the facsimile components of the conventional facsimile machine 130.

The switches 3062, 3070 are shown in their normal configuration. To transmit facsimile information, the user may simply place a document in an input tray, dial the digits on the keypad 3048, and press a start key on the keypad 3048. The CPU 3022 then takes the facsimile components off-hook by closing the hook switch 3070 and the phone switch 3062, and the conventional facsimile machine 130 outputs DTMF digits through the modem processor 3090, analog front end 3076, and hybrid 3072, which is the path through which facsimile information then flows. A user can also take the phone 3064 off-hook, dial a destination number on the keypad 3048, and wait to hear CED tones before pressing the start key on the keypad 3048 and hanging up. According to such a scenario, the phone 3064 goes off-hook and transmits the DTMF digits. When the start key is pressed, the hook switch 3070 is closed, and the phone switch 3062 is switched to connect the fax tip and ring lines 3054, 3056 to the facsimile components for receipt of the facsimile information.

Refer now to FIG. 105 which shows a block diagram of an improved facsimile machine 3018. While many components are similar to those of the conventional facsimile machine 130 of FIG. 104, a bus-controlled SLIC switch 3082 connects a SLIC (subscriber line interface circuit) 3084 to the fax tip and ring lines 3054, 3056. The SLIC is also connected to the analog front end 3076 through a buffer amplifier 3074 for receiving dial tone and other tones from an alternate modem processor 3090 having DTMF detect and tone generation capabilities. A high-impedance operational amplifier circuit 3086 is also shown connected to the fax tip and ring lines 3054, 3056 between the SLIC switch 3082 and the phone switch 3062 and providing output to an isolation circuit 3073 which takes the place of the hybrid circuit 3072 of FIG. 104 to provide isolation and proper off-hook impedance. The most notable distinction is that the CPU 3022, ROM 3026, and RAM 3028 operate under completely different firmware which, while providing control of the elements of the conventional facsimile machine 130, also provide many of the functions of the router 112 of the preferred embodiment of the present invention. According the present alternate embodiment, V.29 modulation is used, rather than Bell 202, to download and upload modulated data between the improved facsimile machine 3018 and the F-SAFF 116. In other alternate embodiments, including those with an external router 112, an improved PBX, etc., the router functionality is provided with fixed code without on-line upgrading of code. The switches 3070, 3062, and 3082 are shown in their normal configurations, referred to herein as open states.

In operation, when a user places a document in an input tray of the improved facsimile machine 3018, dials a number, and presses the start key, the CPU 3022 causes the switches 3062, 3070, 3082 to reverse from that shown in FIG. 105 so that the improved facsimile machine 3018 is off-hook through isolation circuit 3073 and so that DTMF digits can be output from the modem processor 3090 to dial the number. In accordance with the enhanced facsimile methods of the present invention, the CPU 3022 can hangup the line by opening the hook switch 3070, go off-hook again by closing the hook switch 3070 and then dialing the F-SAFF 116 to finish a NNABS method. If a user instead goes off-hook with the phone 3064, dials a number and waits for CED tones before pressing the start key, the CPU 3022 will first be notified that the user has gone off-hook at the phone 3064 when the loop-current detector circuit 3060 notifies the CPU of such an occurrence. Subsequently, battery and dial tone are generated through the modem processor 3090 and the SLIC 3084 and supplied to the phone 3064 without any change to the switches 3062, 3070, and 3082. To take the improved facsimile machine 3018 off-hook and dial the DTMF digits, the CPU 3022 closes all of the switches 3062, 3070, and 3082 before transmitting the digits from the modem processor 3090 as with the first dialing method, after which the phone switch is opened to allow the user to hear the call progress. The CPU 3022 can monitor the call progress through the amplifier circuit 3086, hanging up the phone and dialing the telephone number of the F-SAFF 116 upon detecting a busy signal or after a predetermined amount of time or number of ringback signals received. The improved facsimile machine 3018 hangs up the line by closing the phone switch 3062 and opening the hook switch 3070, after which the hook switch 3070 is closed to allow dialing of the telephone number.

When a call comes into the improved facsimile machine 3018, the ring detect circuit 3058 notifies the CPU 3022 of the occurrence. Subsequently, the switches 3062, 3070, 3082 are closed to take the improved facsimile machine 3018 off-hook, a DTMF "AA" is transmitted from the modem processor 3090 through the analog front end 3076, and isolation circuit 3073 to the fax tip and ring lines 3054, 3056, after which the CPU 3022 can analyze incoming DTMF digits through the amplifier circuit 3086 and modem processor 3090. If a call transfer is to be initiated to the predefined F-SAFF 116, in the case of a remote caller, or to an alternate number if the caller is the F-SAFF 116, a flash is accomplished by temporarily opening the hook switch 3070, after which the number is dialed in a similar fashion as the method proceeds as suggested by the above discussions. The improved facsimile machine 3018 can also be given a connect/hold command to keep the line open after facsimile communication to simulate the post-fax line ability of the router 112 of the preferred embodiment of the present invention.

Figure 106:
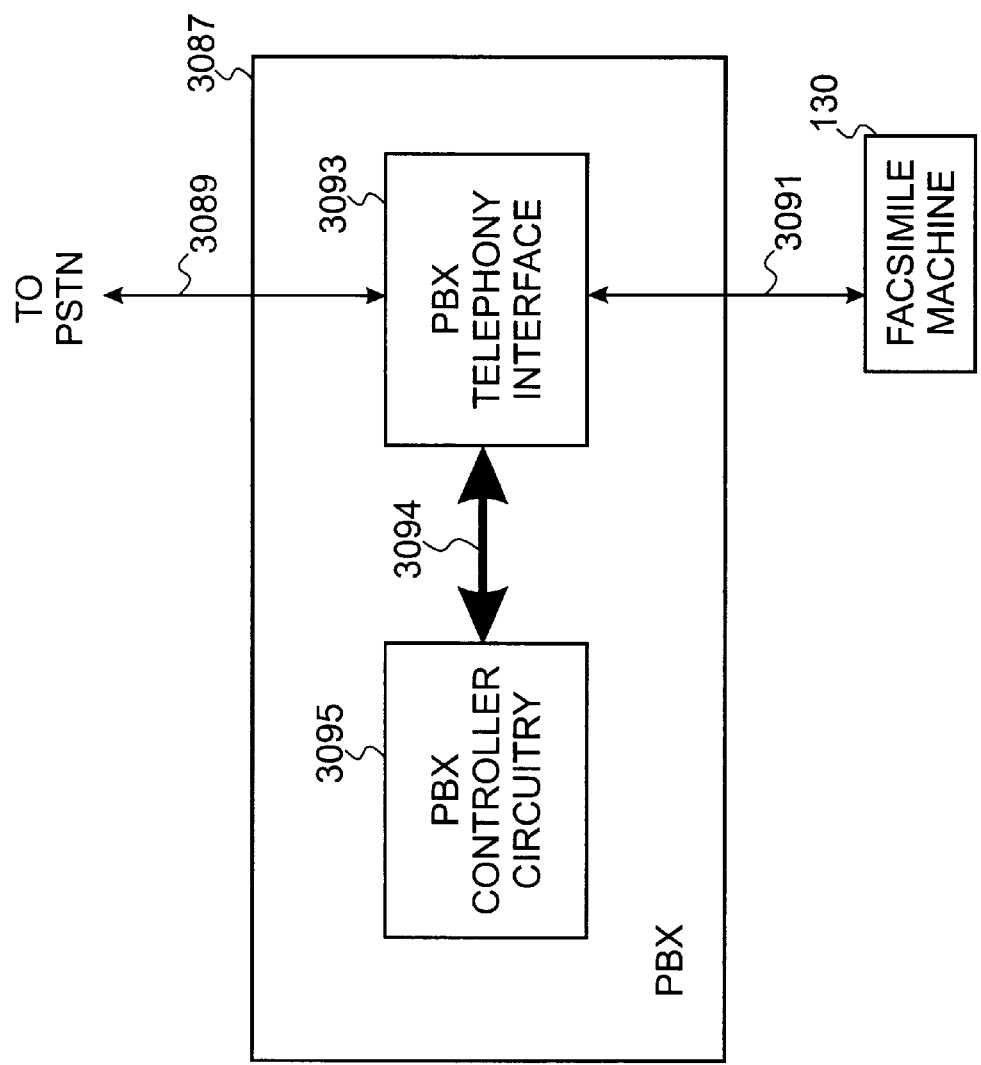
FIG. 106 is a block diagram representation of an improved PBX in accordance with an alternate embodiment of the present invention.

Refer now to FIG. 106 which shows, in accordance with another alternate embodiment of the present invention, a block diagram representation of an improved PBX 3087 which is shown connected between an outside trunk 3089 and an inside fax line 3091 which is connected to a conventional facsimile machine 130. Inside the improved PBX 3087, a PBX telephony interface 3093 is connected to the outside trunk 3089 and the inside fax line 3091. The PBX telephony interface 3093 is also connected through a PBX bus 3094 to PBX controller circuitry 3095. While the improved PBX 3087 of the present alternate embodiment is, from a hardware standpoint, very similar to conventional PBX systems, the PBX controller circuitry 3095 of the improved PBX 3087 operates under stored program control to direct operation of the PBX telephony interface 3093 in order to provide the new router functionality as discussed in great detail above. In addition, it is understood that certain advantages and disadvantages are realized by this integration of router and PBX functionality. For example, V.21 capabilities are not needed to monitor concluding handshaking signals in order to grab the line since the improved PBX 3087 possesses the ability to allow the facsimile machine 130 to go on-hook without losing the connection on the outside trunk 3089. However, without V.21 monitoring capabilities, the improved PBX 3087 would be unable to monitor handshaking signals ensuring proper delivery of urgent facsimile information so that a remote router urgent beep could be commanded. In addition, many PBX systems do not have modem communication capabilities to download and upload new operating instructions. Thus, in other alternate embodiments, the improved PBX 3087 also includes Bell 202 modem and V.21 functionality.

Referring back to FIG. 1, the-facsimile equipped computer 132 is show connected through a router 112 to the PSTN 114. In accordance with another alternate embodiment of the present invention, an improved facsimile equipped computer is connected directly, or through a PBX 117, to the PSTN 114 without going through a physical, external router 112 and includes a uniquely-programmed personal computer with a conventional fax adapter having DTMF detect and generation capabilities. One example of an acceptable fax adapter is the U-1496E fax board, available from Zyxel of Anaheim, Calif. The personal computer includes new and unique programming to interact with the fax adapter to provide router and other functions of the present invention, as would be understood by one reasonably skilled in the art after understanding the details of the present specification, including the operation of the improved facsimile machine discussed above.

According to the above description of the preferred embodiment of the present invention, although methods are defined for handling and eventually completing transfers of facsimile information for calls initiated from a local facsimile machine 130 to remote destinations which receive a busy signal or do not receive an answer within a predetermined amount of time, the NNABS method, as well as for calls initiated from a remote location to the local facsimile machine 130 which are answered by the router 112 when the local facsimile machine 130 is unable to receive facsimile information, the NNAR method, there is no discussion regarding how a call from a remote facsimile machine 130 without a router 112 is handled when a busy signal is received by the remote facsimile machine 130, in essence, a NBR (never busy receive) method. One solution to this problem includes, according to an alternate embodiment of the present invention, a user configuring the local carrier to automatically transfer calls during busy situations to a number at the F-SAFF 116. The F-SAFF 116 would then answer the telephone as though it were the router 112 so that callers could enter normal commands. Accordingly, the F-SAFF 116 would store any facsimile information, including information from the caller, delivery reports, etc., as though the information had been generated by the NNAR method.

Still another alternate embodiment of the present invention includes providing remote callers access to certain user services. When a remote caller calling from a remote telephone 138, a remote facsimile terminal 130x, or a remote facsimile equipped computer 132b with specialized software, reaches the router 112, rather than simply translating digits received from the caller and calling the F-SAFF 116, the router 112 will, according to this alternate embodiment, require a passcode from the caller before accessing the F-SAFF 116. Thus, many of the services referenced in FIG. 42, including administrative and operator service routines, would then be available to remote callers. For instance, a remote caller would be able to use the facsimile information send method of FIG. 74 whereby stored facsimile information is prepended to current facsimile information and transmitted to a destination telephone number entered by the remote caller. As is the case with other user services offered to remote callers, the F-SAFF 116 would, rather than attempt to send a confirmation report to the remote caller or attempt a call transfer with the remote caller, hang-up the remote caller and schedule a call to the router 112 to deliver the confirmation report and accomplish the call transfer.

Refer now to FIG. 107 which shows a facsimile store and forward system 110' in accordance with another alternate embodiment of the present invention where all of the elements shown connected to the PSTN 114 are co-located with each other. A data computer 3136, a facsimile equipped computer 3132, and a local F-SAFF 3116 are shown connected to a data network 3118, such as a local area network. The local F-SAFF 3116 is also connected to a PBX 3117 which is connected to the PSTN 114. A router 3112a connects the facsimile equipped computer 3132 to the PBX 3117, and a router 3112b connects a facsimile machine 3130 to the PBX 3117. It should understood that the data computer 3136, facsimile equipped computer 3132, routers 3112a,b, and facsimile machine 3130 each represent a plurality of similar devices connected as shown in FIG. 107, in addition to a plurality of other (not shown) facsimile machines and telephones connected to PBX 3117. Furthermore, the connections between the PBX 3117 and the plurality of routers 3112a,b are understood to include addressable extension lines as well as central office lines. According to this alternate embodiment of the present invention, the facsimile equipped computer 3132 and data computer 3136 are similar to the facsimile equipped computer 132a and data computer 136, respectively, of the preferred embodiment with the addition of data network interface devices, such as conventional ethernet adapters and driver software.

Except for a few differences which are discussed below, the facsimile store and forward system 110' of FIG. 107 is very similar to the facsimile store and forward system 110 of the preferred embodiment of the present invention. Regarding the differences, the routers 3112 are initialized by a user dialing the extension (or telephone number for routers 3112 connected to CO lines) of the local F-SAFF 3116 after power-up of the routers 3112. The local F-SAFF 3116 is then accessed by the router 3112 for downloading RAM, including learning how to obtain outside line access. Thus, according to this alternate embodiment, there is no need for a universal platform, its associated processes, or a method of obtaining outside line access. While the methods of the system 110' are similar to those of the system 110 of the preferred embodiment, the data network 3118 is the primary method of passing facsimile information and other signaling, such as reports, notifications, message waiting indications, etc., between the local F-SAFF 3116 and the computers 3132, 3136. This transfer method is especially useful with the transfer of information during the facsimile addition administration process. Furthermore, the OCR step of the data fax method can be eliminated since the data itself can be transferred directly to the OCR/BBS platform (not shown, but connected through a data link to the data network 3118).

In accordance with this alternate embodiment of the present invention, the local F-SAFF 3116 varies from the F-SAFF 116 of the preferred embodiment of the present invention. First, system parameter tables identify the F-SAFF as a local F-SAFF 3116 so that non-standard extensions are accepted as valid telephone numbers. Secondly, the process architecture varies from that shown in FIG. 32, including (not shown) the addition of a LAN-SAFFD daemon process, initiated by the PORTMON process 975, which accesses the databases 974 and handles requests over the data network 3118 (through the data interface 918 of FIG. 28) for incoming communication, and the addition of a LANSEND process, spawned by the SCHEDULER process 980, which handles the delivery of information to the computers 3132, 3136. The necessity and details of any other changes and modifications to the local F-SAFF 3116 would be understood by one reasonably skilled in the art after review of the present disclosure.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below.

I claim:

1. A method for facilitating communication of facsimile information through a public switched telephone network with a local facsimile machine, said method comprising:

providing a remotely located facsimile store and forward facility connected to the public switched telephone network;

coupling an interface device to a first telephone line connected to the local facsimile machine and to a second telephone line connected to the public switched telephone network;

receiving dual tone multi-frequency signals at the interface device, the signals being generated by the local facsimile machine in response to user input and corresponding to a request from a user;

calling the remotely located facsimile store and forward facility from the interface device over the second telephone line; and communicating command information between the interface device and the remotely located facsimile store and forward facility, and an interface connect/hold command from the remotely located facsimile store and forward facility to the interface device, whereby communication of the facsimile information through the public switched telephone network with the local facsimile machine is facilitated and the request from the user is fulfilled through provision and use of the remotely located facsimile store and forward facility and the interface device.

2. The method of claim 1, wherein the receiving step includes receiving signals generated by the local facsimile machine in response to user input corresponding to a request for a diagnostics service, wherein the communicating step includes the steps of translating the signals received at the interface device from the local facsimile machine into a facility command for the remotely located facsimile store and forward facility, transmitting the facility command from the interface device over the second telephone line and through the public switched telephone network to the remotely located facsimile store and forward facility, receiving the facility command at the remotely located facsimile store and forward facility, analyzing the facility command at the remotely located facsimile store and forward facility, generating an interface connect/hold command at the remotely located facsimile store and forward facility, transmitting the interface connect/hold command through the public switched telephone network and the second telephone line to the interface device, and receiving the interface connect/hold command at the interface device, and wherein the method further comprises, after the communicating step, the steps of connecting the first telephone line to the second telephone line at the interface device, monitoring the local facsimile machine from the remotely located facsimile store and forward facility for facsimile machine tones, receiving facsimile information from the local facsimile machine at the remotely located facsimile store and forward facility, monitoring the connected second telephone line at the interface device for concluding handshaking signals, supplying load from the interface device to the second telephone line in response to detecting the concluding handshaking signals, generating a diagnostics report and an interface connect command at the remotely located facsimile store and forward facility, transmitting the interface connect command from the remotely located facsimile store and forward facility to the interface device, receiving the interface connect command at the interface device, monitoring the first telephone line for loop current at the interface device, transmitting a ring signal on the first telephone line from the interface device in response to detecting no loop current on the first telephone line, notifying the remotely located facsimile store and forward facility from the interface device that the local facsimile machine is connected to the first telephone line upon detecting loop current on the first telephone line, connecting the first telephone line to the second telephone line at the interface device, monitoring the local facsimile machine from the remotely located facsimile store and forward facility for facsimile machine tones, and transmitting the diagnostics report from the remotely located facsimile store and forward facility to the local facsimile machine in response to detecting the facsimile machine tones.

3. The method of claim 1,
wherein the receiving step includes receiving signals generated by the local facsimile machine in response to user input corresponding to a request for enabling an access restriction service, including an access number,
wherein the communicating step includes the steps of
translating the signals received at the interface device from the local facsimile machine into a facility command for the remotely located facsimile store and forward facility,
transmitting the facility command from the interface device over the second telephone line and through the public switched telephone network to the remotely located facsimile store and forward facility,
receiving the facility command at the remotely located facsimile store and forward facility,
analyzing the facility command at the remotely located facsimile store and forward facility,
storing the access number at the remotely located facsimile store and forward facility,
generating an interface hang-up command at the remotely located facsimile store and forward facility,
transmitting the interface hang-up command through the public switched telephone network and the second telephone line to the interface device, and
receiving the interface hang-up command at the interface device, and
wherein the method further comprises, after the communicating step, the step of hanging up the second telephone line at the interface device in response to receiving the interface hang-up command.

4. The method of claim 1,
wherein the receiving step includes receiving signals generated by the local facsimile machine in response to user input corresponding to a request for an information service administration service,
wherein the communicating step includes the steps of
translating the signals received at the interface device from the local facsimile machine into a facility command for the remotely located facsimile store and forward facility,
transmitting the facility command from the interface device over the second telephone line and through the public switched telephone network to the remotely located facsimile store and forward facility,
receiving the facility command at the remotely located facsimile store and forward facility,
analyzing the facility command at the remotely located facsimile store and forward facility,
generating an interface connect/hold command at the remotely located facsimile store and forward facility,
transmitting the interface connect/hold command through the public switched telephone network and the second telephone line to the interface device, and
receiving the interface connect/hold command at the interface device, and
wherein the method further comprises, after the communicating step, the steps of
connecting the first telephone line to the second telephone line at the interface device,
monitoring the local facsimile machine from the remotely located facsimile store and forward facility for facsimile machine tones,
receiving facsimile information from the local facsimile machine at the remotely located facsimile store and forward facility,
monitoring the connected second telephone line at the interface device for concluding handshaking signals,
supplying load from the interface device to the second telephone line in response to detecting the concluding handshaking signals,
storing the facsimile information at the remotely located facsimile store and forward facility as information service information,
generating an information service index report and an interface connect command at the remotely located facsimile store and forward facility,
transmitting the interface connect command from the remotely located facsimile store and forward facility to the interface device,
receiving the interface connect command at the interface device,
monitoring the first telephone line for loop current at the interface device,
transmitting a ring signal on the first telephone line from the interface device in response to detecting no loop current on the first telephone line,
notifying the remotely located facsimile store and forward facility from the interface device that the local facsimile machine is connected to the first telephone line upon detecting loop current on the first telephone line,
connecting the first telephone line to the second telephone line at the interface device,
monitoring the local facsimile machine from the remotely located facsimile store and forward facility for facsimile machine tones, and
transmitting the information service index report from the remotely located facsimile store and forward facility to the local facsimile machine in response to detecting the facsimile machine tones.

5. The method of claim 1,
wherein the receiving step includes receiving signals generated by the local facsimile machine in response to user input corresponding to a request for a cover service administration service,
wherein the communicating step includes the steps of
translating the signals received at the interface device from the local facsimile machine into a facility command for the remotely located facsimile store and forward facility,
transmitting the facility command from the interface device over the second telephone line and through the public switched telephone network to the remotely located facsimile store and forward facility,
receiving the facility command at the remotely located facsimile store and forward facility,
analyzing the facility command at the remotely located facsimile store and forward facility,
generating an interface connect/hold command at the remotely located facsimile store and forward facility,
transmitting the interface connect/hold command through the public switched telephone network and the second telephone line to the interface device, and
receiving the interface connect/hold command at the interface device, and
wherein the method further comprises, after the communicating step, the steps of
connecting the first telephone line to the second telephone line at the interface device, monitoring the local facsimile machine from the remotely located facsimile store and forward facility for facsimile machine tones, receiving facsimile information from the local facsimile machine at the remotely located facsimile store and forward facility, monitoring the connected second telephone line at the interface device for concluding handshaking signals, supplying load from the interface device to the second telephone line in response to detecting the concluding handshaking signals, storing the facsimile information at the remotely located facsimile store and forward facility as cover service information, generating a cover service index report and an interface connect command at the remotely located facsimile store and forward facility, transmitting the interface connect command from the remotely located facsimile store and forward facility to the interface device, receiving the interface connect command at the interface device, monitoring the first telephone line for loop current at the interface device, transmitting a ring signal on the first telephone line from the interface device in response to detecting no loop current on the first telephone line, notifying the remotely located facsimile store and forward facility from the interface device that the local facsimile machine is connected to the first telephone line upon detecting loop current on the first telephone line, connecting the first telephone line to the second telephone line at the interface device, monitoring the local facsimile machine from the remotely located facsimile store and forward facility for facsimile machine tones, and transmitting the cover service index report from the remotely located facsimile store and forward facility to the local facsimile machine in response to detecting the facsimile machine tones.

6. The method of claim 1, wherein the receiving step includes receiving signals generated by the local facsimile machine in response to user input corresponding to a request for a facsimile mailbox service administration service, wherein the communicating step includes the steps of
translating the signals received at the interface device from the local facsimile machine into a facility command for the remotely located facsimile store and forward facility, transmitting the facility command from the interface device over the second telephone line and through the public switched telephone network to the remotely located facsimile store and forward facility, receiving the facility command at the remotely located facsimile store and forward facility, analyzing the facility command at the remotely located facsimile store and forward facility, generating an interface connect command at the remotely located facsimile store and forward facility, transmitting the interface connect command through the public switched telephone network and the second telephone line to the interface device, and receiving the interface connect command at the interface device, and wherein the method further comprises, after the communicating step, the steps of configuring facsimile mailbox options at the remotely located facsimile store and forward facility according to the facility command, generating a facsimile mailbox service index report at the remotely located facsimile store and forward facility, monitoring the first telephone line for loop current at the interface device, transmitting a ring signal on the first telephone line from the interface device in response to detecting no loop current on the first telephone line, notifying the remotely located facsimile store and forward facility from the interface device that the local facsimile machine is connected to the first telephone line upon detecting loop current on the first telephone line, connecting the first telephone line to the second telephone line at the interface device, monitoring the local facsimile machine from the remotely located facsimile store and forward facility for facsimile machine tones, and transmitting the facsimile mailbox service index report from the remotely located facsimile store and forward facility to the local facsimile machine in response to detecting the facsimile machine tones.

7. The method of claim 1, wherein the receiving step includes receiving signals generated by the local facsimile machine in response to user input corresponding to a request for a facsimile broadcast service administration service, wherein the communicating step includes the steps of
translating the signals received at the interface device from the local facsimile machine into a facility command for the remotely located facsimile store and forward facility, transmitting the facility command from the interface device over the second telephone line and through the public switched telephone network to the remotely located facsimile store and forward facility, receiving the facility command at the remotely located facsimile store and forward facility, analyzing the facility command at the remotely located facsimile store and forward facility, generating an interface connect command at the remotely located facsimile store and forward facility, transmitting the interface connect command through the public switched telephone network and the second telephone line to the interface device, and receiving the interface connect command at the interface device, and wherein the method further comprises, after the communicating step, the steps of configuring facsimile broadcast service options at the remotely located facsimile store and forward facility according to the facility command, generating a facsimile broadcast service index report at the remotely located facsimile store and forward facility, monitoring the first telephone line for loop current at the interface device, transmitting a ring signal on the first telephone line from the interface device in response to detecting no loop current on the first telephone line, notifying the remotely located facsimile store and forward facility from the interface device that the local facsimile machine is connected to the first telephone line upon detecting loop current on the first telephone line, connecting the first telephone line to the second telephone line at the interface device, monitoring the local facsimile machine from the remotely located facsimile store and forward facility for facsimile machine tones, and transmitting the facsimile broadcast service index report from the remotely located facsimile store and forward facility to the local facsimile machine in response to detecting the facsimile machine tones.

8. The method of claim 1, wherein the receiving step includes receiving signals generated by the local facsimile machine in response to user input corresponding to a request to reach a destination telephone number regardless of availability, wherein the method further comprises, before the call step, the steps of dialing the destination telephone number over the second telephone line from the interface device, connecting the first telephone line to the second telephone line at the interface device, monitoring the connected second telephone line at the interface device for call progress signals, disconnecting the second telephone line from the first telephone line to hang-up the second telephone line in response to any result other than a timely answer on the second telephone line, and supplying battery from the interface device only to the first telephone line in quick response to disconnection of the second telephone line, wherein the communicating step includes the steps of translating the signals received at the interface device from the local facsimile machine into a facility command, including the destination number, for the remotely located facsimile store and forward facility, transmitting the facility command from the interface device over the second telephone line and through the public switched telephone network to the remotely located facsimile store and forward facility, analyzing the facility command at the remotely located facsimile store and forward facility, and commanding an interface connect/hold command from the remotely located facsimile store and forward facility to the interface device, and wherein the method further comprises, after the communicating step, the steps of connecting the first telephone line to the second telephone line at the interface device, receiving facsimile information from the local facsimile machine at the remotely located facsimile store and forward facility, monitoring the connected second telephone line at the interface device for concluding handshaking signals, supplying load from the interface device to the second telephone line in response to detecting the concluding handshaking signals, storing the facsimile information at the remotely located facsimile store and forward facility, generating a job confirmation report at the remotely located facsimile store and forward facility, commanding another interface connect/hold command from the remotely located facsimile store and forward facility to the interface device, transmitting a ring signal on the first telephone line from the interface device, connecting the first telephone line to the second telephone line at the interface device in response to detecting loop current on the first telephone line, monitoring the local facsimile machine from the remotely located facsimile store and forward facility for facsimile machine tones, transmitting the job confirmation report from the remotely located facsimile store and forward facility to the local facsimile machine in response to detecting the facsimile machine tones, monitoring the connected second telephone line at the interface device for concluding handshaking signals, supplying load from the interface device to the second telephone line in response to detecting the concluding handshaking signals, commanding the interface device from the remotely located facsimile store and forward facility to dial the destination number again and transfer the call, instructing the public switched telephone network from the interface device to suspend the call on the second telephone line, dialing the destination telephone number again over the second telephone line from the interface device, instructing the public switched telephone network from the interface device to connect the first call to the second call, and transmitting the facsimile information stored at the remotely located facsimile store and forward facility to a remotely located facsimile machine.

9. The method of claim 1, wherein the receiving step includes receiving signals generated by the local facsimile machine in response to user input corresponding to a request to broadcast present facsimile information to a plurality of destinations presently identified by a plurality of present destination telephone numbers, wherein the communicating step includes the steps of translating the signals received at the interface device from the local facsimile machine into a facility command, including the plurality of present destination telephone numbers, for the remotely located facsimile store and forward facility, transmitting the facility command from the interface device over the second telephone line and through the public switched telephone network to the remotely located facsimile store and forward facility, analyzing the facility command at the remotely located facsimile store and forward facility, and commanding an interface connect/hold command from the remotely located facsimile store and forward facility to the interface device, and wherein the method further comprises, after the communicating step, the steps of connecting the first telephone line to the second telephone line at the interface device, receiving facsimile information from the local facsimile machine at the remotely located facsimile store and forward facility, storing the facsimile information at the remotely located facsimile store and forward facility, monitoring the connected second telephone line at the interface device for concluding handshaking signals, supplying load from the interface device to the second telephone line in response to detecting the concluding handshaking signals, generating a job confirmation report at the remotely located facsimile store and forward facility, commanding another interface connect/hold command from the remotely located facsimile store and forward facility to the interface device, transmitting a ring signal on the first telephone line from the interface device, connecting the first telephone line to the second telephone line at the interface device in response to detecting loop current on the first telephone line, transmitting the job confirmation report from the remotely located facsimile store and forward facility to the local facsimile machine, monitoring the connected second telephone line at the interface device for concluding handshaking signals, supplying load from the interface device to the second telephone line in response to detecting the concluding handshaking signals, analyzing at the remotely located facsimile store and forward facility the plurality of present destination telephone numbers to determine a first, preferably long distance, destination telephone number, scheduling subsequent delivery of the facsimile information to all remaining destinations of the remaining present destination telephone numbers of the plurality of present destination telephone numbers, commanding the interface device from the remotely located facsimile store and forward facility to dial the first, preferably long distance, destination telephone number and transfer the call, instructing the public switched telephone network from the interface device to suspend the call on the second telephone line, dialing the first, preferably long distance, destination telephone number over the second telephone line from the interface device, instructing the public switched telephone network from the interface device to connect the first call to the second call, and transmitting the facsimile information stored at the remotely located facsimile store and forward facility to the destination corresponding to the first, preferably long distance, destination telephone number.

10. The method of claim 1, wherein the receiving step includes receiving signals generated by the local facsimile machine in response to user input corresponding to a request to broadcast present facsimile information to a plurality of pre-defined destinations identified by a present broadcast list number corresponding to a plurality of pre-defined destination telephone numbers stored at the remotely located facsimile store and forward facility, wherein the communicating step includes the steps of translating the signals received at the interface device from the local facsimile machine into a facility command, including a present list number, for the remotely located facsimile store and forward facility, transmitting the facility command from the interface device over the second telephone line and through the public switched telephone network to the remotely located facsimile store and forward facility, analyzing the facility command at the remotely located facsimile store and forward facility, identifying the plurality of pre-defined destination telephone numbers from the list present broadcast list number, and commanding an interface connect/hold command from the remotely located facsimile store and forward facility to the interface device, and wherein the method further comprises, after the communicating step, the steps of connecting the first telephone line to the second telephone line at the interface device, receiving facsimile information from the local facsimile machine at the remotely located facsimile store and forward facility, storing the facsimile information at the remotely located facsimile store and forward facility, monitoring the connected second telephone line at the interface device for concluding handshaking signals, supplying load from the interface device to the second telephone line in response to detecting the concluding handshaking signals, generating a job confirmation report at the remotely located facsimile store and forward facility, commanding another interface connect/hold command from the remotely located facsimile store and forward facility to the interface device, transmitting a ring signal on the first telephone line from the interface device, connecting the first telephone line to the second telephone line at the interface device in response to detecting loop current on the first telephone line, transmitting the job confirmation report from the remotely located facsimile store and forward facility to the local facsimile machine, monitoring the connected second telephone line at the interface device for concluding handshaking signals, supplying load from the interface device to the second telephone line in response to detecting the concluding handshaking signals, analyzing at the remotely located facsimile store and forward facility the plurality of pre-defined destination telephone numbers to determine a first, preferably long distance, destination telephone number, scheduling subsequent delivery of the facsimile information to all remaining destinations of the remaining pre-defined destination telephone numbers of the plurality of pre-defined destination telephone numbers, commanding the interface device from the remotely located facsimile store and forward facility to dial the first, preferably long distance, destination telephone number and transfer the call, instructing the public switched telephone network from the interface device to suspend the call on the second telephone line, dialing the first, preferably long distance, destination telephone number over the second telephone line from the interface device, instructing the public switched telephone network from the interface device to connect the suspended call to the present call on the second telephone line, and transmitting the facsimile information stored at the remotely located facsimile store and forward facility to the destination corresponding to the first, preferably long distance, destination telephone number.

11. The method of claim 1, wherein the receiving step includes receiving signals generated by the local facsimile machine in response to user input corresponding to a request for an information send service including a present destination telephone number and a present information identification number corresponding to pre-stored facsimile information stored at the remotely located facsimile store and forward facility, wherein the communicating step includes the steps of translating the signals received at the interface device from the local facsimile machine into a facility command, including the present destination telephone number and the present information identification number, for the remotely located facsimile store and forward facility, transmitting the facility command from the interface device over the second telephone line and through the public switched telephone network to the remotely located facsimile store and forward facility, analyzing the facility command at the remotely located facsimile store and forward facility, and commanding an interface connect/hold command from the remotely located facsimile store and forward facility to the interface device, and wherein the method further comprises, after the communicating step, the steps of connecting the first telephone line to the second telephone line at the interface device, receiving facsimile information from the local facsimile machine at the remotely located facsimile store and forward facility, storing the facsimile information received from the local facsimile machine at the remotely located facsimile store and forward facility, monitoring the connected second telephone line at the interface device for concluding handshaking signals, supplying load from the interface device to the second telephone line in response to detecting the concluding handshaking signals, prepending the facsimile information received from the local facsimile machine to the pre-stored facsimile information at the remotely located facsimile store and forward facility to form facsimile information for delivery, generating a job confirmation report at the remotely located facsimile store and forward facility, commanding another interface connect/hold command from the remotely located facsimile store and forward facility to the interface device, transmitting a ring signal on the first telephone line from the interface device, connecting the first telephone line to the second telephone line at the interface device in response to detecting loop current on the first telephone line, transmitting the job confirmation report from the remotely located facsimile store and forward facility to the local facsimile machine, monitoring the connected second telephone line at the interface device for concluding handshaking signals, supplying load from the interface device to the second telephone line in response to detecting the concluding handshaking signals, commanding the interface device from the remotely located facsimile store and forward facility to dial the present destination telephone number and transfer the call, instructing the public switched telephone network from the interface device to suspend the call on the second telephone line, dialing the present destination telephone number over the second telephone line from the interface device, instructing the public switched telephone network from the interface device to connect the suspended call to the present call on the second telephone line, transmitting the facsimile information for delivery from the remotely located facsimile store and forward facility to a destination corresponding to the present destination telephone number.

12. The method of claim 1, wherein the receiving step includes receiving signals generated by the local facsimile machine in response to user input corresponding to a request for a cover sheet appending service including a present destination telephone number and a present cover sheet identification number corresponding to pre-stored facsimile information corresponding to a partial facsimile cover sheet stored at the remotely located facsimile store and forward facility, wherein the communicating step includes the steps of translating the signals received at the interface device from the local facsimile machine into a facility command, including the present destination telephone number and the present cover sheet identification number, for the remotely located facsimile store and forward facility, transmitting the facility command from the interface device over the second telephone line and through the public switched telephone network to the remotely located facsimile store and forward facility, analyzing the facility command at the remotely located facsimile store and forward facility, and commanding an interface connect/hold command from the remotely located facsimile store and forward facility to the interface device, and wherein the method further comprises, after the communicating step, the steps of connecting the first telephone line to the second telephone line at the interface device, receiving facsimile information from the local facsimile machine at the remotely located facsimile store and forward facility, storing the facsimile information received from the local facsimile machine at the remotely located facsimile store and forward facility, monitoring the connected second telephone line at the interface device for concluding handshaking signals, supplying load from the interface device to the second telephone line in response to detecting the concluding handshaking signals, creating a delivery cover sheet by combining the pre-stored facsimile information corresponding to the partial facsimile cover sheet with information taken from a portion of a first page of the facsimile information received from the local facsimile machine, prepending the deliverable cover sheet to the facsimile information received from the local facsimile machine at the remotely located facsimile store and forward facility to form facsimile information for delivery, generating a job confirmation report at the remotely located facsimile store and forward facility, commanding another interface connect/hold command from the remotely located facsimile store and forward facility to the interface device, transmitting a ring signal on the first telephone line from the interface device, connecting the first telephone line to the second telephone line at the interface device in response to detecting loop current on the first telephone line, transmitting the job confirmation report from the remotely located facsimile store and forward facility to the local facsimile machine, monitoring the connected second telephone line at the interface device for concluding handshaking signals, supplying load from the interface device to the second telephone line in response to detecting the concluding handshaking signals, commanding the interface device from the remotely located facsimile store and forward facility to dial the present destination telephone number and transfer the call, instructing the public switched telephone network from the interface device to suspend the call on the second telephone line, dialing the present destination telephone number over the second telephone line from the interface device, instructing the public switched telephone network from the interface device to connect the suspended call to the present call on the second telephone line, and transmitting the facsimile information for delivery from the remotely located facsimile store and forward facility to a destination corresponding to the present destination telephone number.

13. The method of claim 1, wherein the receiving step includes receiving signals generated by the local facsimile machine in response to user input corresponding to a request for a speed cover sheet appending service including a present speed number corresponding to a pre-stored destination telephone number and pre-stored facsimile information corresponding to a facsimile cover sheet stored at the remotely located facsimile store and forward facility, wherein the communicating step includes the steps of
translating the signals received at the interface device from the local facsimile machine into a facility command, including the present speed number, for the remotely located facsimile store and forward facility, transmitting the facility command from the interface device over the second telephone line and through the public switched telephone network to the remotely located facsimile store and forward facility, analyzing the facility command at the remotely located facsimile store and forward facility, and commanding an interface connect/hold command from the remotely located facsimile store and forward facility to the interface device, and wherein the method further comprises, after the communicating step, the steps of connecting the first telephone line to the second telephone line at the interface device, receiving facsimile information from the local facsimile machine at the remotely located facsimile store and forward facility, storing the facsimile information received from the local facsimile machine at the remotely located facsimile store and forward facility, monitoring the connected second telephone line at the interface device for concluding handshaking signals, supplying load from the interface device to the second telephone line in response to detecting the concluding handshaking signals, prepending the pre-stored facsimile information corresponding to a facsimile cover sheet to the facsimile information received from the local facsimile machine at the remotely located facsimile store and forward facility to form facsimile information for delivery, generating a job confirmation report at the remotely located facsimile store and forward facility, commanding another interface connect/hold command from the remotely located facsimile store and forward facility to the interface device, transmitting a ring signal on the first telephone line from the interface device, connecting the first telephone line to the second telephone line at the interface device in response to detecting loop current on the first telephone line, transmitting the job confirmation report from the remotely located facsimile store and forward facility to the local facsimile machine, monitoring the connected second telephone line at the interface device for concluding handshaking signals, supplying load from the interface device to the second telephone line in response to detecting the concluding handshaking signals, commanding the interface device from the remotely located facsimile store and forward facility to dial the present destination telephone number and transfer the call, instructing the public switched telephone network from the interface device to suspend the call on the second telephone line, dialing the present destination telephone number over the second telephone line from the interface device, instructing the public switched telephone network from the interface device to connect the suspended call to the present call on the second telephone line, and transmitting the facsimile information for delivery from the remotely located facsimile store and forward facility to a destination corresponding to the present destination telephone number.

14. The method of claim 1, wherein the receiving step includes receiving signals generated by the local facsimile machine in response to user input corresponding to a request for a private facsimile service including a present destination telephone number corresponding to a recipient destination, wherein the communicating step includes the steps of
translating the signals received at the interface device from the local facsimile machine into a facility command, including the present destination number, for the remotely located facsimile store and forward facility, transmitting the facility command from the interface device over the second telephone line and through the public switched telephone network to the remotely located facsimile store and forward facility, analyzing the facility command at the remotely located facsimile store and forward facility, and commanding an interface connect/hold command from the remotely located facsimile store and forward facility to the interface device, and wherein the method further comprises, after the communicating step, the steps of connecting the first telephone line to the second telephone line at the interface device, receiving facsimile information from the local facsimile machine at the remotely located facsimile store and forward facility, storing the facsimile information received from the local facsimile machine at the remotely located facsimile store and forward facility, monitoring the connected second telephone line at the interface device for concluding handshaking signals, supplying load from the interface device to the second telephone line in response to detecting the concluding handshaking signals, generating a private facsimile service retrieval code at the remotely located facsimile store and forward facility, generating a private facsimile service notification report including the private facsimile retrieval code at the remotely located facsimile store and forward facility, generating a job confirmation report at the remotely located facsimile store and forward facility, commanding another interface connect/hold command from the remotely located facsimile store and forward facility to the interface device, transmitting a ring signal on the first telephone line from the interface device, connecting the first telephone line to the second telephone line at the interface device in response to detecting loop current on the first telephone line, transmitting the job confirmation report from the remotely located facsimile store and forward facility to the local facsimile machine, monitoring the connected second telephone line at the interface device for concluding handshaking signals, supplying load from the interface device to the second telephone line in response to detecting the concluding handshaking signals, commanding the interface device from the remotely located facsimile store and forward facility to dial the present destination telephone number and transfer the call, instructing the public switched telephone network from the interface device to suspend the call on the second telephone line, dialing the present destination telephone number over the second telephone line from the interface device, instructing the public switched telephone network from the interface device to connect the suspended call to the present call on the second telephone line, transmitting the private facsimile service notification report from the remotely located facsimile store and forward facility to the recipient destination, answering a call from a remote facsimile machine at the interface device on the second telephone line, receiving dual tone multi-frequency signals at the interface device from the remote facsimile machine, including the private facsimile service retrieval code, analyzing the signals received from the remote facsimile machine at the interface device, instructing the public switched telephone network from the interface device to suspend the call on the second telephone line, placing a call to the remotely located facsimile store and forward facility from the interface device over the second telephone line, translating the signals received at the interface device from the remote facsimile machine into a facility command, including the private facsimile service retrieval code, for the remotely located facsimile store and forward facility, transmitting the facility command from the interface device over the second telephone line and through the public switched telephone network to the remotely located facsimile store and forward facility, receiving the facility command at the remotely located facsimile store and forward facility, analyzing the facility command at the remotely located facsimile store and forward facility, commanding the interface device from the remotely located facsimile store and forward facility to transfer the suspended call, instructing the public switched telephone network from the interface device to connect the suspended first call to the call presently on the second telephone line, finding the facsimile information received from the local facsimile machine stored at the remotely located facsimile store and forward facility corresponding to the private facsimile service retrieval code, and transmitting the facsimile information corresponding to the private facsimile service retrieval code to the remote facsimile machine.

15. The method of claim 1, wherein the receiving step includes receiving signals generated by the local facsimile machine in response to user input corresponding to a request for a will call facsimile service.

wherein the communicating step includes the steps of translating the signals received at the interface device from the local facsimile machine into a facility command for the remotely located facsimile store and forward facility, transmitting the facility command from the interface device over the second telephone line and through the public switched telephone network to the remotely located facsimile store and forward facility, analyzing the facility command at the remotely located facsimile store and forward facility, and commanding an interface connect/hold command from the remotely located facsimile store and forward facility to the interface device, and wherein the method further comprises, after the communicating step, the steps of connecting the first telephone line to the second telephone line at the interface device, receiving facsimile information from the local facsimile machine at the remotely located facsimile store and forward facility, storing the facsimile information received from the local facsimile machine at the remotely located facsimile store and forward facility, monitoring the connected second telephone line at the interface device for concluding handshaking signals, supplying load from the interface device to the second telephone line in response to detecting the concluding handshaking signals, generating a will call facsimile service retrieval code at the remotely located facsimile store and forward facility, generating a job confirmation report with the will call facsimile service retrieval code at the remotely located facsimile store and forward facility, commanding an interface connect command from the remotely located facsimile store and forward facility to the interface device, transmitting a ring signal on the first telephone line from the interface device, connecting the first telephone line to the second telephone line at the interface device in response to detecting loop current on the first telephone line, transmitting the job confirmation report from the remotely located facsimile store and forward facility to the local facsimile machine, answering a call from a remote facsimile machine at the interface device on the second telephone line, receiving dual tone multi-frequency signals at the interface device from the remote facsimile machine, including the will call facsimile service retrieval code, analyzing the signals received from the remote facsimile machine at the interface device, instructing the public switched telephone network from the interface device to suspend the call on the second telephone line, placing a call to the remotely located facsimile store and forward facility from the interface device over the second telephone line, translating the signals received at the interface device from the remote facsimile machine into a facility command, including the will call facsimile service retrieval code, for the remotely located facsimile store and forward facility, transmitting the facility command from the interface device over the second telephone line and through the public switched telephone network to the remotely located facsimile store and forward facility, receiving the facility command at the remotely located facsimile store and forward facility, analyzing the facility command at the remotely located facsimile store and forward facility, commanding the interface device from the remotely located facsimile store and forward facility to transfer the suspended call, instructing the public switched telephone network from the interface device to connect the suspended call to the call presently on the second telephone line, finding the facsimile information received from the local facsimile machine stored at the remotely located facsimile store and forward facility corresponding to the will call facsimile service retrieval code, and transmitting the facsimile information corresponding to the will call facsimile service retrieval code to the remote facsimile machine.

16. The method of claim 1, wherein the receiving step includes receiving signals generated by the local facsimile machine in response to user input corresponding to a request for a pager notification service including a present pager notification telephone number, wherein the communicating step includes the steps of
translating the signals received at the interface device from the local facsimile machine into a facility command, including the present pager notification telephone number, for the remotely located facsimile store and forward facility, transmitting the facility command from the interface device over the second telephone line and through the public switched telephone network to the remotely located facsimile store and forward facility, analyzing the facility command at the remotely located facsimile store and forward facility, and commanding an interface connect/hold command from the remotely located facsimile store and forward facility to the interface device, and wherein the method further comprises, after the communicating step, the steps of connecting the first telephone line to the second telephone line at the interface device, receiving facsimile information from the local facsimile machine at the remotely located facsimile store and forward facility, storing the facsimile information received from the local facsimile machine at the remotely located facsimile store and forward facility, monitoring the connected second telephone line at the interface device for concluding handshaking signals, supplying load from the interface device to the second telephone line in response to detecting the concluding handshaking signals, generating at the remotely located facsimile store and forward facility a pager digit delivery string including a telephone number of the second telephone line stored in the remotely located facsimile store and forward facility and a pager notification service retrieval code, generating a job confirmation report at the remotely located facsimile store and forward facility, commanding another interface connect/hold command from the remotely located facsimile store and forward facility to the interface device, transmitting a ring signal on the first telephone line from the interface device, connecting the first telephone line to the second telephone line at the interface device in response to detecting loop current on the first telephone line, transmitting the job confirmation report from the remotely located facsimile store and forward facility to the local facsimile machine, monitoring the connected second telephone line at the interface device for concluding handshaking signals, supplying load from the interface device to the second telephone line in response to detecting the concluding handshaking signals, commanding the interface device from the remotely located facsimile store and forward facility to dial the present pager notification telephone number and transfer the call, instructing the public switched telephone network from the interface device to suspend the call on the second telephone line, dialing the present pager notification telephone number over the second telephone line from the interface device, instructing the public switched telephone network from the interface device to connect the suspended call to the call on the second telephone line, and transmitting the pager digit delivery string from the remotely located facsimile store and forward facility to a destination corresponding to the present page notification telephone number, answering a call from a remote facsimile machine at the interface device on the second telephone line, receiving dual tone multi-frequency signals at the interface device from the remote facsimile machine, including the pager notification service retrieval code, analyzing the signals received from the remote facsimile machine at the interface device, instructing the public switched telephone network from the interface device to suspend the call on the second telephone line, placing a call to the remotely located facsimile store and forward facility from the interface device over the second telephone line, translating the signals received at the interface device from the remote facsimile machine into a facility command, including the pager notification service retrieval code, for the remotely located facsimile store and forward facility, transmitting the facility command from the interface device over the second telephone line and through the public switched telephone network to the remotely located facsimile store and forward facility, receiving the facility command at the remotely located facsimile store and forward facility, analyzing the facility command at the remotely located facsimile store and forward facility, commanding the interface device from the remotely located facsimile store and forward facility to transfer the suspended call, instructing the public switched telephone network from the interface device to connect the suspended call to the call presently on the second telephone line, finding the facsimile information received from the local facsimile machine stored at the remotely located facsimile store and forward facility corresponding to the pager notification service retrieval code, and transmitting the facsimile information corresponding to the pager notification service retrieval code to the remote facsimile machine.

* * * * *